US012215039B2

United States Patent
Repac et al.

(10) Patent No.: US 12,215,039 B2
(45) Date of Patent: Feb. 4, 2025

(54) SYNTHESIS, CAPPING, AND DISPERSION OF TiO$_2$ NANOCRYSTALS

(71) Applicant: PIXELLIGENT TECHNOLOGIES LLC, Baltimore, MD (US)

(72) Inventors: Jason Allen Repac, Baltimore, MD (US); Serpil Gonen Williams, Baltimore, MD (US); Selina Thomas Monickam, Baltimore, MD (US); Robert J. Wiacek, Baltimore, MD (US)

(73) Assignee: PT SPE SUBCO LLC, Baltimore, MD (US)

( * ) Notice: Subject to any disclaimer, the term of this patent is extended or adjusted under 35 U.S.C. 154(b) by 705 days.

(21) Appl. No.: 17/294,261

(22) PCT Filed: Nov. 20, 2019

(86) PCT No.: PCT/US2019/062439
§ 371 (c)(1),
(2) Date: May 14, 2021

(87) PCT Pub. No.: WO2020/106860
PCT Pub. Date: May 28, 2020

(65) Prior Publication Data
US 2022/0017381 A1 Jan. 20, 2022

Related U.S. Application Data

(60) Provisional application No. 62/892,625, filed on Aug. 28, 2019, provisional application No. 62/769,703, filed on Nov. 20, 2018.

(51) Int. Cl.
*C01G 23/08* (2006.01)
*C01G 23/053* (2006.01)
(Continued)

(52) U.S. Cl.
CPC .......... *C01G 23/08* (2013.01); *C01G 23/053* (2013.01); *C08J 5/18* (2013.01); *C09D 133/08* (2013.01);
(Continued)

(58) Field of Classification Search
CPC .......... C01G 23/08; C01G 23/053; C08J 5/18; C09D 133/08
(Continued)

(56) References Cited

U.S. PATENT DOCUMENTS 8,053,059 B2  11/2011 Choi et al.
8,592,511 B2* 11/2013 Gonen Williams ..... C30B 29/32
                                                514/772.4

(Continued)

FOREIGN PATENT DOCUMENTS

CN   102849793   1/2013
CN   102947218   2/2013
(Continued)

OTHER PUBLICATIONS

International Search Report for PCT/US2019/062439 dated Mar. 17, 2020, 4 pages.
(Continued)

*Primary Examiner* — Tahseen Khan
(74) *Attorney, Agent, or Firm* — NIXON & VANDERHYE, PC

(57) ABSTRACT

The preparation of monodispersed TiO$_2$ nanocrystals with nanocrystal size between 1-30 nm is described herein. These TiO$_2$ nanocrystals are used to prepare dispersions into solvents, formulation into monomers, oligomers, and polymers, and nanocomposites from the resulting formulations. Dispersions of nanocrystals can be formed in various solvents at high loading, high transmittance, and low viscosity. Formulations incorporating these nanocrystals and a matrix
(Continued)

material are highly stable, where the resulting nanocomposites have high refractive index and are optically transparent in the visible wavelengths, with very little or no scattering.

22 Claims, 13 Drawing Sheets

(51) Int. Cl.
*C08J 5/18* (2006.01)
*C09D 133/08* (2006.01)
(52) U.S. Cl.
CPC ...... *C01P 2002/72* (2013.01); *C01P 2002/88* (2013.01); *C01P 2004/04* (2013.01); *C01P 2004/64* (2013.01); *C08J 2333/08* (2013.01); *C08J 2433/08* (2013.01)
(58) Field of Classification Search
USPC .......................................................... 428/220
See application file for complete search history.

(56) References Cited

U.S. PATENT DOCUMENTS

| | | | |
|---|---|---|---|
| 10,988,598 | B2 | 4/2021 | Bai et al. |
| 2010/0135937 | A1* | 6/2010 | O'Brien ............ C01B 13/32 |
| | | | 257/532 |
| 2010/0144518 | A1* | 6/2010 | Scott ............ B82Y 30/00 |
| | | | 252/589 |
| 2011/0159109 | A1* | 6/2011 | Lee ............ C09D 1/00 |
| | | | 424/618 |
| 2011/0301270 | A1* | 12/2011 | Nomura ............ C01G 23/0536 |
| | | | 524/379 |
| 2012/0088845 | A1* | 4/2012 | Gonen Williams ....... C30B 7/10 |
| | | | 427/427 |
| 2013/0221279 | A1 | 8/2013 | Wei et al. |
| 2014/0322549 | A1* | 10/2014 | Xu ............ C09D 5/00 |
| | | | 427/256 |
| 2018/0223107 | A1* | 8/2018 | Monickam ............ C09C 3/08 |

FOREIGN PATENT DOCUMENTS

| | | |
|---|---|---|
| CN | 103387261 | 11/2013 |
| CN | 105931697 | 9/2016 |
| CN | 106241865 | 12/2016 |
| CN | 107849255 | 3/2018 |
| JP | 2001262008 | 9/2001 |
| JP | 2006-103999 | 4/2006 |
| JP | 2014503446 | 2/2014 |
| KR | 10-2004-0070068 | 8/2004 |
| KR | 10-2006-0112858 | 11/2006 |
| KR | 100825176 | 4/2008 |
| KR | 10-2014-0098626 | 8/2014 |
| WO | 2008118422 | 10/2008 |
| WO | 2012058271 | 5/2012 |

OTHER PUBLICATIONS

Written Opinion of the ISA for PCT/US2019/062439 dated Mar. 17, 2020, 8 pages.

* cited by examiner

SYNTHESIS, CAPPING, AND DISPERSION OF TiO$_2$ NANOCRYSTALS

CROSS REFERENCE TO RELATED APPLICATIONS

This application is the U.S. national phase of International Application No. PCT/US2019/062439 filed Nov. 20, 2019 which designated the U.S. and claims priority to U.S. Provisional Patent Application Nos. 62/769,703 filed Nov. 20, 2018, and 62/892,625 filed Aug. 28, 2019, the entire contents of each of which are hereby incorporated by reference.

Preparation of capped colloidal TiO$_2$ nanocrystals and their dispersions in solvents, monomers, oligomers, and polymers as well as resulting nanocomposite films are described herein. The colloidal TiO$_2$ nanocrystals are highly monodisperse with nanocrystal size between 1-50 nm. Nanocomposites having a high loading of uniformly dispersed capped nanocrystals incorporated therein may be formed with these nanocrystals. Dispersions of nanocrystals may be formed in various solvents, these dispersions have high loading, high transmittance and low viscosity. Resultant formulations incorporating these nanocrystals and a matrix material are highly stable and resulting nanocomposites are high refractive index, and optically transparent in the visible wavelengths with very little or no scattering. In addition, TiO$_2$ nanocrystals synthesized by the disclosed method can be mixed with ZrO$_2$ nanocrystals synthesized in a similar method to form nanocomposites with unique properties.

BACKGROUND

Titanium dioxide (TiO$_2$), or titania, is one of the most widely used multifunctional ceramic materials due to its unique physical and chemical characteristics combined with its abundance and nontoxicity. Due to its bulk properties, including high refractive index and (UV) light absorption, TiO$_2$ has been commercially manufactured in the millions of tons and can commonly be found in pigments, paints, sunscreens, and coatings. These applications utilize titania across a range of sizes from a few nanometers to several micrometers. In addition to the traditional applications, titania is also being studied for use in many other emerging applications including optoelectronics, photovoltaics, catalysis, fuel cells, batteries, smart windows, sensors, CMOS sensors, LED, mini-LED, microLED, organic LED (OLED), Quantum LED (QLED), touch screen, display, flexible electronics, printed electronics and self-cleaning surfaces. One such application garnering much interest in TiO$_2$ nanoparticles is in Augmented Reality (AR), Mixed Reality (MR), and Virtual Reality (VR) applications as a high refractive index material for use in wave guides, light extraction, and 3D sensors. The high refractive index of TiO$_2$ is beneficial in improving the field of view in AR applications, which is a critical feature in AR applications. Titania is also heavily investigated as a wide band gap semi-conductor material for photocatalytic processes. Titania nanocrystals possessing small particle and feature size (below 100 nm) have shown high visible light transparency combined with high UV light absorption. When combined with a monomer to make a film, these nanocomposites demonstrate high transparency. Titania nanocrystals have also generated great interest in the field of plasmonics and metamaterials due to the diverse applications in areas such as energy storage, sub-diffraction imaging, structural color, sensing, light concentration, cloaking, negative refraction, and optical information storage.

More specifically, TiO$_2$ nanocrystals of particle size less than 50 nm would have applications in optical layers due to their inherent high transparency, high refractive index, and UV light absorption. Applications could include internal light extraction layers, optical adhesives, micro-lens array, optical coatings, wave guides, and in diffraction gratings. Additionally, due to the small size, and organic ligand functionality these materials have high dispersibility with loading up to 80% in dispersion and can be easily deposited/processed using existing techniques such as spin coating, spray-coating, dispense, slot-die, ink-jet printing, screen printing, nano-imprinting, photopatterning roll-to-roll, or imprint.

Nanocrystals are single crystals of a material in which at least one dimension of the crystal is less than 1 micron in size. Nanocrystals may either retain the optical, mechanical, and physical properties of their bulk counterparts or display properties which are quite different. Nanocrystals can be made by a wide variety of methods, some of which include liquid synthesis, solvothermal synthesis, vapor phase synthesis, aerosol synthesis, pyrolysis, flame pyrolysis, laser pyrolysis, ball-milling, and laser ablation.

Typical routes for the manufacture of nanocrystals often result in aggregates which causes scattering and loss of transparency in resulting nanocomposites. One key to producing well-dispersed nanocomposites is to use nanocrystals which are not aggregated before the start of mixing with the matrix or media.

BRIEF SUMMARY

The disclosure provides methods of preparing monodispersed TiO$_2$ nanocrystals with nanocrystal sizes between 1-50 nm and the TiO$_2$ nanocrystals prepared according to these methods. The disclosure also provides methods of capping the TiO$_2$ nanocrystals and the capped TiO$_2$ nanocrystals prepared according to these methods, as well as monomer, oligomer, and polymer formulations dispersions, nanocomposite compositions, substrates, coatings, and devices comprising the comprising the TiO$_2$ nanocrystals prepared according to these methods are also provided herein. The provided nanocrystals can be formed in various solvents at high loading, high transmittance, and low viscosity. Formulations incorporating these nanocrystals and a matrix material are highly stable, where the resulting nanocomposites have high refractive index and are optically transparent in the visible wavelengths, with very little or no scattering.

In some embodiments, the disclosure provides:
[1] a method of preparing TiO$_2$ nanocrystals, comprising converting a precursor of titanium dioxide into TiO$_2$ nanocrystals in a solvent, wherein the majority of the solvent is not water;
[2] the method of [1], wherein the converting comprises 1) mixing the precursor of titanium dioxide, optionally with water, in the solvent to provide a reaction mixture, and 2) heating the reaction mixture at a reaction temperature, e.g., about 180° C. to about 250° C., about 200° C. to about 210° C., for a period of time to provide the TiO$_2$ nanocrystals;
[3] the method of [1], wherein the converting comprises 1) adding the precursor of titanium dioxide and optionally water in the solvent to provide a reaction mixture, and 2) heating the reaction mixture at a reaction temperature of about 180° C. to about 250° C. (e.g., about 200° C. to about 210° C., or about 203° C. to about 207° C.) for about 10 minutes to 5 hours (e.g., 20 minutes to 1 hour, or 1-5 hours) to provide the TiO$_2$ nanocrystals;

[4] the method of [2] or [3], wherein heating the reaction mixture at the reaction temperature is carried out under pressure ranging from about 40 psi to about 500 psi, such as about 40 psi to about 150 psi;

[5] the method of any one of [2]-[4], wherein the reaction mixture is heated to reach the reaction temperature at a heating rate of about 0.1° C. to 5° C. per minute, such as about 0.5° C. to about 3° C. per minute;

[6] the method of any one of [1]-[5], wherein the molar ratio of the precursor of titanium dioxide to water, as applicable, ranges from about 1:0 to about 1:10, e.g., about 1:0-1:0.1, 1:0.1-1:0.5, 1:0.5-1:1, 1:1-1:1.5, 1:1.5-1:2, 1:2-1:2.5, 1:2.5-1:3, 1:3-1:3.5, 1:3.5 to 1:4, 1:4-1:4.5, 1:4.5-1:5, 1:5-1:5.5, 1:5.5 to 1:6, 1:6-1:6.5, 1:6.5-1:7, 1:7-1:7.5, 1:7.5-1:8, 1:8-1:8.5, 1:8.5-1:9, 1:9-1:9.5, or 1:9.5-1:10;

[7] the method of any one of [1]-[6], wherein the molar ratio of the precursor of titanium dioxide to the solvent ranges from about 1:1 to about 1:150, e.g., about 1:1-1:5, 1:5-1:10, 1:10-1:15, 1:15-1:20, 1:20-1:25, 1:25-1:30, 1:30-1:35, 1:35-1:40, 1:40-1:45, 1:45-1:50, 1:50-1:55, 1:55-1:60, 1:60-1:65, 1:65-1:70, 1:70-1:75, 1:75-1:80, 1:80-1:85, 1:85-1:90, 1:90-1:95, 1:95-1:100 or 1:100-1:150;

[8] the method of any one of [1]-[7], wherein the precursor of titanium dioxide is a titanium alkoxide, such as a titanium alkoxide having a formula of Ti(OR)4, a compound having a formula of Ti(OR)xGy, or a combination thereof, wherein each R group can be independently an alkyl group (e.g., a C1-C6 alkyl group) or a substituted alkyl group, G group at each occurrence is independently a halogen (e.g., Cl), wherein x is an integer of 0-4, y is an integer of 0-4, provided that x+y is 4;

[9] the method of any one of [1]-[7], wherein the precursor of titanium dioxide is selected from titanium methoxide (Ti(OCH$_3$)$_4$), titanium ethoxide (Ti(OCH$_2$CH$_3$)$_4$), titanium n-propoxide (Ti(OCH$_2$CH$_2$CH$_3$)$_4$), titanium isopropoxide (Ti(OCH(CH$_3$)$_2$)$_4$), titanium n-butoxide (Ti(OCH$_2$CH$_2$CH$_2$CH$_3$)$_4$), titanium oxyacetylacetonate (TiO(CH$_3$COCHCOCH$_3$)$_2$), titanium chloride (TiCl$_4$), titanium chlorotriisopropoxytitanium (TiCl(OCH(CH$_3$)$_2$)$_3$), chlorotributoxytitanium (TiCl(OCH$_2$CH$_2$CH$_2$CH$_3$)$_3$), titanium dichloride diethoxide (TiCl$_2$(OCH$_2$CH$_3$)$_2$), and combinations thereof;

[10] the method of any one of [1]-[7], wherein the precursor of titanium dioxide is titanium methoxide, titanium ethoxide, titanium n-propoxide, titanium isopropoxide, titanium n-butoxide, or a combination thereof.

[11] the method of any one of [1]-[10], wherein the solvent is an alcoholic solvent, an ether solvent, a glycol solvent, a ketone solvent, an ester solvent, an aromatic solvent, water, or a combination thereof,

[12] the method of any one of [1]-[10], wherein the solvent comprises one or more solvents selected from benzyl alcohol, phenol, oleyl alcohol, butanol, propanol, isopropanol, ethanol, butoxy ethanol, butoxy propanol, methanol, 2-(isopentyloxy)ethanol, 2-propoxypropanol (PnP), 2-(hexyloxy)ethanol, tetrahydrofuran, dimethyl ether, diethyl ether, dibutyl ether, propylene glycol monomethyl ether (PGME), diethylene glycol butyl ether, dipropylene glycol methyl ether (DPGME), diethylene glycol monomethyl ether, diethylene glycol monoethyl ether, diethylene glycol, dipropylene glycol, acetone, propylene glycol methyl ether acetate (PG-MEA), ethyl lactate (EL), methyl acetates, ethyl acetates, butyl acetate, ethylene glycol monobutyl ether acetate, diethylene glycol monobutyl ether acetate, diethylene glycol monoethyl ether acetate, butoxy ethyl acetate, ethyl acetate, 2-(2-butoxyethoxy)ethyl acetate, benzene, toluene, and water;

[13] the method of any one of [1]-[10], wherein the solvent comprises benzyl alcohol, phenol, butanol, oleylalcohol, dodecylalcohol, and/or octadecanol;

[14] the method of any one of [1]-[13], wherein the TiO$_2$ nanocrystals prepared according to the method have anatase crystal structure;

[15] the method of any one of [1]-[14], wherein the TiO$_2$ nanocrystals prepared according to the method have an average particle size of less than 50 nm (e.g., less than about 50 nm, less than about 40 nm, less than about 30 nm, less than about 20 nm, less than about 10 nm, or less than about 5 nm, such as such as about 1 nm, about 4 nm, about 5 nm, about 10 nm, about 15 nm, about 20 nm, about 35 nm, about 30 nm, about 40 nm, about 50 nm, or any range between the recited values, such as about 1 nm to about 5 nm, about 1 nm to about 10 nm, about 40 nm to about 50 nm, about 20 nm to about 30 nm, about 10 nm to about 20 nm, about 30 nm to about 40 nm, about 4 nm to about 50 nm, about 4 nm to about 20 nm, about 15 nm to about 20 nm, or about 10 nm to about 25 nm), as measured by TEM;

[16] the method of any one of [1]-[15], wherein the TiO$_2$ nanocrystals prepared according to the method have an average particle size of about 4 nm to about 50 nm, such as about 4 nm to about 20 nm or about 15 nm to about 20 nm, as measured by TEM;

[17] the method of [16], wherein the TiO$_2$ nanocrystals prepared according to the method have an average particle size of about 10 nm to about 25 nm, as measured by TEM;

[18] a method of preparing TiO$_2$ nanocrystals having an average particle size of less than 10 nm (such as less than 5 nm, e.g., about 1 nm to about 5 nm or about 1 nm to about 10 nm), as measured by TEM, the method comprising 1) adding a precursor of titanium dioxide and water in a solvent to provide a reaction mixture, and 2) heating the reaction mixture at a reaction temperature of about 180° C. to about 250° C. (e.g., about 200° C. to about 210° C., about 203° C. to about 207° C.) for about 10 minutes to 5 hours (e.g., 20 minutes to 1 hour, or 1-5 hours) to provide the TiO$_2$ nanocrystals, wherein the molar ratio of the precursor of titanium dioxide to water ranges from about 1:0.3 to about 1:3, such as about 1:0.5 to about 1:2.5, about 1:0.5 to about 1:1, about 1:1 to about 1:1.5, about 1:1.5 to about 1:2, about 1:2 to about 1:2.5;

[19] the method of [18], wherein heating the reaction mixture at the reaction temperature is carried out under pressure ranging from about 40 psi to about 500 psi, such as about 40 psi to about 150 psi;

[20] the method of any one of [18]-[19], wherein the reaction mixture is heated to reach the reaction temperature at a heating rate of about 0.1° C. to 5° C. per minute, such as about 0.5° C. to about 3° C. per minute;

[21] the method of any one of [18]-[20], wherein the molar ratio of the precursor of titanium dioxide to the solvent ranges from about 1:1 to about 1:150, e.g., 1:1-1:5, 1:5-1:10, 1:10-1:15, 1:15-1:20, 1:20-1:25, 1:25-1:30, 1:30-1:35, 1:35-1:40, 1:40-1:45, 1:45-1:50, 1:50-1:55, 1:55-1:60, 1:60-1:65, 1:65-1:70, 1:70-1:75, 1:75-1:80, 1:80-1:85, 1:85-1:90, 1:90-1:95, 1:95-1:100, 1:100-1:150.

[22] a method of preparing $TiO_2$ nanocrystals having an average particle size of greater than 4 nm but less than 50 nm (such as about 10 nm to about 25 nm or about 4 nm to about 20 nm) as measured by TEM, the method comprising 1) adding a precursor of titanium dioxide and water in a solvent to provide a reaction mixture, and 2) heating the reaction mixture at a reaction temperature of about 180° C. to about 250° C. (e.g., about 200° C. to about 210° C.) for about 10 minutes to 5 hours (e.g., 20 minutes to 1 hour, or 1-5 hours) to provide the $TiO_2$ nanocrystals, wherein the molar ratio of the precursor of titanium dioxide to water ranges from about 1:0.3 to about 1:3, such as about 1:0.5 to about 1:2.5, about 1:0.5 to about 1:1, about 1:1 to about 1:1.5, about 1:1.5 to about 1:2, about 1:2 to about 1:2.5, or less than 1, such as less than 0.5, about 0.1, about 0.2, about 0.3, about 0.4, about 0.45, or about 0.2 to about 0.5, or about 0.3 to about 0.45;

[23] the method of [22], wherein heating the reaction mixture at the reaction temperature is carried out under pressure ranging from about 40 psi to about 500 psi, such as about 40 psi to about 150 psi;

[24] the method of any one of [22]-[23], wherein the reaction mixture is heated to reach the reaction temperature at a heating rate of about 0.1° C. to 5° C. per minute, such as about 0.5° C. to about 3° C. per minute;

[25] the method of any one of [22]-[24], wherein the molar ratio of the precursor of titanium dioxide to the solvent ranges from about 1:1 to about 1:150, e.g., 1:1-1:5, 1:5-1:10, 1:10-1:15, 1:15-1:20, 1:20-1:25, 1:25-1:30, 1:30-1:35, 1:35-1:40, 1:40-1:45, 1:45-1:50, 1:50-1:55, 1:55-1:60, 1:60-1:65, 1:65-1:70, 1:70-1:75, 1:75-1:80, 1:80-1:85, 1:85-1:90, 1:90-1:95, 1:95-1:100, 1:100-1:150.

[26] the method of any one of [18]-[25], wherein the precursor of titanium dioxide is a titanium alkoxide, such as a titanium alkoxide having a formula of $Ti(OR)_4$, a compound having a formula of $Ti(OR)_xG_y$, or a combination thereof, wherein each R group can be independently an alkyl group or a substituted alkyl group, G group at each occurrence is independently a halogen (e.g., Cl), wherein x is an integer of 0-4, y is an integer of 0-4, provided that x+y is 4;

[27] the method of any one of [18]-[25], wherein the precursor of titanium dioxide is selected from titanium methoxide ($Ti(OCH_3)_4$), titanium ethoxide ($Ti(OCH_2CH_3)_4$), titanium n-propoxide ($Ti(OCH_2CH_2CH_3)_4$), titanium isopropoxide ($Ti(OCH(CH_3)_2)_4$), titanium n-butoxide ($Ti(OCH_2CH_2CH_2CH_3)_4$), titanium oxyacetylacetonate ($TiO(CH_3COCHCOCH_3)_2$), titanium chloride ($TiCl_4$), titanium chlorotriisopropoxytitanium ($TiCl(OCH(CH_3)_2)_3$), chlorotributoxytitanium ($TiCl(OCH_2CH_2CH_2CH_3)_3$), titanium dichloride diethoxide ($TiCl_2(OCH_2CH_3)_2$), and combinations thereof;

[28] the method of any one of [18]-[25], wherein the precursor of titanium dioxide is titanium methoxide, titanium ethoxide, titanium n-propoxide, titanium isopropoxide, titanium n-butoxide, or a combination thereof.

[29] the method of any one of [18]-[28], wherein the solvent is an alcoholic solvent, an ether solvent, a glycol solvent, a ketone solvent, an ester solvent, an aromatic solvent, water, or a combination thereof,

[30] the method of any one of [18]-[28], wherein the solvent comprises one or more solvents selected from benzyl alcohol, phenol, oleyl alcohol, butanol, propanol, isopropanol, ethanol, butoxy ethanol, butoxy propanol, methanol, 2-(isopentyloxy)ethanol, 2-propoxypropanol (PnP), 2-(hexyloxy)ethanol, tetrahydrofuran, dimethyl ether, diethyl ether, dibutyl ether, propylene glycol monomethyl ether (PGME), diethylene glycol butyl ether, dipropylene glycol methyl ether (DPGME), diethylene glycol monomethyl ether, diethylene glycol monoethyl ether, diethylene glycol, dipropylene glycol, acetone, propylene glycol methyl ether acetate (PGMEA), ethyl lactate (EL), methyl acetates, ethyl acetates, butyl acetate, ethylene glycol monobutyl ether acetate, diethylene glycol monobutyl ether acetate, diethylene glycol monoethyl ether acetate, butoxy ethyl acetate, ethyl acetate, 2-(2-butoxyethoxy)ethyl acetate, benzene, toluene, and water;

[31] the method of any one of [18]-[28], wherein the solvent comprises benzyl alcohol, phenol, butanol, oleylalcohol, dodecylalcohol, and/or octadecanol;

[32] the method of any one of [18]-[31], wherein the $TiO_2$ nanocrystals prepared according to the method have anatase crystal structure;

[33] the method of any one of [1]-[32], wherein the $TiO_2$ nanocrystals prepared according to the method have a narrow particle size distribution, which is characterized by 1) a ratio of D90:D10 of less than 5, preferably, less than 3, or less than 2, such as about 1.1 to about 2, about 1.5 to about 2, about 1.2 to about 1.8, about 1.2 to about 3, or about 1.5 to about 3; 2) a ratio of D90:D50 of less than 3, preferably, less than 2, or less than 1.5, such as about 1.1 to about 2, about 1.5 to about 2, about 1.2 to about 1.5; and/or 3) a ratio of D50:D10 of less than 3, preferably, less than 2, or less than 1.5, such as about 1.1 to about 2, about 1.5 to about 2, about 1.2 to about 1.5;

[34] the method of any one of [1]-[32], wherein the $TiO_2$ nanocrystals prepared according to the method have a narrow particle size distribution, which is characterized by a standard deviation (σ) of the particle size distribution no greater than 15% (e.g., no greater than 10%, or no greater than 5%, such as about 1% to about 15%, about 5% to about 10%, or about 10% to about 15%) of the median particle size of the nanocrystals as measured by TEM.

[35] the method of any one of [1]-[32], wherein the $TiO_2$ nanocrystals prepared according to the method have a narrow particle size distribution, which is characterized by a standard deviation (σ) of the particle size distribution no greater than 5 nm (e.g., no greater than 3 nm, or no greater than 1 nm, such as about 1 nm, about 3 nm, about 5 nm, or any ranges between the recited values, such as about 1-3 nm, about 1-5 nm, about 3-5 nm, etc.), as measured by TEM.

[36] the method of any one of [1]-[32], wherein the $TiO_2$ nanocrystals prepared according to the method have a narrow particle size distribution, which is characterized in that greater than about 90% (e.g., greater than about 95%, or greater than about 99%, such as about 91%, about 95%, about 98%, about 99%, about 99.5%, or any ranges between the recited values, such as 90-99%, 90-95%, or 95-99%) of the nanocrystals have a particle size within 5 nm of the average particle size, as measured by TEM;

[37] the method of any one of [1]-[36], further comprising separating the solvent from the TiO$_2$ nanocrystals to provide wet TiO$_2$ nanocrystals;

[38] the method of [37], further comprising comprise suspending the wet TiO$_2$ nanocrystals in a second solvent, e.g., a capping solvent;

[39] the TiO$_2$ nanocrystals prepared by the method of any one of [1]-[38];

[40] TiO$_2$ nanocrystals having an average particle size of less than 50 nm (e.g., less than about 50 nm, less than about 40 nm, less than about 30 nm, less than about 20 nm, less than about 10 nm, or less than about 5 nm, such as about 1 nm, about 4 nm, about 5 nm, about 10 nm, about 15 nm, about 20 nm, about 35 nm, about 30 nm, about 40 nm, about 50 nm, or any range between the recited values), as measured by TEM, for example, having an average particle size of about 1 nm to about 5 nm, about 1 nm to about 10 nm, about 40 nm to about 50 nm, about 20 nm to about 30 nm, about 10 nm to about 20 nm, about 30 nm to about 40 nm, about 4 nm to about 50 nm, about 4 nm to about 20 nm, about 15 nm to about 20 nm, or about 10 nm to about 25 nm, as measured by TEM

[41] the TiO$_2$ nanocrystals of [40], which have a narrow particle size distribution characterized by 1) a ratio of D90:D10 of less than 5, preferably, less than 3, or less than 2, such as about 1.1 to about 2, about 1.5 to about 2, about 1.2 to about 1.8, about 1.2 to about 3, or about 1.5 to about 3; 2) a ratio of D90:D50 of less than 3, preferably, less than 2, or less than 1.5, such as about 1.1 to about 2, about 1.5 to about 2, about 1.2 to about 1.5; and/or 3) a ratio of D50:D10 of less than 3, preferably, less than 2, or less than 1.5, such as about 1.1 to about 2, about 1.5 to about 2, about 1.2 to about 1.5;

[42] the TiO$_2$ nanocrystals of [40], which have a narrow particle size distribution characterized by a standard deviation (σ) of the particle size distribution no greater than 15% (e.g., no greater than 10%, or no greater than 5%, such as about 1% to about 15%, about 5% to about 10%, or about 10% to about 15%) of the median particle size of the nanocrystals as measured by TEM;

[43] the TiO$_2$ nanocrystals of [40], which have a narrow particle size distribution characterized by a standard deviation (σ) of the particle size distribution no greater than 5 nm (e.g., no greater than 3 nm, or no greater than 1 nm, such as about 1 nm, about 3 nm, about 5 nm, or any ranges between the recited values, such as about 1-3 nm, about 1-5 nm, about 3-5 nm, etc.), as measured by TEM;

[44] the TiO$_2$ nanocrystals of [40], which have a narrow particle size distribution characterized in that greater than about 90% (e.g., greater than about 95%, or greater than about 99%, such as about 91%, about 95%, about 98%, about 99%, about 99.5%, or any ranges between the recited values, such as 90-99%, 90-95%, or 95-99%) of the nanocrystals have a particle size within 5 nm of the average particle size, as measured by TEM;

[45] the TiO$_2$ nanocrystals of any one of [40]-[44], having anatase crystal structure;

[46] a method of capping TiO$_2$ nanocrystals, comprising reacting the TiO$_2$ nanocrystals of any one of [39]-[45] with a first capping agent in a first capping solvent to produce a first at least partially capped TiO$_2$ nanocrystals;

[47] the method of [46], wherein the reacting comprises 1) mixing the TiO$_2$ nanocrystals of any one of [39]-[45] with the first capping agent in the first capping solvent to provide a first reaction mixture; and 2) heating the first reaction mixture, e.g., at the reflux temperature of the first capping solvent, for a period of time (e.g., about 10 minutes to about 120 minutes) to produce the first at least partially capped TiO$_2$ nanocrystals;

[48] the method of [46] or [47], further comprising 1) mixing the first at least partially capped TiO$_2$ nanocrystals with a second capping agent in a second capping solvent to provide a second reaction mixture; and 2) heating the second reaction mixture, e.g., at the reflux temperature of the second capping solvent, for a period of time (e.g., about 10 minutes to about 120 minutes) to produce a second at least partially capped TiO$_2$ nanocrystals;

[49] the method of any one of [45]-[48], further comprising a) adding water to the first or second reaction mixture after the respective heating step 2), and b) heating the first or second reaction mixture for an additional period of time (e.g., about 10 minutes to about 120 minutes);

[50] the method of any one of [45]-[49], further comprising separating, purifying, and/or drying the first or second at least partially capped TiO$_2$ nanocrystals;

[51] the method of any one of [45]-[50], wherein the first or second capping agent is independently selected from a silane, an alcohol, a carboxylic acid, a thiol, a sulfonate, a phosphonate, a phosphate, and combinations thereof;

[52] the method of any one of [45]-[50], wherein the first or second capping agent is independently selected from methyltrimethoxysilane, n-propyltrimethoxysilane, n-propyltriethoxysilane, n-octyltrimethoxysilane, n-octyltriethoxysilane, phenytrimethoxysilane, dodecyltrimethoxysilane, m,p-ethylphenethyl trimethoxysilane, 2-[methoxy(polyethyleneoxy)propyl]-trimethoxysilane, methoxy(triethyleneoxy)propyltrimethoxysilane, 3-aminopropyltrimethoxysilane, 3-mercaptopropyltrimethoxysilane, 3-(methacryloyloxy)propyl trimethoxysilane, 3-(acryloyloxy)propyl trimethoxysilane, 3-isocyanatopropyltriethoxysilane, 3-isocyanatopropyltrimethoxysilane, 3-glycidoxypropyltrimethoxysilane, vinyltrimethoxysilane, allyltrimethoxysilane, 1-hexenyltrimethoxysilane, 1-octenyltrimethoxysilane, (phenylaminomethyl) methyldimethoxysilane, N-phenylaminopropyltrimethoxysilane, 3-(4-pyridylethyl)thiopropyltrimethoxysilane, N-(3-trimethoxysilylpropyl)pyrrole, 2-(3-trimethoxysilylpropylthio) thiophene, (3-trimethoxysilylpropyl)diethylene triamine, 11-mercaptoundecyltrimethoxysilane, (2-diphenylphosphino) ethyldimethylethoxysilane, 2-(diphenylphosphino) ethyltriethoxysilane, 3-(diphenylphosphino) propyltriethoxysilane, heptanol, hexanol, octanol, benzyl alcohol, phenol, ethanol, propanol, butanol, oleylalcohol, dodecylalcohol, octadecanol, triethylene glycol monomethyl ether, octanoic acid, acetic acid, propionic acid, 2-[2-(2-methoxyethoxy) ethoxy] acetic acid, oleic acid, benzoic acid, stearic acid, trifluoroacetic acid, biphenyl-4-carboxylic acid, 2-(2-methoxyethoxy) acetic acid, methacrylic acid, mono-2-(Methacryloyloxy) ethyl succinate, 2-mercaptoethanol, 2-{2-[2-(2-mercaptoethoxy)ethoxy)ethoxy]ethoxy} ethanol, 2-(2-methoxyethoxy)ethanethiol, 1-octanethiol, sodium 2,3-dimercaptopropanesulfonate monohydrate, sodium dodecyl sulfate, dodecyl phosphonic acid, octylphosphonic acid, (11-mercaptoundecyl)phosphonic acid, (11-(acryloyloxy)undecyl)phosphonic acid, 11-methacryloyloxyundecylphosphonic acid, [2-[2-(2-methoxyethoxy)ethoxy]ethyl]phosphonic acid ethyl ester, and combinations thereof;

[53] the method of any one of [45]-[50], wherein the first or second capping agent is independently selected from methyltrimethoxysilane, n-octyltrimethoxysilane, methoxy(triethyleneoxy)propyltrimethoxysilane, 3-mercaptopropyltrimethoxysilane, 3-(methacryloyloxy)propyl trimethoxysilane, 3-(acryloyloxy)propyl trimethoxysilane, vinyltrimethoxysilane, allyltrimethoxysilane, 2-[2-(2-methoxyethoxy) ethoxy] acetic acid, oleic acid, and combinations thereof, for example, the first or second capping agent is independently selected from methoxy(triethyleneoxy)propyltrimethoxysilane, 3-mercaptopropyltrimethoxysilane, 3-(methacryloyloxy)propyl trimethoxysilane, 3-(acryloyloxy)propyl trimethoxysilane, 2-[2-(2-methoxyethoxy) ethoxy] acetic acid, and combinations thereof,

[54] the method of any one of [45]-[53], wherein the first or second capping solvent is independently selected from an alcoholic solvent, an ether solvent, a glycol solvent, a ketone solvent, an ester solvent, an aromatic solvent, water, and combinations thereof,

[55] the method of any one of [45]-[53], wherein the first or second capping solvent is independently selected from benzyl alcohol, phenol, oleyl alcohol, butanol, propanol, isopropanol, ethanol, butoxy ethanol, butoxy propanol, methanol, 2-(isopentyloxy)ethanol, 2-propoxy-propanol (PnP), 2-(hexyloxy)ethanol, tetrahydrofuran, dimethyl ether, diethyl ether, dibutyl ether, propylene glycol monomethyl ether (PGME), diethylene glycol butyl ether, dipropylene glycol methyl ether (DPGME), diethylene glycol monomethyl ether, diethylene glycol monoethyl ether, diethylene glycol, dipropylene glycol, acetone, propylene glycol methyl ether acetate (PGMEA), ethyl lactate (EL), methyl acetates, ethyl acetates, Butyl Carbitol Acetate (BCA), butyl acetate, ethylene glycol monobutyl ether acetate, diethylene glycol monobutyl ether acetate, diethylene glycol monoethyl ether acetate, butoxy ethyl acetate, ethyl acetate, 2-(2-butoxyethoxy)ethyl acetate, benzene, toluene, water, and combinations thereof,

[56] the method of any one of [45]-[53], wherein the first or second capping solvent is independently selected from benzyl alcohol, Butyl Carbitol Acetate (BCA), propylene glycol monomethyl ether (PGME), diethylene glycol butyl ether, dipropylene glycol methyl ether (DPGME), propylene glycol methyl ether acetate (PGMEA), ethyl lactate (EL), ethyl acetate, toluene and combinations thereof, for example, the first or second capping solvent is independently selected from benzyl alcohol, Butyl Carbitol Acetate (BCA), diethylene glycol butyl ether, dipropylene glycol methyl ether (DPGME), propylene glycol methyl ether acetate (PGMEA), ethyl acetate, and combinations thereof,

[57] At least partially capped $TiO_2$ nanocrystals prepared by the method of any one of [45]-[56];

[58] At least partially capped $TiO_2$ nanocrystals, comprising the $TiO_2$ nanocrystals of any one of [39]-[45] at least partially capped with at least one capping agent selected from a silane, an alcohol, a carboxylic acid, a thiol, a sulfonate, a phosphonate, a phosphate, and combinations thereof,

[59] the at least partially capped $TiO_2$ nanocrystals of [58], wherein the at least one capping agent is selected from methyltrimethoxysilane, n-propyltrimethoxysilane, n-propyltriethoxysilane, n-octyltrimethoxysilane, n-octyltriethoxysilane, phenytrimethoxysilane, dodecyltrimethoxysilane, m,p-ethylphenethyl trimethoxysilane, 2-[methoxy(polyethyleneoxy)propyl]-trimethoxysilane, methoxy(triethyleneoxy)propyltrimethoxysilane, 3-aminopropyltrimethoxysilane, 3-mercaptopropyltrimethoxysilane, 3-(methacryloyloxy)propyl trimethoxysilane, 3-(acryloyloxy)propyl trimethoxysilane, 3-isocyanatopropyltriethoxysilane, 3-isocyanatopropyltrimethoxysilane, 3-glycidoxypropyltrimethoxysilane, vinyltrimethoxysilane, allyltrimethoxysilane, 1-hexenyltrimethoxysilane, 1-octenyltrimethoxysilane, (phenylaminomethyl) methyldimethoxysilane, N-phenylaminopropyltrimethoxysilane, 3-(4-pyridylethyl)thiopropyltrimethoxysilane, N-(3-trimethoxysilylpropyl)pyrrole, 2-(3-trimethoxysilylpropylthio) thiophene, (3-trimethoxysilylpropyl)diethylene triamine, 11-mercaptoundecyltrimethoxysilane, (2-diphenylphosphino) ethyldimethylethoxysilane, 2-(diphenylphosphino) ethyltriethoxysilane, 3-(diphenylphosphino) propyltriethoxysilane, heptanol, hexanol, octanol, benzyl alcohol, phenol, ethanol, propanol, butanol, oleylalcohol, dodecylalcohol, octadecanol, triethylene glycol monomethyl ether, octanoic acid, acetic acid, propionic acid, 2-[2-(2-methoxyethoxy) ethoxy] acetic acid, oleic acid, benzoic acid, stearic acid, trifluoroacetic acid, biphenyl-4-carboxylic acid, 2-(2-methoxyethoxy) acetic acid, methacrylic acid, mono-2-(Methacryloyloxy) ethyl succinate, 2-mercaptoethanol, 2-{2-[2-(2-mercaptoethoxy)ethoxy)ethoxy]ethoxy} ethanol, 2-(2-methoxyethoxy)ethanethiol, 1-octanethiol, sodium 2,3-dimercaptopropanesulfonate monohydrate, sodium dodecyl sulfate, dodecyl phosphonic acid, octylphosphonic acid, (11-mercaptoundecyl)phosphonic acid, (11-(acryloyloxy)undecyl)phosphonic acid, 11-methacryloyloxyundecylphosphonic acid, [2-[2-(2-methoxyethoxy)ethoxy]ethyl]phosphonic acid ethyl ester, and combinations thereof;

[60] the at least partially capped $TiO_2$ nanocrystals of [58] or [59], wherein the at least one capping agent is selected from methyltrimethoxysilane, n-octyltrimethoxysilane, methoxy(triethyleneoxy)propyltrimethoxysilane, 3-mercaptopropyltrimethoxysilane, 3-(methacryloyloxy)propyl trimethoxysilane, 3-(acryloyloxy)propyl trimethoxysilane, vinyltrimethoxysilane, allyltrimethoxysilane, 2-[2-(2-methoxyethoxy) ethoxy] acetic acid, oleic acid, and combinations thereof, for example, the at least one capping agent is selected from methoxy(triethyleneoxy)propyltrimethoxysilane, 3-mercaptopropyltrimethoxysilane, 3-(methacryloyloxy)propyl trimethoxysilane, 3-(acryloyloxy)propyl trimethoxysilane, 2-[2-(2-methoxyethoxy) ethoxy] acetic acid, and combinations thereof;

[61] the at least partially capped $TiO_2$ nanocrystals of any one of [57]-[60], which are in a dry form and/or in a substantially pure form, for example, the at least partially capped $TiO_2$ nanocrystals are free or substantially free of a capping agent used for capping $TiO_2$ nanocrystals and/or by-products from capping the $TiO_2$ nanocrystals;

[62] the at least partially capped $TiO_2$ nanocrystals of any one of [57]-[61], which are dispersible;

[63] the at least partially capped $TiO_2$ nanocrystals of any one of [57]-[62], which are characterized in that the average particle size as measured by volume of the capped titanium dioxide nanocrystals dispersed 5% by weight in a solvent is less than 130 nm (e.g., less than 120 nm, less than 100 nm, less than 80 nm, less than 50 nm, less than 20 nm, or less than 10 nm, such as about 10 nm, about 20 nm, about 50 nm, about 80 nm, about 100 nm, about 120 nm, or any ranges between the recited values, such as about 10 to about 50 nm, about 50 nm to about 100 nm, etc.), as measured by Dynamic Light Scattering (DLS);

[64] the at least partially capped $TiO_2$ nanocrystals of [63], which are further characterized in that the D9999 is less than 500 nm (e.g., less than 200 nm, less than 100 nm, or less than 50 nm, such as about 10 nm, about 20 nm, about 50 nm, about 100 nm, about 200 nm, about 500 nm, or any ranges between the recited values, such as about 20 nm to about 50 nm, about 50 nm to about 100 nm, about 20 nm to about 200 nm, about 100 nm to about 200 nm, etc.) as measured by volume of the capped titanium dioxide nanocrystals dispersed 5% by weight in a solvent by Dynamic Light Scattering (DLS);

[65] the at least partially capped $TiO_2$ nanocrystals of any one of [57]-[64], characterized by an organic content of about 5% to about 35%, preferably, about 5% to about 15%, about 10% to about 25%, or about 15% to about 30%, as measured by TGA;

[66] a nanocrystal dispersion comprising at least partially capped $TiO_2$ nanocrystals and a solvent, wherein the at least partially capped $TiO_2$ nanocrystals are present in an amount of greater than 30%, e.g., greater than 40%, greater than 50%, greater than 60%, or greater than 70%, such as about 40%, about 50%, about 60%, about 70%, about 80%, or any ranges between the recited values, such as about 40-70%, about 30-80%, about 50-80%, etc., by weight of the dispersion;

[67] the nanocrystal dispersion of [66], comprising the at least partially capped $TiO_2$ nanocrystals of any one of [57]-[65], for example, the $TiO_2$ nanocrystals at least partially capped with a capping agent selected from methyltrimethoxysilane, n-octyltrimethoxysilane, methoxy(triethyleneoxy)propyltrimethoxysilane, 3-mercaptopropyltrimethoxysilane, 3-(methacryloyloxy)propyl trimethoxysilane, 3-(acryloyloxy)propyl trimethoxysilane, vinyltrimethoxysilane, allyltrimethoxysilane, 3-glycidoxypropyltrimethoxysilane, 2-[2-(2-methoxyethoxy) ethoxy] acetic acid, oleic acid, and combinations thereof, preferably, the capping agent is selected from methyltrimethoxysilane, methoxy(triethyleneoxy)propyltrimethoxysilane, 3-(methacryloyloxy)propyl trimethoxysilane, 3-(acryloyloxy)propyl trimethoxysilane, 2-[2-(2-methoxyethoxy) ethoxy] acetic acid, and combinations thereof, and more preferably, the capping agent is selected from methoxy (triethyleneoxy)propyltrimethoxysilane, 3-(methacryloyloxy)propyl trimethoxysilane, 3-(acryloyloxy) propyl trimethoxysilane, and combinations thereof, for example, the capping agent is methoxy(triethyleneoxy) propyltrimethoxysilane;

[68] the nanocrystal dispersion of [66] or [67], wherein the solvent is selected from an alcoholic solvent, an ether solvent, a glycol solvent, a ketone solvent, an ester solvent, an aromatic solvent, water, and combinations thereof;

[69] the nanocrystal dispersion of [66] or [67], wherein the solvent is selected from benzyl alcohol, phenol, oleyl alcohol, butanol, propanol, isopropanol, ethanol, butoxy ethanol, butoxy propanol, methanol, 2-(isopentyloxy)ethanol, 2-propoxy-propanol (PnP), 2-(hexyloxy)ethanol, tetrahydrofuran, dimethyl ether, diethyl ether, dibutyl ether, propylene glycol monomethyl ether (PGME), diethylene glycol butyl ether, dipropylene glycol methyl ether (DPGME), diethylene glycol monomethyl ether, diethylene glycol monoethyl ether, diethylene glycol, dipropylene glycol, acetone, propylene glycol methyl ether acetate (PGMEA), ethyl lactate (EL), methyl acetates, ethyl acetates, Butyl Carbitol Acetate (BCA), butyl acetate, ethylene glycol monobutyl ether acetate, diethylene glycol monobutyl ether acetate, diethylene glycol monoethyl ether acetate, butoxy ethyl acetate, ethyl acetate, 2-(2-butoxyethoxy)ethyl acetate, benzene, toluene, water, and combinations thereof, preferably, the solvent is selected from benzyl alcohol, Butyl Carbitol Acetate (BCA), butanol, propanol, isopropanol, ethanol, butoxy ethanol, butoxy propanol, methanol, tetrahydrofuran, diethyl ether, propylene glycol monomethyl ether (PGME), diethylene glycol butyl ether, dipropylene glycol methyl ether (DPGME), diethylene glycol monomethyl ether, diethylene glycol monoethyl ether, diethylene glycol, dipropylene glycol, acetone, propylene glycol methyl ether acetate (PGMEA), ethyl lactate (EL), ethyl acetate, butyl acetate, diethylene glycol monoethyl ether acetate, toluene, and combinations thereof,

[70] the nanocrystal dispersion of [66] or [67], wherein the solvent is selected from benzyl alcohol, Butyl Carbitol Acetate (BCA), isopropanol, tetrahydrofuran, propylene glycol monomethyl ether (PGME), dipropylene glycol methyl ether (DPGME), propylene glycol methyl ether acetate (PGMEA), ethyl lactate (EL), ethyl acetate, toluene, and combinations thereof, preferably, the solvent is selected from Butyl Carbitol Acetate (BCA), propylene glycol monomethyl ether (PGME), dipropylene glycol methyl ether (DPGME), propylene glycol methyl ether acetate (PGMEA), ethyl acetate, and combinations thereof, for example, the solvent is propylene glycol methyl ether acetate (PGMEA)

[71] a nanocrystal dispersion comprising at least partially capped $TiO_2$ nanocrystals and a dispersing agent (e.g., a non-ionic dispersing agent, an anionic dispersing agent, or a combination thereof), wherein the at least partially capped $TiO_2$ nanocrystals are present in an amount of greater than 30%, e.g., greater than 40%, greater than 50%, greater than 60%, greater than 70%, such as about 40%, about 50%, about 60%, about 70%, about 80%, or any ranges between the recited values, by weight of the dispersion;

[72] the nanocrystal dispersion of [71], wherein the dispersing agent is selected from polyalkylene glycols and esters thereof, polyoxyalkylenes, polyhydric alcohol ester alkylene oxide addition products, alcohol alkylene oxide addition products, sulfonate esters, sulfonate salts, carboxylate esters, carboxylate salts, alkylamide alkylene oxide addition products, alkyl amines, and combinations thereof.

[73] the nanocrystal dispersion of any one of [66]-[72], wherein the average particle size of the $TiO_2$ nanocrystals in the dispersion is in the range of 1-50 nm, such as 4-20 nm, or 15-20 nm, as measured by TEM;

[74] the nanocrystal dispersion of any one of [66]-[73], wherein the D9999 of the $TiO_2$ nanocrystals in the dispersion, as determined by DLS, is in the range of 20-500 nm, preferably, less than 200 nm.

[75] the nanocrystal dispersion of any one of [66]-[74], wherein the at least partially capped TiO$_2$ nanocrystals in the dispersion are uniformly dispersed without agglomeration or settling of the nanocrystals as observed by TGA;

[76] the nanocrystal dispersion of any one of [66]-[75], wherein the dispersion is stable for more than two weeks, e.g., three weeks, or four weeks, or more than three weeks, more than four weeks, showing less than 5% (e.g., less than 3%, less than 2%, or less than 1%, such as about 0.1%, about 0.5%, about 1%, about 2%, about 3%, or any ranges between the recited values, such as about 0.01-1%, about 0.1-1%, about 0.1-5%, about 0.5-2%, about 0.5-3%, about 0.5-1%, etc.) change in transmittance at 400 nm when stored at room temperature in dark;

[77] the nanocrystal dispersion of any one of [66]-[76], prepared by a method comprising mixing the at least partially capped TiO$_2$ nanocrystals with the solvent to form the dispersion;

[78] the nanocrystal dispersion of [77], wherein the at least partially capped TiO$_2$ nanocrystals are in a substantially pure form, for example, which are free or substantially free of a capping agent used for capping TiO$_2$ nanocrystals and/or by-products from capping the TiO$_2$ nanocrystals;

[79] the nanocrystal dispersion of [77] or [78], wherein the method comprises mixing the at least partially capped TiO$_2$ nanocrystals in a dry form with the solvent to form the dispersion;

[80] a nanocomposite formulation comprising the nanocrystal dispersion of any one of [66]-[79] and a monomer, oligomer, and/or polymer.

[81] a nanocomposite formulation prepared by a method comprising mixing the nanocrystal dispersion of any one of [66]-[79] with a monomer, oligomer, and/or polymer.

[82] a nanocomposite formulation comprising 1) at least partially capped TiO$_2$ nanocrystals; and 2) a monomer, oligomer, and/or polymer;

[83] a nanocomposite formulation comprising 1) at least partially capped TiO$_2$ nanocrystals; 2) a monomer, oligomer, and/or polymer; and 3) a solvent;

[84] a nanocomposite formulation comprising 1) at least partially capped TiO$_2$ nanocrystals; 2) a monomer, oligomer, and/or polymer; and 3) a curing agent;

[85] a nanocomposite formulation comprising 1) at least partially capped TiO$_2$ nanocrystals; 2) a monomer, oligomer, and/or polymer; 3) a solvent; and 4) a curing agent;

[86] the nanocomposite formulation of any one of [80]-[85], further comprising one or more ingredients selected from a curing agent, an adhesion promoter, a wetting agent, a leveling agent, a dispersing agent, a viscosity modifier, and an antioxidant;

[87] the nanocomposite formulation of any one of [80]-[86], comprising the at least partially capped TiO$_2$ nanocrystals of any one of [57]-[65], e.g., the TiO$_2$ nanocrystals at least partially capped with a capping agent selected from methyltrimethoxysilane, n-octyltrimethoxysilane, methoxy(triethyleneoxy)propyltrimethoxysilane, 3-mercaptopropyltrimethoxysilane, 3-(methacryloyloxy)propyl trimethoxysilane, 3-(acryloyloxy)propyl trimethoxysilane, vinyltrimethoxysilane, allyltrimethoxysilane, 3-glycidoxypropyltrimethoxysilane, 2-[2-(2-methoxyethoxy) ethoxy] acetic acid, oleic acid, and combinations thereof, preferably, the capping agent is selected from methyltrimethoxysilane, methoxy(triethyleneoxy)propyltrimethoxysilane, 3-(methacryloyloxy)propyl trimethoxysilane, 3-(acryloyloxy)propyl trimethoxysilane, 2-[2-(2-methoxyethoxy) ethoxy] acetic acid, and combinations thereof, and more preferably, the capping agent is selected from methoxy(triethyleneoxy)propyltrimethoxysilane, 3-(methacryloyloxy)propyl trimethoxysilane, 3-(acryloyloxy)propyl trimethoxysilane, and combinations thereof, for example, the capping agent is methoxy(triethyleneoxy)propyltrimethoxysilane;

[88] the nanocomposite formulation of any one of [80]-[87], wherein the at least partially capped TiO$_2$ nanocrystals are in a substantially pure form, for example, which are free or substantially free of a capping agent used for capping TiO$_2$ nanocrystals and/or by-products from capping the TiO$_2$ nanocrystals;

[89] the nanocomposite formulation of any one of [80]-[88], wherein the at least partially capped TiO$_2$ nanocrystals are present in an amount of greater than 30%, e.g., greater than 40%, greater than 50%, greater than 60%, greater than 70%, greater than 80%, or greater than 90%, such as about 40%, about 50%, about 60%, about 70%, about 80%, about 90%, or any ranges between the recited values, such as about 50-90%, about 40-80%, about 60-90%, etc., by weight in respect to the monomer, oligomer and/or polymer;

[90] the nanocomposite formulation of any one of [80]-[89], wherein the monomer, oligomer and/or polymer is an acrylate, epoxy, or isocyanurate compound, e.g., selected from Bisphenol A Glycerolate Dimethacrylate, esters with acrylic acid (OPPEOA), Bisphenol A Ethoxylate diacrylates, Bisphenol A propoxylate diacrylate, Bisphenol F ethoxylate (2 EO/phenol) diacrylate, Bisphenol A glycerolate diacrylates, bisphenol A ethoxylate dimethacrylate, Ethoxylated (4) bisphenol A diacrylate (SR-601), Biphenol A ethoxylate diacrylate (SR-349), Tris(2-acryloyloxy)ethyl} isocyanurate, tricyclodecane dimethanol diacrylate, Tris(2-hydroxyethyl)isocyanurate triacrylate, cresol novolac epoxy acrylate (CN112C60), Benzyl methacrylate (BMA), benzyl acrylate, trimethylolpropane triacrylate (TMPTA), Trimethylolpropane ethoxylate (1 EO/OH) methyl ether diacrylate, 1,6-Hexanediol diacrylate (HDDA, SR238B), tri(ethyleneglycol) diacrylate, ethylene glycol diacrylate, Poly(ethylene glycol) diacrylate, Glycerol 1,3-diglycerolate diacrylate, Di(ethylene glycol) diacrylate, and combinations thereof;

[91] the nanocomposite formulation of any one of [80]-[89], wherein the monomer, oligomer and/or polymer is selected from Bisphenol A Glycerolate Dimethacrylate, esters with acrylic acid (OPPEOA), Bisphenol A Ethoxylate diacrylates, Bisphenol A propoxylate diacrylate, Bisphenol F ethoxylate (2 EO/phenol) diacrylate, Bisphenol A glycerolate diacrylates, bisphenol A ethoxylate dimethacrylate, Ethoxylated (4) bisphenol A diacrylate (SR-601), Biphenol A ethoxylate diacrylate (SR-349), cresol novolac epoxy acrylate (CN112C60), and combinations thereof, preferably, the monomer, oligomer and/or polymer is selected from Bisphenol A Glycerolate Dimethacrylate, esters with acrylic acid (OPPEOA), Ethoxylated (4) bisphenol A diacrylate (SR-601), Biphenol A ethoxylate diacrylate (SR-349), cresol novolac epoxy acrylate (CN112C60) and combinations thereof, for example, the monomer, oligomer and/or polymer is Bisphenol A Glycerolate Dimethacrylate;

[92] the nanocomposite formulation of any one of [80]-[91], wherein the solvent, when present, is selected from benzyl alcohol, Butyl Carbitol Acetate (BCA), butanol, propanol, isopropanol, ethanol, butoxy ethanol, butoxy propanol, methanol, tetrahydrofuran, diethyl ether, propylene glycol monomethyl ether (PGME), diethylene glycol butyl ether, dipropylene glycol methyl ether (DPGME), diethylene glycol monomethyl ether, diethylene glycol monoethyl ether, diethylene glycol, dipropylene glycol, acetone, propylene glycol methyl ether acetate (PGMEA), ethyl lactate (EL), ethyl acetate, butyl acetate, diethylene glycol monoethyl ether acetate, toluene, and combinations thereof, preferably, the solvent is selected from benzyl alcohol, Butyl Carbitol Acetate (BCA), propylene glycol monomethyl ether (PGME), diethylene glycol butyl ether, dipropylene glycol methyl ether (DPGME), propylene glycol methyl ether acetate (PGMEA), ethyl lactate (EL), ethyl acetate, toluene, and combinations thereof, more preferred, the solvent is selected from benzyl alcohol, Butyl Carbitol Acetate (BCA), diethylene glycol butyl ether, dipropylene glycol methyl ether (DPGME), propylene glycol methyl ether acetate (PGMEA), ethyl acetate, and combinations thereof, for example, the solvent is dipropylene glycol methyl ether (DPGME), propylene glycol methyl ether acetate (PGMEA), or a combination thereof;

[93] the nanocomposite formulation of any one of [80]-[92], wherein the curing agent, when present, is a photopolymerization initiator and/or a thermal free radical initiator;

[94] the nanocomposite formulation of [93], wherein the curing agent comprises one or more agents selected from Ebecryl® Pl 15, Ebecryl® P39, benzophenone, SpeedCure BEM, 4,4'-Bis(diethylamino)benzophenone, diphenyl (2,4,6-trimethylbenzoyl)-phosphine oxide, Irgacure® 184, 2,4,6-Trimethylbenzoyl diphenylphosphine oxide (TPO), Ethyl (2,4,6-trimethylbenzoyl) phenylphosphinate, 4-(Dimethylamino)benzophenone, 2-isopropyl thoxanthone, Darocure 4265, Speedcure Xkm, methylbenzoylformate, Thioxanthen-9-one, dicumyl peroxide, t-butyl perbenzoate, benzoyl peroxide, t-butyl peracetate, 1,1-di (t-butylperoxy)3,3,5-trimethyl cyclohexane, 2,5-dimethyl-2,5-di(t-butylperoxy)hexyne, 2,2'-azobisisobutyronitrile, and combinations thereof,

[95] the nanocomposite formulation of [93], wherein the curing agent comprises one or more agents selected from Ebecryl® Pl 15, Ebecryl® P39, benzophenone, diphenyl (2,4,6-trimethylbenzoyl)-phosphine oxide, Irgacure® 184, benzoyl peroxide, and 2,2'-azobisisobutyronitrile;

[96] the nanocomposite formulation of any one of [80]-[95], further comprising at least one adhesion promoter selected from 3-aminopropyltriethoxysilane, 3-[(methacryloyloxy)propyl] trimethoxysilane, ureidopropyltrimethoxysilane, trimethoxy [3-(methylamino)propyl] silane, CN820, CN146, and combinations thereof.

[97] the nanocomposite formulation of any one of [80]-[96], further comprising at least one wetting agent selected from BYK-307, BYK-330, Novec 4430, Novec 4432, Novec 4434, and combinations thereof.

[98] the nanocomposite formulation of any one of [80]-[97], further comprising at least one levelling agent selected from BYK-352, BYK-353, BYK-356, BYK-361N, BYK-322, BYK-323, BYK-350 and combinations thereof.

[99] the nanocomposite formulation of any one of [80]-[98], further comprising at least one dispersing agent selected from DISPERBYK-101, DISPERBYK-130, DISPERBYK-140, DISPERBYK-160, DISPERBYK-161, DISPERBYK-162, DISPERBYK-163, DISPERBYK-164, DISPERBYK-165, DISPERBYK-166, DISPERBYK-170, DISPERBYK-171, DISPERBYK-182, DISPERBYK-2000, DISPERBYK-2001, Solsperse 32000, Solsperse 36000, Solsperse 28000, Solsperse 20000, Solsperse 41000, and Solsperse 45000 FC-4430, FC-4432, FC-4434 (3M), Capstone FS-3100, and combinations thereof;

[100] the nanocomposite formulation of any one of [80]-[99], further comprising at least one anti-oxidant agent selected from Irganox 1010, Irganox 1076, SongNox® 1076, SongNox® 2450, SongNox® 1680, Irgaphos 168, SongLight® 6220, and combinations thereof.

[101] the nanocomposite formulation of any one of [80]-[100], wherein the average particle size of the $TiO_2$ nanocrystals in the formulation is in the range of 1-50 nm, such as 4-20 nm, or 10-20 nm, as measured by TEM.

[102] the nanocomposite formulation of any one of [80]-[101], wherein the D9999 of the $TiO_2$ nanocrystals in the formulation, as determined by DLS, is in the range of 20-500 nm, preferably, less than 200 nm.

[103] the nanocomposite formulation of any one of [80]-[102], wherein the at least partially capped $TiO_2$ nanocrystals in the formulation are uniformly dispersed without agglomeration or settling of the nanocrystals as observed by TGA.

[104] the nanocomposite formulation of any one of [80]-[103], wherein the formulation is stable for more than two weeks, e.g., three weeks, or four weeks, or more than three weeks, more than four weeks, showing less than 5% (e.g., less than 3%, less than 2%, or less than 1%, such as about 0.1%, about 0.5%, about 1%, about 2%, about 3%, or any ranges between the recited values, such as about 0.01-1%, about 0.1-1%, about 0.1-5%, about 0.5-2%, about 0.5-3%, about 0.5-1%, etc.) change in transmittance at 400 nm when stored at room temperature in dark;

[105] the nanocomposite formulation of any one of [80]-[104], having a tunable viscosity in the range of about 1 cp to about 1000 cp, such as about 1 cP-2 cP, about 2 cP-5 cP, about 5 cP-10 cP, about 10 cP-15 cP, about 15 cP-20 cP, about 20 cP-25 cP, about 25 cP-30 cP, about 30 cP-40 cP, about 40 c-50 cP, about 50 cP-60 cP, about 60 cP-75 cP, about 75 cP-100 cP, about 100 cP-200 cP, about 200 cP-500 cP, or about 500 cP-1,000 cP when measured with a Brookfield RVDV II+ cone and plate viscometer;

[106] the nanocomposite formulation of any one of [80]-[105], further comprising at least one scatterer particle such as titania particles, polymer beads, silica particles, or controlled agglomeration of $ZrO_2$ nanocrystals.

[107] the nanocomposite formulation of [106], wherein the at least one scatterer has a particle size in the range of about 50 nm to about 2 μm, such as 50-100 nm, 100-200 nm, 200-300 nm, 300-400 nm, 400-500 nm, 500-600 nm, 600-700 nm, 700-800 nm, 800-900 nm, 900 nm to 1 μm, 1-1.5 μm, or 1.5-2 μm.

[108] the nanocomposite formulation of [106] or [107], wherein the at least one scatterer particle is in the amount of 0.1-40% by weight of the total weight of the formulation.

[109] the nanocomposite formulation of any one of [106]-[108], wherein the formulation has a viscosity of less than 5 cPs, or 5 cPs-50 cPs, or 50 cPs-200 cPs, or 200 cPs-400 cPs, or 400 cPs-650 cPs, or 650 cPs-1000 cPs, when measured at 25° C. with a Brookfield RVDV II+ cone and plate viscometer.

[110] a method of coating a substrate, comprising applying the nanocomposite formulation of any one of [80]-[109] to the surface of the substrate.

[111] the method of [110], wherein the substrate is a glass substrate, ceramic substrate, metal substrate, and/or a plastic substrate;

[112] the method of [110] or [111], wherein the nanocomposite formulation is applied to the surface of the substrate by spin coating, spraying, dipping, screen printing, rolling, painting, printing, ink jet printing, dispensing, roll to roll coating, depositing by evaporation and/or vapor deposition, preferably by spin coating, inkjet printing, imprinting, nano-imprinting, photopatterning, roll to roll coating, slot-die coating, and/or screen-printing;

[113] the method of any one of [110]-[112], further comprising curing the nanocomposite formulation, e.g., by light such as UV light, or heat treatment;

[114] a coated substrate prepared by the method of any one of [110]-[113];

[115] a device comprising the coated substrate of [114];

[116] the device of [115], which is an optoelectronic device, photovoltaic device, catalysis device, fuel cell, battery, smart window, sensor, CMOS sensor, LED, mini-LED, micro LED, organic LED (OLED), Quantum LED (QLED), touch screen, display, flexible electronic device, printed electronic device, augmented reality, virtual reality, mixed reality, wave guide, diffraction grating or a solar cell device;

[117] the device of [115], which is a device, such as a light emitting diode device, comprising a lens structure as an internal light extraction layer, wherein the internal light extraction layer comprises the coated substrate of [114];

[118] a nanocomposite film comprising at least partially capped $TiO_2$ nanocrystals and at least one monomer, oligomer and/or polymer, wherein the at least partially capped nanocrystals are present in an amount greater than 50%, such as greater than 60%, greater than 70%, greater than 80%, or greater than 90%, such as about 55%, about 60%, about 70%, about 80%, about 90%, or any ranges between the recited values, such as about 55-90%, about 60-90%, about 70-90%, by weight of the nanocomposite;

[119] the nanocomposite film of [118], comprising the at least partially capped $TiO_2$ nanocrystals of any one of [57]-[65], e.g., the $TiO_2$ nanocrystals at least partially capped with a capping agent selected from methyltrimethoxysilane, n-octyltrimethoxysilane, methoxy(triethyleneoxy)propyltrimethoxysilane, 3-mercaptopropyltrimethoxysilane, 3-(methacryloyloxy)propyl trimethoxysilane, 3-(acryloyloxy)propyl trimethoxysilane, vinyltrimethoxysilane, allyltrimethoxysilane, 3-glycidoxypropyltrimethoxysilane, 2-[2-(2-methoxyethoxy) ethoxy] acetic acid, oleic acid, and combinations thereof, preferably, the capping agent is selected from methyltrimethoxysilane, methoxy(triethyleneoxy)propyltrimethoxysilane, 3-(methacryloyloxy)propyl trimethoxysilane, 3-(acryloyloxy)propyl trimethoxysilane, 2-[2-(2-methoxyethoxy) ethoxy] acetic acid, and combinations thereof, and more preferably, the capping agent is selected from methoxy(triethyleneoxy)propyltrimethoxysilane, 3-(methacryloyloxy)propyl trimethoxysilane, 3-(acryloyloxy)propyl trimethoxysilane, and combinations thereof, for example, the capping agent is methoxy(triethyleneoxy)propyltrimethoxysilane;

[120] the nanocomposite film of [118] or [119], wherein the at least partially capped $TiO_2$ nanocrystals are in a substantially pure form, for example, which are free or substantially free of a capping agent used for capping $TiO_2$ nanocrystals and by-products from capping the $TiO_2$ nanocrystals;

[121] the nanocomposite film of any one of [118]-[120], wherein the monomer, oligomer and/or polymer is an acrylate, epoxy, or isocyanurate compound, e.g., selected from Bisphenol A Glycerolate Dimethacrylate, esters with acrylic acid (OPPEOA), Bisphenol A Ethoxylate diacrylates, Bisphenol A propoxylate diacrylate, Bisphenol F ethoxylate (2 EO/phenol) diacrylate, Bisphenol A glycerolate diacrylates, bisphenol A ethoxylate dimethacrylate, Ethoxylated (4) bisphenol A diacrylate (SR-601), Biphenol A ethoxylate diacrylate (SR-349), Tris(2-acryloyloxy)ethyl} isocyanurate, tricyclodecane dimethanol diacrylate, Tris(2-hydroxyethyl)isocyanurate triacrylate, cresol novolac epoxy acrylate (CN112C60), Benzyl methacrylate (BMA), benzyl acrylate, trimethylolpropane triacrylate (TMPTA), Trimethylolpropane ethoxylate (1 EO/OH) methyl ether diacrylate, 1,6-Hexanediol diacrylate (HDDA, SR238B), tri(ethyleneglycol) diacrylate, ethylene glycol diacrylate, Poly(ethylene glycol) diacrylate, Glycerol 1,3-diglycerolate diacrylate, Di(ethylene glycol) diacrylate, and combinations thereof,

[122] the nanocomposite film of any one of [118]-[120], wherein the monomer, oligomer and/or polymer is selected from Bisphenol A Glycerolate Dimethacrylate, esters with acrylic acid (OPPEOA), Bisphenol A Ethoxylate diacrylates, Bisphenol A propoxylate diacrylate, Bisphenol F ethoxylate (2 EO/phenol) diacrylate, Bisphenol A glycerolate diacrylates, bisphenol A ethoxylate dimethacrylate, Ethoxylated (4) bisphenol A diacrylate (SR-601), Biphenol A ethoxylate diacrylate (SR-349), cresol novolac epoxy acrylate (CN112C60), and combinations thereof, preferably, the monomer, oligomer and/or polymer is selected from Bisphenol A Glycerolate Dimethacrylate, esters with acrylic acid (OPPEOA), Ethoxylated (4) bisphenol A diacrylate (SR-601), Biphenol A ethoxylate diacrylate (SR-349), cresol novolac epoxy acrylate (CN112C60) and combinations thereof, for example, the monomer, oligomer and/or polymer is Bisphenol A Glycerolate Dimethacrylate;

[123] the nanocomposite film of any one of [118]-[122], wherein the average particle size of $TiO_2$ nanocrystals when measured as a 5% nanocrystal dispersion in PGMEA with DLS is in the range of 1-5 nm, 5-10 nm, 10-15 nm, 15-20 nm, 20-30 nm, 30-40 nm or 40-50 nm and with a D9999 less than 100 nm;

[124] the nanocomposite film of any one of [118]-[123], wherein the % transmittance of the film with a thickness of 1 micron is greater than 80%, e.g., greater than 85%, greater than 90%, greater than 95%, greater than 97%, greater than 98%, greater than 99%, such as about 85%, about 90%, about 95%, about 97%, about 98%, about 99%, about 99.5%, or any ranges between the recited values, such as about 90-99%, at wavelength of 400 nm;

[125] the nanocomposite film of any one of [118]-[124], having a refractive index of about 1.70 to about 2.10, e.g., 1.70-1.72, or 1.72-1.74, or 1.74-1.76, or 1.76-1.78, or 1.78-1.80, or 1.80-1.82, or 1.82-1.84, or 1.84-1.86, or 1.86-1.88, or 1.88-1.90, or 1.90-1.92, or 1.92-1.94, or 1.94-1.96, or 1.96-1.98, or 1.98-2.00, or 2.00-2.02, or 2.02-2.04, or 2.04-2.06, or 2.06-2.08, or 2.08-2.10, at 448 nm, and/or a refractive index of about 1.70 to about 2.10, e.g., 1.70-1.72, or 1.72-1.74, or 1.74-1.76, or 1.76-1.78, or 1.78-1.80, or 1.80-1.82, or 1.82-1.84, or 1.84-1.86, or 1.86-1.88, or 1.88-1.90, or 1.90-1.92, or 1.92-1.94, or 1.94-1.96, or 1.96-1.98, or 1.98-2.00, or 2.00-2.02, or 2.02-2.04, or 2.04-2.06, or 2.06-2.08, or 2.08-2.10, at 635 nm, as measured using a Prism Coupler of a film with <5 um thickness;

[126] the nanocomposite film of any one of [118]-[125], having a hardness of greater than 50 MPa, greater than 100 MPa, or greater than 200 MPa, or greater than 300 MPa or greater than 400 MPa, such as about 55 Mpa, about 100 MPa, about 200 MPa, about 300 MPa, about 400 MPa, about 500 MPa, or any ranges between the recited values, such as about 50-500 MPa or about 100-400 MPa, as measured by nanoindentation;

[127] the nanocomposite film of any one of [118]-[126], wherein the % absorbance of the film with a thickness of 1 micron is less than 0.1%, less than 0.05% or less than 0.01% at wavelength of 450 nm as measured by an integrating sphere;

[128] the nanocomposite film of any one of [118]-[127], having a surface roughness of less than 1 nm Ra as measured by AFM for 5-micron×5-micron area;

[129] the nanocomposite film of any one of [118]-[128], wherein the haze of the nanocomposite film is less than 0.1%, or less than 0.2%, or less than 0.3%, or less than 0.4%, or less than 0.5%, or less than 1% (e.g., about 0.01% to about 0.1%, about 0.1% to about 0.2%, about 0.1% to about 0.5%, about 0.2% to about 0.5%, or about 0.1% to about 1%) and b* is less than 1, or less than 0.5 or less than 0.1 (e.g., about 0.01 to about 0.1, about 0.1 to about 0.5, about 0.1 to about 0.2, or about 0.1 to about 1) as measured by a hazemeter.

[130] the nanocomposite film of any one of [118]-[129], wherein the haze of the nanocomposite film is less than 0.1%, or less than 0.2%, or less than 0.3%, or less than 0.4%, or less than 0.5%, or less than 1% (e.g., about 0.01% to about 0.1%, about 0.1% to about 0.2%, about 0.1% to about 0.5%, about 0.2% to about 0.5%, or about 0.1% to about 1%), and wherein the at least partially capped nanocrystals are uniformly dispersed without agglomeration in the film to achieve uniform RI distribution as observed by uniform particle distribution by TEM, SEM or EDX images;

[131] a method of preparing the nanocomposite film of any one of [118]-[130], comprising mixing the at least partially capped $TiO_2$ nanocrystals and at least one monomer, oligomer and/or polymer to provide a nanocomposite formulation, and optionally curing the nanocomposite formulation to provide the nanocomposite film;

[132] a method of preparing the nanocomposite film of any one of [118]-[130], comprising mixing the at least partially capped $TiO_2$ nanocrystals and at least one monomer, oligomer and/or polymer in a solvent to provide a nanocomposite formulation, and optionally curing the nanocomposite formulation to provide the nanocomposite film;

[133] a method of preparing the nanocomposite film of any one of [118]-[130], comprising mixing the at least partially capped $TiO_2$ nanocrystals, a curing agent, and at least one monomer, oligomer and/or polymer to provide a nanocomposite formulation, and optionally curing the nanocomposite formulation to provide the nanocomposite film;

[134] a method of preparing the nanocomposite film of any one of [118]-[130], comprising mixing the at least partially capped $TiO_2$ nanocrystals, a curing agent, and at least one monomer, oligomer and/or polymer in a solvent to provide a nanocomposite formulation, and optionally curing the nanocomposite formulation to provide the nanocomposite film;

[135] the method of any one of [131]-[134], wherein the at least partially capped $TiO_2$ nanocrystals are prepared according to any one of the methods of [46]-[56];

[136] the method of any one of [131]-[135], wherein the at least partially capped $TiO_2$ nanocrystals are prepared from $TiO_2$ nanocrystals prepared according to any one of the methods of [1]-[38];

[137] a device comprising the nanocomposite film of any one of [118]-[130];

[138] the device of [137], which is an optoelectronic device, photovoltaic device, catalysis device, fuel cell, battery, smart window, sensor, CMOS sensor, LED, mini-LED, micro LED, organic LED (OLED), Quantum LED (QLED), touch screen, display, flexible electronic device, printed electronic device, augmented reality, virtual reality, mixed reality, wave guide, diffraction grating or a solar cell device; or

[139] the device of [138], which is a device, such as a light emitting diode device, comprising a lens structure as an internal light extraction layer, wherein the internal light extraction layer comprises the nanocomposite film of any one of [118]-[130].

Nanocrystal aggregation is controlled by the surface chemistry (or chemistry of the effective surface) of the nanocrystals. In a dispersion, the inter-particle forces (such as electrostatic forces, van der Waals forces and entropic forces) between the surfaces of the nanocrystals result in a tendency to form aggregates. These inter-particle forces are particularly important in nanocrystals because of the large surface to volume ratio for these particles. In order to avoid aggregation in dispersion, it is desirable for the surfaces of the nanocrystals to be passivated (or stabilized). One method that may be used to passivate the surface of the nanocrystal involves the introduction of ligand ions or molecules. These ligands, which are also called capping agents, are added to the surface of the nanocrystals and thus create a new effective surface of the nanocrystals. This effective surface is the surface of the shell created by the complete or partial surface coverage with capping agents. The chemistry of this effective surface can be tailored in order to create a chemical environment, distinct from the actual or initial surface of the nanocrystal, which facilitates dispersion while preventing or reducing aggregation.

The liquid synthesis of metal oxide colloidal nanocrystals is a method of producing nanocrystals which are, at least partially, surface passivated during the synthesis. The liquid synthesis is performed in solvent with or without the presence of capping agents. The nanocrystals are protected against aggregation, at least partially, during the synthesis and afterwards, by capping agents.

After synthesis of nanocrystals by liquid synthesis, the as-made surface passivation can be modified by a process known as a capping exchange reaction in which one ligand or capping agent is at least partially replaced by a different one. In this process the nanocrystals are usually dispersed in a solvent along with the desired capping agent. In some instances, the temperature of the suspension may be elevated to further drive the exchange process. As a result of the capping exchange, either the new capping agent is added to some fraction of the nanocrystal surface or a fraction of the previous surface passivation agents are replaced by the new capping agent, or some combination thereof. The new capping agent may be chosen in order to yield chemical compatibility between the effective nanocrystal surface and the solvent, or other media, chosen for the final dispersion or application.

In order to achieve higher quality nanocomposites, nanocrystal particle size should advantageously be less than 50 nm in at least one dimension, preferably less than 30 nm in at least one dimension, preferably less than 20 nm in at least one dimension, preferably less than 10 nm in at least one dimension with a narrow particle size distribution, and further with specific particle shape (rod, spherical, etc). In addition, the surface chemistry of the nanocrystal is advantageously well passivated, preventing or reducing aggregation, and increasing or enhancing compatibility with the solvent(s) and/or the matrix material, and thereby allowing or enhancing dispersion of the nanocrystals into a nanocomposite or other substrate containing same.

Nanocrystals of the present disclosure will also be recognized in the art as including, for example, nanoparticles, quantum dots and colloidal particles and can include particles that are crystalline and/or amorphous with sizes ranging from a few hundred nanometers down to 1 nm or less.

Functionalized silanes are a common class of organic compounds used to populate the surface of a nanocrystalline oxide material as capping agents. These silanes are typically composed of head and tail components. The head of a functionalized silane is typically either a trialkoxysilane group or a trichlorosilane group, although bi- and mono-substituted alkoxy and chloro silane are possible. The head anchors to the surface of the oxide through a covalent bond with the hydroxide groups (—OH) or —OR group wherein R is an alkyl or aryl group, present at the surface, eliminating an alcohol, alkyl chloride, water or HCl as a by-product. The tails of a functionalized silane can include one or more of an alkyl chains of varying lengths, aryl groups, ether groups, amines, thiols, acrylates, methacrylates or carboxylic acid.

Other classes of organic compounds used as capping agents to passivate the surface of an oxide material include carboxylic acids and alcohols. The head of carboxylic acids is a carboxylic acid (—COOH) group and alcohols is an —OH group. The head anchors to the surface of the oxide through a covalent bond with the hydroxide groups (—OH) or —OR (R=alkyl or aryl) group present at the surface, eliminating an alcohol, or water as a by-product. The tails of a functionalized carboxylic acids and alcohols can be composed of alkyl chains of a variety of lengths, aryl groups, ether groups, amines, thiols, acrylates, methacrylates or carboxylic acids.

Yet another class of organic compounds that can be used to passivate the surface of the metal oxide have head groups that include thiols, sulfonates, phosphates and phosphonates, where the head of the molecule anchors to the to the surface of the oxide through a covalent bond with the hydroxide groups (—OH) or —OR (R=alkyl or aryl) group present at the surface, eliminating an alcohol, or water as a by-product. The tails of these organic compounds can be composed of alkyl chains of a variety of lengths, aryl groups, ether groups, amines, thiols, acrylates or methacrylates.

The present disclosure further includes methods for the surface modification of nanocrystals with silanes, alcohols, thiols, sulfonates, phosphonates, phosphates and/or carboxylic acids. The method includes depositing capping agents during the synthesis of the nanocrystals or through ligand exchange of at least part of the capping agent originally present on the nanocrystal with a second one after the synthesis. These reactions can be performed under ambient, heated, and/or high temperature/high pressure conditions.

The present disclosure further includes dispersions and formulations of capped $TiO_2$ nanocrystal. These dispersions may be in solvents and formulations may include monomers, oligomers and polymer in addition to other additives.

The present disclosure further includes a nanocomposite material containing a matrix and nanocrystals, which have been, for example, mixed, stirred, or dispersed therein. Nanocomposites according to the present disclosure may be fabricated by, for example, UV curing, heat curing, melt blending, in situ polymerization, and/or solvent mixing of the nanocrystals and the matrix materials or precursors of the matrix.

BRIEF DESCRIPTION OF TABLES

Figure 1:
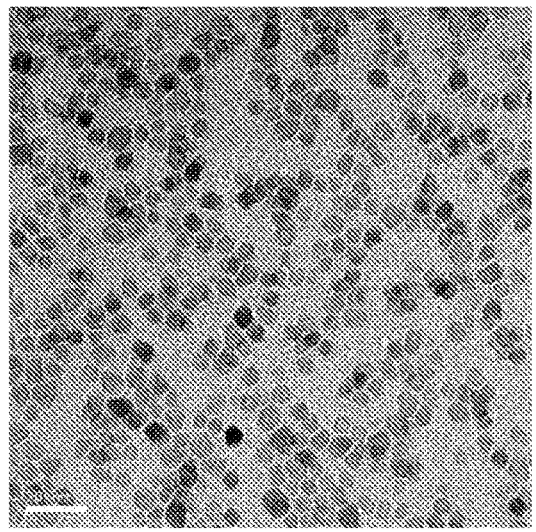
FIG. 1: An exemplary TEM image of titanium oxide nanocrystals described in example 8 showing particle sizes less than 10 nanometers.

TABLE 1: Reaction conditions used to synthesize $TiO_2$ nanocrystals in 2-gallon Parr reactor.

TABLE 2: Aging data of comprising of methoxy(triethyleneoxy)propyltrimethoxy-silane capped titanium oxide nanocrystals described in example 8 dispersed 50% by weight in PGMEA showing initial, 1 week, and 1-month values for TGA, DLS, and UV measurements.

TABLE 3: Data compromising various ratios of capped titanium oxide nanocrystals and capped zirconium dioxide nanocrystals dispersed 50% by weight in PGMEA, showing values for TGA, DLS, and UV measurements described in Example 17.

TABLE 4: Optical properties such as % Transmittance, Refractive Index, b*, and % Haze of 2-micron thick spin coated nanocomposite film made from formulations described in Example 17.

TABLE 5: Summary of the properties of the nanocrystal dispersion and formulation stated in the various examples.

TABLE 6: Summary of the optical properties of the nanocomposite films stated in the various examples.

DETAILED DESCRIPTION

In various embodiments, the present disclosure provides novel $TiO_2$ nanocrystals, capped $TiO_2$ nanocrystals, dispersions containing the same, nanocomposites such as films containing the same, and/or devices (e.g., coated substrates) containing the same. In some embodiments, the present disclosure also provides methods of preparing and using the novel $TiO_2$ nanocrystals, capped $TiO_2$ nanocrystals, dispersions, nanocomposites, and/or devices.

In some embodiments, the present disclosure provides a method of preparing $TiO_2$ nanocrystals. The method typically comprises converting a precursor of titanium oxide into $TiO_2$ with a solvothermal method. The conversion is not limited to any particular mechanism, which can typically include hydrolysis or solvolysis of the precursor of titanium oxide. While not required, the conversion is typically conducted under an inert atmosphere. For brevity, the term "titanium oxide" and "titanium dioxide" are used interchangeably herein.

In some embodiments, the synthetic methods to prepare titanium oxide nanocrystals described herein include a solvothermal method wherein a precursor of the titanium oxide is mixed or dissolved in at least one solvent and allowed to react for a certain period of time. The use of pressure and/or heating may be necessary in some cases. In a typical solvothermal process, the majority of the solvent is not water. When water is used as a majority of the solvent, the synthetic method is referred to as a hydrothermal synthesis. Addition of small amount of water as a reactant rather than as a solvent into the reaction mixture in solvothermal synthesis of $TiO_2$ nanocrystals results in better control of the particle size and distribution than reactions carried out without addition of water.

In some embodiments, the method of preparing $TiO_2$ nanocrystals herein can include reacting a precursor of titanium oxide with water in a solvent, such as a non-aqueous solvent, to provide the $TiO_2$ nanocrystals. In some embodiments, the method of preparing $TiO_2$ nanocrystals herein can include mixing a precursor of titanium oxide in a solvent to provide a reaction mixture and heating the reaction mixture to provide the $TiO_2$ nanocrystals. In some embodiments, the method of preparing $TiO_2$ nanocrystals herein can include adding a precursor of titanium oxide and water in a solvent to provide a reaction mixture, and heating the reaction mixture to provide the $TiO_2$ nanocrystals. In some embodiments, the precursor of titanium oxide can be dissolved in the solvent. In some embodiments, the reaction mixture can be heated under pressure to provide the $TiO_2$ nanocrystals. In some embodiments, the amount of water added to the solvent can range from about 0.01 to about 10 molar equivalents of the precursor of titanium oxide. The molar ratio of the precursor of titanium oxide to water ranges from about 1:0 to about 1:10, such as 1:0-1:0.1, 1:0.1-1:0.5, 1:0.5-1:1, 1:1-1:1.5, 1:1.5-1:2, 1:2-1:2.5, 1:2.5-1:3, 1:3-1:3.5, 1:3.5 to 1:4, 1:4-1:4.5, 1:4.5-1:5, 1:5-1:5.5, 1:5.5 to 1:6, 1:6-1:6.5, 1:6.5-1:7, 1:7-1:7.5, 1:7.5-1:8, 1:8-1:8.5, 1:8.5-1:9, 1:9-1:9.5, 1:9.5-1:10. The molar ratio of the precursor of titanium oxide to the solvent ranges from about 1:1 to about 1:150, such as 1:1-1:5, 1:5-1:10, 1:10-1:15, 1:15-1:20, 1:20-1:25, 1:25-1:30, 1:30-1:35, 1:35-1:40, 1:40-1:45, 1:45-1:50, 1:50-1:55, 1:55-1:60, 1:60-1:65, 1:65-1:70, 1:70-1:75, 1:75-

1:80, 1:80-1:85, 1:85-1:90, 1:90-1:95, 1:95-1:100, or 1:100 to 1:150. In some embodiments, no water is added to the solvent. Commercially available solvents such as reagent grade solvents typically contain some levels of moisture. For the methods described herein, it is not necessary to take additional measure to remove the moistures otherwise present in a solvent used herein. For the avoidance of doubt, unless otherwise obvious from context, the amount of water referred to herein should be understood as externally added water, not including the amount of water that may be present in the solvent itself. Suitable precursors, solvents, amount of water, heating temperatures, durations, and pressures include any of those described herein.

Precursors of titanium oxide useful for the methods herein are not particularly limited, so long as they can be converted into $TiO_2$, e.g., through hydrolysis, decomposition, and/or other suitable reactions. In some embodiments, the precursor of titanium oxide can be a hydrolysable precursor. In some embodiments, the precursor of the titanium oxide nanocrystals may be one or more of alkoxides, such as: titanium methoxide (Ti(OCH3)4), titanium ethoxide (Ti(OCH2CH3)4), titanium n-propoxide (Ti(OCH2CH2CH3)4), titanium isopropoxide (Ti(OCH(CH3)2)4), titanium n-butoxide (Ti(OCH2CH2CH2CH3)4); acetylacetonates, such as titanium oxyacetylacetonate (TiO(CH3COCHCOCH3)2); halides, such as titanium chloride (TiCl4); and mixed halides and alkoxide, such as titanium chlorotriisopropoxytitanium (TiCl(OCH(CH3)2)3), chlorotributoxytitanium (TiCl(OCH2CH2CH2CH3)3), or titanium dichloride diethoxide (TiCl2(OCH2CH3)2) or other organometallic compounds.

For example, in some embodiments, the precursor of titanium oxide for the methods of preparing $TiO_2$ nanocrystals herein can be a titanium alkoxide. In some embodiments, the titanium alkoxide can have a formula of Ti(OR)4, wherein each R group can be independently an alkyl group (e.g., a C1-C6 alkyl) or a substituted alkyl group, such as methyl, ethyl, n-propyl, isopropyl, n-butyl, isobutyl, sec-butyl, benzyl, etc. In some embodiments, all of the R groups in Ti(OR)4 can be the same, such as titanium methoxide (Ti(OCH3)4), titanium ethoxide (Ti(OCH2CH3)4), titanium n-propoxide (Ti(OCH2CH2CH3)4), titanium isopropoxide (Ti(OCH(CH3)2)4), or titanium n-butoxide (Ti(OCH2CH2CH2CH3)4). In some embodiments, at least one of the R groups in Ti(OR)4 can be different from the remaining R groups.

In some embodiments, the precursor of titanium oxide for the methods of preparing $TiO_2$ nanocrystals herein can also have a formula of Ti(OR)xGy, wherein R group at each occurrence can be independently an alkyl group or a substituted alkyl group, such as methyl, ethyl, n-propyl, isopropyl, n-butyl, isobutyl, sec-butyl, benzyl, etc., and G group at each occurrence can be independently a halogen such as Cl, wherein x can be an integer of 0-4, and y can be an integer of 0-4, provided that x+y is 4.

In some embodiments, the method herein can use one precursor of titanium oxide for preparing the $TiO_2$ nanocrystals, such as titanium butoxide (Ti(OCH2CH2CH2CH3)4), or isopropoxide (Ti(OCH(CH3)2)4). However, in some embodiments, the method herein can also use two or more precursors of titanium oxide for preparing the $TiO_2$ nanocrystals, for example, a mixture of titanium ethoxide (Ti(OCH2CH3)4) and titanium isopropoxide (Ti(OCH(CH3)2)4).

Various solvents are useful for the methods of preparing $TiO_2$ nanocrystals herein. Typically, the solvent is chosen such that the precursor of titanium oxide and optionally added water can be dissolved in the solvent. In some preferred embodiments, the solvent can have a higher boiling point than water. Non-limiting solvents useful in the present disclosure may be one or more of alcohols such as: benzyl alcohol, phenol, oleyl alcohol, butanol, propanol, isopropanol, ethanol, butoxy ethanol, butoxy propanol, methanol, 2-(isopentyloxy)ethanol, 2-propoxy-propanol (PnP), 2-(hexyloxy)ethanol; ethers and cyclic ethers, such as: tetrahydrofuran, dimethyl ether, diethyl ether, dibutyl ether, propylene glycol monomethyl ether (PGME), diethylene glycol butyl ether, dipropylene glycol methyl ether (DPGME), diethylene glycol monomethyl ether, and diethylene glycol monoethyl ether; glycols such as: diethylene glycol, dipropylene glycol; ketones and cyclic ketones, such as: acetone; esters, such as: propylene glycol methyl ether acetate (PGMEA), ethyl lactate (EL), methyl acetates, ethyl acetates, butyl acetate, ethylene glycol monobutyl ether acetate, diethylene glycol monobutyl ether acetate, diethylene glycol monoethyl ether acetate, butoxy ethyl acetate, ethyl acetate, 2-(2-butoxyethoxy)ethyl acetate; aromatics such as: benzene, toluene; and water and any combination or mixture thereof. In some specific embodiments, the solvent can include an alcoholic solvent, preferably an alcoholic solvent with a higher boiling point than water. In some embodiments, the solvent can include benzyl alcohol. In some embodiments, the solvent can be a single alcoholic solvent, such as benzyl alcohol. In some embodiments, the solvent can be a mixture of solvents, such as a mixture of benzyl alcohol with another solvent.

Without wishing to be bound by theories, it is believed that the characteristics of the initial $TiO_2$ nanocrystals can have an impact on the properties of the capped $TiO_2$ nanocrystals, dispersions, nanocomposites, and/or device. Thus, some embodiments of the present disclosure are also directed to methods of preparing $TiO_2$ nanocrystals having certain desired characteristics (e.g., described herein).

In some embodiments, the present disclosure provides a method of preparing $TiO_2$ nanocrystals, which comprises 1) adding a precursor of titanium oxide (e.g., described herein) and water in a solvent (e.g., an alcoholic solvent such as benzyl alcohol, or another solvent described herein) to provide a reaction mixture, wherein the molar ratio of the precursor of titanium oxide to water ranges from about 0.01 to about 10 (e.g., about 0.1 to about 1, about 1 to about 2.5, about 0.1 to about 0.5, about 0.5 to about 1, about 2.5 to about 5, etc.), and 2) heating the reaction mixture at a temperature of about 180□ to about 250□ (e.g., about 200° C. to about 210° C.) for about 10 minutes to 5 hours (e.g., 20 minutes to 1 hour, or 1-5 hours), to provide the $TiO_2$ nanocrystals. As detailed herein, the particle size and particle size distribution of the $TiO_2$ nanocrystals can be controlled by the reaction conditions herein, including for example, the reaction temperature, the amount of added water, and the duration of heat. Thus, in some embodiments, the reaction condition is controlled such that the $TiO_2$ nanocrystals can have an average particle size of less than 50 nm (e.g., less than about 50 nm, less than about 40 nm, less than about 30 nm, less than about 20 nm, less than about 10 nm, less than about 5 nm, such as about 1 nm, about 4 nm, about 5 nm, about 10 nm, about 15 nm, about 20 nm, about 35 nm, about 30 nm, about 40 nm, about 50 nm, or any range between the recited values, such as about 1 nm to about 5 nm, about 1 nm to about 10 nm, about 40 nm to about 50 nm, about 20 nm to about 30 nm, about 10 nm to about 20 nm, about 30 nm to about 40 nm, about 4 nm to about 50 nm, about 4 nm to about 20 nm, about 15 nm to about 20 nm, or about 10 nm to about 25 nm etc.) as measured by TEM, preferably, with a narrow particle size distribution. For example, in some embodiments, the $TiO_2$ nanocrystals herein can have a narrow particle size distribution characterized by 1) a ratio of D90:D10 of less than 5, preferably, less than 3, or less than 2, such as about 1.1 to about 2, about 1.5 to about 2, about 1.2 to about 1.8, about 1.2 to about 3, or about 1.5 to about 3; 2) a ratio of D90:D50 of less than 3, preferably, less than 2, or less than 1.5, such as about 1.1 to about 2, about 1.5 to about 2, about 1.2 to about 1.5; and/or 3) a ratio of D50:D10 of less than 3, preferably, less than 2, or less than 1.5, such as about 1.1 to about 2, about 1.5 to about 2, about 1.2 to about 1.5. In some embodiments, the $TiO_2$ nanocrystals herein can also have a narrow particle size distribution characterized by a standard deviation ($\sigma$) of the particle size distribution no greater than 15% (e.g., no greater than 10%, or no greater than 5%, such as about 1% to about 15%, about 5% to about 10%, or about 10% to about 15%) of the median particle size of the nanocrystals as measured by TEM. In some embodiments, the $TiO_2$ nanocrystals herein can also have a narrow particle size distribution characterized by a standard deviation ($\sigma$) of the particle size distribution no greater than 5 nm (e.g., no greater than 3 nm, or no greater than 1 nm, such as about 1 nm, about 3 nm, about 5 nm, or any ranges between the recited values, such as about 1-3 nm, about 1-5 nm, about 3-5 nm, etc.), as measured by TEM. In some embodiments, the $TiO_2$ nanocrystals herein can also have a narrow particle size distribution characterized in that greater than about 90% (e.g., greater than about 95%, or greater than about 99%, such as about 91%, about 95%, about 98%, about 99%, about 99.5%, or any ranges between the recited values, such as 90-99%, 90-95%, or 95-99%) of the nanocrystals have a particle size within 5 nm of the average particle size, as measured by TEM. It should be noted that the $TiO_2$ nanocrystals prepared by the methods herein and their particle size distribution are also novel aspects of the present disclosure. In any of the embodiments described herein, unless otherwise obviously contradictory from the context, the $TiO_2$ nanocrystals can have anatase crystal structure.

In some embodiments, the disclosure provides a method of preparing $TiO_2$ nanocrystals, which comprises 1) adding a precursor of titanium oxide (e.g., such as titanium methoxide, titanium ethoxide, titanium n-propoxide, titanium isopropoxide, or titanium n-butoxide, or otherwise described herein) and water in a solvent (e.g., an alcoholic solvent such as benzyl alcohol, phenol, butanol, oleylalcohol, dodecylalcohol, and octadecanol, or otherwise described herein) to provide a reaction mixture, wherein the molar ratio of the precursor of titanium oxide to water ranges from about 0.1 to about 5 and 2) heating the reaction mixture at a temperature of about 180° C. to about 250° C. (e.g., about 200° C. to about 210° C.) for about 10 minutes to 5 hours (e.g., 20 minutes to 1 hour, or 1-5 hours), to provide the $TiO_2$ nanocrystals. In some embodiments, the molar ratio of water to the precursor of titanium oxide in the reaction mixture ranges from about 0.1 to about 5, about 1 to about 2.5, or about 0.1 to about 0.5, etc.). In some embodiments, the reaction mixture is heated at about 200° C. to about 210° C. (e.g., about 203° C. to about 207° C.) for about 10 minutes to 5 hours (e.g., 20 minutes to 1 hour, or 1-5 hours). In some embodiments, the reaction condition is controlled such that the $TiO_2$ nanocrystals can have an average particle size of less than 50 nm (e.g., less than about 50 nm, less than about 40 nm, less than about 30 nm, less than about 20 nm, less than about 10 nm, less than about 5 nm, such as about 1 nm, about 4 nm, about 5 nm, about 10 nm, about 15 nm, about 20 nm, about 35 nm, about 30 nm, about 40 nm, about 50 nm, or any range between the recited values, such as about 1 nm to about 5 nm, about 1 nm to about 10 nm, about 40 nm to about 50 nm, about 20 nm to about 30 nm, about 10 nm to about 20 nm, about 30 nm to about 40 nm, about 4 nm to about 50 nm, about 4 nm to about 20 nm, about 15 nm to about 20 nm, or about 10 nm to about 25 nm) as measured by TEM, preferably, with a narrow particle size distribution. In some embodiments, the reaction condition is controlled such that the $TiO_2$ nanocrystals have an average particle size of about 1 nm to about 5 nm, about 1 nm to about 10 nm, about 40 nm to about 50 nm, about 20 nm to about 30 nm, about 10 nm to about 20 nm, or about 30 nm to about 40 nm as measured by TEM, preferably, with a narrow particle size distribution. For example, in some embodiments, the reaction condition is controlled such that the $TiO_2$ nanocrystals can have a narrow particle size distribution characterized by 1) a ratio of D90:D10 of less than 5, preferably, less than 3, or less than 2, such as about 1.1 to about 2, about 1.5 to about 2, about 1.2 to about 1.8, about 1.2 to about 3, or about 1.5 to about 3; 2) a ratio of D90:D50 of less than 3, preferably, less than 2, or less than 1.5, such as about 1.1 to about 2, about 1.5 to about 2, about 1.2 to about 1.5; and/or 3) a ratio of D50:D10 of less than 3, preferably, less than 2, or less than 1.5, such as about 1.1 to about 2, about 1.5 to about 2, about 1.2 to about 1.5. In some embodiments, the reaction condition is controlled such that the $TiO_2$ nanocrystals can also have a narrow particle size distribution characterized by a standard deviation ($\sigma$) of the particle size distribution no greater than 15% (e.g., no greater than 10%, or no greater than 5%, such as about 1% to about 15%, about 5% to about 10%, or about 10% to about 15%) of the median particle size of the nanocrystals as measured by TEM. In some embodiments, the reaction condition is controlled such that the $TiO_2$ nanocrystals can also have a narrow particle size distribution characterized by a standard deviation ($\sigma$) of the particle size distribution no greater than 5 nm (e.g., no greater than 3 nm, or no greater than 1 nm, such as about 1 nm, about 3 nm, about 5 nm, or any ranges between the recited values, such as about 1-3 nm, about 1-5 nm, about 3-5 nm, etc.), as measured by TEM. In some embodiments, the reaction condition is controlled such that the $TiO_2$ nanocrystals can also have a narrow particle size distribution characterized in that greater than about 90% (e.g., greater than about 95%, or greater than about 99%, such as about 91%, about 95%, about 98%, about 99%, about 99.5%, or any ranges between the recited values, such as 90-99%, 90-95%, or 95-99%) of the nanocrystals have a particle size within 5 nm of the average particle size, as measured by TEM.

In some embodiments, the rate of heating and heating duration can influence the particle sizes of the $TiO_2$ nanocrystals. Typically, longer duration of heating or faster rate of heating can lead to larger particle sizes and wider particle size distribution. In some preferred embodiments, the reaction mixture can be heated at a temperature of about 200☐ to about 210☐ for about 10 minutes to 5 hours (e.g., 20 minutes to 1 hour, or 1-5 hours). In some embodiments, the rate of heating can be controlled such that the reaction temperature (e.g., about 200☐ to about 210☐, or about 203° C. to about 207° C.) is reached with a heating rate of about 0.1☐ to 5☐ per minute, such as about 0.5☐ to about 3☐ per minute. In some embodiments, the reaction mixture can be heated under pressure ranging from about 40 psi to about 500 psi, such as about 40 psi to about 150 psi.

As described herein, the amount of water in the reaction mixture can also have an effect on the particle sizes of the $TiO_2$ nanocrystals. For example, in some embodiments, the desired $TiO_2$ nanocrystals have an average particle size of less than 10 nm (such as less than 5 nm, such as about 1 nm to about 5 nm, or about 1 nm to about 10 nm), and in such cases, the molar ratio of the precursor of titanium oxide to water can preferably range from about 1:0.3 to about 1:3, such as about 1:0.5 to about 1:2.5, e.g., about 1:0.5 to about 1:1, about 1:1 to about 1:1.5, about 1:1.5 to about 1:2, or about 1:2 to about 1:2.5. In some embodiments the molar ratio of the precursor of titanium oxide to the solvent range from about 1:1 to 1:150, such as 1:1-1:5, 1:5-1:10, 1:10-1:15, 1:15-1:20, 1:20-1:25, 1:25-1:30, 1:30-1:35, 1:35-1:40, 1:40-1:45, 1:45-1:50, 1:50-1:55, 1:55-1:60, 1:60-1:65, 1:65-1:70, 1:70-1:75, 1:75-1:80, 1:80-1:85, 1:85-1:90, 1:90-1:95, 1:95-1:100, 1:100-1:150. In some embodiments, the desired $TiO_2$ nanocrystals have an average particle size of greater than 4 nm but less than 50 nm (such as about 10 nm to about 25 nm or about 4 nm to about 20 nm), and in such cases, the molar ratio of the precursor of titanium oxide to water can range from about 1:0.3 to about 1:3, such as about 1:0.5 to about 1:2.5, e.g., about 1:0.5 to about 1:1, about 1:1 to about 1:1.5, about 1:1.5 to about 1:2, or about 1:2 to about 1:2.5, preferably less than 1, such as less than 0.5, for example, about 0.1, about 0.2, about 0.3, about 0.4, about 0.45, or about 0.2 to about 0.5, or about 0.3 to about 0.45.

Other suitable conditions and exemplified preparations of $TiO_2$ nanocrystals with the recited characteristics are described herein. For example, in some embodiments, the precursor of titanium oxide is a titanium alkoxide, such as titanium (IV) butoxide. In some embodiments, the solvent can be an alcoholic solvent, such as benzyl alcohol. Typically, the molar ratio of precursor of titanium oxide (e.g., titanium (IV) butoxide) to the solvent (e.g., benzyl alcohol) can range from about 01:1 to about 50, preferably, about 1:5 to about 1:40, preferably, about 1:30.

In some embodiments, the method of preparing $TiO_2$ nanocrystals herein can further comprise separating the solvent from the $TiO_2$ nanocrystals to provide wet $TiO_2$ nanocrystals, e.g., through centrifuge and decant. In some embodiments, the method of preparing $TiO_2$ nanocrystals herein can further comprise suspending the wet $TiO_2$ nanocrystals in a capping solvent (e.g., described herein, such as PGMEA).

In additional embodiments, the disclosure provides a nanocrystal dispersion comprising at least partially capped $TiO_2$ nanocrystals and a solvent, wherein the at least partially capped $TiO_2$ nanocrystals are present in an amount greater than 30%, e.g., greater than 40%, greater than 50%, greater than 60%, or greater than 70% by weight, in the dispersion, such as about 40%, about 50%, about 60%, about 70%, about 80%, or any ranges between the recited values, such as about 40-70%, about 30-80%, about 50-80%, etc. by weight in the dispersion. In some embodiments, the $TiO_2$ nanocrystals of the dispersion are at least partially capped with a capping agent such as a silane, alcohol, carboxylic acid, thiol or sulfonate, or phosphonate or phosphate. In some embodiments, the $TiO_2$ nanocrystals are at least partially capped with a capping agent described herein. In some embodiments, the size of the $TiO_2$ nanocrystals in the dispersion is in the range of 1-50 nm, such as 4-20 nm, or 10-20 nm. In some embodiments, the at least partially capped $TiO_2$ nanocrystals herein can typically have an organic content of about 5% to about 35%, preferably, about 5% to about 15%, or about 10% to about 25%, or about 15% to about 30%, as measured by TGA. In some embodiments, the $TiO_2$ nanocrystals of the dispersion were capped in the presence of water. In some embodiments, the at least partially capped $TiO_2$ nanocrystals are derived from the $TiO_2$ nanocrystals prepared by any of the methods described herein. In additional embodiments, the at least partially capped $TiO_2$ nanocrystals in the dispersion are uniformly dispersed without agglomeration or settling of the nanocrystals as observed by TGA. In additional embodiments, the dispersion is stable for more than two weeks, three weeks, or four weeks, showing less than 5% (e.g., less than 3%, less than 2%, or less than 1%, e.g., less than 3%, less than 2%, or less than 1%, such as about 0.1%, about 0.5%, about 1%, about 2%, about 3%, or any ranges between the recited values, such as about 0.01-1%, about 0.1-1%, about 0.1-5%, about 0.5-2%, about 0.5-3%, about 0.5-1%, etc.) change in transmittance at 400 nm when stored at room temperature in dark. The term "capped $TiO_2$ nanocrystals" as used herein should be understood as "at least partially capped $TiO_2$ nanocrystals" unless obviously contradictory from context.

In some embodiments, the disclosure provides a nanocrystal dispersion comprising at least partially capped $TiO_2$ nanocrystals and a solvent wherein the at least partially capped $TiO_2$ nanocrystals are present in an amount greater than 30%, e.g., greater than 40%, greater than 50%, greater than 60%, or greater than 70%, such as about 40%, about 50%, about 60%, about 70%, about 80%, or any ranges between the recited values, such as about 40-70%, about 30-80%, about 50-80%, etc., by weight in the dispersion and wherein the nanocrystal dispersion comprises a solvent selected from benzyl alcohol, Butyl Carbitol Acetate (BCA), butanol, propanol, isopropanol, ethanol, butoxy ethanol, butoxy propanol, methanol, tetrahydrofuran, diethyl ether, propylene glycol monomethyl ether (PGME), diethylene glycol butyl ether, dipropylene glycol methyl ether (DPGME), diethylene glycol monomethyl ether, diethylene glycol monoethyl ether, diethylene glycol, dipropylene glycol, acetone, propylene glycol methyl ether acetate (PGMEA), ethyl lactate (EL), ethyl acetate, butyl acetate, diethylene glycol monoethyl ether acetate, toluene. In some embodiments, the $TiO_2$ nanocrystals of the dispersion are at least partially capped with a capping agent such as a silane, alcohol, carboxylic acid, thiol or sulfonate, or phosphonate or phosphate. In some embodiments, the $TiO_2$ nanocrystals are at least partially capped with a capping agent described herein. In some embodiments, the $TiO_2$ nanocrystals are at least partially capped with a capping agent selected from methyltrimethoxysilane, n-octyltrimethoxysilane, methoxy(triethyleneoxy)propyltrimethoxysilane, 3-mercaptopropyltrimethoxysilane, 3-(methacryloyloxy)propyl trimethoxysilane, 3-(acryloyloxy)propyl trimethoxysilane, vinyltrimethoxysilane, allyltrimethoxysilane, 3-glycidoxypropyltrimethoxysilane, 2-[2-(2-methoxyethoxy) ethoxy] acetic acid, oleic acid, and combinations thereof. In some embodiments, the average particle size of the $TiO_2$ nanocrystals in the dispersion is in the range of 1-50 nm, such as 4-20 nm, or 10-20 nm. In some embodiments, the D9999 of the $TiO_2$ nanocrystals in the dispersion is <200 nm. In some embodiments, the at least partially capped $TiO_2$ nanocrystals herein can typically have an organic content of about 5% to about 35%, preferably, about 5% to about 15%, or about 10% to about 25%, or about 15% to about 30%, as measured by TGA. In some embodiments, the $TiO_2$ nanocrystals of the dispersion were capped in the presence of water. In some embodiments, the at least partially capped $TiO_2$ nanocrystals are derived from the $TiO_2$ nanocrystals prepared by any of the methods described herein. In additional embodiments, the at least partially capped $TiO_2$ nanocrystals in the dispersion are uniformly dispersed without agglomeration or settling of the nanocrystals as observed by TGA. In additional embodiments, the dispersion is stable for more than two weeks, three weeks, or four weeks, showing less than 5% (e.g., less than 3%, less than 2%, or less than 1%, such as about 0.1%, about 0.5%, about 1%, about 2%, about 3%, or any ranges between the recited values, such as about 0.01-1%, about 0.1-1%, about 0.1-5%, about 0.5-2%, about 0.5-3%, about 0.5-1%, etc.) change in transmittance at 400 nm when stored at room temperature in dark.

In some embodiments, the disclosure provides a nanocrystal dispersion comprising at least partially capped $TiO_2$ nanocrystals and a solvent wherein the at least partially capped $TiO_2$ nanocrystals are present in an amount greater than 30%, e.g., greater than 40%, greater than 50%, greater than 60%, or greater than 70%, such as about 40%, about 50%, about 60%, about 70%, about 80%, or any ranges between the recited values, such as about 40-70%, about 30-80%, about 50-80%, etc., by weight in the dispersion and wherein the nanocrystal dispersion comprises a solvent selected from benzyl alcohol, Butyl Carbitol Acetate (BCA), isopropanol, tetrahydrofuran, propylene glycol monomethyl ether (PGME), dipropylene glycol methyl ether (DPGME), propylene glycol methyl ether acetate (PGMEA), ethyl lactate (EL), ethyl acetate, toluene, and combinations thereof. In some embodiments, the $TiO_2$ nanocrystals of the dispersion are at least partially capped with a capping agent such as a silane, alcohol, carboxylic acid, thiol or sulfonate, or phosphonate or phosphate. In some embodiments, the $TiO_2$ nanocrystals are at least partially capped with a capping agent described herein. In some embodiments, the $TiO_2$ nanocrystals are at least partially capped with a capping agent selected from methyltrimethoxysilane, methoxy(triethyleneoxy)propyltrimethoxysilane, 3-(methacryloyloxy)propyl trimethoxysilane, 3-(acryloyloxy)propyl trimethoxysilane, 2-[2-(2-methoxyethoxy) ethoxy]acetic acid, and combinations thereof. In some embodiments, the average particle size of the $TiO_2$ nanocrystals in the dispersion is in the range of 1-50 nm, such as 4-20 nm, or 15-20 nm. In some embodiments, the D9999 of the $TiO_2$ nanocrystals in the dispersion, as determined by DLS, is in the range of 20-500 nm. In some embodiments, the at least partially capped $TiO_2$ nanocrystals herein can typically have an organic content of about 5% to about 35%, preferably, about 5% to about 15%, or about 10% to about 25%, or about 15% to about 30%, as measured by TGA. In some embodiments, the $TiO_2$ nanocrystals of the dispersion were capped in the presence of water. In some embodiments, the at least partially capped $TiO_2$ nanocrystals are derived from the $TiO_2$ nanocrystals prepared by any of the methods described herein. In additional embodiments, the at least partially capped $TiO_2$ nanocrystals in the dispersion are uniformly dispersed without agglomeration or settling of the nanocrystals as observed by TGA. In additional embodiments, the dispersion is stable for more than two weeks, e.g., three weeks, or four weeks, or more than three weeks, more than four weeks, showing less than 5% (e.g., less than 3%, less than 2%, or less than 1%, such as about 0.1%, about 0.5%, about 1%, about 2%, about 3%, or any ranges between the recited values, such as about 0.01-1%, about 0.1-1%, about 0.1-5%, about 0.5-2%, about 0.5-3%, about 0.5-1%, etc.) change in transmittance at 400 nm when stored at room temperature in dark.

In some embodiments, the disclosure provides a nanocrystal dispersion comprising at least partially capped $TiO_2$ nanocrystals and a solvent wherein the at least partially capped $TiO_2$ nanocrystals are present in an amount greater than 30%, e.g., greater than 40%, greater than 50%, greater than 60%, or greater than 70%, such as about 40%, about 50%, about 60%, about 70%, about 80%, or any ranges between the recited values, such as about 40-70%, about 30-80%, about 50-80%, etc., by weight in the formulation and wherein the nanocrystal dispersion comprises a solvent selected from Butyl Carbitol Acetate (BCA), propylene glycol monomethyl ether (PGME), dipropylene glycol methyl ether (DPGME), propylene glycol methyl ether acetate (PGMEA), ethyl acetate, and combinations thereof. In some embodiments, the $TiO_2$ nanocrystals of the dispersion are at least partially capped with a capping agent such as a silane, alcohol, carboxylic acid, thiol or sulfonate, or phosphonate or phosphate. In some embodiments, the $TiO_2$ nanocrystals are at least partially capped with a capping agent described herein. In some embodiments, the $TiO_2$ nanocrystals are at least partially capped with a capping agent selected from methoxy(triethyleneoxy)propyltrimethoxysilane, 3-(methacryloyloxy)propyl trimethoxysilane, 3-(acryloyloxy)propyl trimethoxysilane, and combinations thereof. In some embodiments, the average particle size of the $TiO_2$ nanocrystals in the dispersion is in the range of 1-50 nm, such as 4-20 nm, or 15-20 nm. In some embodiments, the D9999 of the $TiO_2$ nanocrystals in the dispersion, as determined by DLS, is in the range of 20-500 nm. In some embodiments, the at least partially capped $TiO_2$ nanocrystals herein can typically have an organic content of about 5% to about 35%, preferably, about 5% to about 15%, or about 10% to about 25%, or about 15% to about 30%, as measured by TGA. In some embodiments, the $TiO_2$ nanocrystals of the dispersion were capped in the presence of water. In some embodiments, the at least partially capped $TiO_2$ nanocrystals are derived from the $TiO_2$ nanocrystals prepared by any of the methods described herein. In additional embodiments, the at least partially capped $TiO_2$ nanocrystals in the dispersion are uniformly dispersed without agglomeration or settling of the nanocrystals as observed by TGA. In additional embodiments, the dispersion is stable for more than two weeks, e.g., three weeks, or four weeks, or more than three weeks, more than four weeks, showing less than 5% (e.g., less than 3%, less than 2%, or less than 1%, such as about 0.1%, about 0.5%, about 1%, about 2%, about 3%, or any ranges between the recited values, such as about 0.01-1%, about 0.1-1%, about 0.1-5%, about 0.5-2%, about 0.5-3%, about 0.5-1%, etc.) change in transmittance at 400 nm when stored at room temperature in dark.

In some embodiments, the disclosure provides a nanocrystal dispersion comprising at least partially capped $TiO_2$ nanocrystals and a dispersing agent (e.g., a non-ionic dispersing agent, an anionic dispersing agent, or a combination thereof, such as described herein) wherein the at least partially capped $TiO_2$ nanocrystals are present in an amount greater than 30%, e.g., greater than 40%, or greater than 50%, greater than 60%, or greater than 70%, such as about 40%, about 50%, about 60%, about 70%, about 80%, or any ranges between the recited values, such as about 40-70%, about 30-80%, about 50-80%, etc., by weight in the dispersion and the nanocrystal dispersion comprises the dispersing agent of propylene glycol methyl ether acetate (PGMEA). In some embodiments, the $TiO_2$ nanocrystals of the dispersion are at least partially capped with a capping agent such as a silane, alcohol, carboxylic acid, thiol or sulfonate, or phosphonate or phosphate. In some embodiments, the $TiO_2$ nanocrystals are at least partially capped with a capping agent described herein. In some embodiments, the $TiO_2$ nanocrystals are at least partially capped with the capping agent methoxy(triethyleneoxy)propyltrimethoxysilane. In some embodiments, the average particle size of the $TiO_2$ nanocrystals in the dispersion is in the range of 1-50 nm, such as 4-20 nm, or 15-20 nm, preferably, the D9999 of the $TiO_2$ nanocrystals in the dispersion, as determined by DLS, is in the range of 20-500 nm, for example, the D9999 is <200 nm. In some embodiments, the at least partially capped $TiO_2$ nanocrystals herein can typically have an organic content of about 5% to about 35%, preferably, about 5% to about 15%, or about 10% to about 25%, or about 15% to about 30%, as measured by TGA. In some embodiments, the $TiO_2$ nanocrystals of the dispersion were capped in the presence of water. In some embodiments, the at least partially capped $TiO_2$ nanocrystals are derived from the $TiO_2$ nanocrystals prepared by any of the methods described herein. In additional embodiments, the at least partially capped $TiO_2$ nanocrystals in the dispersion are uniformly dispersed without agglomeration or settling of the nanocrystals as observed by TGA. In additional embodiments, the dispersion is stable for more than two weeks, three weeks, or four weeks, showing less than 1% change in transmittance at 400 nm when stored at room temperature in dark.

In some embodiments, the nanocomposite formulation herein can comprise the at least partially capped $TiO_2$ nanocrystals herein. In some embodiments, $TiO_2$ nanocrystal nanocomposite formulation herein can comprise suspending the at least partially capped $TiO_2$ nanocrystals in at least one monomer, polymer and/or oligomer in the presence of at least one solvent. As used herein, the term "monomer, polymer and/or oligomer" or similar expression should be understood as including a recited monomer, an oligomer thereof, a polymer thereof, or any mixture thereof. In some embodiments, the $TiO_2$ nanocrystal nanocomposite formulation herein can further comprise at least one curing agent. In some embodiments, the $TiO_2$ nanocrystal nanocomposite formulation herein can further comprise at least one adhesion promoter. In some embodiments, the $TiO_2$ nanocrystal nanocomposite formulation herein can further comprise at least one wetting agent. In some embodiments, the $TiO_2$ nanocrystal nanocomposite formulation herein can further comprise at least one levelling agent. In some embodiments, the $TiO_2$ nanocrystal nanocomposite formulation herein can further comprise at least one dispersing agent. In some embodiments, the $TiO_2$ nanocrystal nanocomposite formulation herein can further comprise at least one levelling agent. In some embodiments, the $TiO_2$ nanocrystal nanocomposite formulation herein can further comprise at least one anti-oxidant agent. In some embodiments, the $TiO_2$ nanocrystal nanocomposite formulation herein can further comprise at least one scatterer particle.

In additional embodiments, the disclosure provides a nanocomposite formulation comprising at least partially capped $TiO_2$ nanocrystals and at least one monomer, polymer and/or oligomer in the presence of a solvent wherein the at least partially capped $TiO_2$ nanocrystals are present in an amount greater than 30%, e.g., greater than 40%, greater than 50%, greater than 60%, greater than 70%, greater than 80%, or greater than 90%, such as about 40%, about 50%, about 60%, about 70%, about 80%, about 90%, or any ranges between the recited values, such as about 50-90%, about 40-80%, about 60-90%, etc., by weight in respect to the monomer and/or oligomer described herein. In some embodiments, the $TiO_2$ nanocrystals of the formulation are at least partially capped with a capping agent such as a silane, alcohol, carboxylic acid, thiol or sulfonate, or phosphonate or phosphate. In some embodiments, the $TiO_2$ nanocrystals of the formulation may be capped in the presence of water. In some embodiments, the $TiO_2$ nanocrystals are at least partially capped with a capping agent described herein. In some embodiments, the average particle size of the $TiO_2$ nanocrystals in the formulation is in the range of 1-50 nm, such as 4-20 nm, or 10-20 nm. In some embodiments, the D9999 of the $TiO_2$ nanocrystals in the dispersion, as determined by DLS, is in the range of 20-500 nm. In some embodiments, the at least partially capped $TiO_2$ nanocrystals herein can typically have an organic content of about 5% to about 35%, preferably, about 5% to about 15%, or about 10% to about 25%, or about 15% to about 30%, as measured by TGA. In additional embodiments, the at least partially capped $TiO_2$ nanocrystals in the formulation are uniformly dispersed without agglomeration or settling of the nanocrystals as observed by TGA. In additional embodiments, the formulation is stable for more than two weeks, three weeks, or four weeks, showing less than 5% (e.g., less than 3%, less than 2%, or less than 1%, such as about 0.1%, about 0.5%, about 1%, about 2%, about 3%, or any ranges between the recited values, such as about 0.01-1%, about 0.1-1%, about 0.1-5%, about 0.5-2%, about 0.5-3%, about 0.5-1%, etc.) change in transmittance at 400 nm when stored at room temperature in dark. In additional embodiments, the $TiO_2$ nanocrystal nanocomposite formulation herein can have a tunable viscosity in the range of about 1 cp to about 1000 cp, e.g., about 1 cP-2 cP, about 2 cP-5 cP, about 5 cP-10 cP, about 10 cP-15 cP, about 15 cP-20 cP, about 20 cP-25 cP, about 25 cP-30 cP, about 30 cP-40 cP, about 40 c-50 cP, about 50 cP-60 cP, about 60 cP-75 cP, about 75 cP-100 cP, about 100 cP-200 cP, about 200 cP-500 cP, 500 cP-1,000 cP when measured with a Brookfield RVDV II+ cone and plate viscometer. In additional embodiments, the $TiO_2$ nanocomposite formulation is applied to a glass or plastic surface by spin coating, inkjet printing, nano-imprinting, photopatterning, imprinting, roll to roll coating, slot-die coating, and/or screen-printing.

In some embodiments, the disclosure provides a nanocomposite formulation comprising at least partially capped $TiO_2$ nanocrystals and at least one monomer, polymer and/or oligomer, wherein the monomer, polymer and/or oligomer is selected from Bisphenol A Glycerolate Dimethacrylate, esters with acrylic acid (OPPEOA), Bisphenol A Ethoxylate diacrylates, Bisphenol A propoxylate diacrylate, Bisphenol F ethoxylate (2 EO/phenol) diacrylate, Bisphenol A glycerolate diacrylates, bisphenol A ethoxylate dimethacrylate, Ethoxylated (4) bisphenol A diacrylate (SR-601), Biphenol A ethoxylate diacrylate (SR-349), Tris(2-acryloyloxy)ethyl} isocyanurate, tricyclodecane dimethanol diacrylate, Tris(2-hydroxyethyl)isocyanurate triacrylate, cresol novolac epoxy acrylate (CN112C60), Benzyl methacrylate (BMA), benzyl acrylate, trimethylolpropane triacrylate (TMPTA), Trimethylolpropane ethoxylate (1 EO/OH) methyl ether diacrylate, 1,6-Hexanediol diacrylate (HDDA, SR238B), tri(ethyleneglycol) diacrylate, ethylene glycol diacrylate, Poly(ethylene glycol) diacrylate, Glycerol 1,3-diglycerolate diacrylate, Di(ethylene glycol) diacrylate, and combinations thereof. In additional embodiments, the at least partially capped $TiO_2$ nanocrystals are present in an amount greater than 30%, e.g., greater than 40%, greater than 50%, greater than 60%, greater than 70%, greater than 80%, or greater than 90%, such as about 40%, about 50%, about 60%, about 70%, about 80%, about 90%, or any ranges between the recited values, such as about 50-90%, about 40-80%, about 60-90%, etc., by weight in respect to the monomer and/or oligomer in the presence of a solvent, wherein the solvent is selected from benzyl alcohol, Butyl Carbitol Acetate (BCA), butanol, propanol, isopropanol, ethanol, butoxy ethanol, butoxy propanol, methanol, tetrahydrofuran, diethyl ether, propylene glycol monomethyl ether (PGME), diethylene glycol butyl ether, dipropylene glycol methyl ether (DPGME), diethylene glycol monomethyl ether, diethylene glycol monoethyl ether, diethylene glycol, dipropylene glycol, acetone, propylene glycol methyl ether acetate (PGMEA), ethyl lactate (EL), ethyl acetate, butyl acetate, diethylene glycol monoethyl ether acetate, toluene, and combinations thereof. In some embodiments, the $TiO_2$ nanocrystals are at least partially capped with a capping agent selected from methyltrimethoxysilane, n-octyltrimethoxysilane, methoxy(triethyleneoxy)propyltrimethoxysilane, 3-mercaptopropyltrimethoxysilane, 3-(methacryloyloxy)propyl trimethoxysilane, 3-(acryloyloxy)propyl trimethoxysilane, vinyltrimethoxysilane, allyltrimethoxysilane, 2-[2-(2-methoxyethoxy) ethoxy] acetic acid, oleic acid, and combinations thereof. In some embodiments, the average particle size of the $TiO_2$ nanocrystals in the formulation is in the range of 1-50 nm, such as 4-20 nm, or 10-20 nm. In some embodiments, the D9999 of the $TiO_2$ nanocrystals in the dispersion, as determined by DLS, is in the range of 20-500 nm. In some embodiments, the at least partially capped $TiO_2$ nanocrystals herein can typically have an organic content of about 5% to about 35%, preferably, about 5% to about 15%, or about 10% to about 25%, or about 15% to about 30%, as measured by TGA. In some embodiments, the $TiO_2$ nanocrystals of the formulation may be capped in the presence of water. In some embodiments, the at least partially capped $TiO_2$ nanocrystals are derived from the $TiO_2$ nanocrystals prepared by any of the methods described herein. In additional embodiments, the at least partially capped $TiO_2$ nanocrystals in the formulation are uniformly dispersed without agglomeration or settling of the nanocrystals as observed by TGA. In additional embodiments, the dispersion is stable for more than two weeks, three weeks, or four weeks, showing less than 5% (e.g., less than 3%, less than 2%, or less than 1%, such as about 0.1%, about 0.5%, about 1%, about 2%, about 3%, or any ranges between the recited values, such as about 0.01-1%, about 0.1-1%, about 0.1-5%, about 0.5-2%, about 0.5-3%, about 0.5-1%, etc.) change in transmittance at 400 nm when stored at room temperature in dark. In additional embodiments, the $TiO_2$ nanocrystal nanocomposite formulation herein can have a tunable viscosity in the range of about 1 cP-2 cP, about 2 cP-5 cP, about 5 cP-10 cP, about 10 cP-15 cP, about 15 cP-20 cP, about 20 cP-25 cP, about 25 cP-30 cP, about 30 cP-40 cP, about 40 c-50 cP, about 50 cP-60 cP, about 60 cP-75 cP, about 75 cP-100 cP, about 100 cP-200 cP, about 200 cP-500 cP, 500 cP-1,000 cP when measured with a Brookfield RVDV II+ cone and plate viscometer. In additional embodiments, the $TiO_2$ nanocomposite formulation is applied to a glass or plastic surface by spin coating, inkjet printing, nano-imprinting, photopatterning, imprinting, roll to roll coating, slot-die coating, and/or screen-printing.

In some embodiments, the disclosure provides a nanocomposite formulation comprising at least partially capped $TiO_2$ nanocrystals and at least one monomer, polymer and/or oligomer, wherein the monomer, polymer and/or oligomer is selected from Bisphenol A Glycerolate Dimethacrylate, esters with acrylic acid (OPPEOA), Bisphenol A Ethoxylate diacrylates, Bisphenol A propoxylate diacrylate, Bisphenol F ethoxylate (2 EO/phenol) diacrylate, Bisphenol A glycerolate diacrylates, bisphenol A ethoxylate dimethacrylate, Ethoxylated (4) bisphenol A diacrylate (SR-601), Biphenol A ethoxylate diacrylate (SR-349), cresol novolac epoxy acrylate (CN112C60), and combinations thereof. In additional embodiments, the at least partially capped $TiO_2$ nanocrystals are present in an amount greater than 30%, e.g., greater than 40%, greater than 50%, greater than 60%, greater than 70%, greater than 80%, or greater than 90%, such as about 40%, about 50%, about 60%, about 70%, about 80%, about 90%, or any ranges between the recited values, such as about 50-90%, about 40-80%, about 60-90%, etc., by weight in respect to the monomer and/or oligomer, in the presence of a solvent, wherein the solvent is selected from benzyl alcohol, Butyl Carbitol Acetate (BCA), propylene glycol monomethyl ether (PGME), diethylene glycol butyl ether, dipropylene glycol methyl ether (DPGME), propylene glycol methyl ether acetate (PGMEA), ethyl lactate (EL), ethyl acetate, toluene, and combinations thereof. In some embodiments, the $TiO_2$ nanocrystals are at least partially capped with a capping agent selected from methoxy(triethyleneoxy)propyltrimethoxysilane, 3-mercaptopropyltrimeth-oxysilane, 3-(methacryloyloxy)propyl trimethoxysilane, 3-(acryloyloxy)propyl trimethoxysilane, 2-[2-(2-methoxyethoxy) ethoxy] acetic acid, and combinations thereof. In some embodiments, the average particle size of the $TiO_2$ nanocrystals in the formulation is in the range of 1-50 nm, such as 4-20 nm, or 10-20 nm. In some embodiments, the D9999 of the $TiO_2$ nanocrystals in the dispersion, as determined by DLS, is in the range of 20-500 nm. In some embodiments, the at least partially capped $TiO_2$ nanocrystals herein can typically have an organic content of about 5% to about 35%, preferably, about 5% to about 15%, or about 10% to about 25%, or about 15% to about 30%, as measured by TGA. In some embodiments, the $TiO_2$ nanocrystals of the formulation may be capped in the presence of water. In some embodiments, the at least partially capped $TiO_2$ nanocrystals are derived from the $TiO_2$ nanocrystals prepared by any of the methods described herein. In additional embodiments, the at least partially capped $TiO_2$ nanocrystals in the formulation are uniformly dispersed without agglomeration or settling of the nanocrystals as observed by TGA. In additional embodiments, the dispersion is stable for more than two weeks, three weeks, or four weeks, showing less than 5% (e.g., less than 3%, less than 2%, or less than 1%, such as about 0.1%, about 0.5%, about 1%, about 2%, about 3%, or any ranges between the recited values, such as about 0.01-1%, about 0.1-1%, about 0.1-5%, about 0.5-2%, about 0.5-3%, about 0.5-1%, etc.) change in transmittance at 400 nm when stored at room temperature in dark. In additional embodiments, the $TiO_2$ nanocrystal nanocomposite formulation herein can have a tunable viscosity in the range of about 1 cP-2 cP, about 2 cP-5 cP, about 5 cP-10 cP, about 10 cP-15 cP, about 15 cP-20 cP, about 20 cP-25 cP, about 25 cP-30 cP, about 30 cP-40 cP, about 40 c-50 cP, about 50 cP-60 cP, about 60 cP-75 cP, about 75 cP-100 cP, about 100 cP-200 cP, about 200 cP-500 cP, 500 cP-1,000 cP when measured with a Brookfield RVDV II+ cone and plate viscometer. In additional embodiments, the $TiO_2$ nanocomposite formulation is applied to a glass or plastic surface by spin coating, inkjet printing, imprinting, nano-imprinting, photopatterning, roll to roll coating, slot-die coating, and/or screen-printing.

In some embodiments, the disclosure provides a nanocomposite formulation comprising at least partially capped $TiO_2$ nanocrystals and at least one monomer, polymer and/or oligomer of Bisphenol A Glycerolate Dimethacrylate. In additional embodiments, the at least partially capped $TiO_2$ nanocrystals are present in an amount greater than 30%, e.g., greater than 40%, greater than 50%, greater than 60%, greater than 70%, greater than 80%, or greater than 90%, such as about 40%, about 50%, about 60%, about 70%, about 80%, about 90%, or any ranges between the recited values, such as about 50-90%, about 40-80%, about 60-90%, etc., by weight in respect to the monomer and/or oligomer in the presence of a solvent, wherein the solvent is selected from dipropylene glycol methyl ether (DPGME), propylene glycol methyl ether acetate (PGMEA), and combinations thereof. In some embodiments, the $TiO_2$ nanocrystals are at least partially capped with a capping agent of methoxy (triethyleneoxy)propyltrimethoxysilane. In some embodiments, the average particle size of the $TiO_2$ nanocrystals in the formulation is in the range of 1-50 nm, such as 4-20 nm, or 10-20 nm. In some embodiments, the D9999 of the $TiO_2$ nanocrystals in the dispersion, as determined by DLS, is in the range of 20-500 nm. In some embodiments, the at least partially capped $TiO_2$ nanocrystals herein can typically have an organic content of about 5% to about 35%, preferably, about 5% to about 15%, or about 10% to about 25%, or about 15% to about 30%, as measured by TGA. In some embodiments, the $TiO_2$ nanocrystals of the formulation may be capped in the presence of water. In some embodiments, the at least partially capped $TiO_2$ nanocrystals are derived from the $TiO_2$ nanocrystals prepared by any of the methods described herein. In additional embodiments, the at least partially capped $TiO_2$ nanocrystals in the formulation are uniformly dispersed without agglomeration or settling of the nanocrystals as observed by TGA. In additional embodiments, the dispersion is stable for more than two weeks, three weeks, or four weeks, showing less than 5% (e.g., less than 3%, less than 2%, or less than 1%, such as about 0.1%, about 0.5%, about 1%, about 2%, about 3%, or any ranges between the recited values, such as about 0.01-1%, about 0.1-1%, about 0.1-5%, about 0.5-2%, about 0.5-3%, about 0.5-1%, etc.) change in transmittance at 400 nm when stored at room temperature in dark. In additional embodiments, the $TiO_2$ nanocrystal nanocomposite formulation herein can have a tunable viscosity in the range of about 1 cP-2 cP, about 2 cP-5 cP, about 5 cP-10 cP, about 10 cP-15 cP, about 15 cP-20 cP, about 20 cP-25 cP, about 25 cP-30 cP, about 30 cP-40 cP, about 40 c-50 cP, about 50 cP-60 cP, about 60 cP-75 cP, about 75 cP-100 cP, about 100 cP-200 cP, about 200 cP-500 cP, 500 cP-1,000 cP when measured with a Brookfield RVDV II+ cone and plate viscometer. In additional embodiments, the $TiO_2$ nanocomposite formulation is applied to a glass or plastic surface by spin coating, inkjet printing, imprinting, nano-imprinting, photopatterning, roll to roll coating, slot-die coating, and/or screen-printing.

In some embodiments, the disclosure provides a nanocomposite formulation comprising at least partially capped $TiO_2$ nanocrystals and at least one monomer, polymer and/or oligomer wherein the monomer, polymer and/or oligomer is selected from Bisphenol A Glycerolate Dimethacrylate, esters with acrylic acid (OPPEOA), Bisphenol A Ethoxylate diacrylates, Bisphenol A propoxylate diacrylate, Bisphenol F ethoxylate (2 EO/phenol) diacrylate, Bisphenol A glycerolate diacrylates, bisphenol A ethoxylate dimethacrylate, Ethoxylated (4) bisphenol A diacrylate (SR-601), Biphenol A ethoxylate diacrylate (SR-349), cresol novolac epoxy acrylate (CN112C60). In additional embodiments, the at least partially capped $TiO_2$ nanocrystals are present in an amount greater than 30%, e.g., greater than 40%, greater than 50%, greater than 60%, greater than 70%, greater than 80%, or greater than 90%, such as about 40%, about 50%, about 60%, about 70%, about 80%, about 90%, or any ranges between the recited values, such as about 50-90%, about 40-80%, about 60-90%, etc., by weight in respect to the monomer and/or oligomer in the presence of a solvent, wherein the solvent is selected from benzyl alcohol, Butyl Carbitol Acetate (BCA), propylene glycol monomethyl ether (PGME), diethylene glycol butyl ether, dipropylene glycol methyl ether (DPGME), propylene glycol methyl ether acetate (PGMEA), ethyl lactate (EL), ethyl acetate, toluene, and combinations thereof. In some embodiments, the $TiO_2$ nanocrystals are at least partially capped with a capping agent selected from methoxy(triethyleneoxy)propyl-trimethoxysilane, 3-mercaptopropyltrimethoxysilane, 3-(methacryloyloxy)propyl trimethoxysilane, 3-(acryloyloxy)propyl trimethoxysilane, 2-[2-(2-methoxyethoxy)ethoxy]acetic acid, and combinations thereof. In some embodiments, the average particle size of the $TiO_2$ nanocrystals in the formulation is in the range of 1-50 nm, such as 4-20 nm, or 10-20 nm. In some embodiments, the D9999 of the $TiO_2$ nanocrystals in the dispersion, as determined by DLS, is in the range of 20-500 nm. In some embodiments, the at least partially capped $TiO_2$ nanocrystals herein can typically have an organic content of about 5% to about 35%, preferably, about 5% to about 15%, or about 10% to about 25%, or about 15% to about 30%, as measured by TGA. In some embodiments, the $TiO_2$ nanocrystals of the formulation may be capped in the presence of water. In some embodiments, the at least partially capped $TiO_2$ nanocrystals are derived from the $TiO_2$ nanocrystals prepared by any of the methods described herein. In additional embodiments, the $TiO_2$ nanocrystal nanocomposite formulation herein can further comprise at least one curing agent, wherein the curing agent is selected from Ebecryl® Pl 15, Ebecryl® P39, benzophenone, SpeedCure BEM, 4,4'-Bis(diethylamino) benzophenone, diphenyl (2,4,6-trimethylbenzoyl)-phosphine oxide, Irgacure® 184, 2,4,6-Trimethylbenzoyl diphenylphosphine oxide (TPO), Ethyl (2,4,6-trimethylbenzoyl) phenylphosphinate, 4-(Dimethylamino)benzophenone, 2-isopropyl thoxanthone, Darocure 4265, Speedcure Xkm, methylbenzoylformate, Thioxanthen-9-one, dicumyl peroxide, t-butyl perbenzoate, benzoyl peroxide, t-butyl peracetate, 1,1-di (t butylperoxy)3,3,5-trimethyl cyclohexane, 2,5-dimethyl-2,5-di(t-butylperoxy)hexyne, 2,2'-azobisisobutyronitrile, and combinations thereof.

In some embodiments, the disclosure provides a nanocomposite formulation comprising at least partially capped $TiO_2$ nanocrystals and at least one monomer, polymer and/or oligomer wherein the monomer, polymer and/or oligomer is selected from Bisphenol A Glycerolate Dimethacrylate, esters with acrylic acid (OPPEOA), Ethoxylated (4) bisphenol A diacrylate (SR-601), Biphenol A ethoxylate diacrylate (SR-349), cresol novolac epoxy acrylate (CN112C60). In additional embodiments, the at least partially capped $TiO_2$ nanocrystals are present in an amount greater than 30%, e.g., greater than 40%, greater than 50%, greater than 60%, greater than 70%, greater than 80%, or greater than 90%, such as about 40%, about 50%, about 60%, about 70%, about 80%, about 90%, or any ranges between the recited values, such as about 50-90%, about 40-80%, about 60-90%, etc., by weight in respect to the monomer and/or oligomer in the presence of a solvent, wherein the solvent is selected from benzyl alcohol, Butyl Carbitol Acetate (BCA), diethylene glycol butyl ether, dipropylene glycol methyl ether (DPGME), propylene glycol methyl ether acetate (PGMEA), ethyl acetate, and combinations thereof. In some embodiments, the $TiO_2$ nanocrystals are at least partially capped with a capping agent selected from methoxy(triethyleneoxy)propyl-trimethoxysilane, 3-mercaptopropyltrimethoxysilane, 3-(methacryloyloxy)propyl trimethoxysilane, 3-(acryloyloxy)propyl trimethoxysilane, 2-[2-(2-methoxyethoxy) ethoxy] acetic acid, and combinations thereof. In some embodiments, the average particle size of the $TiO_2$ nanocrystals in the formulation is in the range of 1-50 nm, such as 4-20 nm, or 10-20 nm. In some embodiments, the D9999 of the $TiO_2$ nanocrystals in the dispersion, as determined by DLS, is in the range of 20-500 nm. In some embodiments, the at least partially capped $TiO_2$ nanocrystals herein can typically have an organic content of about 5% to about 35%, preferably, about 5% to about 15%, or about 10% to about 25%, or about 15% to about 30%, as measured by TGA. In some embodiments, the at least partially capped $TiO_2$ nanocrystals are derived from the $TiO_2$ nanocrystals prepared by any of the methods described herein. In additional embodiments, the $TiO_2$ nanocrystal nanocomposite formulation herein can further comprise at least one curing agent, wherein the curing agent is selected from Ebecryl® Pl 15, Ebecryl® P39, benzophenone, diphenyl (2,4,6-trimethylbenzoyl)-phosphine oxide, Irgacure® 184, benzoyl peroxide, 2,2'-azobisiso-butyronitrile, and combinations thereof. In additional embodiments, the $TiO_2$ nanocrystal nanocomposite formulation herein can further comprise at least one adhesion promoter selected from 3-aminopropyltriethoxysilane, 3-[(methacryloyloxy)propyl] trimethoxysilane, ureidopropyltrimethoxysilane, trimethoxy [3-(methylamino) propyl]silane, CN820, CN146, and combinations thereof.

In some embodiments, the disclosure provides a nanocomposite formulation comprising at least partially capped $TiO_2$ nanocrystals and at least one monomer, polymer and/or oligomer, wherein the monomer, polymer and/or oligomer is selected from Bisphenol A Glycerolate Dimethacrylate, esters with acrylic acid (OPPEOA), Ethoxylated (4) bisphenol A diacrylate (SR-601), Biphenol A ethoxylate diacrylate (SR-349), cresol novolac epoxy acrylate (CN112C60), and combinations thereof. In additional embodiments, the at least partially capped $TiO_2$ nanocrystals are present in an amount greater than 30%, e.g., greater than 40%, greater than 50%, greater than 60%, greater than 70%, greater than 80%, or greater than 90%, such as about 40%, about 50%, about 60%, about 70%, about 80%, about 90%, or any ranges between the recited values, such as about 50-90%, about 40-80%, about 60-90%, etc., by weight in respect to the monomer and/or oligomer in the presence of a solvent, wherein the solvent is selected from benzyl alcohol, Butyl Carbitol Acetate (BCA), diethylene glycol butyl ether, dipropylene glycol methyl ether (DPGME), propylene glycol methyl ether acetate (PGMEA), ethyl acetate, and combinations thereof. In some embodiments, the $TiO_2$ nanocrystals are at least partially capped with a capping agent selected from methoxy(triethyleneoxy)propyltrimethoxysilane, 3-mercaptopropyltrimethoxysilane, 3-(methacryloyloxy)propyl trimethoxysilane, 3-(acryloyloxy)propyl trimethoxysilane, 2-[2-(2-methoxyethoxy) ethoxy] acetic acid, and combinations thereof. In some embodiments, the average particle size of the $TiO_2$ nanocrystals in the formulation is in the range of 1-50 nm, such as 4-20 nm, or 10-20 nm. In some embodiments, the D9999 of the $TiO_2$ nanocrystals in the dispersion, as determined by DLS, is in the range of 20-500 nm. In some embodiments, the at least partially capped $TiO_2$ nanocrystals herein can typically have an organic content of about 5% to about 35%, preferably, about 5% to about 15%, or about 10% to about 25%, or about 15% to about 30%, as measured by TGA. In some embodiments, the at least partially capped $TiO_2$ nanocrystals are derived from the $TiO_2$ nanocrystals prepared by any of the methods described herein. In additional embodiments, the $TiO_2$ nanocrystal nanocomposite formulation herein can further comprise at least one curing agent, wherein the curing agent is selected from Ebecryl® Pl 15, Ebecryl® P39, benzophenone, diphenyl (2,4,6-trimethylbenzoyl)-phosphine oxide, Irgacure® 184, benzoyl peroxide, 2,2'-azobisisobutyronitrile, and combinations thereof. In additional embodiments, the $TiO_2$ nanocrystal nanocomposite formulation herein can further comprise at least one adhesion promoter selected from 3-aminopropyltriethoxysilane, 3-[(methacryloyloxy)propyl] trimethoxysilane, ureidopropyltrimethoxysilane, trimethoxy [3-(methylamino)propyl] silane, CN820, CN146, and combinations thereof. In some embodiments, the $TiO_2$ nanocrystal nanocomposite formulation herein can further comprise at least one wetting agent selected from BYK-307, BYK-330, Novec 4430, Novec 4432, and Novec 4434, and combinations thereof. In some embodiments, the $TiO_2$ nanocrystal nanocomposite formulation herein can further comprise at least one levelling agent selected from BYK-352, BYK-353, BYK-356, BYK-361N, BYK-322, BYK-323, BYK-350, and combinations thereof. In some embodiments, the $TiO_2$ nanocrystal nanocomposite formulation herein can further comprise at least one dispersing agent selected from DISPERBYK-101, DISPERBYK-130, DISPERBYK-140, DISPERBYK-160, DISPERBYK-161, DISPERBYK-162, DISPERBYK-163, DISPERBYK-164, DISPERBYK-165, DISPERBYK-166, DISPERBYK-170, DISPERBYK-171, DISPERBYK-182, DISPERBYK-2000, DISPERBYK-2001, Solsperse 32000, Solsperse 36000, Solsperse 28000, Solsperse 20000, Solsperse 41000, and Solsperse 45000 FC-4430, FC-4432, FC-4434 (3M), Capstone FS-3100, and combinations thereof.

In some embodiments, the $TiO_2$ nanocrystal nanocomposite formulation herein can further comprise at least one anti-oxidant agent selected from Irganox 1010, Irganox 1076, SongNox® 1076, SongNox® 2450, SongNox® 1680, Irgaphos 168, SongLight® 6220. In some embodiments, the $TiO_2$ nanocrystal nanocomposite formulation herein can further comprise at least one scatterer particle such as titania particles, polymer beads, silica particles, controlled agglomeration of $ZrO_2$ nanocrystals. In additional embodiments, the $TiO_2$ nanocrystal nanocomposite formulation herein can comprise at least one scatterer particle in the range of 50-100 nm, or 100-200 nm, or 200-300 nm, or 300-400 nm, or 400-500 nm, or 500-600 nm, or 600-700 nm, or 700-800 nm, or 800-900 nm or 900 nm to 1 µm, or 1-1.5 µm, or 1.5-2 µm. In additional embodiments, the $TiO_2$ nanocrystal nanocomposite formulation herein can comprise at least one scatterer particle in the amount of 0.1-40% by weight of the total weight of the formulation. In additional embodiments, the $TiO_2$ nanocrystal nanocomposite formulation herein can comprise at least one scatterer particle wherein the formulation may have a viscosity of less than 5 cPs, or 5 cPs-50 cPs, or 50 cPs-200 cPs, or 200 cPs-400 cPs, or 400 cPs-650 cPs, or 650 cPs-1000 cPs, when measured at 25° C. with a Brookfield RVDV II+ cone and plate viscometer.

In some embodiments, the disclosure provides a nanocomposite film comprising at least partially capped $TiO_2$ nanocrystals and at least one monomer, polymer and/or oligomer, wherein the % transmittance of a 1-micron film is greater than 80%, e.g., greater than 85%, greater than 90%, greater than 95%, greater than 97%, greater than 98%, or greater than 99%, such as about 85%, about 90%, about 95%, about 97%, about 98%, about 99%, about 99.5%, or any ranges between the recited values, such as about 90-99%, at wavelength of 400 nm and greater, and wherein the nanocomposite film may possess a refractive index of about 1.70 to about 2.10, e.g., 1.70-1.72, or 1.72-1.74, or 1.74-1.76, or 1.76-1.78, or 1.78-1.80, or 1.80-1.82, or 1.82-1.84, or 1.84-1.86, or 1.86-1.88, or 1.88-1.90, or 1.90-1.92, or 1.92-1.94, or 1.94-1.96, or 1.96-1.98, or 1.98-2.00, or 2.00-2.02, or 2.02-2.04, or 2.04-2.06, or 2.06-2.08, or 2.08-2.10, at 448 nm, and may possess a refractive index of about 1.70 to about 2.10, e.g., 1.70-1.72, or 1.72-1.74, or 1.74-1.76, or 1.76-1.78, or 1.78-1.80, or 1.80-1.82, or 1.82-1.84, or 1.84-1.86, or 1.86-1.88, or 1.88-1.90, or 1.90-1.92, or 1.92-1.94, or 1.94-1.96, or 1.96-1.98, or 1.98-2.00, or 2.00-2.02, or 2.02-2.04, or 2.04-2.06, or 2.06-2.08, or 2.08-2.10, at 635 nm, as measured using a Prism Coupler of a film with <5 um thickness, wherein the TiO$_2$ nanocrystals are at least partially capped with capping agents where the capping agents are selected from methyltrimethoxysilane, n-octyltrimethoxysilane, methoxy(triethyleneoxy)propyltrimethoxysilane, 3-mercaptopropyltrimethoxysilane, 3-(methacryloyloxy)propyl trimethoxysilane, 3-(acryloyloxy)propyl trimethoxysilane, vinyltrimethoxysilane, allyltrimethoxysilane, 3-glycidoxypropyltrimethoxysilane, 2-[2-(2-methoxyethoxy) ethoxy] acetic acid, oleic acid, and combinations thereof, wherein the average particle size of the TiO$_2$ nanocrystal when measured as a 5% nanocrystal dispersion in PGMEA with DLS is in the range of 1-5 nm, 5-10 nm, 10-15 nm, 15-20 nm, 20-30 nm, 30-40 nm or 40-50 nm and preferably, with a D9999 less than 100 nm.

In some embodiments, the disclosure provides a nanocomposite film comprising at least partially capped TiO$_2$ nanocrystals and at least one monomer, polymer and/or oligomer, wherein the % transmittance of a 1-micron film is greater than 80%, greater than 785%, greater than 90%, greater than 95%, greater than 97%, greater than 98%, greater than 99%, such as about 85%, about 90%, about 95%, about 97%, about 98%, about 99%, about 99.5%, or any ranges between the recited values, such as about 90-99%, at wavelength of 400 nm and greater and wherein the nanocomposite film may possess a refractive index of about 1.70 to about 2.10, e.g., 1.70-1.72, or 1.72-1.74, or 1.74-1.76, or 1.76-1.78, or 1.78-1.80, or 1.80-1.82, or 1.82-1.84, or 1.84-1.86, or 1.86-1.88, or 1.88-1.90, or 1.90-1.92, or 1.92-1.94, or 1.94-1.96, or 1.96-1.98, or 1.98-2.00, or 2.00-2.02, or 2.02-2.04, or 2.04-2.06, or 2.06-2.08, or 2.08-2.10, at 448 nm, and may possess a refractive index of about 1.70 to about 2.10, e.g., 1.70-1.72, or 1.72-1.74, or 1.74-1.76, or 1.76-1.78, or 1.78-1.80, or 1.80-1.82, or 1.82-1.84, or 1.84-1.86, or 1.86-1.88, or 1.88-1.90, or 1.90-1.92, or 1.92-1.94, or 1.94-1.96, or 1.96-1.98, or 1.98-2.00, or 2.00-2.02, or 2.02-2.04, or 2.04-2.06, or 2.06-2.08, or 2.08-2.10, at 635 nm, as measured using a Prism Coupler of a film with <5 um thickness, wherein the nanocomposite film has a hardness of greater than 50 MPa, e.g., greater than 100 MPa, greater than 200 MPa, greater than 300 MPa or greater than 400 MPa, such as about 55 Mpa, about 100 MPa, about 200 MPa, about 300 MPa, about 400 MPa, about 500 MPa, or any ranges between the recited values, such as about 50-500 MPa or about 100-400 MPa, as measured by nanoindentation.

In some embodiments, the disclosure provides a nanocomposite film comprising at least partially capped TiO$_2$ nanocrystals and at least one monomer, polymer and/or oligomer, wherein the % transmittance of a 1-micron film is greater than 80%, e.g., greater than 85%, greater than 90%, greater than 95%, greater than 97%, greater than 98%, greater than 99%, such as about 85%, about 90%, about 95%, about 97%, about 98%, about 99%, about 99.5%, or any ranges between the recited values, such as about 90-99%, at wavelength of 400 nm and greater and wherein the nanocomposite film may possess a refractive index of about 1.70 to about 2.10, e.g., 1.70-1.72, or 1.72-1.74, or 1.74-1.76, or 1.76-1.78, or 1.78-1.80, or 1.80-1.82, or 1.82-1.84, or 1.84-1.86, or 1.86-1.88, or 1.88-1.90, or 1.90-1.92, or 1.92-1.94, or 1.94-1.96, or 1.96-1.98, or 1.98-2.00, or 2.00-2.02, or 2.02-2.04, or 2.04-2.06, or 2.06-2.08, or 2.08-2.10, at 448 nm, and may possess a refractive index of about 1.70 to about 2.10, e.g., 1.70-1.72, or 1.72-1.74, or 1.74-1.76, or 1.76-1.78, or 1.78-1.80, or 1.80-1.82, or 1.82-1.84, or 1.84-1.86, or 1.86-1.88, or 1.88-1.90, or 1.90-1.92, or 1.92-1.94, or 1.94-1.96, or 1.96-1.98, or 1.98-2.00, or 2.00-2.02, or 2.02-2.04, or 2.04-2.06, or 2.06-2.08, or 2.08-2.10, at 635 nm, as measured using a Prism Coupler of a film with <5 um thickness, wherein the nanocomposite film has a hardness of greater than 50 MPa, e.g., greater than 100 MPa, greater than 200 MPa, greater than 300 MPa or greater than 400 MPa, such as about 55 Mpa, about 100 MPa, about 200 MPa, about 300 MPa, about 400 MPa, about 500 MPa, or any ranges between the recited values, such as about 50-500 MPa or about 100-400 MPa, as measured by nanoindentation and wherein the % absorbance of a 1-micron film is less than 0.1%, less than 0.05% or less than 0.01% at wavelength of 450 nm as measured by an integrating sphere.

In some embodiments, the disclosure provides a nanocomposite film comprising at least partially capped TiO$_2$ nanocrystals and at least one monomer, polymer and/or oligomer wherein the % transmittance of a 1-micron film is greater than 80%, e.g., greater than 85%, greater than 90%, greater than 95%, greater than 97%, greater than 98%, greater than 99%, such as about 85%, about 90%, about 95%, about 97%, about 98%, about 99%, about 99.5%, or any ranges between the recited values, such as about 90-99%, at wavelength of 400 nm and greater and wherein the nanocomposite film may possess a refractive index of about 1.70 to about 2.10, e.g., 1.70-1.72, or 1.72-1.74, or 1.74-1.76, or 1.76-1.78, or 1.78-1.80, or 1.80-1.82, or 1.82-1.84, or 1.84-1.86, or 1.86-1.88, or 1.88-1.90, or 1.90-1.92, or 1.92-1.94, or 1.94-1.96, or 1.96-1.98, or 1.98-2.00, or 2.00-2.02, or 2.02-2.04, or 2.04-2.06, or 2.06-2.08, or 2.08-2.10, at 448 nm, and may possess a refractive index of about 1.70 to about 2.10, e.g., 1.70-1.72, or 1.72-1.74, or 1.74-1.76, or 1.76-1.78, or 1.78-1.80, or 1.80-1.82, or 1.82-1.84, or 1.84-1.86, or 1.86-1.88, or 1.88-1.90, or 1.90-1.92, or 1.92-1.94, or 1.94-1.96, or 1.96-1.98, or 1.98-2.00, or 2.00-2.02, or 2.02-2.04, or 2.04-2.06, or 2.06-2.08, or 2.08-2.10, at 635 nm, as measured using a Prism Coupler of a film with <5 um thickness, wherein the nanocomposite film has surface roughness of less than 1 nm Ra as measured by AFM for 5-micron×5-micron area.

In some embodiments, the disclosure provides a nanocomposite film comprising at least partially capped TiO$_2$ nanocrystals and at least one monomer, polymer and/or oligomer, wherein the capped nanocrystals are present in an amount greater than 50%, (e.g., about 55%, about 60%, about 70%, about 80%, about 90%, or any ranges between the recited values, such as about 55-90%, about 60-90%, about 70-90%) by weight of the nanocomposite, greater than 60% by weight of the nanocomposite, greater than 70% by weight of the nanocomposite, greater than 80% by weight of the nanocomposite, greater than 90% by weight of the nanocomposite, wherein the % transmittance of a 1-micron film is greater than 80%, e.g., greater than 85%, greater than 90%, greater than 95%, greater than 97%, greater than 98%, greater than 99%, such as about 85%, about 90%, about 95%, about 97%, about 98%, about 99%, about 99.5%, or any ranges between the recited values, such as about 90-99%, at wavelength of 400 nm and greater and wherein the nanocomposite film may possess a refractive index of about 1.70 to about 2.10, e.g., 1.70-1.72, or 1.72-1.74, or 1.74-1.76, or 1.76-1.78, or 1.78-1.80, or 1.80-1.82, or 1.82-1.84, or 1.84-1.86, or 1.86-1.88, or 1.88-1.90, or 1.90-1.92, or 1.92-1.94, or 1.94-1.96, or 1.96-1.98, or 1.98-2.00, or 2.00-2.02, or 2.02-2.04, or 2.04-2.06, or 2.06-2.08, or 2.08-2.10, at 448 nm, and may possess a refractive index of about 1.70 to about 2.10, e.g., 1.70-1.72, or 1.72-1.74, or 1.74-1.76, or 1.76-1.78, or 1.78-1.80, or 1.80-1.82, or 1.82-1.84, or 1.84-1.86, or 1.86-1.88, or 1.88-1.90, or 1.90-1.92, or 1.92-1.94, or 1.94-1.96, or 1.96-1.98, or 1.98-2.00, or 2.00-

2.02, or 2.02-2.04, or 2.04-2.06, or 2.06-2.08, or 2.08-2.10, at 635 nm, as measured using a Prism Coupler of a film with <5 um thickness.

In some embodiments, the disclosure provides a nanocomposite film comprising at least partially capped $TiO_2$ nanocrystals and at least one monomer, polymer and/or oligomer wherein the % transmittance of a 1-micron film is greater than 80%, e.g., greater than 85%, greater than 90%, greater than 95%, greater than 97%, greater than 98%, greater than 99%, such as about 85%, about 90%, about 95%, about 97%, about 98%, about 99%, about 99.5%, or any ranges between the recited values, such as about 90-99%, at wavelength of 400 nm and greater and wherein the nanocomposite film may possess a refractive index of about 1.70 to about 2.10, e.g., 1.70-1.72, or 1.72-1.74, or 1.74-1.76, or 1.76-1.78, or 1.78-1.80, or 1.80-1.82, or 1.82-1.84, or 1.84-1.86, or 1.86-1.88, or 1.88-1.90, or 1.90-1.92, or 1.92-1.94, or 1.94-1.96, or 1.96-1.98, or 1.98-2.00, or 2.00-2.02, or 2.02-2.04, or 2.04-2.06, or 2.06-2.08, or 2.08-2.10, at 448 nm, and may possess a refractive index of about 1.70 to about 2.10, e.g., 1.70-1.72, or 1.72-1.74, or 1.74-1.76, or 1.76-1.78, or 1.78-1.80, or 1.80-1.82, or 1.82-1.84, or 1.84-1.86, or 1.86-1.88, or 1.88-1.90, or 1.90-1.92, or 1.92-1.94, or 1.94-1.96, or 1.96-1.98, or 1.98-2.00, or 2.00-2.02, or 2.02-2.04, or 2.04-2.06, or 2.06-2.08, or 2.08-2.10, at 635 nm, as measured using a Prism Coupler of a film with <5 um thickness wherein the haze of the nanocomposite is less than 0.1%, or less than 0.2%, or less than 0.3%, or less than 0.4%, or less than 0.5%, or less than 1% (e.g., about 0.01% to about 0.1%, about 0.1% to about 0.2%, about 0.1% to about 0.5%, about 0.2% to about 0.5%, or about 0.1% to about 1%) and b* is less than 1, or less than 0.5 or less than 0.1 (e.g., about 0.01 to about 0.1, about 0.1 to about 0.5, about 0.1 to about 0.2, or about 0.1 to about 1) as measured by a hazemeter.

In some embodiments, the disclosure provides a nanocomposite film comprising at least partially capped $TiO_2$ nanocrystals and at least one monomer, polymer and/or oligomer wherein the % transmittance of a 1-micron film is greater than 80%, e.g., greater than 85%, greater than 90%, greater than 95%, greater than 97%, greater than 98%, greater than 99%, such as about 85%, about 90%, about 95%, about 97%, about 98%, about 99%, about 99.5%, or any ranges between the recited values, such as about 90-99%, at wavelength of 400 nm and greater and wherein the nanocomposite film may possess a refractive index of about 1.70 to about 2.10, e.g., 1.70-1.72, or 1.72-1.74, or 1.74-1.76, or 1.76-1.78, or 1.78-1.80, or 1.80-1.82, or 1.82-1.84, or 1.84-1.86, or 1.86-1.88, or 1.88-1.90, or 1.90-1.92, or 1.92-1.94, or 1.94-1.96, or 1.96-1.98, or 1.98-2.00, or 2.00-2.02, or 2.02-2.04, or 2.04-2.06, or 2.06-2.08, or 2.08-2.10, at 448 nm, and may possess a refractive index of about 1.70 to about 2.10, e.g., 1.70-1.72, or 1.72-1.74, or 1.74-1.76, or 1.76-1.78, or 1.78-1.80, or 1.80-1.82, or 1.82-1.84, or 1.84-1.86, or 1.86-1.88, or 1.88-1.90, or 1.90-1.92, or 1.92-1.94, or 1.94-1.96, or 1.96-1.98, or 1.98-2.00, or 2.00-2.02, or 2.02-2.04, or 2.04-2.06, or 2.06-2.08, or 2.08-2.10, at 635 nm, as measured using a Prism Coupler of a film with <5 um thickness wherein the haze of the nanocomposite is less than 0.1%, or less than 0.2%, or less than 0.3%, or less than 0.4%, or less than 0.5%, or less than 1% wherein the capped nanocrystals are uniformly dispersed without agglomeration in the film to achieve uniform RI distribution as observed uniform particle distribution by TEM, SEM or EDX images.

The method of the disclosure includes capping the as-synthesized, purified, and/or separated nanocrystals with at least one capping agent to produce at least partially capped nanocrystals. The at least partially capped nanocrystals may be further purified and/or separated according to methods of the present disclosure. Nanocrystals and capped nanocrystals may be dispersed in a material, including solvent, polymer, or some combination thereof in methods of the present disclosure.

The surface of titanium oxide nanocrystals of the present disclosure is optionally capped with at least one capping agent including, but not limited to, silane, alcohol or carboxylic acid. Examples of silanes of the present disclosure include, but not limited to, methyltrimethoxysilane, n-propyltrimethoxysilane, n-propyltriethoxysilane, n-octyltrimethoxysilane, n-octyltriethoxysilane, phenytrimethoxysilane, dodecyltrimethoxysilane, m,p-ethylphenethyl trimethoxysilane, 2-[methoxy(polyethyleneoxy)propyl]-trimethoxysilane, methoxy(triethyleneoxy)propyltrimethoxysilane, 3-aminopropyltrimethoxysilane, 3-mercaptopropyltrimethoxysilane, 3-(methacryloyloxy)propyl trimethoxysilane, 3-(acryloyloxy)propyl trimethoxysilane, 3-isocyanatopropyltriethoxysilane, 3-isocyanatopropyltrimethoxysilane, and 3-glycidoxypropyltrimethoxysilane, vinyltrimethoxysilane, allyltrimethoxysilane, 1-hexenyltrimethoxysilane, 1-octenyltrimethoxysilane, (phenylaminomethyl) methyldimethoxysilane, N-phenylaminopropyltrimethoxysilane, 3-(4-pyridylethyl) thiopropyltrimethoxysilane, N-(3-trimethoxysilylpropyl) pyrrole, 2-(3-trimethoxysilylpropylthio) thiophene, (3-trimethoxysilylpropyly)diethylene triamine, 11-mercaptoundecyltrimethoxysilane, (2-diphenylphosphino) ethyldimethylethoxysilane, 2-(diphenylphosphino) ethyltriethoxysilane, 3-(diphenylphosphino) propyltriethoxysilane or any combination thereof.

Examples of alcohols of the present disclosure include, but not limited to, heptanol, hexanol, octanol, benzyl alcohol, phenol, ethanol, propanol, butanol, oleylalcohol, dodecylalcohol, octadecanol and triethylene glycol monomethyl ether, or any combination thereof.

Examples of carboxylic acids of the present disclosure include, but not limited to, octanoic acid, acetic acid, propionic acid, 2-[2-(2-methoxyethoxy) ethoxy] acetic acid, oleic acid, benzoic acid, stearic acid, trifluoroacetic acid, biphenyl-4-carboxylic acid, 2-(2-methoxyethoxy) acetic acid, methacrylic acid, mono-2-(Methacryloyloxy)ethyl succinate, or any combination thereof.

Examples of thiols and sulfonates of the present disclosure include, but not limited to, 2-mercaptoethanol, 2-{2-[2-(2-mercaptoethoxy)ethoxy)ethoxy]ethoxy} ethanol, 2-(2-methoxyethoxy)ethanethiol, 1-octanethiol, sodium 2,3-dimercaptopropanesulfonate monohydrate, sodium dodecyl sulfate or any combination thereof.

Examples of phosphonates and phosphates of the present disclosure include, but not limited to, dodecyl phosphonic acid, octylphosphonic acid, (11-mercaptoundecyl)phosphonic acid, (11-(acryloyloxy)undecyl)phosphonic acid, 11-methacryloyloxyundecylphosphonic acid, [2-[2-(2-methoxyethoxy)ethoxy]ethyl]phosphonic acid ethyl ester or any combination thereof.

Capped titanium oxide nanocrystals of the present disclosure are, optionally, removed from and re-dispersed into solvents, such as: benzyl alcohol, phenol, oleyl alcohol, butanol, propanol, isopropanol, ethanol, butoxy ethanol, butoxy propanol, methanol, 2-(isopentyloxy)ethanol, 2-propoxy-propanol (PnP), 2-(hexyloxy)ethanol; ethers and cyclic ethers, such as: tetrahydrofuran, dimethyl ether, diethyl ether, dibutyl ether, propylene glycol monomethyl ether (PGME), diethylene glycol butyl ether, dipropylene glycol methyl ether (DPGME), diethylene glycol monomethyl ether, and diethylene glycol monoethyl ether; glycols such as: diethylene glycol, dipropylene glycol; ketones and cyclic ketones, such as: acetone; esters, such as: propylene glycol methyl ether acetate (PGMEA), ethyl lactate (EL), methyl acetates, ethyl acetates, Butyl Carbitol Acetate (BCA), butyl acetate, ethylene glycol monobutyl ether acetate, diethylene glycol monobutyl ether acetate, diethylene glycol monoethyl ether acetate, butoxy ethyl acetate, ethyl acetate, 2-(2-butoxyethoxy)ethyl acetate; aromatics such as: benzene, toluene; and water and any combination or mixture thereof.

Average Particle size of the $TiO_2$ nanocrystals of the present disclosure may be <50 nm as measured by TEM. Preferably the particle size is between 1-4 nm, or 4-6 nm, or 6-8 nm, or 8-10 nm, or 10-12 nm, or 12-14 nm, or 14-16 nm, or 16-18 nm, or 18-20 nm, or 20-25 nm, or 25-30 nm, or 30-35 nm, or 35-40 nm, or 40-45 nm, or 45-50 nm, as measured by TEM.

One common technique to characterize the size and size distribution of nanocrystals in dispersion is Dynamic Light Scattering (DLS). DLS usually measures nanocrystals dispersed in a liquid transparent to the measuring wavelength. In this technique, the liquid sample with proper concentration is kept in a plastic, glass, or fused silica cuvette, a laser beam is scattered off the liquid sample, and the time dependence of the scattered laser light, which is a result of the Brownian motion of the nanocrystals, is measured and the size and size distribution of the nanocrystal can be calculated. The result is usually the size distribution of the nanocrystals with equivalent diameter as the x-axis, the y-axis can represent scattering intensity, the volume of the scattering nanocrystals, or the number of scattering nanocrystals. The measured size often includes the size of the nanocrystals and the size of the capping agent and/or solvent group and/or precursor group along with a thin layer of solvent (solvent shell), therefore the actual nanocrystal size is often smaller than measured by DLS. In the present disclosure, except where noted, all references to nanocrystal size and size distributions refer to the actual nanocrystal size and not the nanocrystal size plus capping agent and/or solvent group and/or precursor group or nanocrystal plus capping agent and/or solvent group and/or precursor group plus solvent shell. D9999 is defined as 99.99% of the particles in the measured dispersion are less than reported value (in nanometers), as measured by volume. There are a variety of DLS spectrometers available, each vendor often develops its own proprietary methodology and algorithm, the results may not be interchangeable, the models that are specifically used to acquire the data in this disclosure is a Malvern Zetasizer Nano S DLS. In any of the embodiments described herein, when unspecified, the average particle size and/or D9999 value determined/measured by DLS can be based on intensity, volume, or both. For example, when unspecified, an average particle size of a sample of titanium oxide nanocrystals can be said to be between 4-50 nm as determined by DLS if the average particle size as determined based on either intensity or volume is within the range of 4-50 nm. The description of D9999 values should be understood similarly. Unless otherwise specified or obvious from context, in any of the embodiments described herein, the average particle size and/or D9999 value as determined/measured by DLS referred to herein can be based on volume. Unless otherwise specified or obvious from context, in any of the embodiments described herein, the average particle size and/or D9999 value as determined/measured by DLS referred to herein can also be based on intensity.

Average Particle size as measured by Intensity of the capped titanium oxide nanocrystals dispersed 5% by weight in a solvent of the present disclosure may be <130 nm as measured by Dynamic Light Scattering. Preferably the particle size is between 1-4 nm, or 4-6 nm, or 6-8 nm, or 8-10 nm, or 10-12 nm, or 12-14 nm, or 14-16 nm, or 16-18 nm, or 18-20 nm, or 20-25 nm, 25-30, or 30-35 nm, or 30-35 nm, or 35-40 nm, or 40-45 nm, or 45-50 nm, or 50-55 nm, or 55-60 nm, or 60-65 nm, or 65-70 nm, or 70-75 nm, or 75-80 nm, or 80-85 nm, or 85-90 nm, or 90-95 nm, or 95-100 nm, or 100-105, or 105-110, or 110-115, or 115-120, or 120-125, or 125-130 as measured by DLS.

Average Particle size as measured by volume of the capped titanium oxide nanocrystals dispersed 5% by weight in a solvent of the present disclosure may be <130 nm as measured by Dynamic Light Scattering. Preferably the particle size is between 1-4 nm, or 4-6 nm, or 6-8 nm, or 8-10 nm, or 10-12 nm, or 12-14 nm, or 14-16 nm, or 16-18 nm, or 18-20 nm, or 20-25 nm, 25-30, or 30-35 nm, or 30-35 nm, or 35-40 nm, or 40-45 nm, or 45-50 nm, or 50-55 nm, or 55-60 nm, or 60-65 nm, or 65-70 nm, or 70-75 nm, or 75-80 nm, or 80-85 nm, or 85-90 nm, or 90-95 nm, or 95-100 nm, or 100-110 nm, or 110-120 nm, or 120-130 nm as measured by DLS.

D9999 as measured by volume of the capped titanium oxide nanocrystals dispersed 5% by weight in a solvent of the present disclosure may be <500 nm as measured by Dynamic Light Scattering. Preferably D9999 is <20 nm, <30 nm, <40 nm, <50 nm, <60 nm, <70 nm, <80 nm, <90 nm, <100 nm, <110 nm, <120 nm, <130 nm, <140 nm, <150 nm, <170 nm, <190 nm, <200 nm as measured by DLS.

One common technique to characterize optical transmittance and absorptance of nanocrystals dispersion formulation and film is UV-Vis Spectrophotometer (UV-Vis). The UV-Vis technique measures the transmitted light vs. the incident light of a sample in the 200 nm-900 nm wavelength range. The transmittance of a sample at a given wavelength is defined as:

$$T = \frac{I}{I_0}$$

where I is the transmitted light intensity and $I_0$ is the incident light intensity, both at the same wavelength. The absorptance of a sample at a given wavelength is defined as:

$$A = \frac{I_0 - I}{I_0}$$

The absorbance of a sample, i.e., Optical Density (OD), at a given wavelength is defined as:

$$OD = -\log_{10}\frac{I}{I_0}$$

Often a reference sample is used to remove the effects from other materials in the sample. For thin film samples, often there are multiple reflections involved, modeling and algorithm may be applied to extract the actual transmittance, absorptance, and absorbance.

To measure a nanocrystal dispersion or a formulation, the sample is usually kept in a plastic, glass, or fused-silica cuvette with 10 mm optical path. The sample is measured against a reference, which comprises the same solvent used in the dispersion kept in the same or same type of cuvette to remove the effects from the cuvette and solvent. To measure nanocrystal polymer nanocomposite, the nanocomposite is spin-cast on a glass or a fused-silica wafer to form a uniform thin film, the sample may be measured against a reference, which comprises the same wafer and/or the same polymer spin-cast on a wafer with same thickness to remove the effects from the wafer and polymer. Modeling and algorithms may be applied to extract the exact transmittance, absorptance, and absorbance of the nanocomposite.

There are a variety of UV-Vis spectrometers available, they are all based on the same principle and when operated properly, the results are interchangeable. The model that was specifically used to acquire the data in this disclosure is a Perkin Elmer Lambda 850.

One common technique to characterize the loading level of nanocrystal dispersions and nanocomposites is Thermogravimetric Analysis (TGA). In this technique, the nanocrystals dispersion or nanocrystal polymer nanocomposite is kept in a crucible and heated up from room temperature up to about 800 C, while the weight is monitored. The organic solvent, polymer, and, capping agent will decompose at high, and usually different, temperatures, leaving only the inorganic nanocrystals behind. The relative weight percentage of various ingredients in the original sample can be obtained. TGA results usually generate plots with temperature as the x-axis and the relative weight percentage as the y-axis. There are a variety of TGA instruments available, they are all based on similar principles and when operated properly, the results are interchange. The model that was specifically used to acquire the data in this disclosure is a TA Instrument TGA Q500.

The presently disclosed formulation may be analyzed using a TA instrument Q500 thermal gravimetric analyzer (TGA) to determine the organic solid content of capped titanium oxide nanocrystals and, subsequently, the inorganic content of the final formulation. The percent mass at 200° C. (M200C) relative to the initial mass is regarded as capped nanocrystals and the percent mass at 700° C. (M700C) relative to the initial mass is regarded as inorganic portion of the capped nanocrystal, i.e. inorganic solid content. The organic content is defined as the difference between the percent mass at 200° C. and at 700° C. divided by percent mass at 200° C., i.e. % Organics=(M200C-M700C)/M200C.

The refractive index is measured using a Metricon's 2010/M model Prism Coupler which is equipped with 448 nm and 635 nm laser beam. One can calculate the estimated refractive index of the same material at a third wavelength. The calculation of the refractive index at 550 nm is based on a 2-term version of Cauchy's equation:

$$RI(w) = A + \frac{B}{w^2}$$

The A and B parameters depend on the measured RI values at specific wavelengths, which were chosen to be 448 and 635 nm. By representing parameters A and B in terms of RI (448 nm) and RI (635 nm), the following equation allows for the calculation of the RI (550 nm):

$$RI(550 \text{ nm}) = \frac{1}{3}RI(448 \text{ nm}) + \frac{2}{3}RI(635 \text{ nm})$$

Method of Making

The present disclosure provides a method of making nanocrystals including dissolving precursors of $TiO_2$ nanocrystals in at least one solvent to produce a solution, optionally at least one of heating and increasing pressure of said solution and reacting the precursors or the precursors and the at least one solvent of the solution to form the nanocrystals.

The nanocrystals may further be capped with at least one capping agent to increase the solubility or dispersibility of the nanocrystals in at least one solvent or other media, or some combination of solvent and other media. In the method of the disclosure, nanocrystals may be capped with at least one agent which may include at least one silane, alcohol or carboxylic acid. These capping agents may impart uniform dispersion of the nanocrystals in different media such as hydrophobic or hydrophilic media by creating an effective nanocrystal surface which is formed by the full or partial shell of capping agents whose tail groups have a polarity compatible with the media.

The capping method of the present disclosure may include capping of the nanocrystals with the at least one capping agent in the solution, prior to, during, or after said reacting the precursors. The capping method may include addition of small amount of water to facilitate the capping process. The methods of the present disclosure further include purifying and/or separating the nanocrystals prior to, or after, the capping method of the present disclosure.

Functionalized capping agents are covalently bonded to $TiO_2$ nanocrystals according to an aspect of the present disclosure. Alternatively, nanocrystals are functionalized with capping agents without forming covalent bonds.

The present disclosure includes nanocrystals and at least partially capped nanocrystals made by methods described herein.

Methods of the present disclosure further includes methods of making formulations by mixing nanocrystals with monomers, oligomers and/or polymers and other additives. This formulation can be used in forming a film or coating including applying the formulation to a surface. The applying methods may include spin coating, spraying, dipping, screen printing, rolling, painting, printing, ink jet printing, dispensing, roll to roll coating, depositing by evaporation and/or vapor deposition followed by optionally curing the film or coating by light or heat treatment.

$TiO_2$ Nanocrystal Synthesis

In an exemplary method, titanium oxide nanocrystals are produced by a solvothermal process from a mixture of titanium (IV) butoxide, water, and benzyl alcohol in an inert atmosphere which is sealed within an autoclave. The molar ratio of titanium (IV) butoxide to water range from 1:0-1:0.1, 1:0.1-1:0.5, 1:0.5-1:1, 1:1-1:1.5, 1:1.5-1:2, 1:2-1:2.5, 1:2.5-1:3, 1:3-1:3.5, 1:3.5 to 1:4, 1:4-1:4.5, 1:4.5-1:5, 1:5-1:5.5, 1:5.5 to 1:6, 1:6-1:6.5, 1:6.5-1:7, 1:7-1:7.5, 1:7.5-1:8, 1:8-1:8.5, 1:8.5-1:9, 1:9-1:9.5, 1:9.5-1:10. The molar ratio of titanium (IV) butoxide to benzyl alcohol range from 1:0.1-1:5, 1:5-1:10, 1:10-1:15, 1:15-1:20, 1:20-1:25, 1:25-1:30, 1:30-1:35, 1:35-1:40, 1:40-1:45, 1:45-1:50, 1:50-1:55, 1:55-1:60, 1:60-1:65, 1:65-1:70, 1:70-1:75, 1:75-1:80, 1:80-1:85, 1:85-1:90, 1:90-1:95, 1:95-1:100, 1:100-1:150. The reaction mixture is heated to a temperature between 140-150, 150-160, 160-170, 170-180, 180-190, 190-200, 200-210, 210-220, 220-230, 230-240, 240-250, 250-260, 260-270, 270-280, 280-290, 290-300° C., 300-310° C., 310-320° C., 320-330° C., 330-340° C., 340-350° C., 350-360° C., 360-370° C. at a heating rate is 0.1-0.5, 0.5-1, 1-1.5, 1.5-2, 2-2.5, 2.5-3, 3-3.5, 2.5-4, 4-4.5, 4.5-5° C./min. Once the reaction mixture reaches the desired temperature, the temperature is maintained for 1-10, 10-20, 20-30, 30-40, 40-50, 50-60, 60-70, 70-80, 80-90, 90-100, 100-120 minutes, 1-2 hours, 2-3 hours, 3-4 hours, 4-5 hours, 5-6 hours, 6-7 hours, 7-8 hours, 8-9 hours, 9-10 hours, 10-1 hours, 11-12 hours, 12-13 hours, 13-14 hours, 14-15 hours, 15-16 hours, 16-17 hours, 17-18 hours, 18-19 hours, 19-20 hours. The pressure of the reactor reaches from 50 to 150 psi during the reaction. A white milky solution of as-synthesized $TiO_2$ nanocrystals is collected after the reactor is cooled to the room temperature.

$TiO_2$ Nanocrystal Capping

Some embodiments of the present disclosure are directed to methods of capping $TiO_2$ nanocrystals. In some embodiments, the method comprises reacting $TiO_2$ nanocrystals (e.g., any of those described herein) with a first capping agent in a first capping solvent to produce a first at least partially capped $TiO_2$ nanocrystals. In some embodiments, the reacting comprises 1) mixing the $TiO_2$ nanocrystals with the first capping agent in the first capping solvent to provide a first reaction mixture; and 2) heating the first reaction mixture, e.g., at the reflux temperature of the first capping solvent, for a period of time (e.g., about 10 minutes to about 120 minutes) to produce the first at least partially capped $TiO_2$ nanocrystals. In some embodiments, the method further comprises 1) mixing the first at least partially capped $TiO_2$ nanocrystals with a second capping agent in a second capping solvent to provide a second reaction mixture; and 2) heating the second reaction mixture, e.g., at the reflux temperature of the second capping solvent, for a period of time (e.g., about 10 minutes to about 120 minutes) to produce a second at least partially capped $TiO_2$ nanocrystals. In some embodiments, the method can further comprise a) adding water to the first or second reaction mixture after the respective heating step 2), and b) heating the first or second reaction mixture for an additional period of time (e.g., about 10 minutes to about 120 minutes). In some embodiments, the method can further comprise separating, purifying, and/or drying the first or second at least partially capped $TiO_2$ nanocrystals, e.g., as described herein.

The $TiO_2$ nanocrystals suitable for the capping methods herein are not particularly limited. In some embodiments, the $TiO_2$ nanocrystals have an average particle size of less than 50 nm (e.g., less than about 50 nm, less than about 40 nm, less than about 30 nm, less than about 20 nm, less than about 10 nm, or less than about 5 nm, such as about 1 nm, about 4 nm, about 5 nm, about 10 nm, about 15 nm, about 20 nm, about 35 nm, about 30 nm, about 40 nm, about 50 nm, or any range between the recited values, such as about 1 nm to about 5 nm, about 1 nm to about 10 nm, about 40 nm to about 50 nm, about 20 nm to about 30 nm, about 10 nm to about 20 nm, about 30 nm to about 40 nm, about 4 nm to about 50 nm, about 4 nm to about 20 nm, about 15 nm to about 20 nm, or about 10 nm to about 25 nm), as measured by TEM. $TiO_2$ nanocrystals can have a narrow particle size distribution. For example, in some embodiments, the $TiO_2$ nanocrystals can have a narrow particle size distribution characterized by 1) a ratio of D90:D10 of less than 5, preferably, less than 3, or less than 2, such as about 1.1 to about 2, about 1.5 to about 2, about 1.2 to about 1.8, about 1.2 to about 3, or about 1.5 to about 3; 2) a ratio of D90:D50 of less than 3, preferably, less than 2, or less than 1.5, such as about 1.1 to about 2, about 1.5 to about 2, about 1.2 to about 1.5; and/or 3) a ratio of D50:D10 of less than 3, preferably, less than 2, or less than 1.5, such as about 1.1 to about 2, about 1.5 to about 2, about 1.2 to about 1.5. In some embodiments, the $TiO_2$ nanocrystals can also have a narrow particle size distribution characterized by a standard deviation (σ) of the particle size distribution no greater than 15% (e.g., no greater than 10%, or no greater than 5%, such as about 1% to about 15%, about 5% to about 10%, or about 10% to about 15%) of the median particle size of the nanocrystals as measured by TEM. In some embodiments, the $TiO_2$ nanocrystals can also have a narrow particle size distribution characterized by a standard deviation (σ) of the particle size distribution no greater than 5 nm (e.g., no greater than 3 nm, or no greater than 1 nm, such as about 1 nm, about 3 nm, about 5 nm, or any ranges between the recited values, such as about 1-3 nm, about 1-5 nm, about 3-5 nm, etc.), as measured by TEM. In some embodiments, the $TiO_2$ nanocrystals can also have a narrow particle size distribution characterized in that greater than about 90% (e.g., greater than about 95%, or greater than about 99%, such as about 91%, about 95%, about 98%, about 99%, about 99.5%, or any ranges between the recited values, such as 90-99%, 90-95%, or 95-99%) of the nanocrystals have a particle size within 5 nm of the average particle size, as measured by TEM.

In some preferred embodiments, the $TiO_2$ nanocrystals are those prepared by any of the methods described herein. For example, typically, the milky white suspension is collected and transferred to centrifuge bottles such as 250-mL centrifuge bottles. The suspension is centrifuged at 100-500, 500-1000, 100-1500, 1500-2000, 2000-2500, 2500-3000 rpm, 3000-3500, 3500-4000, 4000-4500, 4500-5000, 5000-5500, 5500-6000, 6000-6500, 6500-7000, 7000-7500, 7500-8000, 8000-8500, 8500-9000 rpm for 0-5, 5-10, 10-15, 15-20, 30-25, 25-30, 30-35, 35-40, 40-45, 45-50, 50-55, 55-60 minutes. The supernatant is decanted, leaving a wet cake settling at the bottom of the centrifuge bottle. The wet cake is optionally rinsed by addition of a solvent, followed by agitation of the wet cake in the solvent and then centrifugation. The wet cake collected is then transferred to a 250 ml round bottom flask. A solvent such as PGMEA or toluene is added at a 0.1:1-1:1, 1:1-1.25:1, 1.25:1-1.5:1, 1.5:1-1.75:1, 1.75:1-2:1, 2:1-2.25:1, 2.25:1-2.5:1, 2.5:1-2.75:1, 2.75:1-3:1, 3:1-4:1, 4:1-5:1, 5:1-6:1, 6:1-7:1, 7:1-8:1, 8:1-9:1, 9:1-10:1 ratio of solvent to wet cake by weight. A first capping agent is added to the reaction flask at 0.1-5%, 5-10%, 10-15%, 15-20%, 20-25%, 25%-30%, 30%-35% of capping agent to wet cake by weight. This mixture is then refluxed at 50-60, 60-70, 70-80, 80-90, 90-100, 100-110, 110-120, 120-130° C. for 1-10, 10-20, 20-30, 30-40, 40-50, 50-60, 60-70, 70-80, 80-90, 90-100, 100-120 minutes.

Optionally a second capping agent is added to the reaction flask before or after the first heating process. The second capping agent is also added to the reaction flask at a at 0.1-5%, 5-10%, 10-15%, 15-20%, 20-25%, 25%-30%, 30%-35%, 35%-40%, 40%-45%, 45%-50%, 50%-55%, 55%-60%, 60%-70%, 70%-80%, 80%-90%, 90%-100% of capping agent to wet cake by weight. This mixture is then refluxed at 50-60, 60-70, 70-80, 80-90, 90-100, 100-110, 110-120, 120-130° C. for 1-10, 10-20, 20-30, 30-40, 40-50, 50-60, 60-70, 70-80, 80-90, 90-100, 100-120 minutes. Optionally water is then added to the reaction mixture after cooling the reaction mixture to 80 C at a 0.1-5%, 5-10%, 10-15%, 15-20%, 20-25%, 25%-30%, 30%-35% of water to wet cake by weight. This mixture is refluxed at 80-90, 90-100, 100-110, 110-120, 120-130° C. for an additional 1-10, 10-20, 20-30, 30-40, 40-50, 50-60, 60-70, 70-80, 80-90, 90-100, 100-120 minutes. The reaction mixture is then cooled to room temperature to provide capped nanocrystals. Capped nanocrystal in dispersion is then filtered through a 0.45-micron and then a 0.2-micron PTFE filter or optionally further purified through the following washing process.

The capped nanocrystals is purified by washing to remove excess capping agent and other by-products. The reaction mixture is precipitated by adding an anti-solvent such as heptane for a PGMEA solution or acetone for a toluene solution in a 0.1:1-1:1, 1:1-1.25:1, 1.25:1-1.5:1, 1.5:1-1.75:1, 1.75:1-2:1, 2:1-2.25:1, 2.25:1-2.5:1, 2.5:1-2.75:1, 2.75:1-3:1 ratio of anti-solvent to reaction mixture by weight. This precipitate is centrifuged at 100-500, 500-1000, 100-1500, 1500-2000, 2000-2500, 2500-3000 rpm, 3000-3500, 3500-4000, 4000-4500, 4500-5000, 5000-5500, 5500-6000, 6000-6500, 6500-7000, 7000-7500, 7500-8000, 8000-8500, 8500-9000 rpm for 0-5, 5-10, 10-15, 15-20, 30-25, 25-30, 30-35, 35-40, 40-45, 45-50, 50-55, 55-60 minutes. The resulting supernatant is decanted and discarded. The solids are then dispersed in a solvent, such as toluene for non-polar capped $TiO_2$ nanocrystals or THF for polar capped $TiO_2$ nanocrystals. The dispersed solids are then precipitated with an anti-solvent again, such as heptane for a THF solution or acetone for a toluene solution in a 0.1:1-1:1, 1:1-1.25:1, 1.25:1-1.5:1, 1.5:1-1.75:1, 1.75:1-2:1, 2:1-2.25:1, 2.25:1-2.5:1, 2.5:1-2.75:1, 2.75:1-3:1 ratio of anti-solvent to reaction mixture by weight. This precipitate is centrifuged at 100-500, 500-1000, 100-1500, 1500-2000, 2000-2500, 2500-3000 rpm, 3000-3500, 3500-4000, 4000-4500, 4500-5000, 5000-5500, 5500-6000, 6000-6500, 6500-7000, 7000-7500, 7500-8000, 8000-8500, 8500-9000 rpm for 0-5, 5-10, 10-15, 15-20, 30-25, 25-30, 30-35, 35-40, 40-45, 45-50, 50-55, 55-60 minutes. The resulting supernatant is decanted and discarded. This process is repeated if necessary. The solids are then dried overnight in a vacuum oven.

The dried solids are re-dispersed in a 1:1 ratio of solids to solvent in PGMEA to create a 50% by weight loaded dispersion. The resulting dispersion is optionally filtered through a 0.45 micron and then a 0.2-micron PTFE filter.

The first or second capping agent is typically independently selected from a silane, an alcohol, a carboxylic acid, a thiol, a sulfonate, a phosphonate, a phosphate, and combinations thereof. Examples of suitable silanes, alcohols, carboxylic acids, thiols, sulfonates, phosphonates, phosphates include those described herein. In some embodiments, the first or second capping agent is independently selected from methyltrimethoxysilane, n-propyltrimethoxysilane, n-propyltriethoxysilane, n-octyltrimethoxysilane, n-octyltriethoxysilane, phenyltrimethoxysilane, dodecyltrimethoxysilane, m,p-ethylphenethyl trimethoxysilane, 2-[methoxy(polyethyleneoxy)propyl]-trimethoxysilane, methoxy(triethyleneoxy)propyltrimethoxysilane, 3-aminopropyltrimethoxysilane, 3-mercaptopropyltrimethoxysilane, 3-(methacryloyloxy)propyl trimethoxysilane, 3-(acryloyloxy)propyl trimethoxysilane, 3-isocyanatopropyltriethoxysilane, 3-isocyanatopropyltrimethoxysilane, 3-glycidoxypropyltrimethoxysilane, vinyltrimethoxysilane, allyltrimethoxysilane, 1-hexenyltrimethoxysilane, 1-octenyltrimethoxysilane, (phenylaminomethyl) methyldimethoxysilane, N-phenylaminopropyltrimethoxysilane, 3-(4-pyridylethyl)thiopropyltrimethoxysilane, N-(3-trimethoxysilylpropyl)pyrrole, 2-(3-trimethoxysilylpropylthio) thiophene, (3-trimethoxysilylpropyl)diethylene triamine, 11-mercaptoundecyltrimethoxysilane, (2-diphenylphosphino) ethyldimethylethoxysilane, 2-(diphenylphosphino) ethyltriethoxysilane, 3-(diphenylphosphino) propyltriethoxysilane, heptanol, hexanol, octanol, benzyl alcohol, phenol, ethanol, propanol, butanol, oleylalcohol, dodecylalcohol, octadecanol, triethylene glycol monomethyl ether, octanoic acid, acetic acid, propionic acid, 2-[2-(2-methoxyethoxy) ethoxy] acetic acid, oleic acid, benzoic acid, stearic acid, trifluoroacetic acid, biphenyl-4-carboxylic acid, 2-(2-methoxyethoxy) acetic acid, methacrylic acid, mono-2-(Methacryloyloxy)ethyl succinate, 2-mercaptoethanol, 2-{2-[2-(2-mercaptoethoxy)ethoxy)ethoxy]ethoxy} ethanol, 2-(2-methoxyethoxy)ethanethiol, 1-octanethiol, sodium 2,3-dimercaptopropanesulfonate monohydrate, sodium dodecyl sulfate, dodecyl phosphonic acid, octylphosphonic acid, (11-mercaptoundecyl)phosphonic acid, (11-(acryloyloxy)undecyl)phosphonic acid, 11-methacryloyloxyundecylphosphonic acid, [2-[2-(2-methoxyethoxy)ethoxy]ethyl]phosphonic acid ethyl ester, and combinations thereof. In some embodiments, the first or second capping agent is independently selected from methyltrimethoxysilane, n-octyltrimethoxysilane, methoxy(triethyleneoxy)propyltrimethoxysilane, 3-mercaptopropyltrimethoxysilane, 3-(methacryloyloxy)propyl trimethoxysilane, 3-(acryloyloxy)propyl trimethoxysilane, vinyltrimethoxysilane, allyltrimethoxysilane, 2-[2-(2-methoxyethoxy) ethoxy] acetic acid, oleic acid, and combinations thereof, for example, in some embodiments, the first or second capping agent is independently selected from methoxy(triethyleneoxy)propyltrimethoxysilane, 3-mercaptopropyltrimethoxysilane, 3-(methacryloyloxy)propyl trimethoxysilane, 3-(acryloyloxy)propyl trimethoxysilane, 2-[2-(2-methoxyethoxy) ethoxy] acetic acid, and combinations thereof.

The first or second capping solvent is typically independently selected from an alcoholic solvent, an ether solvent, a glycol solvent, a ketone solvent, an ester solvent, an aromatic solvent, water, and combinations thereof. Examples of suitable alcoholic solvents, ether solvents, glycol solvent, ketone solvent, ester solvent, and aromatic solvents include any of those described herein. In some embodiments, the first or second capping solvent is independently selected from benzyl alcohol, phenol, oleyl alcohol, butanol, propanol, isopropanol, ethanol, butoxy ethanol, butoxy propanol, methanol, 2-(isopentyloxy)ethanol, 2-propoxy-propanol (PnP), 2-(hexyloxy)ethanol, tetrahydrofuran, dimethyl ether, diethyl ether, dibutyl ether, propylene glycol monomethyl ether (PGME), diethylene glycol butyl ether, dipropylene glycol methyl ether (DPGME), diethylene glycol monomethyl ether, diethylene glycol monoethyl ether, diethylene glycol, dipropylene glycol, acetone, propylene glycol methyl ether acetate (PGMEA), ethyl lactate (EL), methyl acetates, ethyl acetates, Butyl Carbitol Acetate (BCA), butyl acetate, ethylene glycol monobutyl ether acetate, diethylene glycol monobutyl ether acetate, diethylene glycol monoethyl ether acetate, butoxy ethyl acetate, ethyl acetate, 2-(2-butoxyethoxy)ethyl acetate, benzene, toluene, water, and combinations thereof. In some embodiments, the first or second capping solvent is independently selected from benzyl alcohol, Butyl Carbitol Acetate (BCA), propylene glycol monomethyl ether (PGME), diethylene glycol butyl ether, dipropylene glycol methyl ether (DPGME), propylene glycol methyl ether acetate (PGMEA), ethyl lactate (EL), ethyl acetate, toluene and combinations thereof, for example, the first or second capping solvent is independently selected from benzyl alcohol, Butyl Carbitol Acetate (BCA), diethylene glycol butyl ether, dipropylene glycol methyl ether (DPGME), propylene glycol methyl ether acetate (PGMEA), ethyl acetate, and combinations thereof.

The at least partially capped $TiO_2$ nanocrystals prepared by the methods herein are also novel compositions of the present disclosure.

In some embodiments, the present disclosure provides at least partially capped $TiO_2$ nanocrystals, which comprise the $TiO_2$ nanocrystals described herein that are at least partially capped with at least one capping agent selected from a silane, an alcohol, a carboxylic acid, a thiol, a sulfonate, a phosphonate, a phosphate, and combinations thereof. In some embodiments, the the at least one capping agent is selected from methyltrimethoxysilane, n-propyltrimethoxysilane, n-propyltriethoxysilane, n-octyltrimethoxysilane, n-octyltriethoxysilane, phenytrimethoxysilane, dodecyltrimethoxysilane, m,p-ethylphenethyl trimethoxysilane, 2-[methoxy(polyethyleneoxy)propyl]-trimethoxysilane, methoxy(triethyleneoxy)propyltrimethoxysilane, 3-aminopropyltrimethoxysilane, 3-mercaptopropyltrimethoxysilane, 3-(methacryloyloxy)propyl trimethoxysilane, 3-(acryloyloxy)propyl trimethoxysilane, 3-isocyanatopropyltriethoxysilane, 3-isocyanatopropyltrimethoxysilane, 3-glycidoxypropyltrimethoxysilane, vinyltrimethoxysilane, allyltrimethoxysilane, 1-hexenyltrimethoxysilane, 1-octenyltrimethoxysilane, (phenylaminomethyl) methyldimethoxysilane, N-phenylaminopropyltrimethoxysilane, 3-(4-pyridylethyl)thiopropyltrimethoxysilane, N-(3-trimethoxysilylpropyl)pyrrole, 2-(3-trimethoxysilylpropylthio) thiophene, (3-trimethoxysilylpropyl)diethylene triamine, 11-mercaptoundecyltrimethoxysilane, (2-diphenylphosphino) ethyldimethylethoxysilane, 2-(diphenylphosphino) ethyltriethoxysilane, 3-(diphenylphosphino) propyltriethoxysilane, heptanol, hexanol, octanol, benzyl alcohol, phenol, ethanol, propanol, butanol, oleylalcohol, dodecylalcohol, octadecanol, triethylene glycol monomethyl ether, octanoic acid, acetic acid, propionic acid, 2-[2-(2-methoxyethoxy) ethoxy] acetic acid, oleic acid, benzoic acid, stearic acid, trifluoroacetic acid, biphenyl-4-carboxylic acid, 2-(2-methoxyethoxy) acetic acid, methacrylic acid, mono-2-(Methacryloyloxy)ethyl succinate, 2-mercaptoethanol, 2-{2-[2-(2-mercaptoethoxy)ethoxy)ethoxy]ethoxy} ethanol, 2-(2-methoxyethoxy)ethanethiol, 1-octanethiol, sodium 2,3-dimercaptopropanesulfonate monohydrate, sodium dodecyl sulfate, dodecyl phosphonic acid, octylphosphonic acid, (11-mercaptoundecyl)phosphonic acid, (11-(acryloyloxy) undecyl)phosphonic acid, 11-methacryloyloxyundecylphosphonic acid, [2-[2-(2-methoxyethoxy)ethoxy]ethyl]phosphonic acid ethyl ester, and combinations thereof. In some embodiments, the at least one capping agent is selected from methyltrimethoxysilane, n-octyltrimethoxysilane, methoxy(triethyleneoxy)propyltrimethoxysilane, 3-mercaptopropyltrimethoxysilane, 3-(methacryloyloxy)propyl trimethoxysilane, 3-(acryloyloxy)propyl trimethoxysilane, vinyltrimethoxysilane, allyltrimethoxysilane, 2-[2-(2-methoxyethoxy) ethoxy] acetic acid, oleic acid, and combinations thereof, for example, the at least one capping agent is selected from methoxy(triethyleneoxy)propyltrimethoxysilane, 3-mercaptopropyltrimethoxysilane, 3-(methacryloyloxy)propyl trimethoxysilane, 3-(acryloyloxy)propyl trimethoxysilane, 2-[2-(2-methoxyethoxy) ethoxy] acetic acid, and combinations thereof.

The at least partially capped $TiO_2$ nanocrystals herein can be in a dry form (e.g., powder) and/or in a substantially pure form, for example, in some embodiments, the at least partially capped $TiO_2$ nanocrystals are free or substantially free of a capping agent used for capping $TiO_2$ nanocrystals and/or by-products from capping the $TiO_2$ nanocrystals. In some preferred embodiments, the at least partially capped $TiO_2$ nanocrystals can be dispersible. In some embodiments, the at least partially capped $TiO_2$ nanocrystals can be separated and purified from the capping reaction and dried, and the dried at least partially capped $TiO_2$ nanocrystals can be redispersed in a capping solvent described herein. The term "substantially free" should be understood as less than 10% by weight, such as less than 5%, less than 3%, less than 1% by weight.

The at least partially capped $TiO_2$ nanocrystals herein can typically have an organic content of about 5% to about 35%, preferably, about 5% to about 15%, or about 10% to about 25%, or about 15% to about 30%, as measured by TGA.

In any of the embodiments described herein, the at least partially capped $TiO_2$ nanocrystals can also be characterized in that the average particle size as measured by volume of the capped titanium dioxide nanocrystals dispersed 5% by weight in a solvent is less than 130 nm (e.g., less than 120 nm, less than 100 nm, less than 80 nm, less than 50 nm, less than 20 nm, or less than 10 nm, such as about 10 nm, about 20 nm, about 50 nm, about 80 nm, about 100 nm, about 120 nm, or any ranges between the recited values, such as about 10 to about 50 nm, about 50 nm to about 100 nm, etc.), as measured by Dynamic Light Scattering (DLS). In some embodiments, the at least partially capped $TiO_2$ nanocrystals can also be characterized in that the D9999 is less than 500 nm (e.g., less than 200 nm, less than 100 nm, or less than 50 nm, such as about 10 nm, about 20 nm, about 50 nm, about 100 nm, about 200 nm, about 500 nm, or any ranges between the recited values, such as about 20 nm to about 50 nm, about 50 nm to about 100 nm, about 20 nm to about 200 nm, about 100 nm to about 200 nm, etc.) as measured by volume of the capped titanium dioxide nanocrystals dispersed 5% by weight in a solvent by Dynamic Light Scattering (DLS).

In some embodiments, the present disclosure also provides a composition such as a nanocrystal dispersion comprising the at least partially capped $TiO_2$ nanocrystals described herein.

$TiO_2$ Nanocrystal Dispersions

In some embodiments, the present disclosure provides a nanocrystal dispersion comprising at least partially capped $TiO_2$ nanocrystals and a solvent, wherein the at least partially capped $TiO_2$ nanocrystals are present in an amount of greater than 30%, e.g., greater than 40%, greater than 50%, greater than 60%, or greater than 70%, such as about 40%, about 50%, about 60%, about 70%, about 80%, or any ranges between the recited values, such as about 40-70%, about 30-80%, about 50-80%, etc., by weight of the dispersion. The at least partially capped $TiO_2$ nanocrystals can be any of those described herein. For example, in some embodiments, the nanocrystal dispersion can include the $TiO_2$ nanocrystals herein which are at least partially capped with a capping agent selected from methyltrimethoxysilane, n-octyltrimethoxysilane, methoxy(triethyleneoxy)propyltrimethoxysilane, 3-mercaptopropyltrimethoxysilane, 3-(methacryloyloxy)propyl trimethoxysilane, 3-(acryloyloxy)propyl trimethoxysilane, vinyltrimethoxysilane, allyltrimethoxysilane, 3-glycidoxypropyltrimethoxysilane, 2-[2-(2-methoxyethoxy) ethoxy] acetic acid, oleic acid, and combinations thereof, preferably, the capping agent is selected from methyltrimethoxysilane, methoxy(triethyleneoxy)propyltrimethoxysilane, 3-(methacryloyloxy)propyl trimethoxysilane, 3-(acryloyloxy)propyl trimethoxysilane, 2-[2-(2-methoxyethoxy) ethoxy]acetic acid, and combinations thereof, and more preferably, the capping agent is selected from methoxy(triethyleneoxy)propyltrimethoxysilane, 3-(methacryloyloxy)propyl trimethoxysilane, 3-(acryloyloxy)propyl trimethoxysilane, and combinations thereof, for example, the capping agent is methoxy(triethyleneoxy) propyltrimethoxysilane. The solvent is not particularly limited. For example, the solvent can be selected from an alcoholic solvent, an ether solvent, a glycol solvent, a ketone solvent, an ester solvent, an aromatic solvent, water, and combinations thereof. Examples of suitable alcoholic solvents, ether solvents, glycol solvents, ketone solvents, ester solvents, and aromatic solvents include any of those described herein. In some embodiments, the solvent is selected from benzyl alcohol, phenol, oleyl alcohol, butanol, propanol, isopropanol, ethanol, butoxy ethanol, butoxy propanol, methanol, 2-(isopentyloxy)ethanol, 2-propoxy-propanol (PnP), 2-(hexyloxy)ethanol, tetrahydrofuran, dimethyl ether, diethyl ether, dibutyl ether, propylene glycol monomethyl ether (PGME), diethylene glycol butyl ether, dipropylene glycol methyl ether (DPGME), diethylene glycol monomethyl ether, diethylene glycol monoethyl ether, diethylene glycol, dipropylene glycol, acetone, propylene glycol methyl ether acetate (PGMEA), ethyl lactate (EL), methyl acetates, ethyl acetates, Butyl Carbitol Acetate (BCA), butyl acetate, ethylene glycol monobutyl ether acetate, diethylene glycol monobutyl ether acetate, diethylene glycol monoethyl ether acetate, butoxy ethyl acetate, ethyl acetate, 2-(2-butoxyethoxy)ethyl acetate, benzene, toluene, water, and combinations thereof, preferably, the solvent is selected from benzyl alcohol, Butyl Carbitol Acetate (BCA), butanol, propanol, isopropanol, ethanol, butoxy ethanol, butoxy propanol, methanol, tetrahydrofuran, diethyl ether, propylene glycol monomethyl ether (PGME), diethylene glycol butyl ether, dipropylene glycol methyl ether (DPGME), diethylene glycol monomethyl ether, diethylene glycol monoethyl ether, diethylene glycol, dipropylene glycol, acetone, propylene glycol methyl ether acetate (PGMEA), ethyl lactate (EL), ethyl acetate, butyl acetate, diethylene glycol monoethyl ether acetate, toluene, and combinations thereof. More preferably, the solvent is selected from benzyl alcohol, Butyl Carbitol Acetate (BCA), isopropanol, tetrahydrofuran, propylene glycol monomethyl ether (PGME), dipropylene glycol methyl ether (DPGME), propylene glycol methyl ether acetate (PGMEA), ethyl lactate (EL), ethyl acetate, toluene, and combinations thereof. In some preferred embodiments, the solvent is selected from Butyl Carbitol Acetate (BCA), propylene glycol monomethyl ether (PGME), dipropylene glycol methyl ether (DPGME), propylene glycol methyl ether acetate (PGMEA), ethyl acetate, and combinations thereof, for example, the solvent is propylene glycol methyl ether acetate (PGMEA).

The present disclosure provides a composition containing a dispersion of capped titanium oxide nanocrystals and a solvent, wherein the capped titanium oxide nanocrystals are present in the solvent in an amount of less than 10% by weight, or 10%-20% by weight, or 20%-30% by weight, or 30%-40% by weight, or 40%-50% by weight, or 50%-60% by weight, or 60%-70% by weight, or 70%-80% by weight, or 80%-90% by weight, or 90%-95% by weight, and wherein the solvent may include alcohols, such as: benzyl alcohol, phenol, oleyl alcohol, butanol, propanol, isopropanol, ethanol, butoxy ethanol, butoxy propanol, methanol, 2-(isopentyloxy)ethanol, 2-propoxy-propanol (PnP), 2-(hexyloxy)ethanol; ethers and cyclic ethers, such as: tetrahydrofuran, dimethyl ether, diethyl ether, dibutyl ether, propylene glycol monomethyl ether (PGME), diethylene glycol butyl ether, dipropylene glycol methyl ether (DPGME), diethylene glycol monomethyl ether, and diethylene glycol monoethyl ether; glycols such as: diethylene glycol, dipropylene glycol; ketones and cyclic ketones, such as: acetone; esters, such as: propylene glycol methyl ether acetate (PGMEA), ethyl lactate (EL), methyl acetates, ethyl acetates, butyl acetate, ethylene glycol monobutyl ether acetate, Butyl Carbitol Acetate (BCA), diethylene glycol monobutyl ether acetate, diethylene glycol monoethyl ether acetate, butoxy ethyl acetate, ethyl acetate, 2-(2-butoxyethoxy)ethyl acetate; aromatics such as: benzene, toluene; and water and any combination or mixture thereof.

In some embodiments, the nanocrystal dispersion described herein are also characterized by the size of the nanocrystals in the dispersion. In some embodiments, the average particle size of the $TiO_2$ nanocrystals in the dispersion is in the range of 1-50 nm, such as 4-20 nm, or 15-20 nm. In some embodiments, the D9999 of the $TiO_2$ nanocrystals in the dispersion, as determined by DLS, is in the range of 20-500 nm, preferably, less than 200 nm. The at least partially capped $TiO_2$ nanocrystals in the dispersion are typically uniformly dispersed without agglomeration or settling of the nanocrystals as observed by TGA.

Optical transmittance of a 50 wt % dispersion of $TiO_2$ nanocrystals in a solvent such as PGMEA at 400 nm may be, 70%-65%, or 65%-60%, or 60%-55%, or 55%-50%, or 50%-45%, or 45%-40%, or 40%-35%, or 35%-30%, or 30%-25%, or 25%-20%, or 20%-15%, or 15%-10%, 10%-5%, or, 5%-3% or 3%-2%, or 2%-1% when measured in a cuvette with 1 cm path length.

Optical transmittance of a 50 wt % dispersion of $TiO_2$ nanocrystals in a solvent such as PGMEA at 450 nm may be, 70%-65%, or 65%-60%, or 60%-55%, or 55%-50%, or 50%-45%, or 45%-40%, or 40%-35%, or 35%-30%, or 30%-25%, or 25%-20%, or 20%-15%, or 15%-10%, 10%-5%, or, 5%-3% or 3%-2%, or 2%-1% when measured in a cuvette with 1 cm path length.

Optical transmittance of a 50 wt % dispersion of $TiO_2$ nanocrystals in a solvent such as PGMEA at 500 nm may be, 70%-65%, or 65%-60%, or 60%-55%, or 55%-50%, or 50%-45%, or 45%-40%, or 40%-35%, or 35%-30%, or 30%-25%, or 25%-20%, or 20%-15%, or 15%-10%, 10%-5%, or, 5%-3% or 3%-2%, or 2%-1% when measured in a cuvette with 1 cm path length.

Optical transmittance of a 50 wt % dispersion of $TiO_2$ nanocrystals in a solvent such as PGMEA at 650 nm may be, 70%-65%, or 65%-60%, or 60%-55%, or 55%-50%, or 50%-45%, or 45%-40%, or 40%-35%, or 35%-30%, or 30%-25%, or 25%-20%, or 20%-15%, or 15%-10%, when measured in a cuvette with 1 cm path length.

The present disclosure provides a capped titanium oxide nanocrystal dispersion in a solvent as described herein wherein the dispersion is storage stable for at least 1 week, or 2 weeks, or 3 weeks, or 4 weeks, or 3 months, or at least 5 months, or at least 6 months, or at least 7 months, or at least 8 months, or at least 9 months, or at least 10 months, or at least 11 months, or at least 1 year, or at least 2 years or at least 3 years, when the dispersion is stored at a temperature in the range of 18-25° C. without deliberate shaking or mixing of the dispersion.

In some embodiments, the nanocrystal dispersion can be stable for more than two weeks, e.g., three weeks, or four weeks, or more than three weeks, more than four weeks, showing less than 5% (e.g., less than 3%, less than 2%, or less than 1%, such as about 0.1%, about 0.5%, about 1%, about 2%, about 3%, or any ranges between the recited values, such as about 0.01-1%, about 0.1-1%, about 0.1-5%, about 0.5-2%, about 0.5-3%, about 0.5-1%, etc.) change in transmittance at 400 nm when stored at room temperature in dark.

The nanocrystal dispersion can be typically prepared by a method comprising mixing the at least partially capped $TiO_2$ nanocrystals with the solvent to form the dispersion. In some embodiments, the at least partially capped $TiO_2$ nanocrystals are in a substantially pure form, for example, free or substantially free of a capping agent used for capping $TiO_2$ nanocrystals and/or by-products from capping the $TiO_2$ nanocrystals. In some embodiments, the method comprises mixing the at least partially capped $TiO_2$ nanocrystals in a dry form with the solvent to form the dispersion.

$ZrO_2$—$TiO_2$ Nanocrystal Dispersions

Optionally, the present disclosure provides a composition containing a dispersion of capped titanium oxide nanocrystals described herein (e.g., any of the at least partially capped $TiO_2$ nanocrystals herein) and capped zirconium oxide nanocrystals, e.g., those described in U.S. Pat. No. 8,592,511 B2, entire content of which is incorporated herein by reference, in a solvent to optimize optical, physical, or chemical performance. $ZrO_2$ to $TiO_2$ nanocrystal weight ratio in the dispersion could vary from 100% $TiO_2$ and 0% $ZrO_2$ to 0% $TiO_2$ to 100% $ZrO_2$ and any ratio in between. The properties of dispersions are described in Table 3 where $ZrO_2$ to $TiO_2$ ratios are 0% and 100%, 10% and 90%, 20% and 80%, 30% and 70%, 40% and 60%, 50% and 50%, 60% and 40%, 70% and 30%, 80% and 20%, 90% and 10%, and 100% and 0% and the solvent content is 50% by weight.

The dispersion comprising the capped titanium oxide nanocrystals and the capped zirconium oxide nanocrystals, wherein the total amount of nanocrystals are present in an amount of less than 10% by weight, or 10%-20% by weight, or 20%-30% by weight, or 30%-40% by weight, or 40%-50% by weight, or 50%-60% by weight, or 60%-70% by weight, or 70%-80% by weight, or 80%-90% by weight, or 90%-95% by weight, and wherein the solvent may include alcohols, such as: benzyl alcohol, phenol, oleyl alcohol, butanol, propanol, isopropanol, ethanol, butoxy ethanol, butoxy propanol, methanol, 2-(isopentyloxy)ethanol, 2-propoxy-propanol (PnP), 2-(hexyloxy)ethanol; ethers and cyclic ethers, such as: tetrahydrofuran, dimethyl ether, diethyl ether, dibutyl ether, propylene glycol monomethyl ether (PGME), diethylene glycol butyl ether, dipropylene glycol methyl ether (DPGME), diethylene glycol monomethyl ether, and diethylene glycol monoethyl ether; glycols such as: diethylene glycol, dipropylene glycol; ketones and cyclic ketones, such as: acetone; esters, such as: propylene glycol methyl ether acetate (PGMEA), ethyl lactate (EL), methyl acetates, ethyl acetates, Butyl Carbitol Acetate (BCA), butyl acetate, ethylene glycol monobutyl ether acetate, diethylene glycol monobutyl ether acetate, diethylene glycol monoethyl ether acetate, butoxy ethyl acetate, ethyl acetate, 2-(2-butoxyethoxy)ethyl acetate; aromatics such as: benzene, toluene; and water and any combination or mixture thereof.

Dispersion of mixtures of $ZrO_2$ and $TiO_2$ nanocrystals at 50 wt % in a solvent such as PGMEA may have optical transmittance at 450 nm of 65%-60%, or 60%-55%, or 55%-50%, or 50%-45%, or 45%-40%, or 40%-35%, or 35%-30%, or 30%-25%, or 25%-20%, or 20%-15%, or 15%-10%, when measured in a cuvette with 1 cm path length.

Dispersion of mixtures of $ZrO_2$ and $TiO_2$ nanocrystals at 50 wt % in a solvent such as PGMEA may have optical transmittance at 500 nm 75%-70%, or 70%-65%, or 65%-60%, or 60%-55%, or 55%-50%, or 50%-45%, or 45%-40%, or 40%-35%, or 35%-30%, or 30%-25%, or 25%-20%, or 20%-15%, or 15%-10%, when measured in a cuvette with 1 cm path length.

Average Particle size as measured by Intensity of the capped titanium oxide nanocrystals dispersed 5% by weight in a solvent of the present disclosure may be <130 nm as measured by Dynamic Light Scattering. Preferably the particle size is between 1-4 nm, or 4-6 nm, or 6-8 nm, or 8-10 nm, or 10-12 nm, or 12-14 nm, or 14-16 nm, or 16-18 nm, or 18-20 nm, or 20-25 nm, 25-30, or 30-35 nm, or 30-35 nm, or 35-40 nm, or 40-45 nm, or 45-50 nm, or 50-55 nm, or 55-60 nm, or 60-65 nm, or 65-70 nm, or 70-75 nm, or 75-80 nm, or 80-85 nm, or 85-90 nm, or 90-95 nm, or 95-100 nm, or 100-105, or 105-110, or 110-115, or 115-120, or 120-125, or 125-130 as measured by DLS.

Average Particle size as measured by volume of the capped titanium oxide nanocrystals dispersed 5% by weight in a solvent of the present disclosure may be <130 nm as measured by Dynamic Light Scattering. Preferably the particle size is between 1-4 nm, or 4-6 nm, or 6-8 nm, or 8-10 nm, or 10-12 nm, or 12-14 nm, or 14-16 nm, or 16-18 nm, or 18-20 nm, or 20-25 nm, 25-30, or 30-35 nm, or 30-35 nm, or 35-40 nm, or 40-45 nm, or 45-50 nm, or 50-55 nm, or 55-60 nm, or 60-65 nm, or 65-70 nm, or 70-75 nm, or 75-80 nm, or 80-85 nm, or 85-90 nm, or 90-95 nm, or 95-100 nm, or 100-110 nm, or 110-120 nm, or 120-130 nm as measured by DLS.

D9999 as measured by volume of the capped titanium oxide nanocrystals dispersed 5% by weight in a solvent of the present disclosure may be <200 nm as measured by Dynamic Light Scattering. Preferably D9999 is <20, <30, <40, <50, <60, <70, <80, <90, <100, <110, <120, <130, <140, <150, <160, <170, <180, <190 nm as measured by DLS.

Formulation

The present disclosure provides a formulation comprising a mixture of capped nanocrystals, and organic coating materials, optionally a solvent.

The organic coating materials may include any one or a combination of any two or more of a monomer, oligomer, and/or polymer, a curing agent, an adhesion promoter, a wetting agent, a leveling agent, a dispersing agent, a viscosity modifier, and optionally an antioxidant. These and other ingredients may be employed in amounts known to those of ordinary skill so long as they do not seriously interfere with the optical application of the formulation described herein.

A formulation disclosed in this disclosure is a flowable liquid that may be used to make a film or a coating, or a layer or a lens or a free-standing structure.

The presently disclosed formulation may comprise nanocrystals of metal oxides, such as titanium oxide, or mixtures of zirconium oxide and titanium oxide, which have high bulk refractive indices, typically larger than 2, as well as exceptional transparency in the visible spectrum.

By combining the organic coating materials of the present disclosure with metal oxide nanocrystals as described herein, the presently described materials make it possible to produce easily processable thin film coatings with a high refractive index and high optical transparency. These films may be flexible.

In some embodiments, the capping agent of capped nanocrystals in the presently disclosed formulation may include methyltrimethoxysilane, n-propyltrimethoxysilane, n-propyltriethoxysilane, n-octyltrimethoxysilane, n-octyltriethoxysilane, phenytrimethoxysilane, dodecyltrimethoxysilane, m,p-ethylphenethyl trimethoxysilane, 2-[methoxy(polyethyleneoxy)propyl]-trimethoxysilane, methoxy(triethyleneoxy)propyltrimethoxysilane, 3-aminopropyltrimethoxysilane, 3-mercaptopropyltrimethoxysilane, 3-(methacryloyloxy)propyl trimethoxysilane, 3-(acryloyloxy)propyl trimethoxysilane, 3-isocyanatopropyltriethoxysilane, 3-isocyanatopropyltrimethoxysilane, and 3-glycidoxypropyltrimethoxysilane, vinyltrimethoxysilane, allyltrimethoxysilane, 1-hexenyltrimethoxysilane, 1-octenyltrimethoxysilane, (phenylaminomethyl) methyldimethoxysilane, N-phenylaminopropyltrimethoxysilane, 3-(4-pyridylethyl)thiopropyltrimethoxysilane, N-(3-trimethoxysilylpropyl)pyrrole, 2-(3-trimethoxysilylpropylthio) thiophene, (3-trimethoxysilylpropyly)diethylene triamine, 11-mercaptoundecyltrimethoxysilane, (2-diphenylphosphino) ethyldimethylethoxysilane, 2-(diphenylphosphino) ethyltriethoxysilane, 3-(diphenylphosphino) propyltriethoxysilane, heptanol, hexanol, octanol, benzyl alcohol, phenol, ethanol, propanol, butanol, oleylalcohol, dodecylalcohol, octadecanol and triethylene glycol monomethyl ether, octanoic acid, acetic acid, propionic acid, 2-[2-(2-methoxyethoxy) ethoxy] acetic acid, oleic acid, benzoic acid, stearic acid, trifluoroacetic acid, biphenyl-4-carboxylic acid, 2-(2-methoxyethoxy) acetic acid, methacrylic acid, mono-2-(Methacryloyloxy)ethyl succinate, 2-mercaptoethanol, 2-{2-[2-(2-mercaptoethoxy)ethoxy]ethoxy} ethanol, 2-(2-methoxyethoxy)ethanethiol, 1-octanethiol, sodium 2,3-dimercaptopropanesulfonate monohydrate, sodium dodecyl sulfate, dodecyl phosphonic acid, octylphosphonic acid, (11-mercaptoundecyl)phosphonic acid, (11-(acryloyloxy)undecyl)phosphonic acid, 11-methacryloyloxyundecylphosphonic acid, [2-[2-(2-methoxyethoxy)ethoxy]ethyl]phosphonic acid ethyl ester or any combination thereof.

The solvent of presently disclosed formulation may include alcohols, such as: benzyl alcohol, phenol, oleyl alcohol, butanol, propanol, isopropanol, ethanol, butoxy ethanol, butoxy propanol, methanol, 2-(isopentyloxy)ethanol, 2-propoxy-propanol (PnP), 2-(hexyloxy)ethanol; ethers and cyclic ethers, such as: tetrahydrofuran, dimethyl ether, diethyl ether, dibutyl ether, propylene glycol monomethyl ether (PGME), diethylene glycol butyl ether, dipropylene glycol methyl ether (DPGME), diethylene glycol monomethyl ether, and diethylene glycol monoethyl ether; glycols such as: diethylene glycol, dipropylene glycol; ketones and cyclic ketones, such as: acetone; esters, such as: propylene glycol methyl ether acetate (PGMEA), ethyl lactate (EL), methyl acetates, ethyl acetates, Butyl Carbitol Acetate (BCA), butyl acetate, ethylene glycol monobutyl ether acetate, diethylene glycol monobutyl ether acetate, diethylene glycol monoethyl ether acetate, butoxy ethyl acetate, ethyl acetate, 2-(2-butoxyethoxy)ethyl acetate; aromatics such as: benzene, toluene; and water and any combination or mixture thereof.

The solvent of the presently disclosed formulation may constitute less than 10% by weight of the total formulation, or 10%-20% by weight of the total formulation, or 20%-30% by weight of the total formulation, or 30%-40% by weight of the total formulation, or 40%-50% by weight of the total formulation, or 50%-60% by weight of the total formulation, or 60%-70% by weight of the total formulation, or 70%-80% by weight of the total formulation, or 80%-90% by weight of the total formulation.

The presently disclosed formulation may be analyzed using a TA instrument Q500 thermal gravimetric analyzer (TGA) to determine the inorganic solid content. The procedure is the same as described previously. The percent mass at 200° C. relative to the initial mass is regarded as total formulation weight minus solvent content, and the percent mass at 700° C. relative to the initial mass is regarded as inorganic portion of the formulation, i.e. solid content.

The inorganic solid content of the presently disclosed formulation may be 0-10% as measured by TGA, or 10-20% as measured by TGA, or 20-30% as measured by TGA, or 30-40% as measured by TGA, or 40-50% as measured by TGA, or 50-60% as measured by TGA, or 60-70% as measured by TGA, or 70-80% as measured by TGA, or 80-90% as measured by TGA, or 90-93% as measured by TGA. The organic coating materials of the presently disclosed formulation may include monomers, oligomers and/or polymers. The monomer, oligomer, and/or polymer of presently disclosed formulation may include acrylics. The monomer, oligomer, and/or polymer of presently disclosed formulation may include Bisphenol A Glycerolate Dimethacrylate, Biphenyl-2-ol, Ethoxylated, esters with acrylic acid (OPPEOA), Bisphenol A Ethoxylate diacrylates, Bisphenol A propoxylate diacrylate, Bisphenol F ethoxylate (2 EO/phenol) diacrylate, Bisphenol A glycerolate diacrylates, bisphenol A ethoxylate dimethacrylate, Ethoxylated (4) bisphenol A diacrylate (SR-601), Biphenol A ethoxylate diacrylate (SR-349), Tris(2-acryloyloxy)ethyl} isocyanurate, tricyclodecane dimethanol diacrylate, Tris(2-hydroxyethyl) isocyanurate triacrylate, cresol novolac epoxy acrylate (CN112C60), Benzyl methacrylate (BMA), benzyl acrylate, trimethylolpropane triacrylate (TMPTA), Trimethylolpropane ethoxylate (1 EO/OH) methyl ether diacrylate, 1,6-Hexanediol diacrylate (HDDA, SR238B), tri(ethyleneglycol) diacrylate, ethylene glycol diacrylate, Poly(ethylene glycol) diacrylate, Glycerol 1,3-diglycerolate diacrylate, Di(ethylene glycol) diacrylate, Tetra(ethylene glycol) diacrylate, Poly(propylene glycol) diacrylate, Tri(propylene glycol) diacrylate (SR306F), 1,6-Hexanediol ethoxylate diacrylate, Ethylene glycol phenyl ether acrylate, Biphenylmethyl acrylate (Miramer M1192), Tricyclodecane dimethanol diacrylate (SR833S), Polyester acrylate (CN2283, CN2281), Aliphatic urethane acrylate oligomer (CN2920), Epoxy acrylate oligomer (CN2003B), Tris(2-hydroxyethyl) isocyanurate Triacrylate (THEICTA—Miramer M370), 1,1'-Thiobis(2,3-epithiopropane), 2,2'-Thiobis-ethanethiol or any combination thereof.

The capped nanocrystals of the presently disclosed formulation may constitute less than 10% by weight of the monomer, oligomer, and/or polymer plus at least partially capped nanocrystals, or 10%-20% by weight of the monomer, oligomer, and/or polymer plus at least partially capped nanocrystals, or 20%-30% by weight of the monomer, oligomer, and/or polymer plus at least partially capped nanocrystals, or 30%-40% by weight of the monomer, oligomer, and/or polymer plus at least partially capped nanocrystals, or 40%-50% by weight of the monomer, oligomer, and/or polymer plus at least partially capped nanocrystals, or 50%-60% by weight of the monomer, oligomer, or polymer, or 60%-70% by weight of the monomer, oligomer, and/or polymer plus at least partially capped nanocrystals, or 70%-80% by weight of the monomer, oligomer, and/or polymer plus at least partially capped nanocrystals, or 80%-90% by weight of the monomer, oligomer, and/or polymer plus at least partially capped nanocrystals.

Curing agents of the presently disclosed formulation may comprise a photopolymerization initiator. Any photopolymerization initiator can be used as long as it is capable of producing an active species, such as a radical with light (UV) energy. Photopolymerization initiator curing agents may include amines such as Ebecryl® Pl 15, or benzophenone and its derivatives such as Ebecryl® P39, benzophenone, SpeedCure BEM (Lambson USA Ltd, Rutherford, CT, USA), 4,4'-Bis(diethylamino)benzophenone, or organophosphines such as diphenyl (2,4,6-trimethylbenzoyl)-phosphine oxide, or Irgacure® 184 (BASF USA, Florham Park, NJ, USA), or 2,4,6-Trimethylbenzoyl diphenylphosphine oxide (TPO), or Ethyl (2,4,6-trimethylbenzoyl) phenylphosphinate, 4-(Dimethylamino)benzophenone or others such as 2-isopropyl thoxanthone, Darocure 4265, Speedcure Xkm, methylbenzoylformate, Thioxanthen-9-one. The formulation may comprise a single photopolymerization initiator or any combination thereof.

Curing agents of the presently disclosed formulation may comprise a thermal free radical initiator. Suitable thermal free radical initiators include, but are not limited to, peroxide compounds and azo compounds. The peroxide curing agent may be selected from the commonly used organic peroxy curing agents, such as dicumyl peroxide, t-butyl perbenzoate, benzoyl peroxide, t-butyl peracetate, 1,1-di (t-butylperoxy)3,3,5-trimethyl cyclohexane, 2,5-dimethyl-2,5-di(t-butylperoxy)hexyne, and n-butyl-4,4-bis(t-butylperoxy valerate). The azo initiator may be selected from 2,2'-azobisisobutyronitrile (AIBN), V-40, V-59, and VA-061 (Wako Chemicals USA, North Chesterfield, VA, USA). A combination of more than one curing agent may be advantageous in certain circumstances known to one of ordinary skill.

The amount of curing agent of presently disclosed formulation may be present in an amount of less than 0.5% by weight of the monomer, oligomer, and/or polymer, or 0.5%-1% by weight of the monomer, oligomer, and/or polymer, or 1%-2% by weight of the monomer, oligomer, and/or polymer, or 2%-3% by weight of the monomer, oligomer, and/or polymer, or 3%-4% by weight of the monomer, oligomer, and/or polymer, or 4%-5% by weight of the monomer, oligomer, and/or polymer, or 5%-6% by weight of the monomer, oligomer, and/or polymer, or 6%-7% by weight of the monomer, oligomer, and/or polymer, or 7%-8% by weight of the monomer, oligomer, and/or polymer, or 8%-15% by weight of the monomer, oligomer, and/or polymer.

The adhesion promoter, if present may be selected from organometallic compounds, such as functional silanes, or from functionalized monomers and oligomers. Some functional silane adhesion promoters that are suitable contain amino or methacryloxy groups. Exemplary silane adhesion promoters include, but are not limited to 3-aminopropyltriethoxysilane, 3-[(methacryloyloxy)propyl] trimethoxysilane, ureidopropyltrimethoxysilane and trimethoxy [3-(methylamino)propyl]silane. Functionalized monomer and oligomer adhesion promoters include, but are not limited to, CN820, CN146 (Sartomer Americas, Exton, PA, USA), SR9051, SR9053 (Sartomer Americas, Exton, PA, USA), and Ebecryl 171 (Allnex USA Inc., Wallingford, CT, USA).

Adhesion promoters of the presently disclosed formulation may be present in an amount of less than 0.5% by weight of the monomer, oligomer, and/or polymer, or 0.5-1% by weight of the monomer, oligomer, and/or polymer, or 1-5% by weight of the monomer, oligomer, and/or polymer, or 5-10% by weight of the monomer, oligomer, and/or polymer, or 10-15% by weight of the monomer, oligomer, and/or polymer, or 15-30% by weight of the monomer, oligomer, and/or polymer.

A wetting agent may be present to reduce the surface tension of the formulation and thereby provide improved wetting property of the coating on substrates and sub-layers. Representative examples of suitable wetting agents include but are not limited to siloxane surfactants such as BYK-307, BYK-330 (BYK Chemie, GMBH) and fluro-surfactants such as Novec 4430, Novec 4432, and Novec 4434 (3M, St. Paul, MN, USA).

The amount of wetting agent of the presently disclosed formulation may be present in amount of less than 0.05% by weight of the total formulation, or 0.05-0.1% by weight of the total formulation, or 0.1-0.5% by weight of the total formulation, or 0.5-1% by weight of the total formulation, or 1-2% by weight of the total formulation, or 2-5% by weight of the total formulation.

A leveling agent may be used to improve the flowing property of the formulation to produce a more uniform surface of the dried coating. The leveling agent, if present, may be a polyacrylate compound such as BYK-352, BYK-353, BYK-356, and BYK-361N and an aralkyl modified polymethylalkylsiloxane, such as BYK-322, BYK-323, and BYK-350 (BYK Chemie, GMBH).

The amount of leveling agent of the presently disclosed formulation may be present in an amount of less than 0.05% by weight of the total formulation, or 0.05-0.1% by weight of the total formulation, or 0.1-0.5% by weight of the total formulation, or 0.5-1% by weight of the total formulation, or 1-2% by weight of the total formulation, or 2-5% by weight of the total formulation.

The dispersing agent may be a non-ionic dispersing agent, an anionic dispersing agent, or a combination thereof. Examples of the dispersing agent may include, without limitation, polyalkylene glycols and esters thereof, polyoxyalkylenes, polyhydric alcohol ester alkylene oxide addition products, alcohol alkylene oxide addition products, sulfonate esters, sulfonate salts, carboxylate esters, carboxylate salts, alkylamide alkylene oxide addition products, alkyl amines, and the like, and may be used singularly or as a mixture of two or more.

Commercially available examples of the dispersing agent may include without limitation DISPERBYK-101, DISPERBYK-130, DISPERBYK-140, DISPERBYK-160, DISPERBYK-161, DISPERBYK-162, DISPERBYK-163, DISPERBYK-164, DISPERBYK-165, DISPERBYK-166, DISPERBYK-170, DISPERBYK-171, DISPERBYK-182, DISPERBYK-2000, DISPERBYK-2001 (BYK Chemie, GMBH), Solsperse 32000, Solsperse 36000, Solsperse 28000, Solsperse 20000, Solsperse 41000, and Solsperse 45000 (Lubrizol, Wickliffe, OH, USA), fluorosurfactants such as FC-4430, FC-4432, FC-4434 (3M), Capstone FS-3100.

The amount of dispersing agent of the presently disclosed formulation may vary depending on the material being dispersed. The amount of dispersing agent may be less than 3% by weight of the material being dispersed, or 3-5% by weight of the material being dispersed, or 5-10% by weight of the material being dispersed, or 10-20% by weight of the material being dispersed, or 20-40% by weight of the material being dispersed, or 40-60% by weight of the material being dispersed, or 60-80% by weight of the material being dispersed, or 80-100% by weight of the material being dispersed, or 100-150% by weight of the material being dispersed.

Formulations of present disclosure may have a tunable viscosity, and/or a viscosity that can be controlled by one or more of the organic coating materials or solvents.

Formulations of the present disclosure may have a viscosity of about 1 cP to about 1,000 cP. Formulations of the present disclosure may have a viscosity of about 1 cP-2 cP, about 2 cP-5 cP, about 5 cP-10 cP, about 10 cP-15 cP, about 15 cP-20 cP, about 20 cP-25 cP, about 25 cP-30 cP, about 30 cP-40 cP, about 40 c-50 cP, about 50 cP-60 cP, about 60 cP-75 cP, about 75 cP-100 cP, about 100 cP-200 cP, about 200 cP-500 cP, 500 cP-1,000 cP when measured with a Brookfield RVDV 11+ cone and plate viscometer.

The viscosity of formulations of the present disclosure may be controlled. Parameters that can control viscosity of the formulation include, but are not limited to, the average length, and molecular weight, of a monomer, oligomer, and/or polymer; as well as the presence of a solvent and a concentration of a solvent; the presence of a thickener (i.e., a viscosity-modifying component) and a concentration of a thickener; a particle size of a component present in the formulation; and combinations thereof.

Antioxidant agents of the presently disclosed formulation may include at least one primary antioxidant. This primary antioxidant may be selected from sterically hindered phenols, such as Irganox 1010, Irganox 1076, SongNox® 1076, SongNox® 2450 or phenolic phosphites such as SongNox® 1680 or phosphines such as Irgaphos 168 (BASF USA, Florham Park, NJ, USA) or aromatic secondary amines or hindered amines such as SongLight® 6220 (Songwon Americas, Friendwood, TX, USA).

Formulations of the present disclosure may contain at least one secondary antioxidant. This secondary antioxidant is preferably chosen from compounds comprising at least one unit formed from a sulfur atom linked to two carbon atoms. Representative examples of the secondary antioxidant are di (t-butyl) hydroxyphenylamino bisoctylthiotriazine and Irganox PS800 (BASF USA, Florham Park, NJ, USA).

The amount of anti-oxidant of presently disclosed formulation may be less than 0.5% by weight of the total formulation, or 0.5%-1% by weight of the total formulation, or 1%-2% by weight of the total formulation, or 2%-3% by weight of the total formulation, or 3%-4% by weight of the total formulation, or 4%-5% by weight of the total formulation, or 5%-6% by weight of the total formulation, or 6%-7% by weight of the total formulation, or 7%-8% by weight of the total formulation.

The optical transmittance at 400 nm of the presently disclosed formulation with 50% PGMEA by weight of the total formulation as solvent, when measured in a cuvette with 1 cm path length using a Perkin Elmer Lambda 850 spectrophotometer, may be 99%-95%, or 95%-90%, or 90%-85%, or 85%-80%, 80%-75%, or 75%-70%, or 70%-65%, or 65%-60%, or 60%-55%, or 55%-50%, or 50%-45%, or 45%-40%, or 40%-35%, or 35%-30%, or 30%-25%, or 25%-20%, or 20%-15%, or 15%-10%.

The optical transmittance at 450 nm of the presently disclosed formulation with 50% PGMEA by weight of the total formulation as solvent, when measured in a cuvette with 1 cm path length using a Perkin Elmer Lambda 850 spectrophotometer, may be 99%-95%, or 95%-90%, or 90%-85%, or 85%-80%, 80%-75%, or 75%-70%, or 70%-65%, or 65%-60%, or 60%-55%, or 55%-50%, or 50%-45%, or 45%-40%, or 40%-35%, or 35%-30%, or 30%-25%, or 25%-20%, or 20%-15%, or 15%-10%.

The optical transmittance at 500 nm of the presently disclosed formulation with 50% PGMEA by weight of the total formulation as solvent, when measured in a cuvette with 1 cm path length using a Perkin Elmer Lambda 850 spectrophotometer, may be 99%-95%, or 95%-90%, or 90%-85%, or 85%-80%, 80%-75%, or 75%-70%, or 70%-65%, or 65%-60%, or 60%-55%, or 55%-50%, or 50%-45%, or 45%-40%, or 40%-35%, or 35%-30%, or 30%-25%, or 25%-20%, or 20%-15%, or 15%-10%.

The optical transmittance at 650 nm of the presently disclosed formulation with 50% PGMEA by weight of the total formulation as solvent, when measured in a cuvette with 1 cm path length using a Perkin Elmer Lambda 850 spectrophotometer, may be 99%-95%, or 95%-90%, or 90%-85%, or 85%-80%, 80%-75%, or 75%-70%, or 70%-65%, or 65%-60%, or 60%-55%, or 55%-50%, or 50%-45%, or 45%-40%, or 40%-35%, or 35%-30%, or 30%-25%, or 25%-20%, or 20%-15%, or 15%-10%.

In some embodiments, the present disclosure provides a nanocomposite formulation comprising the nanocrystal dispersion described herein and a monomer, oligomer, and/or polymer. In some embodiments, the present disclosure provides a nanocomposite formulation prepared by a method comprising mixing the nanocrystal dispersion described herein with a monomer, oligomer, and/or polymer. In some embodiments, the present disclosure provides a nanocomposite formulation comprising 1) at least partially capped $TiO_2$ nanocrystals; and 2) a monomer, oligomer, and/or polymer. In some embodiments, the present disclosure provides a nanocomposite formulation comprising 1) at least partially capped $TiO_2$ nanocrystals; 2) a monomer, oligomer, and/or polymer; and 3) a solvent. In some embodiments, the present disclosure provides a nanocomposite formulation comprising 1) at least partially capped $TiO_2$ nanocrystals; 2) a monomer, oligomer, and/or polymer; 3) a solvent; and 4) a curing agent. In some embodiments, the nanocomposite formulation further comprises one or more ingredients selected from a curing agent, an adhesion promoter, a wetting agent, a leveling agent, a dispersing agent, a viscosity modifier, and an antioxidant. Suitable at least partially capped $TiO_2$ nanocrystals, monomers, oligomers, and/or polymers, solvents, curing agents, adhesion promoters, wetting agents, leveling agents, dispersing agents, viscosity modifiers, and antioxidants include any of those described herein.

The at least partially capped $TiO_2$ nanocrystals in the nanocomposite formulation can include any of those described herein, for example, the $TiO_2$ nanocrystals herein which are at least partially capped with a capping agent selected from methyltrimethoxysilane, n-octyltrimethoxysilane, methoxy(triethyleneoxy)propyltrimethoxysilane, 3-mercaptopropyltrimethoxysilane, 3-(methacryloyloxy)propyl trimethoxysilane, 3-(acryloyloxy)propyl trimethoxysilane, vinyltrimethoxysilane, allyltrimethoxysilane, 3-glycidoxypropyltrimethoxysilane, 2-[2-(2-methoxyethoxy)ethoxy] acetic acid, oleic acid, and combinations thereof, preferably, the capping agent is selected from methyltrimethoxysilane, methoxy(triethyleneoxy)propyltrimethoxysilane, 3-(methacryloyloxy)propyl trimethoxysilane, 3-(acryloyloxy)propyl trimethoxysilane, 2-[2-(2-methoxyethoxy) ethoxy] acetic acid, and combinations thereof, and more preferably, the capping agent is selected from methoxy (triethyleneoxy)propyltrimethoxysilane, 3-(methacryloyloxy)propyl trimethoxysilane, 3-(acryloyloxy)propyl trimethoxysilane, and combinations thereof, for example, the capping agent is methoxy(triethyleneoxy)propyltrimethoxysilane. In some embodiments, the at least partially capped $TiO_2$ nanocrystals are in a substantially pure form, for example, which are free or substantially free of a capping agent used for capping $TiO_2$ nanocrystals and/or by-products from capping the $TiO_2$ nanocrystals. In some embodiments, the at least partially capped $TiO_2$ nanocrystals are present in an amount of greater than 30%, e.g., greater than 40%, greater than 50%, greater than 60%, greater than 70%, greater than 80%, or greater than 90%, such as about 40%, about 50%, about 60%, about 70%, about 80%, about 90%, or any ranges between the recited values, such as about 50-90%, about 40-80%, about 60-90%, etc., by weight in respect to the monomer, oligomer and/or polymer.

The monomer, oligomer and/or polymer for the nanocomposite formulation can include any of those described herein. In some embodiments, the monomer, oligomer and/or polymer is an acrylate, epoxy, or isocyanurate compound. For example, in some embodiments, the monomer, oligomer and/or polymer can be selected from Bisphenol A Glycerolate Dimethacrylate, esters with acrylic acid (OPPEOA), Bisphenol A Ethoxylate diacrylates, Bisphenol A propoxylate diacrylate, Bisphenol F ethoxylate (2 EO/phenol) diacrylate, Bisphenol A glycerolate diacrylates, bisphenol A ethoxylate dimethacrylate, Ethoxylated (4) bisphenol A diacrylate (SR-601), Biphenol A ethoxylate diacrylate (SR-349), Tris(2-acryloyloxy)ethyl} isocyanurate, tricyclodecane dimethanol diacrylate, Tris(2-hydroxyethyl) isocyanurate triacrylate, cresol novolac epoxy acrylate (CN112C60), Benzyl methacrylate (BMA), benzyl acrylate, trimethylolpropane triacrylate (TMPTA), Trimethylolpropane ethoxylate (1 EO/OH) methyl ether diacrylate, 1,6-Hexanediol diacrylate (HDDA, SR238B), tri(ethyleneglycol) diacrylate, ethylene glycol diacrylate, Poly(ethylene glycol) diacrylate, Glycerol 1,3-diglycerolate diacrylate, Di(ethylene glycol) diacrylate, and combinations thereof. In some preferred embodiments, the monomer, oligomer and/or polymer can be selected from Bisphenol A Glycerolate Dimethacrylate, esters with acrylic acid (OPPEOA), Bisphenol A Ethoxylate diacrylates, Bisphenol A propoxylate diacrylate, Bisphenol F ethoxylate (2 EO/phenol) diacrylate, Bisphenol A glycerolate diacrylates, bisphenol A ethoxylate dimethacrylate, Ethoxylated (4) bisphenol A diacrylate (SR-601), Biphenol A ethoxylate diacrylate (SR-349), cresol novolac epoxy acrylate (CN112C60), and combinations thereof, preferably, the monomer, oligomer and/or polymer is selected from Bisphenol A Glycerolate Dimethacrylate, esters with acrylic acid (OPPEOA), Ethoxylated (4) bisphenol A diacrylate (SR-601), Biphenol A ethoxylate diacrylate (SR-349), cresol novolac epoxy acrylate (CN112C60) and combinations thereof, for example, the monomer, oligomer and/or polymer is Bisphenol A Glycerolate Dimethacrylate.

The solvent for the nanocomposite formulations herein include any of those described herein. For example, in some embodiments, the solvent is selected from benzyl alcohol, Butyl Carbitol Acetate (BCA), butanol, propanol, isopropanol, ethanol, butoxy ethanol, butoxy propanol, methanol, tetrahydrofuran, diethyl ether, propylene glycol monomethyl ether (PGME), diethylene glycol butyl ether, dipropylene glycol methyl ether (DPGME), diethylene glycol monomethyl ether, diethylene glycol monoethyl ether, diethylene glycol, dipropylene glycol, acetone, propylene glycol methyl ether acetate (PGMEA), ethyl lactate (EL), ethyl acetate, butyl acetate, diethylene glycol monoethyl ether acetate, toluene, and combinations thereof, preferably, the solvent is selected from benzyl alcohol, Butyl Carbitol Acetate (BCA), propylene glycol monomethyl ether (PGME), diethylene glycol butyl ether, dipropylene glycol methyl ether (DPGME), propylene glycol methyl ether acetate (PGMEA), ethyl lactate (EL), ethyl acetate, toluene, and combinations thereof, more preferred, the solvent is selected from benzyl alcohol, Butyl Carbitol Acetate (BCA), diethylene glycol butyl ether, dipropylene glycol methyl ether (DPGME), propylene glycol methyl ether acetate (PGMEA), ethyl acetate, and combinations thereof, for example, the solvent is dipropylene glycol methyl ether (DPGME), propylene glycol methyl ether acetate (PGMEA), or a combination thereof.

The curing agent for the nanocomposite formulations herein, when present, is typically a photopolymerization initiator and/or a thermal free radical initiator. Suitable curing agents include those described herein. In some embodiments, the curing agent comprises one or more agents selected from Ebecryl® Pl 15, Ebecryl® P39, benzophenone, SpeedCure BEM, 4,4'-Bis(diethylamino)benzophenone, diphenyl (2,4,6-trimethylbenzoyl)-phosphine oxide, Irgacure® 184, 2,4,6-Trimethylbenzoyl diphenylphosphine oxide (TPO), Ethyl (2,4,6-trimethylbenzoyl) phenylphosphinate, 4-(Dimethylamino)benzophenone, 2-isopropyl thoxanthone, Darocure 4265, Speedcure Xkm, methylbenzoylformate, Thioxanthen-9-one, dicumyl peroxide, t-butyl perbenzoate, benzoyl peroxide, t-butyl peracetate, 1,1-di (t butylperoxy)3,3,5-trimethyl cyclohexane, 2,5-dimethyl-2,5-di(t-butylperoxy)hexyne, 2,2'-azobisisobutyronitrile, and combinations thereof. More preferably, the curing agent comprises one or more agents selected from Ebecryl® Pl 15, Ebecryl® P39, benzophenone, diphenyl (2,4,6-trimethylbenzoyl)-phosphine oxide, Irgacure® 184, benzoyl peroxide, and 2,2'-azobisisobutyronitrile. In some embodiments, the nanocomposite formulation can further comprise at least one adhesion promoter described herein, preferably, those selected from 3-aminopropyltriethoxysilane, 3-[(methacryloyloxy)propyl] trimethoxysilane, ureidopropyltrimethoxysilane, trimethoxy [3-(methylamino)propyl]silane, CN820, CN146, and combinations thereof. In some embodiments, the nanocomposite formulation can further comprise at least one wetting agent described herein, preferably, at least one wetting agent selected from BYK-307, BYK-330, Novec 4430, Novec 4432, Novec 4434, and combinations thereof. In some embodiments, the nanocomposite formulation can further comprise at least one levelling agent described herein, preferably, at least one levelling agent selected from BYK-352, BYK-353, BYK-356, BYK-361N, BYK-322, BYK-323, BYK-350 and combinations thereof. In some embodiments, the nanocomposite formulation can further comprise at least one one dispersing agent described herein, preferably, at least one dispersing agent selected from DISPERBYK-101, DISPERBYK-130, DISPERBYK-140, DISPERBYK-160, DISPERBYK-161, DISPERBYK-162, DISPERBYK-163, DISPERBYK-164, DISPERBYK-165, DISPERBYK-166, DISPERBYK-170, DISPERBYK-171, DISPERBYK-182, DISPERBYK-2000, DISPERBYK-2001, Solsperse 32000, Solsperse 36000, Solsperse 28000, Solsperse 20000, Solsperse 41000, and Solsperse 45000 FC-4430, FC-4432, FC-4434 (3M), Capstone FS-3100, and combinations thereof. In some embodiments, the nanocomposite formulation can further comprise at least one anti-oxidant agent described herein, preferably, one anti-oxidant agent selected from Irganox 1010, Irganox 1076, SongNox® 1076, SongNox® 2450, SongNox® 1680, Irgaphos 168, SongLight® 6220, and combinations thereof.

The nanocomposite formulation described herein typically can have an average particle size of the $TiO_2$ nanocrystals in the formulation in the range of 1-50 nm, such as 4-20 nm, or 10-20 nm. In some embodiments, the D9999 of the $TiO_2$ nanocrystals in the formulation, as determined by DLS, is in the range of 20-500 nm, preferably, less than 200 nm. The at least partially capped $TiO_2$ nanocrystals in the formulation are typically uniformly dispersed without agglomeration or settling of the nanocrystals as observed by TGA. The formulation is typically also stable for more than two weeks, e.g., three weeks, or four weeks, or more than three weeks, more than four weeks, showing less than 5% (e.g., less than 3%, less than 2%, or less than 1%, such as about 0.1%, about 0.5%, about 1%, about 2%, about 3%, or any ranges between the recited values, such as about 0.01-1%, about 0.1-1%, about 0.1-5%, about 0.5-2%, about 0.5-3%, about 0.5-1%, etc.) change in transmittance at 400 nm when stored at room temperature in dark.

In some embodiments, the nanocomposite formulation described herein can also have a tunable viscosity in the range of about 1 cp to about 1000 cp, such as about 1 cP-2 cP, about 2 cP-5 cP, about 5 cP-10 cP, about 10 cP-15 cP, about 15 cP-20 cP, about 20 cP-25 cP, about 25 cP-30 cP, about 30 cP-40 cP, about 40 c-50 cP, about 50 cP-60 cP, about 60 cP-75 cP, about 75 cP-100 cP, about 100 cP-200 cP, about 200 cP-500 cP, or about 500 cP-1,000 cP when measured with a Brookfield RVDV II+ cone and plate viscometer.

Scatterer Containing Formulation

The formulation as described herein (e.g., any of the nanocomposite formulations described herein) may include scatterer particles wherein the scatterer particles may include particles of several hundred nanometers such as titania particles, polymer fillers or beads, or silica particles or controlled agglomeration of $ZrO_2$ nanocrystals.

The scatterers in the formulation as described herein may have an average size in the range of 50-100 nm, or 100-200 nm, or 200-300 nm, or 300-400 nm, or 400-500 nm, or 500-600 nm, or 600-700 nm, or 700-800 nm, or 800-900 nm or 900 nm to 1 µm, or 1-1.5 µm, or 1.5-2 µm.

The scatterers in the formulation as described herein may be in an amount of 0.1-40% by weight of the total weight of the formulation.

The scatterers in the formulation as described herein may have a higher refractive index than the refractive index of the binder formulation.

The scatterers in the formulation as described herein may have a lower refractive index than the refractive index of the binder formulation.

The formulation as described herein comprising the scatterer particles may have a viscosity of less than 5 cPs, or 5 cPs-50 cPs, or 50 cPs-200 cPs, or 200 cPs-400 cPs, or 400 cPs-650 cPs, or 650 cPs-1000 cPs, when measured at 25° C. with a Brookfield RVDV II+ cone and plate viscometer.

The formulation as described herein comprising the scatterer particles may have a storage stability for at least 1 week, or 2 weeks, or 3 weeks, or 4 weeks, or 3 months, or at least 5 months, or at least 6 months, or at least 7 months, or at least 8 months, or at least 9 months, or at least 10 months, or at least 11 months, or at least 1 year, or at least 2 years or at least 3 years, when the scattering formulation is stored at a temperature in the range of 18-25° C. without deliberate shaking or mixing of the scattering formulation.

The formulation as described herein comprising the scatterer particles may have a storage stability and the weight percentage of scattering particles in a sample from the upper third of a stored sample of the scattering formulation changes by less than 1%, or 1-2%, or 2-3%, or 3-4%, or 4-5%, or 5-7%, or 7-10%, or 10-15%, or 15-20%, or 20-25%, or 25-30%, or 30-35% over the storage time.

A Method of Making a Film

The present disclosure provides a method of making a nanocomposite. Said nanocomposite may be a film or a coating, or a layer or a lens or a free-standing structure that is obtained by curing the liquid formulation described herein thermally or by UV exposure.

The nanocomposite coating or film described herein wherein the at least partially capped nanocrystals are made by a process involving mixing nanocrystals in a capping solvent with at least one capping agent; wherein the at least partially capped nanocrystals may be separated from the capping solvent; wherein the nanocrystals may be titanium oxide, or mixtures of zirconium oxide and titanium oxide nanocrystals; wherein said partially capped nanocrystals are mixed with a solvent, monomer, oligomer, polymer or combinations thereof, wherein said formulation may further include a curing agent, an antioxidant, a crosslinking agent, a thickener, an adhesion promoter, a wetting agent, a leveling agent, a dispersing agent, a plasticizer, or a flexibilizer.

The presently disclosed method of making a nanocomposite coating or film using the presently disclosed formulation may be deposited on a substrate comprising or containing glass, SiC, Poly (3,4-ethylenedioxythiophene) (PEDOT), poly (styrene sulfonate) (PSS) doped PEDOT, polyethylene terephthalate (PET), polyethylene naphthalene (PEN), or doped poly(4,4-dioctylcyclopentadithiophene), or polyimide.

The presently disclosed method of making a nanocomposite coating or film using the presently disclosed formulation may comprise spin coating, slot-die coating, slit-coating, screen-printing, ink-jet printing, dip coating, drawbar coating, roll-to-roll printing, nano-imprinting, photopatterning, spray coating, imprint lithography, and any combination thereof.

The presently disclosed method of making a nanocomposite coating or film using the presently disclosed formulation may be applied to a substrate and cured thermally by heating the coating or film on a hot plate at 50 C-100 C or 100 C-150 C or 150 C-200C for 5-10 min or 10-20 min or 20-30 min or 30-40 min or 40-50 min or 50-60 min or 60-70 min or 70-80 min or 80-90 min or 90-100 min or 100-120 min.

The presently disclosed method of making a nanocomposite coating or film using the presently disclosed formulation may be applied to a substrate and cured by exposure to UV of wavelength between 220-230 nm or 230-240 nm or 240-250 nm or 250-260 nm or 260-270 nm or 270-280 nm or 280-290 nm or 290-300 nm or 300-310 nm or 310-320 nm or 320-330 nm or 330-340 nm or 340-350 nm or 350-360 nm or 360-370 nm or 370-380 nm or 380-390 nm or 390-400 nm or 400-410 nm or 410-420 nm at a dosage of less than 1 $J/cm^2$ or 1-2 $J/cm^2$ or 2-3 $J/cm^2$ or 3-4 $J/cm^2$ or 4-5 $J/cm^2$ or 5-6 $J/cm^2$ or 6-7 $J/cm^2$ or 7-8 $J/cm^2$ or 8-9 $J/cm^2$ or 9-10 $J/cm^2$.

In some embodiments, the present disclosure provides a method of coating a substrate, comprising applying the nanocomposite formulation described herein to the surface of the substrate. In some embodiments, the substrate is a glass substrate, ceramic substrate, metal substrate, and/or a plastic substrate. In some embodiments, the substrate can comprise glass, SiC, Poly (3,4-ethylenedioxythiophene) (PEDOT), poly (styrene sulfonate) (PSS) doped PEDOT, polyethylene terephthalate (PET), polyethylene naphthalene (PEN), doped poly(4,4-dioctylcyclopentadithiophene), or polyimide, or a combination thereof. In some embodiments, the nanocomposite formulation is applied to the surface by spin coating, spraying, dipping, screen printing, rolling, painting, printing, ink jet printing, dispensing, roll to roll coating, depositing by evaporation and/or vapor deposition, preferably by spin coating, inkjet printing, imprinting, nano-imprinting, photopatterning, roll to roll coating, slot-die coating, and/or screen-printing. In some embodiments, the method further comprising curing the nanocomposite formulation, e.g., by light such as UV light, or heat treatment described herein.

The coated substrate prepared by the method described herein is also novel compositions of the present disclosure. In some embodiments, the present disclosure also provides a device comprising the coated substrate prepared by the method described herein. In some embodiments, the device is an LED, mini-LED, microLED, organic LED (OLED), Quantum LED (QLED), touch screen, display, sensor, CMOS sensor, flexible electronics, printed electronics, augmented reality, virtual reality, mixed reality, wave guides, diffraction gratings or a solar cell device. In some embodiments, the device is a device, such as a light emitting diode device, comprising a lens structure as an internal light extraction layer, wherein the internal light extraction layer comprises the coated substrate prepared by the method described herein.

Film or Coating

The present disclosure provides a nanocomposite coating or film made using the presently disclosed method of making a nanocomposite using the formulation described herein comprises a mixture of a polymer matrix, a curing agent, and capped nanocrystals wherein said capped nanocrystals are present in the coating or film in an amount of greater than 5% by weight of the coating or film.

The nanocomposite coating or film in the present disclosure may comprise nanocrystals of metal oxides, such as titanium oxide, or mixtures of zirconium oxide and titanium oxide.

The film thickness of presently disclosed nanocomposite coating or film made using the presently disclosed method of making a nanocomposite using the formulation described herein may range from 40 nanometers to 100 micrometers.

The films of the presently disclosed nanocomposite coating or film made using the presently disclosed method of making a nanocomposite using the formulation described may possess a refractive index of 1.60-1.62, or 1.62-1.64, 1.64-1.66, or 1.66-1.68, or 1.68-1.70, or 1.70-1.72, or 1.72-1.74, or 1.76-1.78, or 1.78-1.80, or 1.80-1.82, or 1.82-1.84, or 1.84-1.86, or 1.86-1.88, or 1.88-1.90, or 1.90-1.92, or 1.92-1.94, or 1.94-1.96, or 1.96-1.98, or 1.98-2.00, or 2.00-2.02, or 2.02-2.04, or 2.04-2.06, or 2.06-2.08, or 2.08-2.10 at 448 nm, and may possess a refractive index of 1.60-1.62, or 1.62-1.64, 1.64-1.66, or 1.66-1.68, or 1.68-1.70, or 1.70-1.72, or 1.72-1.74, or 1.76-1.78, or 1.78-1.80, or 1.80-1.82, or 1.82-1.84, or 1.84-1.86, or 1.86-1.88, or 1.88-1.90, or 1.90-1.92, or 1.92-1.94, or 1.94-1.96, or 1.96-1.98, or 1.98-2.00, or 2.00-2.02, or 2.02-2.04, or 2.04-2.06, or 2.06-2.08, or 2.08-2.10 at 635 nm, as measured using a Prism Coupler of a film with <5 um thickness.

The films of the presently disclosed nanocomposite coating or film made using the presently disclosed method of making a nanocomposite using the formulation described herein may possess a root mean square (RMS) surface roughness of 3 nm-10 nm, or 2 nm-3 nm, or 1 nm-2 nm, or 0.6 nm-1 nm, or 0.1 nm-0.6 nm. The RMS surface roughness may be measured using an Atomic Force Microscopy (AFM) over a 5 micron by 5-micron square.

The films of the presently disclosed nanocomposite coating or film made using the presently disclosed method of making a nanocomposite using the formulation described herein may possess high optical (400-800 nm) transmittance of 99.9%-99%, or 99%-98%, or 98%-97%, or 97%-96%, or 96%-95%, or 95%-90%, or 90%-85%, or 85%-80%, 80%-75%, or 75%-70%, or 70%-65%, or 65%-60%, or 60%-55%, or 55%-50%, or 50%-45%, or 45%-40%, or 40%-35%, or 35%-30%, or 30%-25%, or 25%-20%, or 20%-15%, or 15%-10% for films that are less than 5 microns thick.

The transmittance of a film according to the present disclosure may be normal transmittance measured with a Perkin-Elmer UV-Vis Lambda 850 spectrophotometer, wherein the film is coated on an optically transparent substrate, such as fused silica or glass substrates, and a blank substrate of the same type and thickness is used as a reference. The ripples in the spectrum are the result of interference of incoming light and reflected light, it usually is an indication of high film quality, i.e. high smoothness, high uniformity, and high transparency.

The films of the presently disclosed nanocomposite coating or film made using the presently disclosed method of making a nanocomposite using the formulation described herein may possess a percent haze of less than 0.5% or 0.5-1.0% for films that are less than 5 microns. The % haze of a film according to the present disclosure is measured using HunterLab's Vista Hazemeter, wherein the film is coated on an optically transparent substrate, such as fused silica or glass substrates.

The films of the presently disclosed nanocomposite coating or film made using the presently disclosed method of making a nanocomposite using the formulation described herein may additionally demonstrate thermal stability at temperatures less than 150 C. The thermal stability may be measured by subjecting the nanocomposite coating or film at designated temperature in air, nitrogen, or under vacuum for 5 minutes or longer, or 10 minute or longer, or 30 minutes or longer, or 60 minutes or longer, or 120 minutes or longer, without out visually observable coloration, cracking, or delamination.

The thermal stability may be measured by subjecting the coating or film to 150° C. in vacuum or nitrogen for 120 minutes, the averaged change of optical transmittance from 400 nm to 800 nm is 5%-10%, or 2%-5% or 1%-2%, or 0.10%-10% or 0.0010%-0.10%, when normalized to a 1 μm film. The normalization may be carried out by converting the transmittance to absorbance, dividing the absorbance by the film thickness in micrometer, and then converting the result back to transmittance for a 1 μm film.

The films of the presently disclosed nanocomposite coating or film made using the presently disclosed method of making a nanocomposite using the formulation described herein wherein the amount of the at least partially capped nanocrystals in the film is 10%-20%, or 20%-30%, or 30%-40%, or 40%-50%, or 50%-60%, or 60%-70%, or 70%-75%, or 75%-80%, or 80%-85%, or 85%-90%, or 90%-93% by weight of the nanocomposite film.

The films of the presently disclosed nanocomposite coating or film made using the presently disclosed method of making a nanocomposite using the formulation described herein wherein the amount of the at least partially capped nanocrystals in the film is 10%-20%, or 20%-30%, or 30%-40%, or 40%-50%, or 50%-60%, or 60%-70%, or 70%-75%, or 75%-80%, or 80%-85%, or 85%-90%, or 90%-93% by weight of the nanocomposite binder.

In some embodiments, the present disclosure provides a nanocomposite film comprising at least partially capped $TiO_2$ nanocrystals and at least one monomer, oligomer and/or polymer, wherein the at least partially capped nanocrystals are present in an amount greater than 50%, such as greater than 60%, greater than 70%, greater than 80%, or greater than 90%, such as about 55%, about 60%, about 70%, about 80%, about 90%, or any ranges between the recited values, such as about 55-90%, about 60-90%, about 70-90%, by weight of the nanocomposite. The at least partially capped $TiO_2$ nanocrystals can be any of those described herein. For example, in some embodiments, the film can include the $TiO_2$ nanocrystals herein that are at least partially capped with a capping agent selected from methyltrimethoxysilane, n-octyltrimethoxysilane, methoxy(triethyleneoxy)propyltrimethoxysilane, 3-mercaptopropyltrimethoxysilane, 3-(methacryloyloxy)propyl trimethoxysilane, 3-(acryloyloxy)propyl trimethoxysilane, vinyltrimethoxysilane, allyltrimethoxysilane, 3-glycidoxypropyltrimethoxysilane, 2-[2-(2-methoxyethoxy) ethoxy] acetic acid, oleic acid, and combinations thereof, preferably, the capping agent is selected from methyltrimethoxysilane, methoxy(triethyleneoxy)propyltrimethoxysilane, 3-(methacryloyloxy)propyl trimethoxysilane, 3-(acryloyloxy)propyl trimethoxysilane, 2-[2-(2-methoxyethoxy) ethoxy]acetic acid, and combinations thereof, and more preferably, the capping agent is selected from methoxy(triethyleneoxy) propyltrimethoxysilane, 3-(methacryloyloxy)propyl trimethoxysilane, 3-(acryloyloxy)propyl trimethoxysilane, and combinations thereof, for example, the capping agent is methoxy(triethyleneoxy)propyltrimethoxysilane. In some embodiments, the at least partially capped $TiO_2$ nanocrystals are in a substantially pure form, for example, free or substantially free of a capping agent used for capping $TiO_2$ nanocrystals and by-products from capping the $TiO_2$ nanocrystals. The monomer, oligomer and/or polymer can also be any of those described herein, such as an acrylate, epoxy, or isocyanurate compound. In some preferred embodiments, the monomer, oligomer and/or polymer can be selected from Bisphenol A Glycerolate Dimethacrylate, esters with acrylic acid (OPPEOA), Bisphenol A Ethoxylate diacrylates, Bisphenol A propoxylate diacrylate, Bisphenol F ethoxylate (2 EO/phenol) diacrylate, Bisphenol A glycerolate diacrylates, bisphenol A ethoxylate dimethacrylate, Ethoxylated (4) bisphenol A diacrylate (SR-601), Biphenol A ethoxylate diacrylate (SR-349), Tris(2-acryloyloxy)ethyl} isocyanurate, tricyclodecane dimethanol diacrylate, Tris(2-hydroxyethyl) isocyanurate triacrylate, cresol novolac epoxy acrylate (CN112C60), Benzyl methacrylate (BMA), benzyl acrylate, trimethylolpropane triacrylate (TMPTA), Trimethylolpropane ethoxylate (1 EO/OH) methyl ether diacrylate, 1,6-Hexanediol diacrylate (HDDA, SR238B), tri(ethyleneglycol) diacrylate, ethylene glycol diacrylate, Poly(ethylene glycol) diacrylate, Glycerol 1,3-diglycerolate diacrylate, Di(ethylene glycol) diacrylate, and combinations thereof. In some embodiments, the monomer, oligomer and/or polymer is selected from Bisphenol A Glycerolate Dimethacrylate, esters with acrylic acid (OPPEOA), Bisphenol A Ethoxylate diacrylates, Bisphenol A propoxylate diacrylate, Bisphenol F ethoxylate (2 EO/phenol) diacrylate, Bisphenol A glycerolate diacrylates, bisphenol A ethoxylate dimethacrylate, Ethoxylated (4) bisphenol A diacrylate (SR-601), Biphenol A ethoxylate diacrylate (SR-349), cresol novolac epoxy acrylate (CN112C60), and combinations thereof, preferably, the monomer, oligomer and/or polymer is selected from Bisphenol A Glycerolate Dimethacrylate, esters with acrylic acid (OPPEOA), Ethoxylated (4) bisphenol A diacrylate (SR-601), Biphenol A ethoxylate diacrylate (SR-349), cresol novolac epoxy acrylate (CN112C60) and combinations thereof, for example, the monomer, oligomer and/or polymer is Bisphenol A Glycerolate Dimethacrylate.

The nanocomposite film herein can typically have an average particle size of $TiO_2$ nanocrystals when measured as a 5% nanocrystal dispersion in PGMEA with DLS in the range of 1-5 nm, 5-10 nm, 10-15 nm, 15-20 nm, 20-30 nm, 30-40 nm or 40-50 nm and preferably with a D9999 less than 100 nm.

In some embodiments, the nanocomposite film herein can be characterized in that the % transmittance of the film with a thickness of 1 micron is greater than 80%, e.g., greater than 85%, greater than 90%, greater than 95%, greater than 97%, greater than 98%, greater than 99%, such as about 85%, about 90%, about 95%, about 97%, about 98%, about 99%, about 99.5%, or any ranges between the recited values, such as about 90-99%, at wavelength of 400 nm and greater than 80%, e.g., greater than 85%, greater than 90%, greater than 95%, greater than 97%, greater than 98%, greater than 99%, such as about 85%, about 90%, about 95%, about 97%, about 98%, about 99%, about 99.5%, or any ranges between the recited values, such as about 90-99%, at wavelength of 500 nm and greater than 80%, e.g., greater than 85%, greater than 90%, greater than 95%, greater than 97%, greater than 98%, greater than 99%, such as about 85%, about 90%, about 95%, about 97%, about 98%, about 99%, about 99.5%, or any ranges between the recited values, such as about 90-99%, at wavelength of 600 nm, and greater than 80%, e.g., greater than 85%, greater than 90%, greater than 95%, greater than 97%, greater than 98%, greater than 99%, such as about 85%, about 90%, about 95%, about 97%, about 98%, about 99%, about 99.5%, or any ranges between the recited values, such as about 90-99%, at wavelength of 800 nm. In some embodiments, the nanocomposite film herein can also have a refractive index of 1.60-1.62, or 1.62-1.64, 1.64-1.66, or 1.66-1.68, or 1.68-1.70, or 1.70-1.72, or 1.72-1.74, or 1.76-1.78, or 1.78-1.80, or 1.80-1.82, or 1.82-1.84, or 1.84-1.86, or 1.86-1.88, or 1.88-1.90, or 1.90-1.92, or 1.92-1.94, or 1.94-1.96, or 1.96-1.98, or 1.98-2.00, or 2.00-2.02, or 2.02-2.04, or 2.04-2.06, or 2.06-2.08, or 2.08-2.10 at 448 nm and may possess a refractive index of 1.60-1.62, or 1.62-1.64, 1.64-1.66, or 1.66-1.68, or 1.68-1.70, or 1.70-1.72, or 1.72-1.74, or 1.76-1.78, or 1.78-1.80, or 1.80-1.82, or 1.82-1.84, or 1.84-1.86, or 1.86-1.88, or 1.88-1.90, or 1.90-1.92, or 1.92-1.94, or 1.94-1.96, or 1.96-1.98, or 1.98-2.00, or 2.00-2.02, or 2.02-2.04, or 2.04-2.06, or 2.06-2.08, or 2.08-2.10 at 635 nm, as measured using a Prism Coupler of a film with <5 um thickness. In some embodiments, the nanocomposite film herein can also have a hardness of greater than 50 MPa, greater than 100 MPa, or greater than 200 MPa, or greater than 300 MPa or greater than 400 MPa, such as about 55 Mpa, about 100 MPa, about 200 MPa, about 300 MPa, about 400 MPa, about 500 MPa, or any ranges between the recited values, such as about 50-500 MPa or about 100-400 MPa, as measured by nanoindentation. In some embodiments, the nanocomposite film herein can also be characterized in that the % absorbance of the film with a thickness of 1 micron is less than 0.1%, less than 0.05% or less than 0.01% at wavelength of 450 nm as measured by an integrating sphere. In some embodiments, the nanocomposite film herein can also have a surface roughness of less than 1 nm Ra as measured by AFM for 5-micron×5-micron area. In some embodiments, the nanocomposite film herein can also be characterized in that the haze of the nanocomposite film is less than 0.1%, or less than 0.2%, or less than 0.3%, or less than 0.4%, or less than 0.5%, or less than 1% (e.g., about 0.01% to about 0.1%, about 0.1% to about 0.2%, about 0.10% to about 0.5%, about 0.2% to about 0.5%, or about 0.1% to about 1%) and b* is less than 1, or less than 0.5 or less than 0.1 (e.g., about 0.01 to about 0.1, about 0.1 to about 0.5, about 0.1 to about 0.2, or about 0.1 to about 1) as measured by a hazemeter. In some embodiments, the nanocomposite film herein can also be characterized in that the haze of the nanocomposite film is less than 0.1%, or less than 0.2%, or less than 0.3%, or less than 0.4%, or less than 0.5%, or less than 1%, and wherein the at least partially capped nanocrystals are uniformly dispersed without agglomeration in the film to achieve uniform RI distribution as observed by uniform particle distribution by TEM, SEM or EDX images.

The nanocomposite film herein can be typically prepared by a method comprising mixing the respective ingredients of a nanocomposite formulation and optionally curing the nanocomposite formulation. In some embodiments, the method comprises mixing the at least partially capped $TiO_2$ nanocrystals and at least one monomer, oligomer and/or polymer to provide a nanocomposite formulation, and optionally curing the nanocomposite formulation to provide the nanocomposite film. In some embodiments, the method comprises mixing the at least partially capped $TiO_2$ nanocrystals and at least one monomer, oligomer and/or polymer in a solvent to provide a nanocomposite formulation, and optionally curing the nanocomposite formulation to provide the nanocomposite film. In some embodiments, the method comprises mixing the at least partially capped $TiO_2$ nanocrystals, a curing agent, and at least one monomer, oligomer and/or polymer to provide a nanocomposite formulation, and optionally curing the nanocomposite formulation to provide the nanocomposite film. In some embodiments, the method comprises mixing the at least partially capped $TiO_2$ nanocrystals, a curing agent, and at least one monomer, oligomer and/or polymer in a solvent to provide a nanocomposite formulation, and optionally curing the nanocomposite formulation to provide the nanocomposite film. The at least partially capped $TiO_2$ nanocrystals for the nanocomposite film preparation can be typically prepared according to any one of the methods described herein. In some embodiments, the at least partially capped $TiO_2$ nanocrystals can be prepared from $TiO_2$ nanocrystals prepared according to any one of the methods described herein.

The nanocomposite film herein can be used in various devices. In some embodiments, the present disclosure can include any of the nanocomposite films herein. In some embodiments, the device is an optoelectronic device, photovoltaic device, catalysis device, fuel cell, battery, smart window, sensor, CMOS sensor, LED, mini-LED, microLED, organic LED (OLED), Quantum LED (QLED), touch screen, display, flexible electronic device, printed electronic device, sensor, augmented reality, virtual reality, mixed reality, wave guide, diffraction grating or a solar cell device. In some embodiments, the device is a device, such as a light emitting diode device, comprising lens structure as an internal light extraction layer, wherein the internal light extraction layer comprises any of the nanocomposite films herein.

Scatterer Containing Nanocomposite

The film thickness of the presently disclosed nanocomposite coating or film made using the presently disclosed method of making a nanocomposite using the formulation described herein comprising the scatterers may range from 50 nanometers to 100 micrometers.

The films of the presently disclosed nanocomposite coating or film made using the presently disclosed method of making a nanocomposite using the formulation described herein comprising the scatterers may have a refractive index 1.60-1.62, or 1.62-1.64, 1.64-1.66, or 1.66-1.68, or 1.68-1.70, or 1.70-1.72, or 1.72-1.74, or 1.76-1.78, or 1.78-1.80, or 1.80-1.82, or 1.82-1.84, or 1.84-1.86, or 1.86-1.88, or 1.88-1.90, or 1.90-1.92, or 1.92-1.94, or 1.94-1.96, or 1.96-1.98, or 1.98-2.00, or 2.00-2.02, or 2.02-2.04, or 2.04-2.06, or 2.06-2.08, or 2.08-2.10 at 448 nm and may possess a refractive index of 1.60-1.62, or 1.62-1.64, 1.64-1.66, or 1.66-1.68, or 1.68-1.70, or 1.70-1.72, or 1.72-1.74, or 1.76-1.78, or 1.78-1.80, or 1.80-1.82, or 1.82-1.84, or 1.84-1.86, or 1.86-1.88, or 1.88-1.90, or 1.90-1.92, or 1.92-1.94, or 1.94-1.96, or 1.96-1.98, or 1.98-2.00, or 2.00-2.02, or 2.02-2.04, or 2.04-2.06, or 2.06-2.08, or 2.08-2.10 at 635 nm as measured using a Prism Coupler of a film with <5 um thickness.

The films of the presently disclosed nanocomposite coating or film made using the presently disclosed method of making a nanocomposite using the formulation described herein comprising the scatterers wherein a film of at least 1-2 micrometer thickness has a surface roughness of 5-4 nm, or 4-3 nm, or 3-2 nm, or 2-1 nm, or 1-0.5 nm.

The films of the presently disclosed nanocomposite coating or film made using the presently disclosed method of making a nanocomposite using the formulation described herein comprising the scatterers may have a normal transmittance of 99.99%-99%, or 99%-98%, or 98%-97%, or 97%-96%, or 96%-95%, or 95%-90%, or 90%-85%, or 85%-80%, 80%-75%, or 75%-70%, or 70%-65%, or 65%-60%, or 60%-55%, or 55%-50%, or 50%-45%, or 45%-40%, or 40%-35%, or 35%-30%, or 30%-25%, or 25%-20%, or 20%-15%, or 15%-10% for films that are less than 5 microns thick, when measured at a wavelength of 400 nm.

The films of the presently disclosed nanocomposite coating or film made using the presently disclosed method of making a nanocomposite using the formulation described herein comprising the scatterers may have a normal transmittance of 99.99%-99%, or 99%-98%, or 98%-97%, or 97%-96%, or 96%-95%, or 95%-90%, or 90%-85%, or 85%-80%, 80%-75%, or 75%-70%, or 70%-65%, or 65%-60%, or 60%-55%, or 55%-50%, or 50%-45%, or 45%-40%, or 40%-35%, or 35%-30%, or 30%-25%, or 25%-20%, or 20%-15%, or 15%-10% for films that are less than 5 microns thick, when measured at a wavelength of 500 nm.

The films of the presently disclosed nanocomposite coating or film made using the presently disclosed method of making a nanocomposite using the formulation described herein comprising the scatterers may have a normal transmittance of 99.99%-99%, or 99%-98%, or 98%-97%, or 97%-96%, or 96%-95%, or 95%-90%, or 90%-85%, or 85%-80%, 80%-75%, or 75%-70%, or 70%-65%, or 65%-60%, or 60%-55%, or 55%-50%, or 50%-45%, or 45%-40%, or 40%-35%, or 35%-30%, or 30%-25%, or 25%-20%, or 20%-15%, or 15%-10% for films that are less than 5 microns thick, when measured at a wavelength of 600 nm.

The films of the presently disclosed nanocomposite coating or film made using the presently disclosed method of making a nanocomposite using the formulation described herein comprising the scatterers may possess a percent haze of less than 0.5% or 0.5-1.0% or 1.0-10.0% or 10-20% or 20-30% or 30-40% or 40-50% or 50-60% or 60-70% or 70-80% or 80-90% or 90-100% films that are less than 5 microns. The % haze of a film according to the present disclosure is measured using HunterLab's Vista Hazemeter.

The films of the presently disclosed nanocomposite coating or film made using the presently disclosed method of making a nanocomposite using the formulation described herein comprising the scatterers may additionally demonstrate thermal stability at temperatures less than 150 C. The thermal stability may be measured by subjecting the nanocomposite coating or film at designated temperature in air, nitrogen, or under vacuum for 5 minutes or longer, or 10 minute or longer, or 30 minutes or longer, or 60 minutes or longer, or 120 minutes or longer, without out visually observable coloration, cracking, or delamination.

The thermal stability may be measured by subjecting the coating or film to 150° C. in vacuum or nitrogen for 120 minutes, the averaged change of optical transmittance from 400 nm to 800 nm is 5%-10%, or 2%-5% or 1%-2%, or 0.1%-1% or 0.001%-0.1%, when normalized to a 1 µm film. The normalization may be carried out by converting the transmittance to absorbance, dividing the absorbance by the film thickness in micrometer, and then converting the result back to transmittance for a 1 µm film.

The films of the presently disclosed nanocomposite coating or film made using the presently disclosed method of making a nanocomposite using the formulation described herein comprising the scatterers wherein the amount of the at least partially capped nanocrystals in the film is 10%-

20%, or 20%-30%, or 30%-40%, or 40%-50%, or 50%-60%, or 60%-70%, or 70%-75%, or 75%-80%, or 80%-85%, or 85%-90%, or 90%-93% by weight of the nanocomposite film.

The films of the presently disclosed nanocomposite coating or film made using the presently disclosed method of making a nanocomposite using the formulation described herein comprising the scatterers wherein the amount of the at least partially capped nanocrystals in the scattering film is 10%-20%, or 20%-30%, or 30%-40%, or 40%-50%, or 50%-60%, or 60%-70%, or 70%-75%, or 75%-80%, or 80%-85%, or 85%-90%, or 90%-93% by weight of the nanocomposite binder.

A Device

The present disclosure provides a light emitting diode device comprising an internal light extraction layer, said internal light extraction layer comprising a high refractive index nanocomposite with or without scatterers of the present disclosure.

The present disclosure further provides an optoelectronic device, photovoltaic device, catalysis device, fuel cell, battery, smart window, sensor, CMOS sensor, LED, mini-LED, microLED, organic LED (OLED), Quantum LED (QLED), touch screen, display, flexible electronic device, printed electronic device, augmented reality, virtual reality, mixed reality, wave guide, diffraction grating or a solar cell device comprising an active component, said active component comprising or containing a nanocomposite of the present disclosure.

The present disclosure provides a light emitting diode device comprising lens structure as an internal light extraction layer, wherein the said internal light extraction layer comprising a high refractive index nanocomposite coating or film of the present disclosure, wherein the refractive index of the lens structure may be graded or possess a gradient index profile.

The following are non-limiting exemplifications of embodiments of the disclosure.

EXAMPLES

Example 1

Synthesis of Titanium Oxide ($TiO_2$) Nanocrystals:

Titanium oxide nanocrystals having a size in the range of 1-1500 nm can be prepared from precursors such as Titanium (IV) methoxide, Titanium (IV) ethoxide, Titanium(IV) propoxide, Titanium(IV) isopropoxide, Titanium(IV) butoxide, or Titanium(IV) oxyacetylacetonate. Titanium n-butoxide, Chlorotriisopropoxytitanium(IV), titanium n-propoxide, titanium (IV) chloride, titanium chloride tri-n-butoxide, or titanium dichloride diethoxide would be advantageously used as precursors depending on final product desired.

In an exemplary method, a titanium alkoxide precursor, such as, but not limited to, titanium n-butoxide, titanium n-propoxide, titanium isopropoxide or titanium ethoxide, is mixed with water acting as a reagent, and with a solvent or mixture of solvents, including benzyl alcohol, phenol, oleyl alcohol, butanol, propanol, isopropanol, tetrahydrofuran, ethanol, methanol, acetonitrile, toluene, PGMEA, Propylene glycol propylether (PGPE), PGME, 2-methyl-1-propanol, or triethylene glycol monomethyl ether and sealed within an autoclave. The reaction mixture is heated to a temperature between 140-300° C. Once the reaction mixture reaches the set temperature, the temperature is maintained for a length of time ranging from 20 minutes to 24 hours depending in part on the solvent or solvent mixtures and/or the temperature of the reaction. As-synthesized titanium oxide nanocrystals are collected as a white milky suspension.

This milky white suspension was then collected and transferred to centrifuge bottles. The suspension was then centrifuged at 1500 rpm for 5 min. The supernatant was then decanted, and a wet cake was formed on the bottom of the centrifuge bottle. This wet cake was then rinsed with PGMEA at a 2.75 to 1 ratio solvent to wet cake weight-to-weight, and vigorously agitated. This suspension was then centrifuged again at 1500 rpm for 5 min, and the resulting supernatant decanted off the top. The wet cake was then transferred to a 250 ml round bottom flask. PGMEA was added at 1.857:1 solvent to wet cake. A capping agent such as methyltrimethoxysilane, n-propyltrimethoxysilane, n-propyltriethoxysilane, n-octyltrimethoxysilane, n-octyltriethoxysilane, phenytrimethoxysilane, dodecyltrimethoxysilane, m,p-ethylphenethyl trimethoxysilane, 2-[methoxy(polyethyleneoxy)propyl]-trimethoxysilane, methoxy(triethyleneoxy)propyltrimethoxysilane, 3-aminopropyltrimethoxysilane, 3-mercaptopropyltrimethoxysilane, 3-(methacryloyloxy)propyl trimethoxysilane, 3-(acryloyloxy)propyl trimethoxysilane, 3-isocyanatopropyltriethoxysilane, 3-isocyanatopropyltrimethoxysilane, and 3-glycidoxypropyltrimethoxysilane, vinyltrimethoxysilane, allyltrimethoxysilane, 1-hexenyltrimethoxysilane, 1-octenyltrimethoxysilane, (phenylaminomethyl) methyldimethoxysilane, N-phenylaminopropyltrimethoxysilane, 3-(4-pyridylethyl)thiopropyltrimethoxysilane, N-(3-trimethoxysilylpropyl)pyrrole, 2-(3-trimethoxysilylpropyl-thio) thiophene, (3-trimethoxysilylpropyly)diethylene triamine, 11-mercaptoundecyltrimethoxysilane, (2-diphenylphosphino) ethyldimethylethoxysilane, 2-(diphenylphosphino) ethyltriethoxysilane, 3-(diphenylphosphino) propyltriethoxysilane, heptanol, hexanol, octanol, benzyl alcohol, phenol, ethanol, propanol, butanol, oleylalcohol, dodecylalcohol, octadecanol and triethylene glycol monomethyl ether, octanoic acid, acetic acid, propionic acid, 2-[2-(2-methoxyethoxy) ethoxy] acetic acid, oleic acid, benzoic acid, stearic acid, trifluoroacetic acid, biphenyl-4-carboxylic acid, 2-(2-methoxyethoxy) acetic acid, methacrylic acid, mono-2-(Methacryloyloxy)ethyl succinate, 2-mercaptoethanol, 2-{2-[2-(2-mercaptoethoxy)ethoxy)ethoxy} ethanol, 2-(2-methoxyethoxy)ethanethiol, 1-octanethiol, sodium 2,3-dimercaptopropanesulfonate monohydrate, sodium dodecyl sulfate, dodecyl phosphonic acid, octylphosphonic acid, (11-mercaptoundecyl)phosphonic acid, (11-(acryloyloxy)undecyl)phosphonic acid, 11-methacryloyloxyundecylphosphonic acid, [2-[2-(2-methoxyethoxy)ethoxy]ethyl]phosphonic acid ethyl ester or any combination thereof was then added to a reaction flask at 1:5 ratio capping agent to wet cake by weight. This mixture was then heated to 120 degrees C. for 1 hour. When the reaction had cooled all wet cake was dispersed in solution, and the solution took on a salmon appearance.

The reaction mixture was then washed to remove excess capping agent and impurities. The reaction mixture was then precipitated in an anti-solvent such as heptane in a 2:1 heptane to reaction mixture ratio weight-to-weight. This precipitate was centrifuged at 4500 rpm for 10 minutes. The resulting supernatant was decanted and discarded. The solids were then dispersed in THF. The dispersed solids were then precipitated in an anti-solvent again such as heptane in a 2:1 heptane to reaction mixture ratio weight-to-weight. This precipitate was centrifuged at 4500 rpm for 10 minutes. The resulting supernatant was decanted and discarded. The solids were then dispersed in THF. The dispersed solids were then precipitated a third time in an anti-solvent again such as heptane in a 2:1 heptane to reaction mixture ratio weight-to-weight. This precipitate was centrifuged at 4500 rpm for 10 minutes. The resulting supernatant was decanted and discarded. The solids were then placed in a vacuum oven to dry overnight.

The dried solids were redispersed in a 1:1 ratio of solids to solvent in PGMEA to create a 50% by weight loaded dispersion. The resulting dispersion was filtered through a 0.45 micron and then a 0.2-micron PTFE filter.

Example 2

In an example, titanium oxide nanocrystals were produced from a mixture of 100 millimoles of titanium (IV) butoxide, 500 millimoles of water, and 418 milliliters of benzyl alcohol in an inert atmosphere which was sealed within an autoclave. The reaction mixture was heated to 200° C. at a heating rate of 2° C./min. Once the reaction mixture reached 200° C., the temperature was maintained for 20-60 min. A white milky solution of as-synthesized $TiO_2$ nanocrystals was collected after the autoclave was cooled down to the room temperature.

This milky white suspension was then collected and transferred to centrifuge bottles. The suspension was then centrifuged at 1500 rpm for 5 min. The supernatant was then decanted, leaving a wet cake at the bottom of the centrifuge bottle. This wet cake was then rinsed with PGMEA at a 2.75 to 1 ratio of solvent to wet cake by weight, and vigorously agitated. This suspension was then centrifuged again at 1500 rpm for 5 min, and the resulting supernatant decanted off. The wet cake collected was then transferred to a 250 ml round bottom flask. PGMEA was added at a 0.3:1 ratio of solvent to wet cake by weight. Methoxy(triethyleneoxy)propyltrimethoxysilane was then added to a reaction flask at 1:10 ratio of capping agent to wet cake by weight. This mixture was then refluxed at 120 degrees C. for 1 hour upon which a clear dispersion resulted. The reaction mixture was then cooled to room temperature for further processing.

This solution was filtered through a 0.45 micron and then a 0.2-micron PTFE filter to yield a 50% by weight loaded dispersion.

Example 3

In an example, titanium oxide nanocrystals were produced from a mixture of 100 millimoles of titanium (IV) butoxide, 500 millimoles of water, and 418 milliliters of benzyl alcohol in an inert atmosphere which was sealed within an autoclave. The reaction mixture was heated to 225° C. at a heating rate of 2° C./min. Once the reaction mixture reached 225° C., the temperature was maintained for 20-60 min. A white milky solution of as-synthesized $TiO_2$ nanocrystals was collected after the autoclave was cooled down to the room temperature.

The milky white suspension was then transferred to centrifuge bottles and centrifuged at 1500 rpm for 5 min. The supernatant was then decanted, leaving a wet cake at the bottom of the centrifuge bottle. This wet cake was then rinsed with PGMEA at a 2.75 to 1 ratio of solvent to wet cake by weight, and vigorously agitated. This suspension was then centrifuged again at 1500 rpm for 5 min, and the resulting supernatant decanted off leaving a wet cake. The wet cake was then transferred to a 250 ml round bottom flask. PGMEA was added at a 0.3:1 ratio of solvent to wet cake by weight. 2-[2-(2-Methoxyethoxy) ethoxy] acetic acid was then added to a reaction flask at a 1:10 ratio of capping agent to wet cake by weight. This mixture was then heated to 60 degrees C. for 1 hour upon which a clear dispersion resulted. The reaction mixture was then cooled to room temperature for further processing.

This solution was filtered through a 0.45 micron and then a 0.2-micron PTFE filter to yield a 50% by weight loaded dispersion.

Example 4

In an example, titanium oxide nanocrystals were prepared from 2583 millimoles of titanium (IV) butoxide, 6457 millimoles of water, mixed with 3400 milliliters of benzyl alcohol in an inert atmosphere which was transferred to 2-gallon Parr reactor. The reaction mixture was heated to 200-225° C. for 1-2 hours at a heating rate of 2° C./min. The pressure of the reaction reached 50 to 150 psi. After the reaction was complete and the reactor was returned to room temperature and a white milky solution of as-synthesized titanium oxide nanocrystals was collected.

The milky white suspension was then transferred to centrifuge bottles and centrifuged at 1500 rpm for 5 min. The supernatant was then decanted, leaving a wet cake at the bottom of the centrifuge bottle. This wet cake was then rinsed with PGMEA at a 2.75 to 1 ratio of solvent to wet cake by weight, and vigorously agitated. This suspension was then centrifuged again at 1500 rpm for 5 min, and the resulting supernatant decanted off leaving a wet cake. The wet cake was then transferred to a 3000 ml round bottom flask. PGMEA was added at a 1.857:1 ratio of solvent to wet cake by weight. Methoxy(triethyleneoxy)propyltrimethoxysilane was then added to a reaction flask at a 1:5 ratio of capping agent to wet cake by weight. 3-(Acryloyloxy) propyltrimethoxysilane was also added to the reaction flask at a 1:50 ratio of capping agent to wet cake by weight. This mixture was then heated to 120 degrees C. for 1 hour upon which a clear dispersion resulted. The reaction mixture was then cooled to room temperature for further processing.

The capped nanocrystal was purified by washing to remove excess capping agent and other by-products. The capped nanocrystal was precipitated from the reaction mixture using an anti-solvent such as heptane in a 2:1 ratio of heptane to reaction mixture by weight. The precipitate was collected by centrifugation at 4500 rpm for 10 minutes. The resulting supernatant was decanted and discarded. The solids collected were then dispersed in THF. The dispersed solids were again precipitated with an anti-solvent such as heptane in a 2:1 ratio of heptane to reaction mixture by weight. The precipitate was collected by centrifugation at 4500 rpm for 10 minutes. The resulting supernatant was decanted and discarded. The solids collected were then dispersed in THF. The dispersed solids were then precipitated for a third time in an anti-solvent such as heptane in a 2:1 ratio of heptane to reaction mixture by weight. This precipitate was collected by centrifugation at 4500 rpm for 10 minutes and dried overnight in a vacuum oven.

The dried solids were re-dispersed in a 1:1 ratio of solids to solvent by weight in PGMEA to create a 50% by weight loaded dispersion. The resulting dispersion was filtered through a 0.45 micron and then a 0.2-micron PTFE filter.

Example 5

In an example, titanium oxide nanocrystals were prepared from 2583 millimoles of titanium (IV) butoxide, 6457 millimoles of water, mixed with 3400 milliliters of benzyl alcohol in an inert atmosphere which was transferred to 2-gallon Parr reactor. The reaction mixture was heated to 200-225° C. for 1-2 hours at a heating rate of 2° C./min. The pressure of the reaction reached 50 to 150 psi. After the reaction was complete and the reactor was returned to room temperature and a white milky solution of as-synthesized titanium oxide nanocrystals was collected.

The milky white suspension was then transferred to centrifuge bottles and centrifuged at 1500 rpm for 5 min. The supernatant was then decanted, leaving a wet cake at the bottom of the centrifuge bottle. This wet cake was then rinsed with PGMEA at a 2.75 to 1 ratio of solvent to wet cake by weight, and vigorously agitated. This suspension was then centrifuged again at 1500 rpm for 5 min, and the resulting supernatant decanted off the top leaving a wet cake. The wet cake was then transferred to a 3000-ml round bottom flask. PGMEA was added at a 1.857:1 ratio of solvent to wet cake by weight. Methoxy(triethyleneoxy)propyltrimethoxysilane was then added to a reaction flask at a 1:5 ratio of capping agent to wet cake by weight. 3-(Acryloyloxy)propyltrimethoxysilane was also added to the reaction flask at a 1:50 ratio capping agent to wet cake by weight. This mixture was then heated to 120 degrees C. for 1 hour upon which a clear dispersion resulted. The reaction mixture was then cooled to room temperature for further processing.

The capped nanocrystal was purified by washing to remove excess capping agent and other by-products. The capped nanocrystal was precipitated from the reaction mixture using an anti-solvent such as heptane in a 2:1 ratio of heptane to reaction mixture by weight. The precipitate was collected by centrifugation at 4500 rpm for 10 minutes. The resulting supernatant was decanted and discarded. The solids collected were then dispersed in THF and again precipitated with an anti-solvent such as heptane in a 2:1 ratio of heptane to reaction mixture by weight. This precipitate was collected by centrifugation at 4500 rpm for 10 minutes. The resulting supernatant was decanted and discarded. The solids were then again dispersed in THF. The dispersed solids were then precipitated again a third time with an anti-solvent again such as heptane in a 2:1 ratio of heptane to reaction mixture by weight. The precipitate was collected by centrifugation at 4500 rpm for 10 minutes and dried overnight in a vacuum oven.

The dried solids were re-dispersed in a 1:0.43 ratio of solids to solvent by weight in PGMEA to create a 65% by weight loaded dispersion. The resulting dispersion was filtered through a 0.45 micron and then a 0.2-micron PTFE filter.

Example 6

In another example, 879 g of 100% (w/w) Titanium (IV) n-butoxide was mixed with 3550 g of benzyl alcohol and 116.3 g of water in an inerted 2-gallon Parr reactor. The setup was sealed under an inert condition such as nitrogen atmosphere to prevent oxygen contamination. The Parr reactor was then heated up to 200° C. while stirring at 600 rpm and maintained at this temperature for one hour. After the reaction, the reactor was cooled down to room temperature and a white milky solution of as-synthesized titanium oxide nanocrystals was collected.

The milky white suspension was then transferred to centrifuge bottles and centrifuged at 1500 rpm for 5 min. The supernatant was then decanted, leaving a wet cake at the bottom of the centrifuge bottle. This wet cake was then rinsed with PGMEA at a 2.75 to 1 ratio of solvent to wet cake by weight, and vigorously agitated. This suspension was then centrifuged again at 1500 rpm for 5 min, and the resulting supernatant decanted off the top leaving a wet cake settling. The wet cake was then transferred to a 3000-ml round bottom flask. PGMEA was added at a 1.857:1 ratio of solvent to wet cake by weight. Methoxy(triethyleneoxy)propyltrimethoxysilane was then added to a reaction flask at 1:5 ratio of capping agent to wet cake by weight. This mixture was then heated to 120 degrees C. for 40 minutes. Methacryloxypropyltrimethoxysilane was then added to the reaction flask at a 1:3 ratio of capping agent to wet cake by weight. This mixture was then heated at 120 degrees C. for an additional 30 minutes upon which a clear dispersion resulted. The reaction mixture was then cooled to room temperature for further processing.

The capped nanocrystal was purified by washing to remove excess capping agent and other by-products. The capped nanocrystal was precipitated from the reaction mixture using an anti-solvent such as heptane in a 2:1 ratio of heptane to reaction mixture by weight. The precipitate was collected by centrifugation at 4500 rpm for 10 minutes. The resulting supernatant was decanted and discarded. The solid was dispersed in THF. The dispersed solid was again precipitated with an anti-solvent such as heptane in a 2:1 ratio of heptane to reaction mixture by weight. The precipitate was collected by centrifugation at 4500 rpm for 10 minutes. The resulting supernatant was decanted and discarded. The solid was again dispersed in THF. The dispersed solid was precipitated a third time using an anti-solvent such as heptane in a 2:1 ratio of heptane to reaction mixture by weight. The precipitate was collected by centrifugation at 4500 rpm for 10 minutes and dried overnight in a vacuum oven.

The dried solids were re-dispersed in a 1:1 ratio of solids to solvent by weight in PGMEA to create a 50% by weight loaded dispersion. The resulting dispersion was filtered through a 0.45 micron and then a 0.2-micron PTFE filter.

Example 7

In another example, 879 g of 100% (w/w) Titanium (IV) n-butoxide was mixed with 3550 g of benzyl alcohol and 116.3 g of water in an inerted 2-gallon Parr reactor. The setup was sealed under inert condition such as nitrogen atmosphere to prevent oxygen contamination. The Parr reactor was then heated to 250° C. while stirring at 500 rpm and maintained at this temperature for 90 minutes. After the reaction, the reactor was cooled to room temperature. A white milky solution of as-synthesized titanium oxide nanocrystals was collected.

The milky white suspension was then transferred to centrifuge bottles and centrifuged at 1500 rpm for 5 min. The supernatant was then decanted, leaving a wet cake at the bottom of the centrifuge bottle. This wet cake was then rinsed with PGMEA at a 2.75 to 1 ratio of solvent to wet cake by weight, and vigorously agitated. The suspension was then centrifuged again at 1500 rpm for 5 min, and the resulting supernatant decanted off leaving a wet cake settling. The wet cake was then transferred to a 3000-ml round bottom flask. PGMEA was added at a 1.857:1 ratio of solvent to wet cake by weight. Methoxy(triethyleneoxy)propyltrimethoxysilane was then added to a reaction flask at a 1:5 ratio of capping agent to wet cake by weight. This mixture was then heated to 120 degrees C. for 30 minutes. Methacryloxypropyltrimethoxysilane was then added to the reaction flask at a 4:5 ratio of capping agent to wet cake by weight. This mixture was then heated to 120 degrees C. for an additional 30 minutes. Water was then added to the reaction mixture at a 1:20 ratio of water to wet cake by weight. This mixture was heated an additional 20 minutes at 100 degrees C. upon which a clear dispersion resulted. The reaction mixture was then cooled to room temperature for further processing.

The capped nanocrystal was purified by washing to remove excess capping agent and other by-products. The capped nanocrystal was precipitated from the reaction mixture using an anti-solvent such as heptane in a 2:1 ratio of heptane to reaction mixture by weight. The precipitate was collected by centrifugation at 4500 rpm for 10 minutes. The resulting supernatant was decanted and discarded. The solid was dispersed in THF. The dispersed solid was again precipitated with an anti-solvent such as heptane in a 2:1 ratio of heptane to reaction mixture by weight. The precipitate was collected by centrifugation at 4500 rpm for 10 minutes. The resulting supernatant was decanted and discarded. The solid was again dispersed in THF. The dispersed solid was precipitated a third time using an anti-solvent such as heptane in a 2:1 ratio of heptane to reaction mixture by weight. The precipitate was collected by centrifugation at 4500 rpm for 10 minutes and dried overnight in a vacuum oven.

The dried solids were re-dispersed in a 7:3 ratio of solids to solvent by weight in DPGME to create a 70% by weight loaded dispersion. The resulting dispersion was filtered through a 0.45-micron and then a 0.2-micron PTFE filter.

Example 8

In another example, titanium oxide nanocrystals were prepared from 2583 millimoles of titanium (IV) butoxide, 6457 millimoles of water, mixed with 3400 milliliters of benzyl alcohol in an inert atmosphere which was transferred to 2-gallon Parr reactor. The reaction mixture was heated to 200° C. for 1 hour at a heating rate of 2° C./min. The pressure of the reaction reached 50 to 150 psi. After the reaction was complete and the reactor was returned to room temperature, a white milky solution of as-synthesized titanium oxide nanocrystals was collected.

The milky white suspension was transferred to centrifuge bottles and centrifuged at 1500 rpm for 5 min. The supernatant was then decanted and discarded leaving a wet cake settling at the bottom of the centrifuge bottle. This wet cake was then rinsed with PGMEA at a 2.75 to 1 ratio of solvent to wet cake by weight, and vigorously agitated. This suspension was then centrifuged again at 1500 rpm for 5 min, and the resulting supernatant decanted off. The wet cake was then transferred to a 3000-ml round bottom flask. PGMEA was added at a 1.857:1 ratio of solvent to wet cake by weight. Methoxy(triethyleneoxy)propyltrimethoxysilane was then added to the reaction flask at 17% by weight with respect to the wet cake. This mixture was then heated at 120 degrees C. for 1 hour upon which a clear dispersion resulted. The reaction mixture was then cooled to room temperature for further processing.

The capped nanocrystal was purified by washing to remove excess capping agent and other by-products. The capped nanocrystal was precipitated from the reaction mixture using an anti-solvent such as heptane in a 2:1 ratio of heptane to reaction mixture by weight. The precipitate was collected by centrifugation at 4500 rpm for 10 minutes. The resulting supernatant was decanted and discarded. The solid was dispersed in THF. The dispersed solid was again precipitated with an anti-solvent such as heptane in a 2:1 ratio of heptane to reaction mixture by weight. The precipitate was collected by centrifugation at 4500 rpm for 10 minutes. The resulting supernatant was decanted and discarded. The solid was again dispersed in THF. The dispersed solid was precipitated a third time using an anti-solvent such as heptane in a 2:1 ratio of heptane to reaction mixture by weight. The precipitate was collected by centrifugation at 4500 rpm for 10 minutes and dried overnight in a vacuum oven.

The dried solids were re-dispersed in a 1:1 ratio of solids to solvent in PGMEA to create a 50% by weight loaded dispersion. The resulting dispersion was filtered through a 0.45 micron and then a 0.2-micron PTFE filter.

Shown in FIG. 1 is the Transmission Electron Microscope (TEM) image the capped titanium oxide nanocrystals showing particle sizes less than 10 nanometer.

Figure 2:
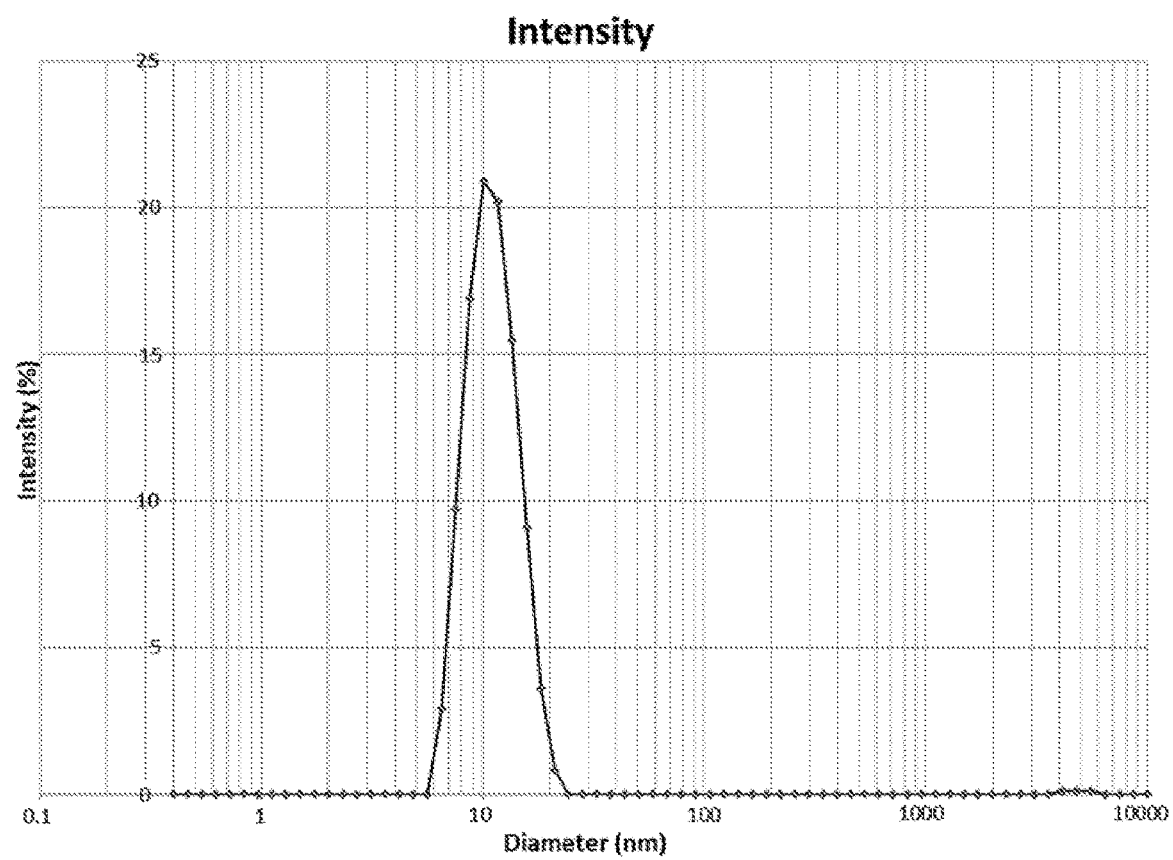
FIG. 2: An exemplary intensity versus particle size DLS plot of capped titanium oxide nanocrystals described in example 8 at 5% by weight in PGMEA showing particle sizes less than 20 nanometers due to aggregation with an average particle size of 11.260 nanometer.

Shown in FIG. 2 is the DLS plot the capped titanium oxide nanocrystals dispersed at 5% by weight in PGMEA. The figure shows the DLS plot as a measure of Intensity versus particle size showing an average particle size of 11.260 nanometers with a narrow size distribution.

Figure 3:
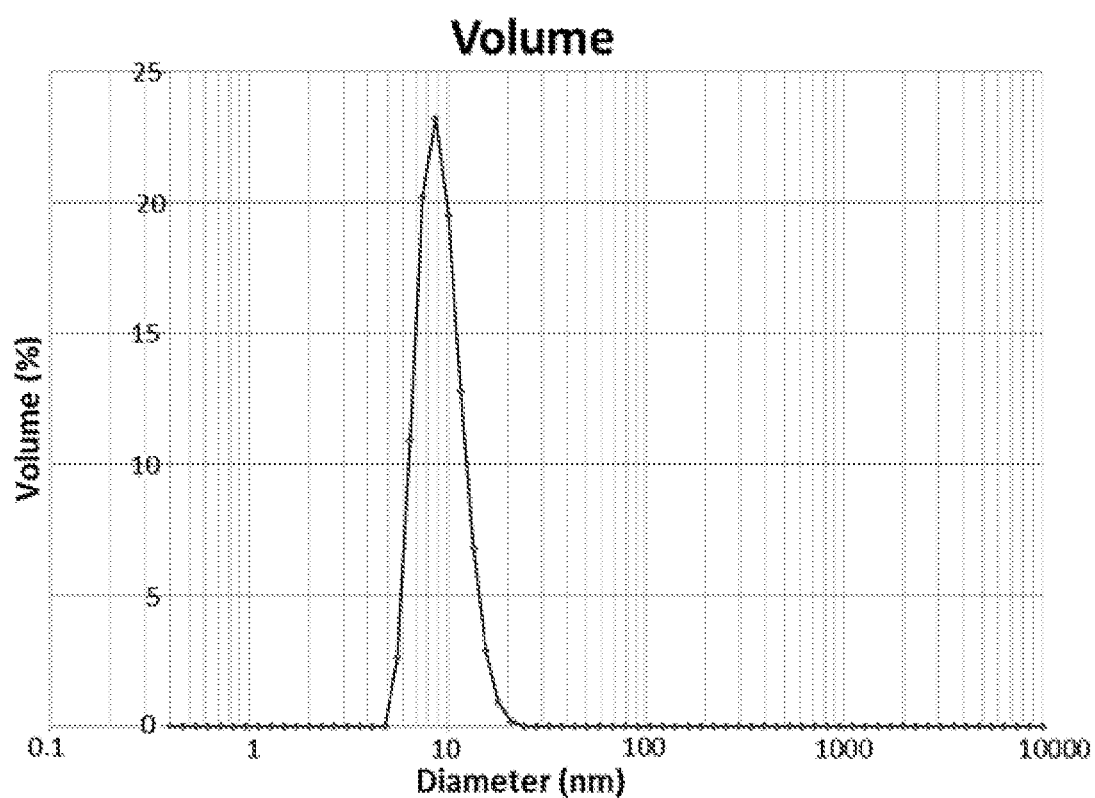
FIG. 3: An exemplary volume versus particle size DLS plot of capped titanium oxide nanocrystals described in example 8 at 5% by weight in PGMEA showing particle sizes less than 25 nanometers due to aggregation with an average particle size of 9.462 nanometer.

Shown in FIG. 3 is the DLS plot the capped titanium oxide nanocrystals dispersed at 5% by weight in PGMEA. The figure shows the DLS plot as a measure of Volume versus particle size showing particle sizes less than 25 nanometers with an average particle size of 9.462 nanometer and D9999 as measured by volume is 24.90 nanometers.

Figure 4A:
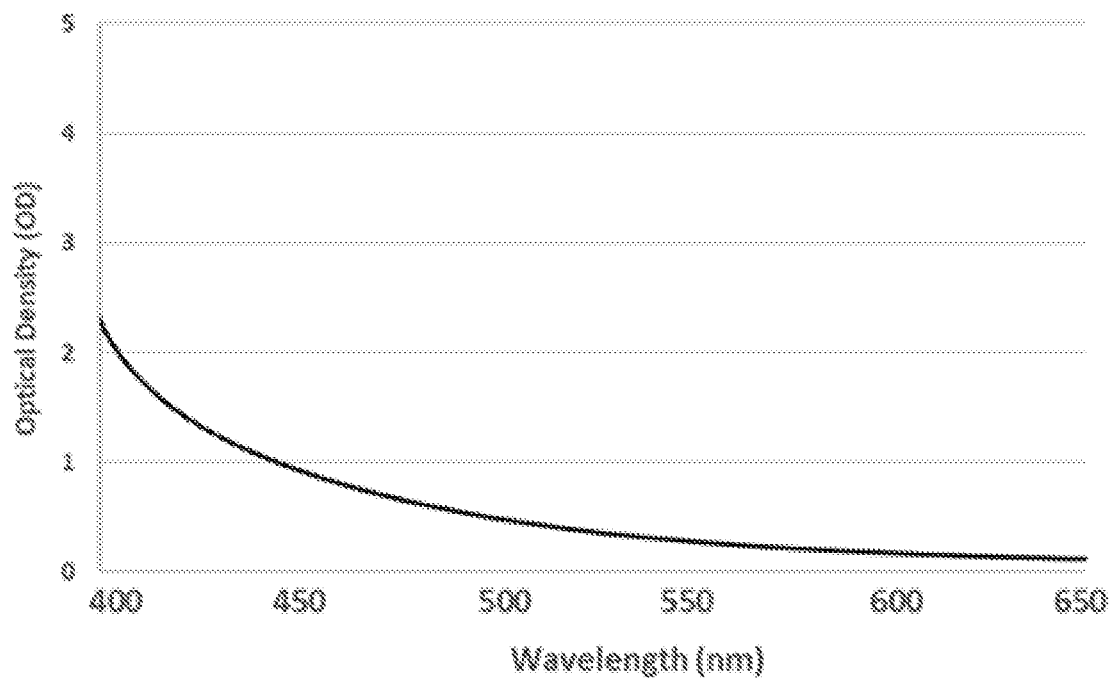
FIG. 4A: An exemplary optical density plot of capped titanium oxide nanocrystals described in example 8 dispersed 50% by weight in PGMEA.
Figure 4B:
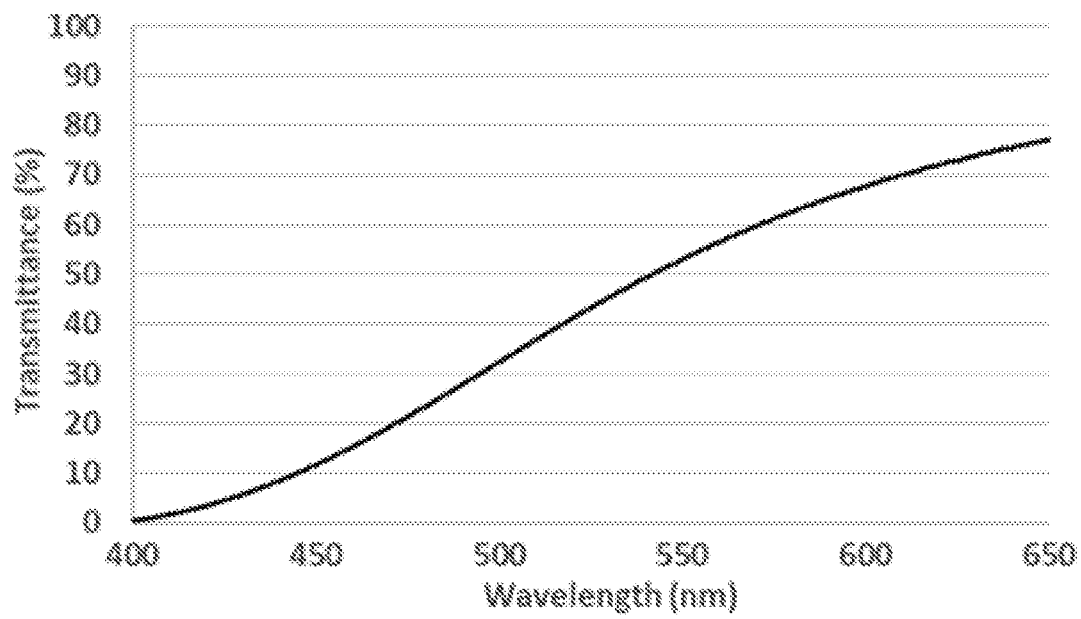
FIG. 4B: An exemplary optical transmittance plot of capped titanium oxide nanocrystals described in example 8 dispersed 50% by weight in PGMEA.

Shown in FIG. 4 is the optical density and optical transmittance spectrum of 50% by weight capped nanocrystal in the formulation measured in a 1 cm path length cuvette. The measurement is taken using Perkin Elmer Lambda 850 spectrophotometer using air as the reference or background. FIG. 4A shows an optical density of 2.29, 0.927, 0.488 and 0.112 at 400 nm, 450 nm, 500 nm and 650 nm respectively. FIG. 4B shows a % transmittance of 0.51%, 11.81%, 32.48% and 77.12% at 400 nm, 450 nm, 500 nm and 650 nm respectively. The dispersion has lower transmittance at lower wavelength and increases as the wavelength increases.

Figure 5:
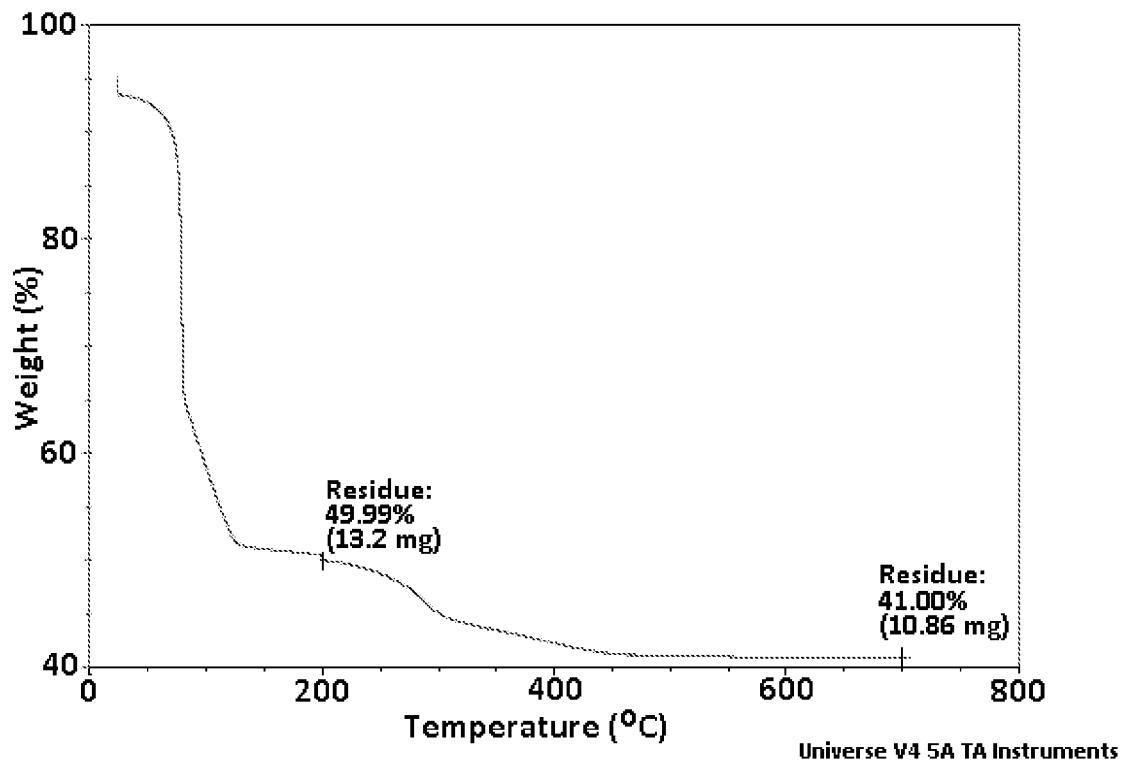
FIG. 5: An exemplary TGA plot of capped titanium oxide nanocrystals described in example 8 dispersed 50% by weight in PGMEA.

The % solid and the % inorganic content of the dispersion is measured using the TA instrument's Q500 thermal gravimetric analyzer (TGA) and is shown in FIG. 5. The weight percentage is measured as a function of temperature, showing a weight percentage of 49.99% solids at 200 C and 41.00% inorganic content at 700 C with an organic content of 17.98%.

Figure 6:
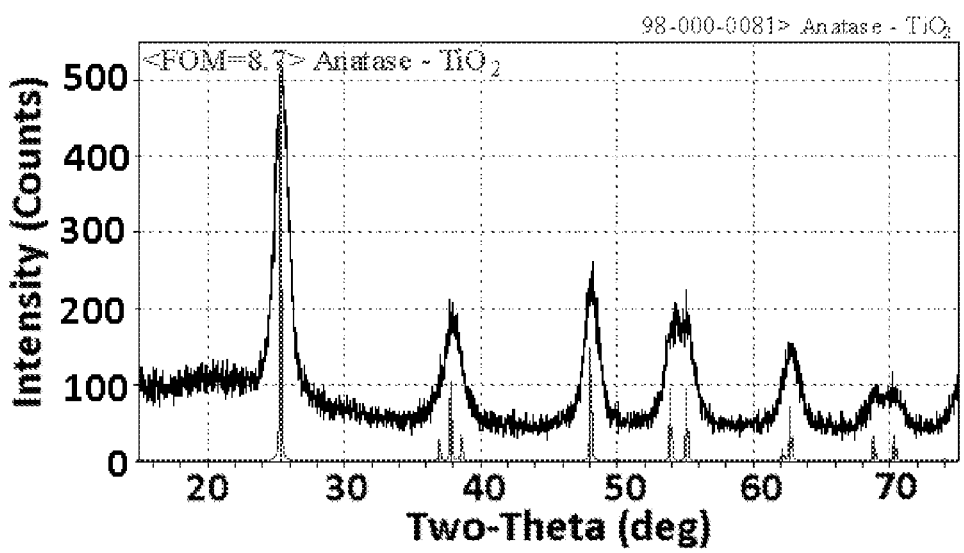
FIG. 6: An exemplary XRD pattern of titanium oxide nanocrystals described in example 8 matching the anatase phase.

Shown in FIG. 6 is the XRD pattern of titanium oxide nanocrystals. The XRD pattern of the titanium oxide nanocrystals matches the anatase phase. Particle size estimated from the line broadening to be ~9 nm.

A summary of the properties of the nanocrystal dispersion is reported in table 5.

TABLE 2 shows the aging data of comprising of methoxy (triethyleneoxy)propyltrimethoxysilane capped titanium oxide nanocrystals dispersed 50% by weight in PGMEA showing initial, 1 week, and 1-month values for TGA, DLS, and UV measurements.

TABLE 2

| | Timeframe of measurement | Initial | 1 week aging | 1 month aging |
|---|---|---|---|---|
| TGA | % solids | 49.99 | 49.77 | 49.62 |
| | % inorganics | 41.00 | 40.89 | 40.68 |
| | % organics | 17.98 | 17.84 | 18.02 |
| DLS | Volume | 9.462 | 9.300 | 9.556 |
| | Intensity | 11.260 | 11.170 | 10.840 |
| | D9999 | 24.9 | 25.1 | 23.2 |
| UV | OD400 | 2.29 | 2.28 | 2.30 |
| | OD650 | 0.11 | 0.11 | 0.10 |

Example 9

In another example, titanium oxide nanocrystals were prepared from 1291 millimoles of titanium (IV) butoxide, 6457 millimoles of water, mixed with 3962 milliliters of benzyl alcohol in an inert atmosphere which was transferred to 2-gallon Parr reactor. The reaction mixture was heated to 200° C. for 1 hours at a heating rate of 2° C./min. The pressure of the reactor reached 50 to 150 psi during the reaction. After the reaction was complete and the reactor was returned to room temperature, a white milky solution of as-synthesized titanium oxide nanocrystals was collected.

This milky white suspension was transferred to centrifuge bottles and centrifuged at 1500 rpm for 5 min. The supernatant was decanted and discarded leaving a wet cake settling at the bottom of the centrifuge bottle. The wet cake was then rinsed with PGMEA at a 2.75 to 1 ratio of solvent to wet cake by weight, and vigorously agitated. The suspension was then centrifuged again at 1500 rpm for 5 min, and the resulting supernatant decanted and discarded. The wet cake collected was then transferred to a 500-ml round bottom flask. PGMEA was added at 1.857:1 ratio of solvent to wet cake by weight. Methoxy(triethyleneoxy)propyltrimethoxysilane was then added to a reaction flask at 17% by weight with respect to the wet cake. This mixture was then heated to 120 degrees C. for 1 hour upon which a clear dispersion resulted. The reaction mixture was then cooled to room temperature for further processing.

The capped nanocrystal was purified by washing to remove excess capping agent and other by-products. The capped nanocrystal was precipitated from the reaction mixture using an anti-solvent such as heptane in a 2:1 ratio of heptane to reaction mixture by weight. The precipitate was collected by centrifugation at 4500 rpm for 10 minutes. The resulting supernatant was decanted and discarded. The solid was dispersed in THF. The dispersed solid was again precipitated with an anti-solvent such as heptane in a 2:1 ratio of heptane to reaction mixture by weight. The precipitate was collected by centrifugation at 4500 rpm for 10 minutes. The resulting supernatant was decanted and discarded. The solid was again dispersed in THF. The dispersed solid was precipitated a third time using an anti-solvent such as heptane in a 2:1 ratio of heptane to reaction mixture by weight. The precipitate was collected by centrifugation at 4500 rpm for 10 minutes and dried overnight in a vacuum oven.

The dried solids were re-dispersed in a 1:1 ratio of solids to solvent by weight in PGMEA to create a 50% by weight loaded dispersion. The resulting dispersion was filtered through a 0.45 micron and then a 0.2-micron PTFE filter.

Example 10

In another example, titanium oxide nanocrystals were prepared from 2583 millimoles of titanium (IV) butoxide, 1291 millimoles of water, mixed with 3400 milliliters of benzyl alcohol in an inert atmosphere which was transferred to 2-gallon Parr reactor. The reaction mixture was heated to 200° C. for 4.25 hours at a heating rate of 2° C./min. The pressure of the reactor reached 50 to 150 psi during the reaction. After the reaction was complete and the reactor was returned to room temperature, a white milky solution of as-synthesized titanium oxide nanocrystals was collected.

This milky white suspension was transferred to centrifuge bottles and centrifuged at 1500 rpm for 5 min. The supernatant was decanted and discarded leaving a wet cake settling at the bottom of the centrifuge bottle. The wet cake was then rinsed with PGMEA at a 2.75 to 1 ratio of solvent to wet cake by weight, and vigorously agitated. The suspension was then centrifuged again at 1500 rpm for 5 min, and the resulting supernatant decanted off the top. The wet cake was then transferred to a 3000 ml round bottom flask. PGMEA was added at 1.857:1 solvent to wet cake. Methoxy (triethyleneoxy)propyltrimethoxysilane was then added to a reaction flask at 17% by weight with respect to the wet cake. This mixture was then heated to 120 degrees C. for 1 hour upon which a clear dispersion resulted. The reaction mixture was then cooled to room temperature for further processing.

The capped nanocrystal was purified by washing to remove excess capping agent and other by-products. The capped nanocrystal was precipitated from the reaction mixture using an anti-solvent such as heptane in a 2:1 ratio of heptane to reaction mixture by weight. The precipitate was collected by centrifugation at 4500 rpm for 10 minutes. The resulting supernatant was decanted and discarded. The solid was dispersed in THF. The dispersed solid was again precipitated with an anti-solvent such as heptane in a 2:1 ratio of heptane to reaction mixture by weight. The precipitate was collected by centrifugation at 4500 rpm for 10 minutes. The resulting supernatant was decanted and discarded. The solid was again dispersed in THF. The dispersed solid was precipitated a third time using an anti-solvent such as heptane in a 2:1 ratio of heptane to reaction mixture by weight. The precipitate was collected by centrifugation at 4500 rpm for 10 minutes and dried overnight in a vacuum oven.

The dried solids were re-dispersed in a 1:1 ratio of solids to solvent in PGMEA to create a 50% by weight loaded dispersion. The resulting dispersion was filtered through a 0.45 micron and then a 0.2-micron PTFE filter.

Figure 7:
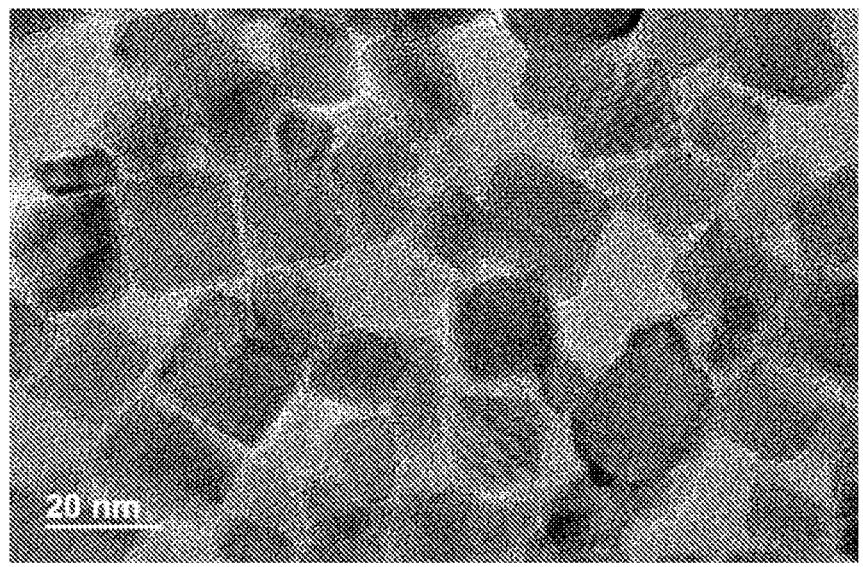
FIG. 7: An exemplary TEM image of titanium oxide nanocrystals described in example 10 showing particle sizes less than 30 nanometers

Shown in FIG. 7 is the Transmission Electron Microscope (TEM) image the capped titanium oxide nanocrystals showing particle sizes less than 30 nanometer.

Figure 8:
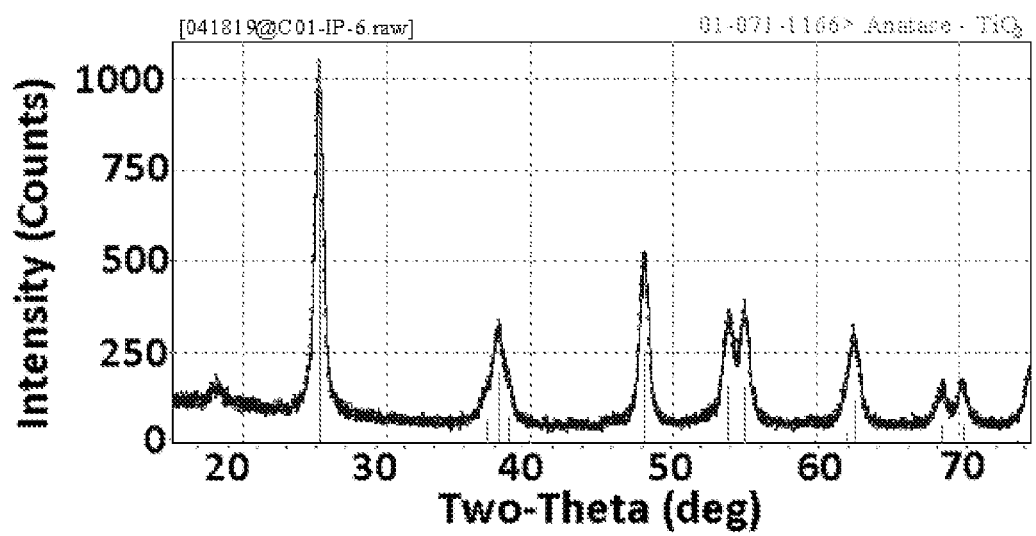
FIG. 8: An exemplary XRD pattern of titanium oxide nanocrystals described in example 10 matching the anatase phase.

Shown in FIG. 8 is the XRD pattern of titanium oxide nanocrystals. The XRD pattern of the titanium oxide nanocrystals matches the anatase phase. Particle size estimated from the line broadening to be 14.5 nm.

Figure 9:
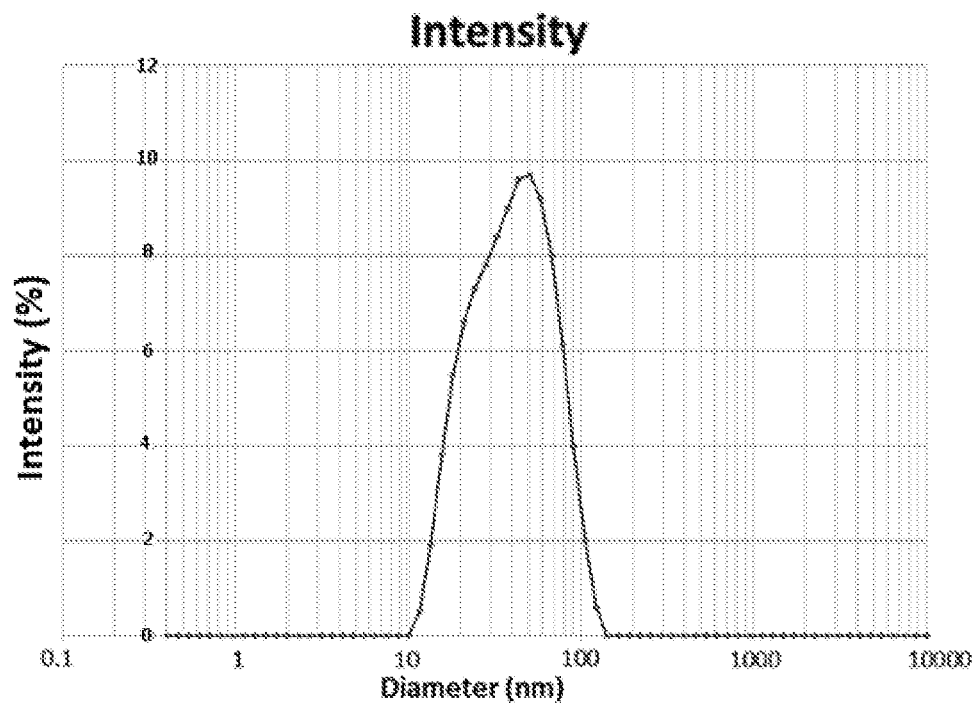
FIG. 9: An exemplary intensity versus particle size DLS plot of capped titanium oxide nanocrystals described in example 10 at 5% by weight in PGMEA showing particle sizes less than 130 nanometers due to aggregation with an average particle size of 50.7 nanometer.

Shown in FIG. 9 is the DLS plot the capped titanium oxide nanocrystals dispersed at 5% by weight in PGMEA. The figure shows the DLS plot as a measure of Intensity versus particle size showing particle size less than 130 nanometers with an average particle size of 44.73 nanometer.

Figure 10:
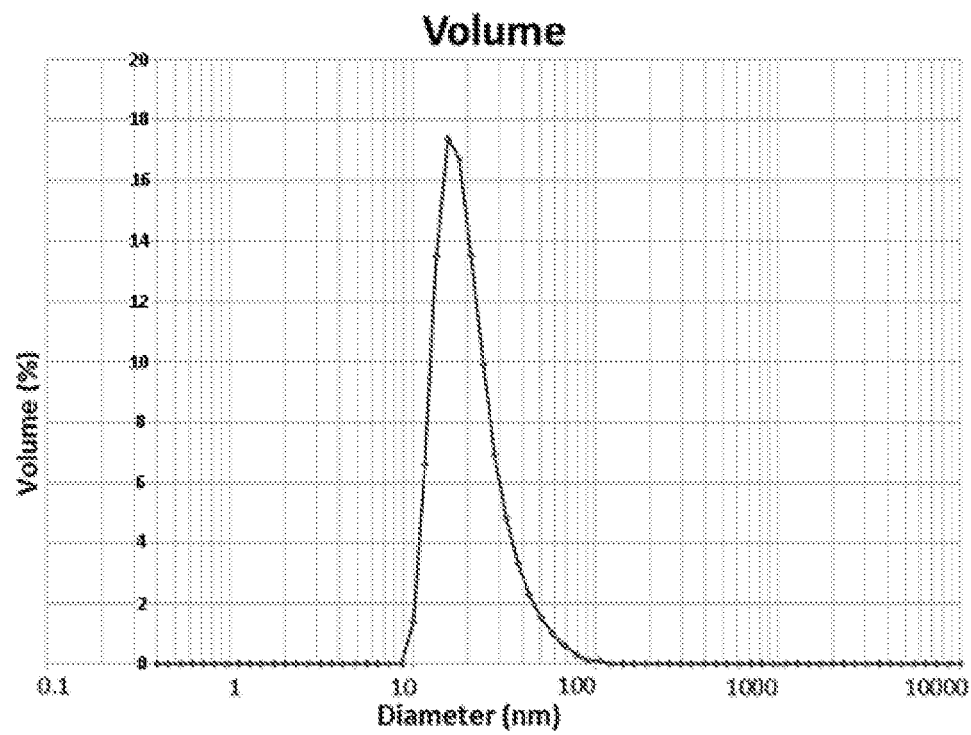
FIG. 10: An exemplary volume versus particle size DLS plot of capped titanium oxide nanocrystals described in example 10 at 5% by weight in PGMEA showing particle sizes less than 100 nanometers due to aggregation with an average particle size of 15.7 nanometer.

Shown in FIG. 10 is the DLS plot the capped titanium oxide nanocrystals dispersed at 5% by weight in PGMEA. The figure shows the DLS plot as a measure of Volume versus particle size showing particle size less than 100 nanometers with an average particle size of 21.72 nanometer and D9999 as measured by volume is 123 nanometers.

Figure 11:
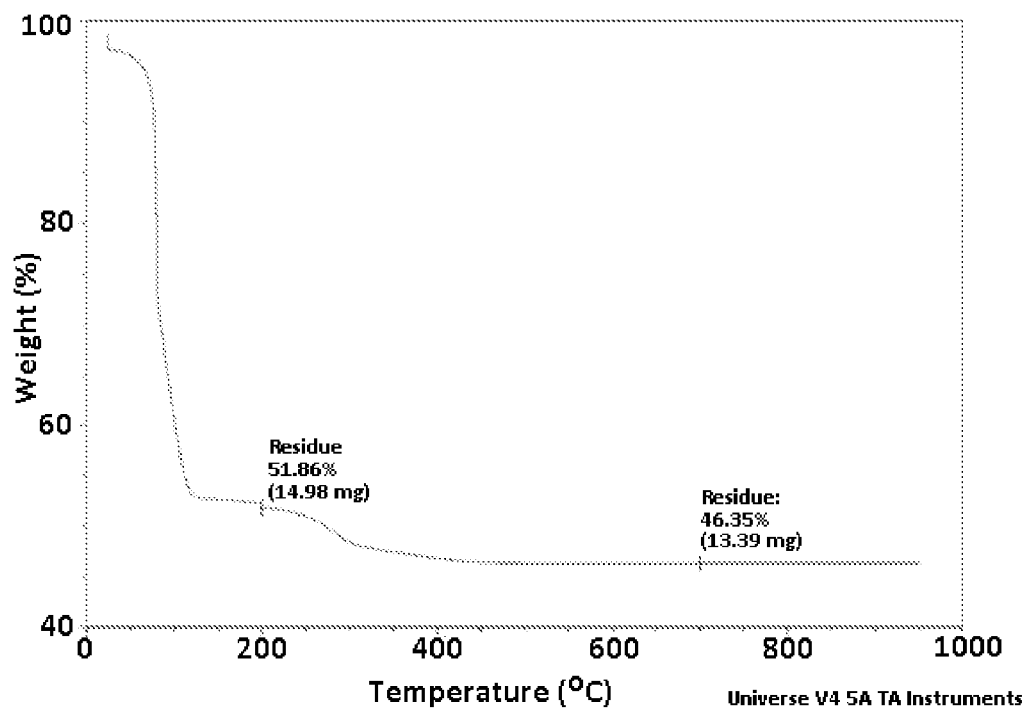
FIG. 11: An exemplary TGA plot of capped titanium oxide nanocrystals described in example 10 dispersed 50% by weight in PGMEA.

The % solid and the % inorganic content of the dispersion is measured using the TA instrument's Q500 thermal gravimetric analyzer (TGA) and is shown in FIG. 11. The weight percentage is measured as a function of temperature, showing a weight percentage of 51.86% solids at 200 C and 46.36% inorganic content at 700 C with an organic content of 10.61%.

A summary of the properties of the nanocrystal dispersion is reported in table 5.

Example 11

In a further example, titanium oxide nanocrystals were prepared using varying amounts of ingredients and reaction conditions as described in TABLE 1. Weight of Titanium (IV) butoxide between 879 g and 1758 g, weight of water between 0 and 116.3 g and weight of benzyl alcohol between 2636.7 g and 3550 g were mixed in an inert atmosphere and transferred to 2-gallon Parr reactor. The reaction mixture was heated at a temperature between 200 and 300 C for a duration between 1 to 12 hours at a heating rate of 2° C./min. The pressure of the reaction reached 50 to 650 psi. After the reaction was complete and the reactor was returned to room temperature, a white milky solution of as-synthesized titanium oxide nanocrystals was collected.

This milky white suspension was transferred to centrifuge bottles and centrifuged at 1500 rpm for 5 min. The supernatant was decanted and discarded leaving a wet cake settling at the bottom of the centrifuge bottle. The wet cake was then rinsed with PGMEA at a 2.75 to 1 ratio of solvent to wet cake by weight, and vigorously agitated. The suspension was then centrifuged again at 1500 rpm for 5 min, and the resulting supernatant decanted off the top. The wet cake was then transferred to a 3000 ml round bottom flask. PGMEA was added at 1.857:1 solvent to wet cake. Methoxy (triethyleneoxy)propyltrimethoxysilane was then added to a reaction flask at 17% by weight with respect to the wet cake. This mixture was then heated to 120 degrees C. for 1 hour upon which a clear dispersion resulted. The reaction mixture was then cooled to room temperature for further processing.

The capped nanocrystal was purified by washing to remove excess capping agent and other by-products. The capped nanocrystal was precipitated from the reaction mixture using an anti-solvent such as heptane in a 2:1 ratio of heptane to reaction mixture by weight. The precipitate was collected by centrifugation at 4500 rpm for 10 minutes. The resulting supernatant was decanted and discarded. The solid was dispersed in THF. The dispersed solid was again precipitated with an anti-solvent such as heptane in a 2:1 ratio of heptane to reaction mixture by weight. The precipitate was collected by centrifugation at 4500 rpm for 10 minutes. The resulting supernatant was decanted and discarded. The solid was again dispersed in THF. The dispersed solid was precipitated a third time using an anti-solvent such as heptane in a 2:1 ratio of heptane to reaction mixture by weight. The precipitate was collected by centrifugation at 4500 rpm for 10 minutes and dried overnight in a vacuum oven.

The dried solids were re-dispersed in a 1:1 ratio of solids to solvent in PGMEA to create a 50% by weight loaded dispersion. The resulting dispersion was filtered through a 0.45 micron and then a 0.2-micron PTFE filter.

TABLE 1

Reaction conditions used to synthesize TiO$_2$ nanocrystals in 2-gallon Parr reactor.

| Experiment | Time | Temp C. | Titanium(IV) butoxide (g) | Benzyl Alcohol (g) | Water (g) |
|---|---|---|---|---|---|
| Experiment 1 | 1 hr | 200 | 879 | 3550 | 23.3 |
| Experiment 2 | 1 hr | 250 | 879 | 3550 | 23.3 |
| Experiment 3 | 1 hr | 250 | 879 | 3550 | 116.3 |
| Experiment 4 | 1 hr | 300 | 879 | 3550 | 23.3 |
| Experiment 5 | 3 hr | 200 | 879 | 3550 | 116.3 |
| Experiment 6 | 3 hr | 200 | 879 | 3550 | 23.3 |
| Experiment 7 | 1 hr | 225 | 879 | 3550 | 14 |
| Experiment 8 | 3 hr | 200 | 879 | 3550 | 34.9 |
| Experiment 9 (Example 10) | 4.25 hr | 200 | 879 | 3550 | 23.3 |
| Experiment 10 | 12 hr | 220 | 879 | 3550 | 9.3 |
| Experiment 11 | 8 hr | 220 | 1758 | 2636.7 | 69.8 |
| Experiment 12 | 4.25 hr | 200 | 879 | 3550 | 23.3 |
| Experiment 13 | 1 hr | 225 | 879 | 3550 | 9.3 |
| Experiment 15 | 1 hr | 225 | 879 | 3550 | 0 |

TABLE 1-continued

Example 12

An exemplary formulation comprises PGMEA as the solvent, an acrylic monomer, bisphenol A glycerolate dimethacrylate (BisGMA), capped titanium oxide nanocrystals (with 90% by weight to the monomer), 4% of Irgacure 184 by weight to the monomer.

The capped titanium oxide nanocrystal used in this formulation is described in example 8. A 50% by weight of the capped titanium oxide nanocrystal in propylene glycol monomethyl ether acetate (PGMEA) is mixed with the monomer, bisphenol A glycerolate dimethacrylate (BisGMA), at 9:1 ratio of nanocrystal to monomer. The nanocrystal and PGMEA is 50% by weight in the formulation respectively. The mixture is blended by stirring on a stir plate using magnetic stirrer or vortexing at 25-30 C temperature for 1-2 hours to allow homogenous mixture. Photoinitiator, Irgacure 184 added to the formulation at 4% by weight to the monomer and again mixed at room temperature on a stir plate using a magnetic stirrer for an additional 5-30 minutes at temperature of 20-30 C. The resulting formulation is filtered through a membrane filter to yield a clear, transparent, liquid. The viscosity of the formulation is between 5-6 cP which is measured by Brookfield RVDV-II+ PCP cone and plate viscometer.

Figure 12:
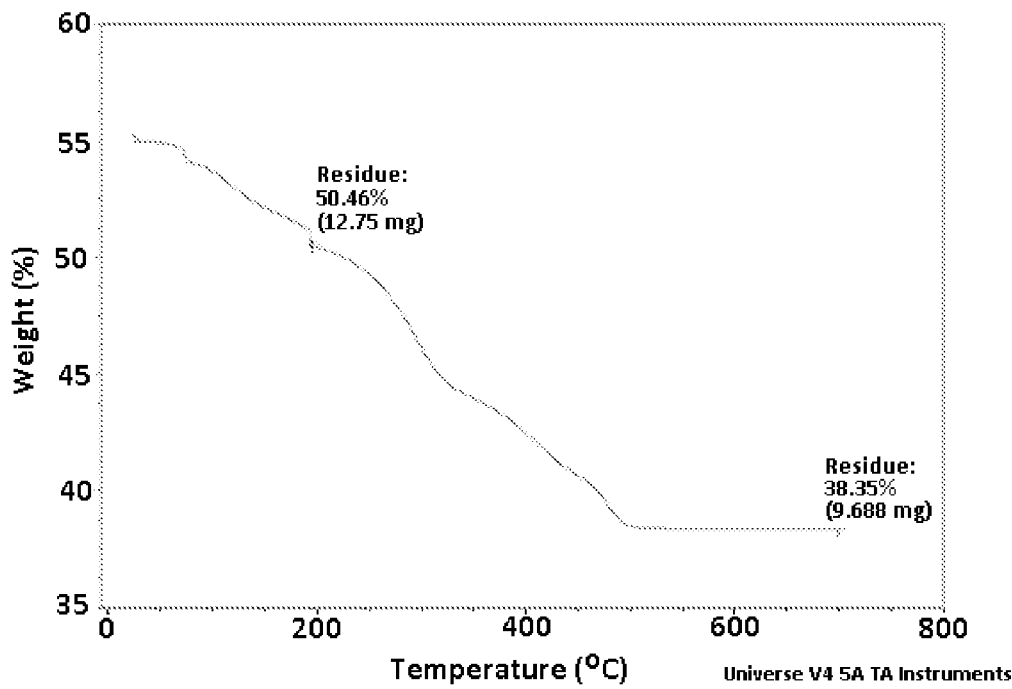
FIG. 12: An exemplary TGA plot of a formulation described in Example 12.

The % solid and the % inorganic content of the formulation is measured using the TA instrument's Q500 thermal gravimetric analyzer (TGA) and is shown in FIG. 12. The weight percentage is measured as a function of temperature, showing a weight percentage of 50.46% solids at 200 C and 38.35% inorganic content at 700 C with an organic content of 24.00%.

Figure 13:
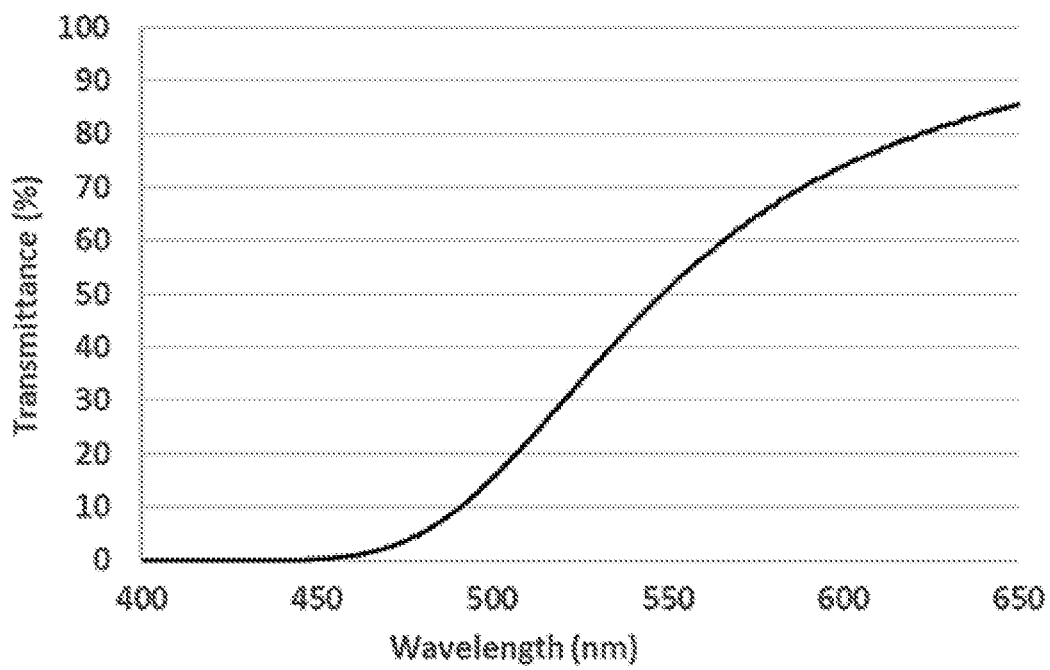
FIG. 13: An exemplary optical transmittance of a formulation described in Example 12.

Shown in FIG. 13 is the optical transmittance spectrum of 50% by weight capped nanocrystal in the formulation measured in a 1 cm path length cuvette. The measurement is taken using Perkin Elmer Lambda 850 spectrophotometer using air as the reference or background. The figure shows a % transmittance of 0.002%, 0.28%, 15.50% and 85.67% at 400 nm, 450 nm, 500 nm and 650 nm respectively. The formulation has lower transmittance at lower wavelength and increases as the wavelength increases.

The nanocomposite coating or films with this formulation is coated on a 2.5×2.5-inch (0.7 mm thick) soda lime glass wafer. The glass wafer is cleaned before applying the film to remove contaminants and dusts. 2-micron thick film is spin coated on the glass wafer at 4000 rpm for 1 minute. Since this is a solvent-based formulation, the coated film is processed by an initial bake process at 100 C on a hot plate for 1 minute to remove some solvent prior to UV exposure. The film is exposed to UV for 120 seconds using Dymax EC-5000 system with a mercury 'H' bulb at 6 J/cm$^2$. The film is then subjected to a 10-minute post bake on a hotplate at 100 C under air to remove residual solvents. The film thickness is measured using Tencor P-2 surface profilometer.

A film of 2-micron thickness produced with the formulation comprising of capped titanium oxide nanocrystals to the monomer, bisphenol A glycerolate dimethacrylate (BisGMA) at a ratio of 9:1, demonstrates a refractive index of 1.943 and 1.881 at 448 nm and 635 nm respectively. The refractive index is measured using Metricon's 2010/M model Prism Coupler which is equipped with 448 nm and 635 nm laser beam.

The films produced with the formulation demonstrates high clarity, transparency and uniformity. The film has a % haze of ~0.14 and yellowness number, b*, of 2.7 measured using HunterLab's Vista hazemeter. The low haze % signifies high clarity of the film.

Figure 14:
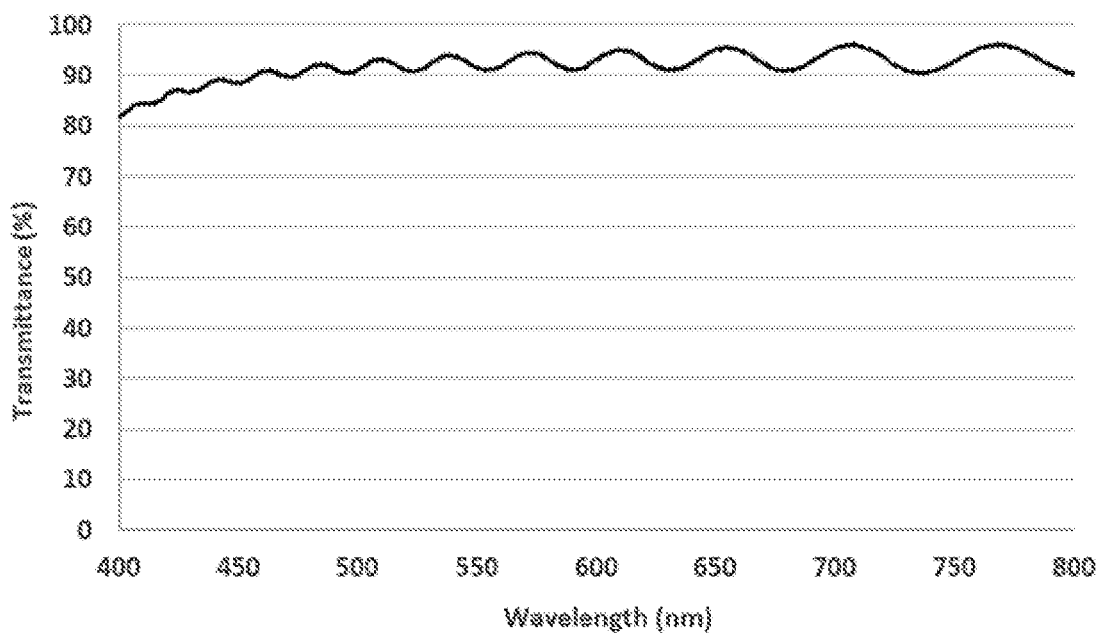
FIG. 14: An exemplary optical transmittance plot of a 2-micron thick spin coated nanocomposite film produced from the formulation described Example 12.

The films produced with the formulation demonstrate high optical transmittance. FIG. 14 shows the optical transmittance of an as-made film measured by Perkin Elmer Lambda 850 spectrophotometer with a blank soda lime glass as the reference or background. The thickness of the film is about 2 microns. The films show an optical transmittance of >80% at wavelengths between 400-800 nm, >85% at wavelengths between 450-800 nm and >95% at wavelengths between 550-800 nm The ripples in the spectrum are the results of interference of incoming light and reflected light, it usually is an indication of high film quality, i.e. high smoothness, high uniformity, and high transparency.

A summary of the properties of the nanocomposite formulation is reported in table 5.

Example 13

Another exemplary formulation comprises PGMEA as the solvent, an acrylic monomer, biphenylmethyl acrylate (Miramer M1192), capped titanium oxide nanocrystals (with 90% by weight to the monomer), 4% of Irgacure 819 by weight to the monomer.

The capped titanium oxide nanocrystal used in this formulation is described in example 8. A 50% by weight of the capped titanium oxide nanocrystal in propylene glycol monomethyl ether acetate (PGMEA) is mixed with the monomer, bisphenol A glycerolate dimethacrylate (BisGMA), at 9:1 ratio of nanocrystal to monomer. The nanocrystal and PGMEA is 50% by weight in the formulation respectively. The mixture is blended by stirring on a stir plate using magnetic stirrer or vortexing at 25-30 C temperature for 1-2 hours to allow homogenous mixture. Photoinitiator, Irgacure 819 added to the formulation at 4% by weight to the monomer and again mixed at room temperature on a stir plate using a magnetic stirrer for an additional 5-30 minutes at temperature of 20-30 C. The resulting formulation is filtered through a membrane filter to yield a clear, transparent, liquid. The viscosity of the formulation is between 5-6 cP which is measured by Brookfield RVDV-II+ PCP cone and plate viscometer.

The nanocomposite coating or films with this formulation is coated on a 2.5" (0.7 mm thick) soda lime glass wafer. The glass wafer is cleaned according to the internal cleaning procedure before applying the film to remove contaminants and dusts. 1-micron thick film is spin coated at 3000 rpm for 1 minute on the glass wafer. Since this is a solvent-based formulation, the coated film is processed by an initial bake process at 100 C on a hot plate for 1 minute to remove some solvent prior to UV exposure. The film is exposed to UV for 2 second using Dymax BlueWave PrimeCure LED curing systems (385 nm) at 2 J/cm2. The film is then subjected to a 10-minute post bake on a hotplate at 100 C to remove residual solvents. The film thickness is measured using Tencor P-2 surface profilometer.

For a film of ~1-micron thickness, it demonstrates a refractive index of 1.928 and 1.897 at 448 nm and 635 nm respectively as measured using Metricon's 2010/M model.

Example 14

Another exemplary formulation comprises DPGME as the solvent, an acrylic monomer, bisphenol A glycerolate dimethacrylate (BisGMA), capped titanium oxide nanocrystals (with 90% by weight to the monomer), 20% of Irgacure 819 by weight to the monomer.

The capped titanium oxide nanocrystal used in this formulation is described in example 5. A 50% by weight of the capped titanium oxide nanocrystal in propylene glycol monomethyl ether acetate (PGMEA) is mixed with the monomer, bisphenol A glycerolate dimethacrylate (BisGMA), at 9:1 ratio of nanocrystal to monomer. The nanocrystal and PGMEA is 50% by weight in the formulation respectively. The mixture is blended by stirring on a stir plate using magnetic stirrer or vortexing at 25-30 C temperature for 1-2 hours to allow homogenous mixture. Photoinitiator, Irgacure 819 added to the formulation at 20% by weight to the monomer and again mixed at room temperature on a stir plate using a magnetic stirrer for an additional 5-30 minutes at temperature of 20-30 C. The resulting formulation is filtered through a membrane filter to yield a clear, transparent, liquid. The viscosity of the formulation is between 5-6 cP which is measured by Brookfield RVDV-II+ PCP cone and plate viscometer.

The nanocomposite coating or films with this formulation is coated on a 2.5×2.5-inch (0.7 mm thick) soda lime glass wafer. The glass wafer is cleaned according to the internal cleaning procedure before applying the film to remove contaminants and dusts. 1-2-micron thick film is either spin coated at 2000-4000 rpm for 1 minute on the glass wafer. Since this is a solvent-based formulation, the coated film is processed by an initial bake process at 50 C for 5 minutes, followed by 100 C for 1 minute a hot plate to remove some solvent prior to UV exposure. The film is then exposed to 385 nm LED for 30 seconds using Dymax BlueWave PrimeCure LED curing systems (385 nm) at 4 J/cm2. The film is then subjected to a 10-minute post bake on a hotplate at 130 C to remove residual solvents. The film thickness is measured using Tencor P-2 surface profilometer.

A film of 2-micron thickness produced with the formulation comprising of capped titanium oxide nanocrystals to the monomer, bisphenol A glycerolate dimethacrylate (BisGMA) at a ratio of 9:1, demonstrates a refractive index of 1.994 and 1.935 at 448 nm and 635 nm respectively. The refractive index is measured using Metricon's 2010/M model Prism Coupler which is equipped with 448 nm and 635 nm laser beam.

A film of 1-micron thickness produced with the formulation demonstrates high clarity, transparency and uniformity. The film has a % haze of % haze of ~0.13 and yellowness number, b*, of 2.7 measured using HunterLab's Vista hazemeter. The low haze % signifies high clarity of the film.

Figure 15:
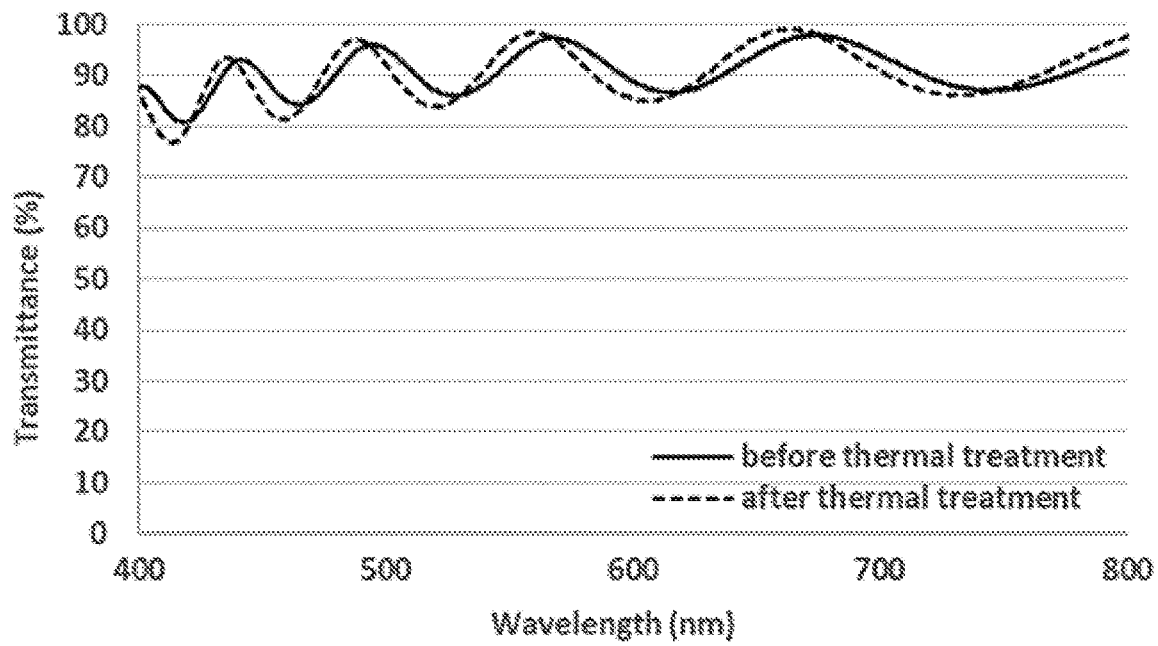
FIG. 15: An exemplary optical transmittance plot of a 1-micron thick spin coated as-made (solid line) nanocomposite film produced from the formulation described Example 14 and after 150 C thermal treatment (dotted line) for 2 hours under vacuum.

The films produced with the formulation demonstrate high optical transmittance. FIG. 15 shows the optical transmittance of an as-made (solid line) film measured by Perkin Elmer Lambda 850 spectrophotometer with a blank soda lime glass as the reference or background. The thickness of the film is about 1 micron. The films show an optical transmittance of >85% at wavelengths between 375-800 nm and >95% at wavelengths between 500-800 nm. The ripples in the spectrum are the results of interference of incoming light and reflected light, it usually is an indication of high film quality, i.e. high smoothness, high uniformity, and high transparency.

Furthermore, the thermal stability of the film was tested by heating the film at a temperature of 150 C under vacuum for 2 hours. No delamination or cracking of the film is observed upon thermal treatment; however, the film had a slight yellow tint. FIG. 15 shows the optical transmittance of the as-made film (solid lines) and after 150 C treatment. Change in % transmittance is less than 3% at 400 nm. The films before and after the thermal treatment show an optical transmittance of >85% at wavelengths between 375-800 nm and >95% at wavelengths between 500-800 nm.

A summary of the optical properties of the nanocomposite film is reported in table 6.

Example 15

An exemplary formulation comprises DPGME as the solvent, an acrylic monomer, bisphenol A glycerolate dimethacrylate (BisGMA), capped titanium oxide nanocrystals (with 90% by weight to the monomer), 4-32% of Irgacure 819 by weight to the monomer, titanium dioxide (200-400 nm) nanoparticles, as scatterers, and a surfactant, Solsperse 41000.

Bisphenol A glycerolate dimethacrylate (BisGMA), Solsperse-41000 and titanium dioxide powder (scatterer particles) are mixed in solvent di(propylene glycol) methyl ether (DPGME) using high shear mixing technique at 500 rpm at temperature of 20-30 C for 2 hours. The resulting titanium dioxide monomer paste that has a viscosity range between 1000-2000 cP is mixed with a 50% by weight capped titanium dioxide nanocrystal described in example 5 with DPGME as the solvent and again mixed using high shear mixing for 2 hours at 25-30 C temperatures.

At the end of the mixing process, a white flowable semi-solid paste of viscosity in the range of 100-120 cPs is obtained. The viscosity is measured by Brookfield RVDV-II+ PCP cone and plate viscometer. The viscosity of the paste can be adjusted by the addition of DPGME solvent for various coating deposition methods.

The scatterer nanocomposite coating or film is coated on a 2.5" (0.7 mm thick) soda lime glass wafer. The glass wafer is cleaned according to the internal cleaning procedure before applying the film to remove contaminants and dusts. 1-micron thick film is either spin coated at 4000 rpm for 1 minute on the glass wafer. Since this is a solvent-based formulation, the coated film is processed by an initial bake process at 50 C for 5 minutes, followed by 100 C for 1 minute a hot plate to remove some solvent prior to UV exposure. The film is then exposed to 385 nm LED for 30 seconds using Dymax BlueWave PrimeCure LED curing systems (385 nm) at 4 J/cm. The film is then subjected to a 10-minute post bake on a hotplate at 130 C to remove residual solvents. The film thickness is measured using Tencor P-2 surface profilometer.

A film of 1-micron thickness produced with the formulation demonstrates a % haze of ~57 and yellowness number, b*, of ~13 measured using HunterLab's Vista hazemeter. The % haze and b* depends on the size and concentration of the scatterers in the film.

Figure 16:
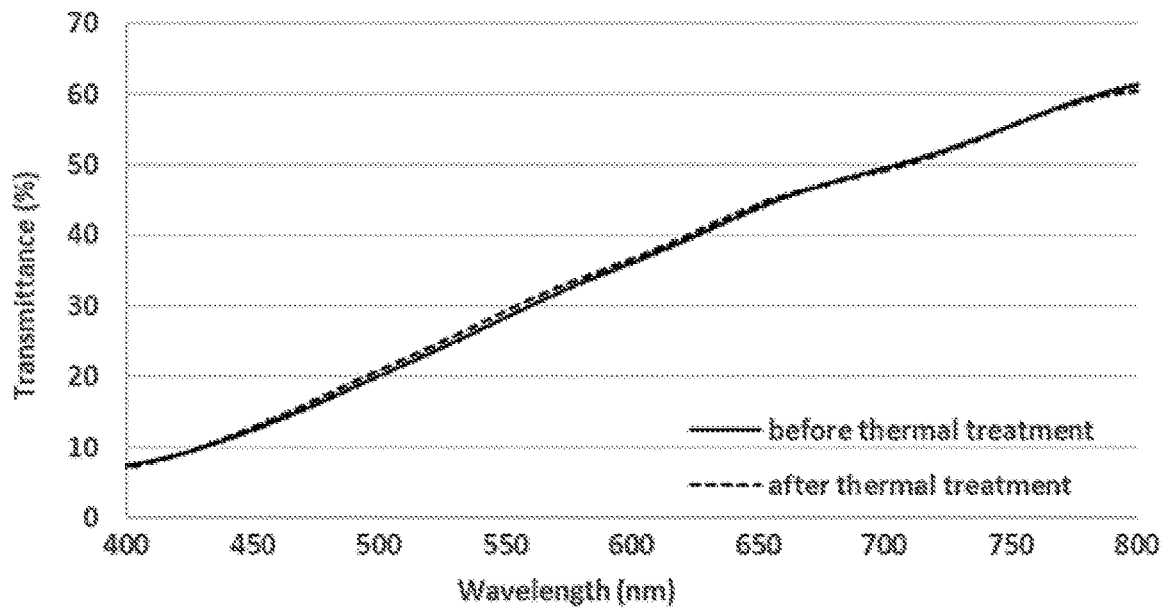
FIG. 16: An exemplary optical transmittance plot of a 1-micron thick spin coated as-made (solid line) nanocomposite film produced from the formulation described Example 15 and after 150 C thermal treatment (dotted line) for 2 hours under vacuum.

The films produced with the formulation demonstrate high optical transmittance. FIG. 16 shows the optical transmittance of an as-made film (solid lines) measured by Perkin Elmer Lambda 850 spectrophotometer with a blank soda lime glass as the reference or background. The thickness of the film is about 1 micron. The films show an optical transmittance of >10% at wavelengths between 350-800 nm and >20% at wavelengths between 550-800 nm.

Furthermore, the thermal stability of the film was tested by heating the film at a temperature of 150 C under vacuum for 2 hours. No delamination or cracking of the film is observed upon thermal treatment, however the film had a slight yellow tint. FIG. 16 shows the optical transmittance of the as-made film (solid lines) and after 150 C treatment. Change in % transmittance is less than 3% at 400 nm. The films before and after the thermal treatment show an optical transmittance of >10% at wavelengths between 375-800 nm and >20% at wavelengths between 500-800 nm.

A summary of the optical properties of the nanocomposite formulation is reported in table 6.

Example 16

An exemplary formulation comprises PGMEA as the solvent, an acrylic monomer, bisphenol A glycerolate dimethacrylate (BisGMA), capped titanium oxide nanocrystals (with 90% by weight to the monomer), 4% of Irgacure 819 by weight to the monomer.

The capped titanium oxide nanocrystal used in this formulation is described in example 10. A 50% by weight of the capped titanium oxide nanocrystal in propylene glycol monomethyl ether acetate (PGMEA) is mixed with the monomer, bisphenol A glycerolate dimethacrylate (BisGMA), at 9:1 ratio of nanocrystal to monomer. The nanocrystal and PGMEA is 50% by weight in the formulation respectively. The mixture is blended by stirring on a stir plate using magnetic stirrer or vortexing at 25-30 C temperature for 1-2 hours to allow homogenous mixture. Photoinitiator, Irgacure 819 added to the formulation at 4% by weight to the monomer and again mixed at room temperature on a stir plate using a magnetic stirrer for an additional 5-30 minutes at temperature of 20-30 C. The resulting formulation is filtered through a membrane filter to yield a clear, transparent, liquid. The viscosity of the formulation is between 5-6 cP which is measured by Brookfield RVDV-II+ PCP cone and plate viscometer.

Figure 17:
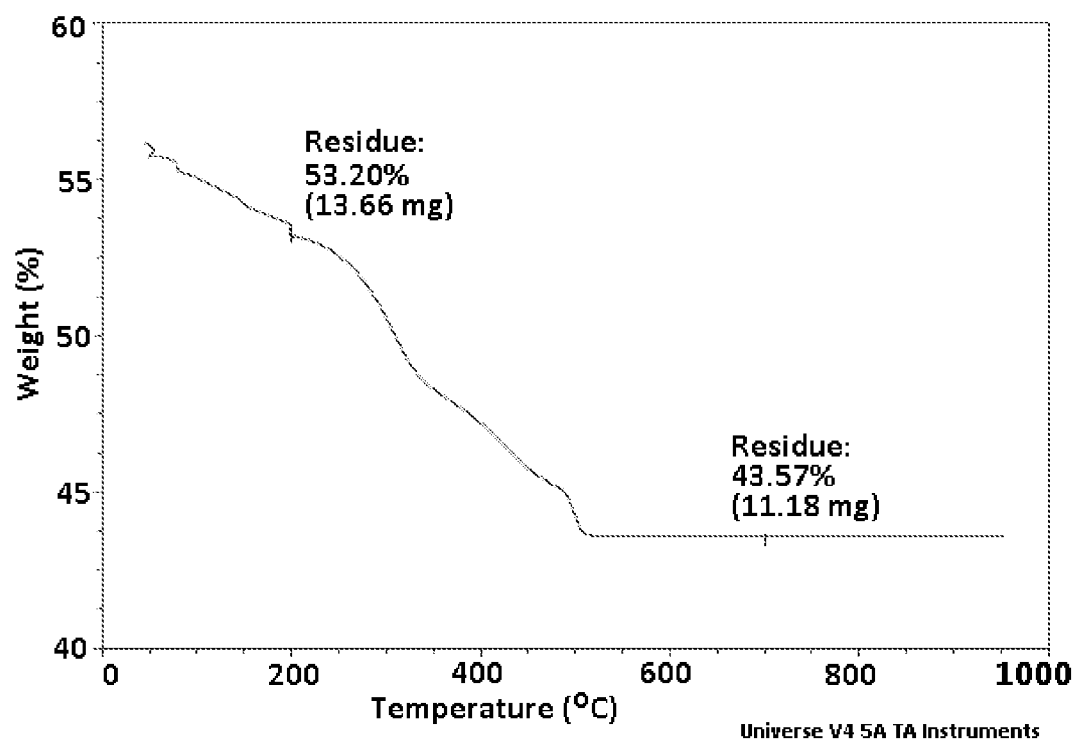
FIG. 17: An exemplary TGA plot of a formulation described in Example 16.

The % solid and the % inorganic content of the formulation is measured using the TA instrument's Q500 thermal gravimetric analyzer (TGA) and is shown in FIG. 17. The weight percentage is measured as a function of temperature, showing a weight percentage of 53.20% solids at 200 C and 43.57% inorganic content at 700 C with an organic content of 18.10%

The nanocomposite coating or films with this formulation is coated on a 2.5×2.5-inch (0.7 mm thick) soda lime glass wafer. The glass wafer is cleaned before applying the film to remove contaminants and dusts. 2-micron thick film is spin coated on the glass wafer at 4000 rpm for 1 minute. Since this is a solvent-based formulation, the coated film is processed by an initial bake process at 100 C on a hot plate for 1 minute to remove some solvent prior to UV exposure. The film is exposed to UV for 120 seconds using Dymax EC-5000 system with a mercury 'H' bulb at 6 J/cm2. The film is then subjected to a 10-minute post bake on a hotplate at 100 C under air to remove residual solvents. The film thickness is measured using Tencor P-2 surface profilometer.

A film of 2-micron thickness produced with the formulation comprising of capped titanium oxide nanocrystals to the monomer, bisphenol A glycerolate dimethacrylate (BisGMA) at a ratio of 9:1, demonstrates a refractive index of 2.0779 and 1.9857 at 448 nm and 635 nm respectively. The refractive index is measured using Metricon's 2010/M model Prism Coupler which is equipped with 448 nm and 635 nm laser beam.

The films produced with the formulation demonstrates high clarity, transparency and uniformity. The film has a % haze of ~0.11 and yellowness number, b*, of 2.15 measured using HunterLab's Vista hazemeter. The low haze % signifies high clarity of the film.

Figure 18:
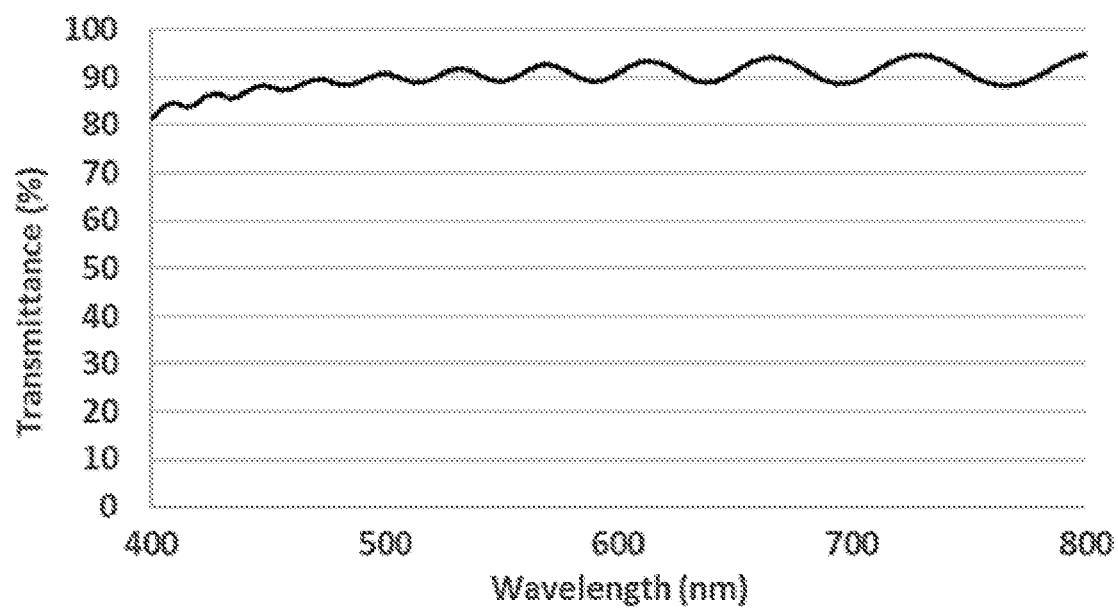
FIG. 18: An exemplary optical transmittance plot of a 2-micron thick spin coated nanocomposite film produced from the formulation described Example 16.

The films produced with the formulation demonstrate high optical transmittance. FIG. 18 shows the optical transmittance of an as-made film measured by Perkin Elmer Lambda 850 spectrophotometer with a blank soda lime glass as the reference or background. The thickness of the film is about 2 microns. The films show an optical transmittance of >80% at wavelengths between 400-800 nm, >85% at wavelengths between 450-800 nm and >95% at wavelengths between 550-800 nm. The ripples in the spectrum are the results of interference of incoming light and reflected light, it usually is an indication of high film quality, i.e. high smoothness, high uniformity, and high transparency.

A summary of the properties of the nanocomposite formulation and the nanocomposite film is reported in table 5 & 6.

Example 17

Another exemplary formulation comprises PGMEA as the solvent, an acrylic monomer, bisphenol A glycerolate dimethacrylate (BisGMA), mixture of capped titanium oxide-nanocrystals and capped zirconium oxide nanocrystal (90% by weight of the total nanocrystal to the monomer), 4% of Irgacure 184 by weight to the monomer. The dispersion properties of the 50% total nanocrystal by weight mixture of the capped titanium oxide and capped zirconium oxide nanocrystals in PGMEA used in this formulation is described in TABLE 3. A 50% by weight of the capped nanocrystal in propylene glycol monomethyl ether acetate (PGMEA) is mixed with the monomer, bisphenol A glycerolate dimethacrylate (BisGMA), at 9:1 ratio of nanocrystal to monomer. The nanocrystal and PGMEA is 50% by weight in the formulation respectively. The mixture is blended by stirring on a stir plate using magnetic stirrer or vortexing at 25-30 C temperature for 1-2 hours to allow homogenous mixture. Photoinitiator, Irgacure 184 added to the formulation at 4% by weight to the monomer and again mixed at room temperature on a stir plate using a magnetic stirrer for an additional 5-30 minutes at temperature of 20-30 C. The resulting formulation is filtered through a membrane filter to yield a clear, transparent, liquid. The viscosity of the formulation is between 5-6 cP which is measured by Brookfield RVDV-II+ PCP cone and plate viscometer.

TABLE 3

| $ZrO_2:TiO_2$ Ratio | DLS | | | % Solids | TGA % inorganics | TGA % organics | UV | |
|---|---|---|---|---|---|---|---|---|
| | Volume | Intensity | D9999 | | | | OD400 | OD650 |
| 100-0 | 8.005 | 8.911 | 17.8 | 50.39 | 42.64 | 15.38 | 0.37 | 0.04 |
| 90-10 | 9.348 | 11.69 | 27.6 | 50.29 | 42.39 | 15.71 | 0.85 | 0.09 |
| 80-20 | 10.26 | 13 | 32.5 | 50.25 | 42.29 | 15.84 | 1.13 | 0.1 |
| 70-30 | 11.6 | 13.19 | 28.1 | 50.17 | 42.05 | 16.18 | 1.35 | 0.1 |
| 60-40 | 11.71 | 13.85 | 31.8 | 50.24 | 42.09 | 16.22 | 1.61 | 0.11 |
| 50-50 | 11.72 | 14.16 | 31.8 | 49.85 | 41.77 | 16.21 | 1.82 | 0.11 |
| 40-60 | 12.15 | 14.37 | 31.9 | 49.52 | 41.34 | 16.52 | 2.01 | 0.12 |
| 30-70 | 11.93 | 13.49 | 27.8 | 49.33 | 41.03 | 16.83 | 2.18 | 0.12 |
| 20-80 | 9.077 | 12.7 | 27.1 | 49.49 | 40.83 | 17.5 | 2.35 | 0.12 |
| 10-90 | 10.19 | 11.97 | 26.5 | 48.95 | 40.53 | 17.2 | 2.5 | 0.11 |
| 0-100 | 9.601 | 10.99 | 23.5 | 48.75 | 40.05 | 17.85 | 2.76 | 0.14 |

The nanocomposite coating or films with this formulation is coated on a 2.5×2.5-inch (0.7 mm thick) soda lime glass wafer. The glass wafer is cleaned before applying the film to remove contaminants and dusts. 2-micron thick film is spin coated on the glass wafer at 4000 rpm for 1 minute. Since this is a solvent-based formulation, the coated film is processed by an initial bake process at 100 C on a hot plate for 1 minute to remove some solvent prior to UV exposure. The film is exposed to UV for 120 seconds using Dymax EC-5000 system with a mercury 'H' bulb at 6 J/cm2. The film is then subjected to a 10-minute post bake on a hotplate at 100 C under air to remove residual solvents. The film thickness is measured using Tencor P-2 surface profilometer.

Shown in TABLE 4 is the summary of the optical properties of the nanocomposite films made with different ratio of capped zirconium oxide to capped titanium oxide nanocrystals. A film of 2-micron thickness produced with the mixed the nanocrystal formulation comprising of capped nanocrystal to the monomer, bisphenol A glycerolate dimethacrylate (BisGMA) at a ratio of 9:1, demonstrates a refractive index between the range of 1.797 to 1.939 and 1.765 to 1.889 at 448 nm and 635 nm respectively. The refractive index is measured using Metricon's 2010/M model Prism Coupler which is equipped with 448 nm and 635 nm laser beam.

TABLE 4

| $ZrO_2:TiO_2$ Ratio | % transmission Film@350 nm | % transmission Film@400 nm | % transmission Film@650 nm | Refractive Index at 448 nm | Refractive Index at 635 nm | b* | % haze |
|---|---|---|---|---|---|---|---|
| 100:0 | 94.2 | 98.0 | 98.2 | 1.797 | 1.765 | 0.62 | 0.16 |
| 90:10 | 91.6 | 96.0 | 96.8 | 1.815 | 1.783 | 0.75 | 0.07 |
| 80:20 | 85.9 | 97.0 | 96.4 | 1.836 | 1.796 | 1.10 | 0.34 |

TABLE 4-continued

| ZrO$_2$:TiO$_2$ Ratio | % transmission Film@350 nm | % transmission Film@400 nm | % transmission Film@650 nm | Refractive Index at 448 nm | Refractive Index at 635 nm | b* | % haze |
|---|---|---|---|---|---|---|---|
| 70:30 | 80.3 | 93.8 | 98.6 | 1.857 | 1.809 | 1.47 | 0.16 |
| 60:40 | 76.8 | 95.6 | 97.4 | 1.870 | 1.819 | 1.45 | 0.25 |
| 50:50 | 70.9 | 94.1 | 98.6 | 1.884 | 1.828 | 1.57 | 0.28 |
| 40:60 | 68.0 | 93.9 | 97.2 | 1.901 | 1.843 | 1.48 | 0.10 |
| 30:70 | 59.8 | 92.8 | 98.3 | 1.911 | 1.852 | 2.04 | 0.16 |
| 20:80 | 54.3 | 91.7 | 96.8 | 1.921 | 1.866 | 2.12 | 0.08 |
| 10:90 | 49.7 | 91.6 | 96.8 | 1.931 | 1.889 | 2.42 | 0.15 |
| 0:100 | 41.0 | 91.1 | 97.4 | 1.939 | 1.889 | 2.65 | 0.13 |

The films produced with the mixed nanocrystal formulation demonstrates high clarity, transparency and uniformity. The film has a % haze in the range of 0.07-0.28 and yellowness number, b*, in the range of 0.62-2.7 measured using HunterLab's Vista hazemeter.

Figure 19:
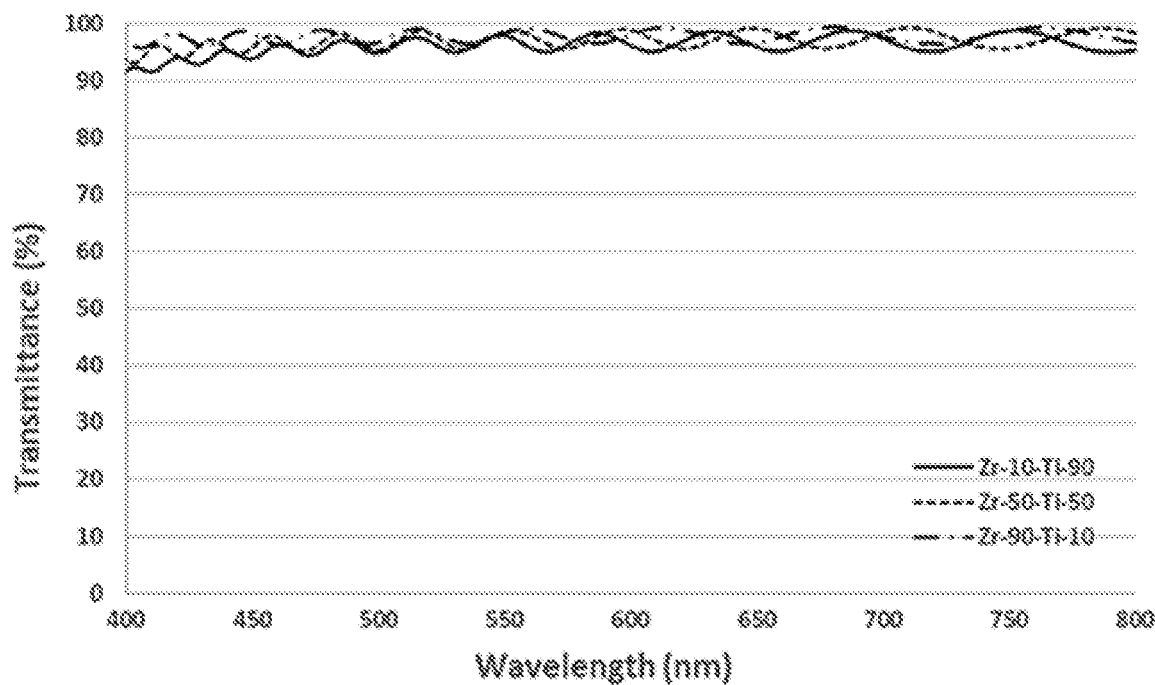
FIG. 19: An exemplary optical transmittance of a 2-micron thick spin coated nanocomposite film produced with formulation described in Example 17.

The films produced with the formulation demonstrate high optical transmittance. FIG. 19 shows the optical transmittance of an as-made film measured by Perkin Elmer Lambda 850 spectrophotometer with a blank soda lime glass as the reference or background. The thickness of the film is about 2 microns. The films show an optical transmittance of >85% at wavelengths between 375-800 nm, >90% at wavelengths between 400-800 nm and >95% at wavelengths between 450-800 nm. The ripples in the spectrum are the results of interference of incoming light and reflected light, it usually is an indication of high film quality, i.e. high smoothness, high uniformity, and high transparency.

Example 18

In another example, titanium oxide nanocrystals were prepared from 2583 millimoles of titanium (IV) butoxide, 2583 millimoles of water, mixed with 3400 milliliters of benzyl alcohol in an inert atmosphere which was transferred to 2-gallon Parr reactor. The reaction mixture was heated to 205° C. for 3 hours at a heating rate of 2° C./min with a stirring of 700 RPM. The pressure of the reactor reached 50 to 65 psi during the reaction. After the reaction was complete and the reactor was returned to room temperature, a white milky solution of as-synthesized titanium oxide nanocrystals was collected.

This milky white suspension was transferred to centrifuge bottles and centrifuged at 4500 rpm for 5 min. The supernatant was decanted and discarded leaving a wet cake settling at the bottom of the centrifuge bottle. The wet cake was then rinsed with PGMEA at a 2.75 to 1 ratio of solvent to wet cake by weight, and vigorously agitated. The suspension was then centrifuged again at 1500 rpm for 5 min, and the resulting supernatant decanted off the top. The wet cake was then transferred to a 3000 ml round bottom flask. PGMEA was added at 1.857:1 solvent to wet cake. Methoxy (triethyleneoxy) propyltrimethoxysilane was then added to a reaction flask at 17% by weight with respect to the wet cake. This mixture was then heated to 120 degrees C. for 1 hour upon which a clear dispersion resulted. The reaction mixture was then cooled to room temperature for further processing.

The capped nanocrystal was purified by washing to remove excess capping agent and other by-products. The capped nanocrystal was precipitated from the reaction mixture using an anti-solvent such as heptane in a 2:1 ratio of heptane to reaction mixture by weight. The precipitate was collected by centrifugation at 4500 rpm for 10 minutes. The resulting supernatant was decanted and discarded. The solid was dispersed in THF. The dispersed solid was again precipitated with an anti-solvent such as heptane in a 2:1 ratio of heptane to reaction mixture by weight. The precipitate was collected by centrifugation at 4500 rpm for 10 minutes. The resulting supernatant was decanted and discarded. The solid was again dispersed in THF. The dispersed solid was precipitated a third time using an anti-solvent such as heptane in a 2:1 ratio of heptane to reaction mixture by weight. The precipitate was collected by centrifugation at 4500 rpm for 10 minutes and dried overnight in a vacuum oven.

The dried solids were re-dispersed in a 1:1 ratio of solids to solvent in PGMEA to create a 50% by weight loaded dispersion. The resulting dispersion was filtered through a 0.45 micron and then a 0.2-micron PTFE filter.

Figure 20:
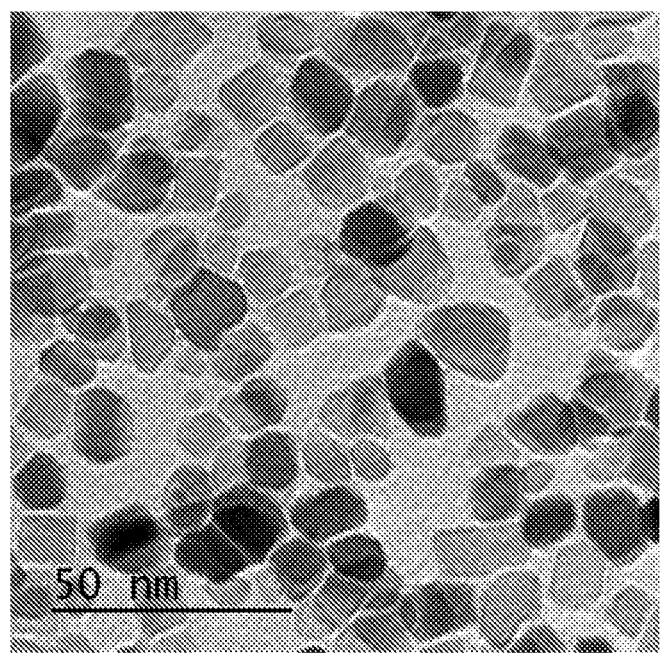
FIG. 20: An exemplary TEM image of titanium oxide nanocrystals described in example 18 showing average particle sizes less than 15 nanometers

Shown in FIG. 20 is the Transmission Electron Microscope (TEM) image the capped titanium oxide nanocrystals showing particle sizes less than 15 nanometer.

Figure 21:
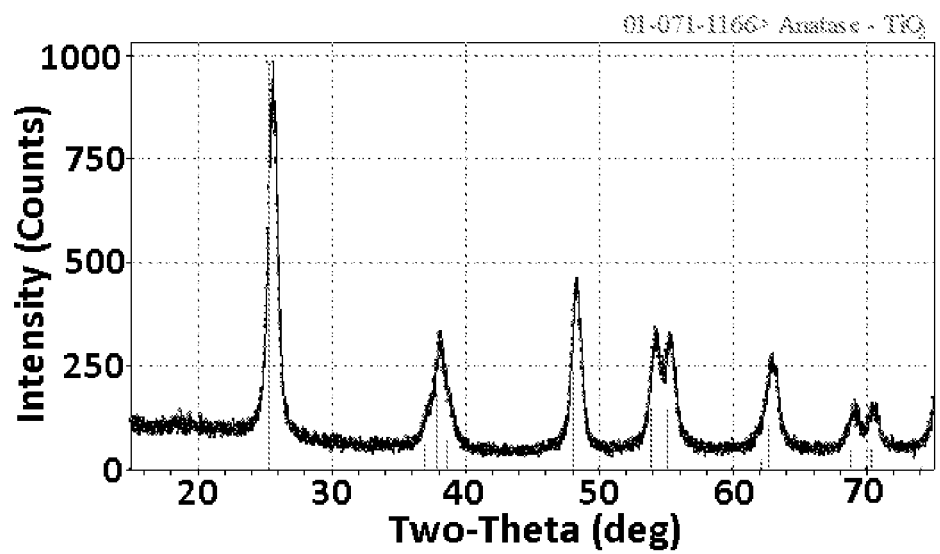
FIG. 21: An exemplary XRD pattern of titanium oxide nanocrystals described in example 18 matching the anatase phase.

Shown in FIG. 21 is the XRD pattern of titanium oxide nanocrystals. The XRD pattern of the titanium oxide nanocrystals matches the anatase phase. Particle size estimated from the line broadening to be 12.1 nm.

Figure 22:
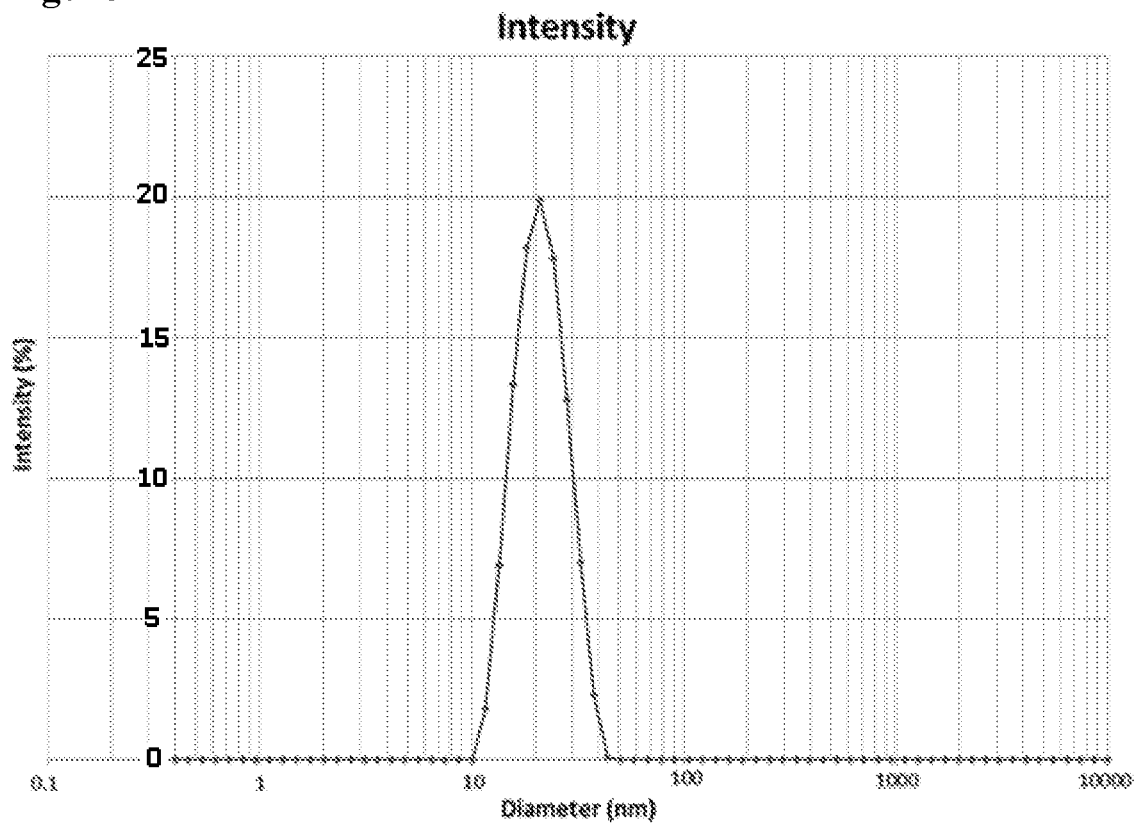
FIG. 22: An exemplary intensity versus particle size DLS plot of capped titanium oxide nanocrystals described in example 18 at 5% by weight in PGMEA showing an average particle size of 21.85 nanometer.

A narrow size distribution with a D9999 of 49.2 is observed by DLS. Shown in FIG. 22 is the DLS plot the capped titanium oxide nanocrystals dispersed at 5% by weight in PGMEA. The figure shows the DLS plot as a measure of Intensity versus particle size an average particle size of 21.85 nanometer.

Figure 23:
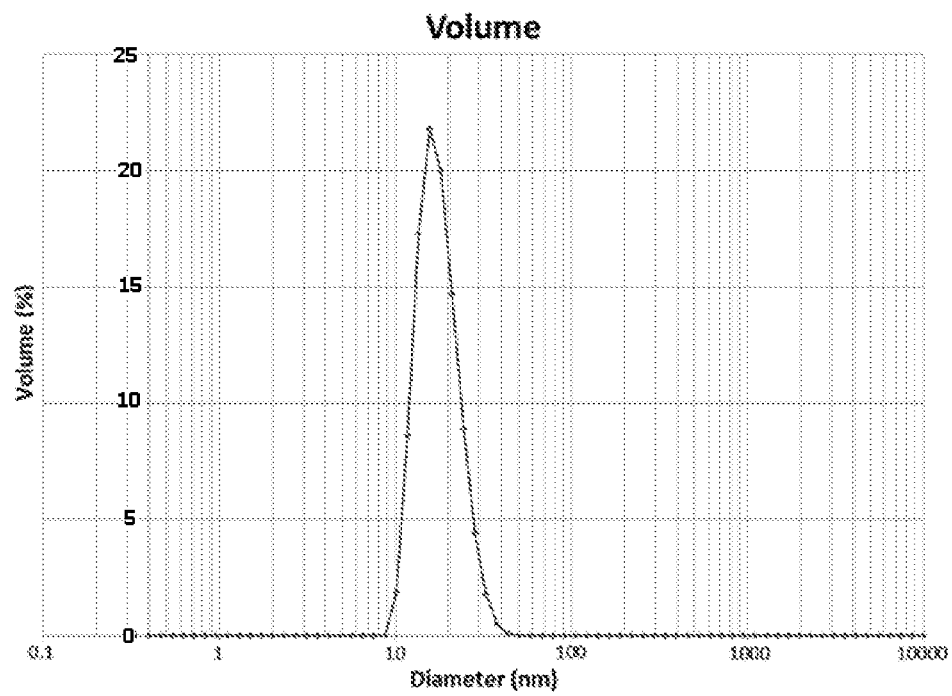
FIG. 23: An exemplary volume versus particle size DLS plot of capped titanium oxide nanocrystals described in example 18 at 5% by weight in PGMEA an average particle size of 17.91 nanometer.
Figure 24:
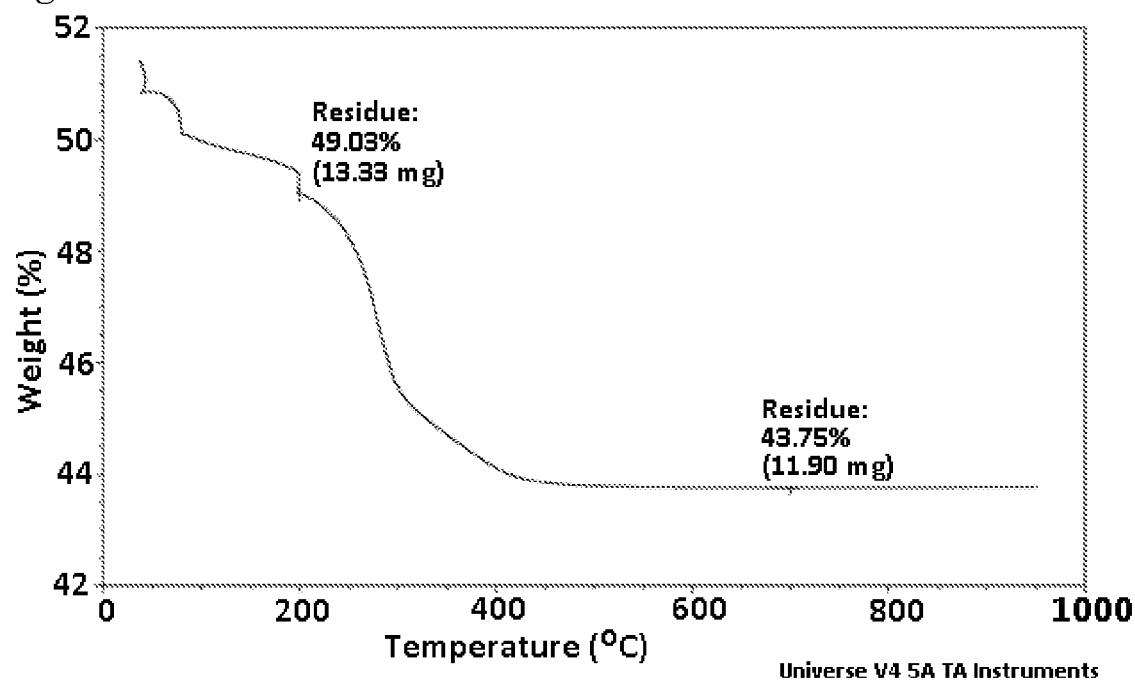
FIG. 24: An exemplary TGA plot of capped titanium oxide nanocrystals described in example 18 dispersed 50% by weight in PGMEA.

Shown in FIG. 23 is the DLS plot the capped titanium oxide nanocrystals dispersed at 5% by weight in PGMEA. The figure shows the DLS plot as a measure of Volume versus particle size showing an average particle size of 17.91 nanometer The % solid and the % inorganic content of the dispersion is measured using the TA instrument's Q500 thermal gravimetric analyzer (TGA) and is shown in FIG. 24. The weight percentage is measured as a function of temperature, showing a weight percentage of 49.03% solids at 200 C and 43.75% inorganic content at 700 C with an organic content of 10.77%.

Table 5 is the summary of the properties of the nanocrystal dispersion and formulation stated in the various examples.

TABLE 5

| | | Average particle size as measured by DLS, nm | | | %Transmittance of 50% dispersion in PGMEA as measured by UV-Vis spectrophotomer | | | | TGA measurements | | |
|---|---|---|---|---|---|---|---|---|---|---|---|
| | | Intensity | Volume | D9999 | 400 nm | 450 nm | 500 nm | 650 nm | % solids at 200 C. | %inorganic at 700 C. | %organic content |
| Example 1 | dispersion | 11.26 | 9.46 | 24.90 | 0.51 | 11.81 | 32.48 | 77.12 | 49.99 | 41.00 | 17.98 |
| Example 10 | dispersion | 44.73 | 21.72 | 123 | | | | | 51.86 | 46.36 | 10.61 |
| Example 12 | formulation | | | | 0.002 | 0.28 | 15.5 | 85.67 | 50.46 | 38.35 | 24 |
| Example 16 | formulation | | | | | | | | 53.20 | 43.57 | 18.10 |
| Example 18 | dispersion | 21.85 | 17.91 | 49.2 | | | | | 49.03 | 43.75 | 10.77 |

Table 6 is the summary of the optical properties of the nanocomposite films stated in the various examples.

TABLE 6

| | Thicknessof the nanocomposite | Refractive Index measured by prism coupler | | | %Transmittance of the nanocomposite as measured by UV-Vis spectrophotomer | | | |
|---|---|---|---|---|---|---|---|---|
| | | 448 nm | 635 nm | %haze | 400 nm | 500 nm | 600 nm | 800 nm |
| Example 12 | 2-micron | 1.943 | 1.881 | 0.14 | 81.85 | 91.49 | 92.92 | 93.03 |
| Example 13 | 1-micron | 1.928 | 1.897 | | | | | |
| Example 14 | 2-micron | 1.994 | 1.934 | 0.13 | 83.22 | 89.36 | 91.85 | 94.77 |
| Example 15 | 1-micron | | | 57 | 7.56 | 20.22 | 36.2 | 61.38 |
| Example 16 | 2-micron | 2.0779 | 1.9857 | 0.11 | 81.55 | 89.55 | 91.22 | 91.44 |

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

With respect to aspects of the invention described as a genus, all individual species are individually considered separate aspects of the invention. If aspects of the invention are described as "comprising" a feature, embodiments also are contemplated "consisting of" or "consisting essentially of" the feature.

As used herein, the term "about" modifying an amount related to the invention refers to variation in the numerical quantity that can occur, for example, through routine testing and handling; through inadvertent error in such testing and handling; through differences in the manufacture, source, or purity of ingredients employed in the invention; and the like. As used herein, "about" a specific value also includes the specific value, for example, about 10% includes 10%. Whether or not modified by the term "about", the claims include equivalents of the recited quantities. In one embodiment, the term "about" means within 20% of the reported numerical value.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments.

All of the various aspects, embodiments, and options described herein can be combined in any and all variations.

The content of each of the following applications is herein incorporated by reference in its entirety: 1) U.S. provisional application No. 62/769,696, filed Nov. 20, 2018; 2) U.S. provisional application No. 62/892,610, filed Aug. 28, 2019, and 3) International application Ser. No. PCT/US2019/062439, entitled "SOLVENT-FREE FORMULATIONS AND NANOCOMPOSITES" and filed Nov. 20, 2019, which claims priority to U.S. provisional application Nos. 62/769,696 and 62/892,610.

All publications, patents, and patent applications mentioned in this specification are herein incorporated by reference to the same extent as if each individual publication, patent, or patent application was specifically and individually indicated to be incorporated by reference. To the extent that any meaning or definition of a term in this document conflicts with any meaning or definition of the same term in a document incorporated by reference, the meaning or definition assigned to that term in this document shall govern.

What is claimed is:

1. At least partially capped TiO2 nanocrystals comprising $TiO_2$ nanocrystals at least partially capped with at least one capping agent selected from a silane, an alcohol, a carboxylic acid, a thiol, a sulfonate, a phosphonate, a phosphate, and combinations thereof, wherein the $TiO_2$ nanocrystals have an average particle size of about 4 nm to about 50 nm as measured by TEM, wherein the TiO2 nanocrystals have anatase crystalline structure, wherein the particle size distribution of the at least partially capped TiO2 nanocrystals is characterized by a D9999 of less than 500 nm as measured by volume by DLS when measured as a 5% dispersion in a solvent.

2. A nanocrystal dispersion comprising at least partially capped $TiO_2$ nanocrystals and a solvent, wherein the at least partially capped $TiO_2$ nanocrystals are present in an amount of greater than 30%, by weight of the dispersion, having an average particle size in the range of 4-50 nm as measured by TEM, wherein the D9999 of the $TiO_2$ nanocrystals in the dispersion, as determined by DLS, is in the range of 20-500 nm when measured as a 5% nanocrystal dispersion in the solvent.

3. A nanocomposite formulation comprising 1) the at least partially capped $TiO_2$ nanocrystals of claim 1; 2) a monomer, oligomer, and/or polymer; and 3) a curing agent, wherein the at least partially capped $TiO_2$ nanocrystals are present in an amount of greater than 50% by weight in respect to the monomer, oligomer and/or polymer.

4. A method of coating a substrate, comprising applying the nanocomposite formulation of claim 3 to the surface of the substrate, and optionally curing the nanocomposite formulation.

5. The coated substrate produced by the method of claim 4.

6. A nanocomposite film comprising the at least partially capped $TiO_2$ nanocrystals of claim 1 and at least one monomer, oligomer and/or polymer, wherein the at least partially capped nanocrystals are present in an amount greater than 30%, by weight of the nanocomposite, wherein the transmittance of the film with a thickness of 1 micron is greater than 80% at wavelength of 400 nm, and the film has a refractive index of about 1.70 to about 2.10 as measured using a Prism Coupler of a film with <5 µm thickness.

7. The nanocomposite film of claim 6, having a hardness of greater than 100 MPa, as measured by nanoindentation.

8. A method of preparing the nanocomposite film of claim 6, the method comprising mixing the at least partially capped $TiO_2$ nanocrystals and at least one monomer, oligomer and/or polymer to provide a nanocomposite formulation, and optionally curing the nanocomposite formulation to provide the nanocomposite film.

9. A device comprising the nanocomposite film of claim 6.

10. The device of claim 9, which is an optoelectronic device, photovoltaic device, catalysis device, fuel cell, battery, smart window, sensor, CMOS sensor, LED, mini-LED, microLED, organic LED (OLED), Quantum LED (QLED), touch screen, display, flexible electronic device, printed electronic device, augmented reality, virtual reality, mixed reality, wave guide, diffraction grating or a solar cell device.

11. A device comprising the coated substrate of claim 5.

12. The device of claim 11, which is an optoelectronic device, photovoltaic device, catalysis device, fuel cell, battery, smart window, sensor, CMOS sensor, LED, mini-LED, microLED, organic LED (OLED), Quantum LED (QLED), touch screen, display, flexible electronic device, printed electronic device, augmented reality, virtual reality, mixed reality, wave guide, diffraction grating or a solar cell device.

13. The at least partially capped TiO2 nanocrystals of claim 1 wherein the organic content of the at least partially capped $TiO_2$ nanocrystals is 5% to 35%, as measured by TGA.

14. The at least partially capped TiO2 nanocrystals of claim 1 capped with at least one capping agent selected from methyltrimethoxysilane, n-propyltrimethoxysilane, n-propyltriethoxysilane, noctyltrimethoxysilane, n-octyltriethoxysilane, phenytrimethoxysilane, dodecyltrimethoxysilane, m,p-ethylphenethyl trimethoxysilane, 2-[methoxy(polyethyleneoxy)propyl] trimethoxysilane, methoxy(triethyleneoxy)propyltrimethoxysilane, 3-aminopropyltrimethoxysilane, 3-mercaptopropyltrimethoxysilane, 3-(methacryloyloxy)propyl trimethoxysilane, 3-(acryloyloxy)propyl trimethoxysilane, 3-isocyanatopropyltriethoxysilane, 3-isocyanatopropyltrimethoxysilane, 3-glycidoxypropyltrimethoxysilane, vinyltrimethoxysilane, allyltrimethoxysilane, 1-hexenyltrimethoxysilane, 1-octenyltrimethoxysilane, (phenylaminomethyl) methyldimethoxysilane, N-phenylaminopropyltrimethoxysilane, 3-(4-pyridylethyl)thiopropyltrimethoxysilane, N-(3-trimethoxysilylpropyl)pyrrole, 2-(3-trimethoxysilylpropylthio) thiophene, (3-trimethoxysilylpropyl)diethylene triamine, 11-mercaptoundecyltrimethoxysilane, (2-diphenylphosphino) ethyldimethylethoxysilane, 2-(diphenylphosphino) ethyltriethoxysilane, 3-(diphenylphosphino) propyltriethoxysilane, heptanol, hexanol, octanol, benzyl alcohol, phenol, ethanol, propanol, butanol, oleylalcohol, dodecylalcohol, octadecanol, triethylene glycol monomethyl ether, octanoic acid, acetic acid, propionic acid, 2-[2-(2-methoxyethoxy)ethoxy] acetic acid, oleic acid, benzoic acid, stearic acid, trifluoroacetic acid, biphenyl-4-carboxylic acid, 2-(2-methoxyethoxy) acetic acid, methacrylic acid, mono-2-(Methacryloyloxy)ethyl succinate, 2-mercaptoethanol, 2-{2-[2-(2-mercaptoethoxy) ethoxy]ethoxy} ethanol, 2-(2-methoxyethoxy)ethanethiol, 1-octanethiol, sodium 2,3-dimercaptopropanesulfonate monohydrate, sodium dodecyl sulfate, dodecyl phosphonic acid, octylphosphonic acid, (11-mercaptoundecyl)phosphonic acid, (11-(acryloyloxy) undecyl)phosphonic acid, 11-methacryloyloxyundecylphosphonic acid, [2-[2-(2-methoxyethoxy)ethoxy]ethyl]phosphonic acid ethyl ester, and combinations thereof.

15. The at least partially capped $TiO_2$ nanocrystals of claim 1, capped with at least one capping agent selected from methyltrimethoxysilane, n-octyltrimethoxysilane, n-octyltriethoxysilane, dodecyltrimethoxysilane, m,p-ethylphenethyl trimethoxysilane, 2-[methoxy(polyethyleneoxy)propyl]-trimethoxysilane, methoxy(triethyleneoxy)propyltrimethoxysilane, 3-aminopropyltrimethoxysilane, 3-mercaptopropyltrimethoxysilane, 3-(methacryloyloxy) propyl trimethoxysilane, 3-(acryloyloxy)propyl trimethoxysilane, 3-glycidoxypropyltrimethoxysilane, vinyltrimethoxysilane, allyltrimethoxysilane, octanol, benzyl alcohol, ethanol, propanol, butanol, oleylalcohol, octanoic acid, acetic acid, 2-[2-(2-methoxyethoxy) ethoxy] acetic acid, oleic acid, benzoic acid, stearic acid, trifluoroacetic acid, 2-(2-methoxyethoxy) acetic acid, methacrylic acid, mono-2-(Methacryloyloxy)ethyl succinate, 2-mercaptoethanol, 2-{2-[2-(2-mercaptoethoxy) ethoxy]ethoxy} ethanol, 2-(2-methoxyethoxy)ethanethiol, dodecyl phosphonic acid, octylphosphonic acid, (11-mercaptoundecyl)phosphonic acid, (11-(acryloyloxy)undecyl)phosphonic acid, 11-methacryloyloxyundecylphosphonic acid, [2-[2-(2-methoxyethoxy)ethoxy]ethyl] phosphonic acid ethyl ester, and combinations thereof.

16. The at least partially capped $TiO_2$ nanocrystals of claim 1, wherein the D9999 is less than 400 nm, as measured by volume of the capped titanium dioxide nanocrystals dispersed 5% by weight in the solvent by Dynamic Light Scattering (DLS).

17. The nanocomposite formulation of claim 3, further comprising a solvent.

18. The nanocomposite formulation of claim 3, wherein the monomer, oligomer and/or polymer is an acrylate, epoxy, or isocyanurate compound, selected from Bisphenol A Glycerolate Dimethacrylate, esters with acrylic acid (OPPEOA), Bisphenol A Ethoxylate diacrylates, Bisphenol A propoxylate diacrylate, Bisphenol F ethoxylate (2 EO/phenol) diacrylate, Bisphenol A glycerolate diacrylates, bisphenol A ethoxylate dimethacrylate, Ethoxylated (4) bisphenol A diacrylate (SR-601), Biphenol A ethoxylate diacrylate (SR-349), Tris(2-acryloyloxy)ethyl} isocyanurate, tricyclodecane dimethanol diacrylate, Tris (2-hydroxyethyl) isocyanurate triacrylate, cresol novolac epoxy acrylate (CN112C60), Benzyl methacrylate (BMA), benzyl acrylate, trimethylolpropane triacrylate (TMPTA), Trimethylolpropane ethoxylate (1 EO/OH) methyl ether diacrylate, 1,6-Hexanediol diacrylate (HDDA, SR238B), tri (ethyleneglycol) diacrylate, ethylene glycol diacrylate, Poly (ethylene glycol) diacrylate, Glycerol 1,3-diglycerolate diacrylate, Di(ethylene glycol) diacrylate, and combinations thereof.

19. The nanocomposite film of claim 6, wherein the % transmittance of the film with a thickness of 1 micron is greater than 80%, at wavelength of 400 nm.

20. The nanocomposite film of claim 6, having a refractive index of 1.70 to 2.10 at 635 nm, as measured using a Prism Coupler of a film with <5 μm thickness.

21. The nanocomposite film of claim 6, having a hardness of greater than 50 MPa, as measured by nanoindentation.

22. The nanocomposite film of claim 6, wherein the haze of the nanocomposite film is less than 1%, and wherein the at least partially capped nanocrystals are dispersed without agglomeration in the film as observed by TEM, SEM or EDX images.

* * * * *